US011354472B2

(12) United States Patent
MacRae et al.

(10) Patent No.: US 11,354,472 B2
(45) Date of Patent: Jun. 7, 2022

(54) AUTOMATED CIRCUIT GENERATION

(71) Applicant: Celera, Inc., San Jose, CA (US)

(72) Inventors: Calum MacRae, Charlotte, NC (US);
Jim LoCascio, Mountain View, CA (US); Karen Mason, Sunnyvale, CA (US); John Mason, Sunnyvale, CA (US); Richard Philpott, Discovery Bay, CA (US); Muhammed Abid Hussain, Los Altos, CA (US)

(73) Assignee: CELERA INC., San Jose, CA (US)

( * ) Notice: Subject to any disclaimer, the term of this patent is extended or adjusted under 35 U.S.C. 154(b) by 0 days.

(21) Appl. No.: 16/886,577

(22) Filed: May 28, 2020

(65) Prior Publication Data
US 2020/0380192 A1    Dec. 3, 2020

Related U.S. Application Data

(63) Continuation of application No. 16/882,217, filed on May 22, 2020.
(Continued)

(51) Int. Cl.
*G06F 30/327* (2020.01)
*G06F 30/367* (2020.01)
(Continued)

(52) U.S. Cl.
CPC ........... *G06F 30/327* (2020.01); *G06F 30/31* (2020.01); *G06F 30/367* (2020.01); *G06F 30/38* (2020.01);
(Continued)

(58) Field of Classification Search
CPC ...... G06F 30/327; G06F 30/367; G06F 30/38; G06F 30/31; G06F 30/398; G06F 30/392; G06F 2111/12; G06F 111/12
See application file for complete search history.

(56) References Cited

U.S. PATENT DOCUMENTS

| 5,278,769 A | 1/1994 | Bair et al. |
| 7,058,916 B2 | 6/2006 | Phelps et al. |

(Continued)

FOREIGN PATENT DOCUMENTS

| CN | 102385642 B | 2/2013 |
| WO | 2007149717 A2 | 12/2007 |

(Continued)

OTHER PUBLICATIONS

Brinson, M.E. et al., "A new approach to compact semiconductor device modelling with Ques Verilog-A analogue module synthesis", International Journal of Numerical Modelling: Electronic Networks, Devices and Fields. Nov. 29, 2016, 20 pages.
(Continued)

*Primary Examiner* — Eric D Lee
(74) *Attorney, Agent, or Firm* — Fountainhead Law Group P.C.

(57) ABSTRACT

Automated circuit generation is disclosed. In some embodiments, parameters are received and a circuit schematic is generated automatically by software. In some embodiment, parameters are received and a circuit layout is generated automatically by software. In some embodiments, a design interface may be used to create a behavioral model of a circuit. Software may generate a circuit specification to generate a schematic. In various embodiments, circuit component values may be determined and generated. Certain embodiments pertain to automating layout of circuits. Software may receive parameters for functional circuit components and generate a circuit schematic and/or a layout. The present techniques are particularly useful for automatically generating analog circuits.

19 Claims, 70 Drawing Sheets

Related U.S. Application Data

(60) Provisional application No. 62/854,848, filed on May 30, 2019.

(51) Int. Cl.
| | |
|---|---|
| *G06F 30/38* | (2020.01) |
| *G06F 30/31* | (2020.01) |
| *G06F 30/398* | (2020.01) |
| *G06F 30/392* | (2020.01) |
| *G06F 111/12* | (2020.01) |
| *G06F 111/20* | (2020.01) |

(52) U.S. Cl.
CPC .......... *G06F 30/392* (2020.01); *G06F 30/398* (2020.01); *G06F 2111/12* (2020.01)

(56) References Cited

U.S. PATENT DOCUMENTS

| | | |
|---|---|---|
| 7,076,415 B1 | 7/2006 | Demler |
| 7,418,683 B1 | 8/2008 | Sonnard et al. |
| 7,587,694 B1 | 9/2009 | Henrickson et al. |
| 8,001,494 B2 | 8/2011 | Hou et al. |
| 8,302,059 B2 | 10/2012 | Pineda de Gyvez et al. |
| 8,850,374 B2 | 9/2014 | Huang et al. |
| 8,949,102 B2 | 2/2015 | Dai et al. |
| 9,183,332 B2 | 11/2015 | Ferguson et al. |
| 9,336,347 B2 | 5/2016 | Wang et al. |
| 9,342,647 B2 | 5/2016 | Chen et al. |
| 9,411,923 B2 | 8/2016 | Kruberg et al. |
| 9,619,605 B1 | 4/2017 | Kohli et al. |
| 9,779,193 B1 | 10/2017 | Ginetti et al. |
| 10,285,276 B1 | 5/2019 | Kukai et al. |
| 10,289,793 B1 | 5/2019 | Kukal et al. |
| 10,558,780 B1 | 2/2020 | Kukai et al. |
| 10,671,700 B2 | 6/2020 | Irissou et al. |
| 10,699,051 B1 | 6/2020 | Zhang et al. |
| 10,770,160 B2 | 9/2020 | Chung et al. |
| 10,783,292 B1 | 9/2020 | Clewes et al. |
| 10,783,296 B1 | 9/2020 | Ershov |
| 10,796,059 B2 | 10/2020 | Su et al. |
| 10,808,333 B2 | 10/2020 | Ito et al. |
| 10,846,456 B2 | 11/2020 | Su et al. |
| 10,885,258 B1 | 1/2021 | Chiou |
| 11,157,676 B2 | 10/2021 | Dantu et al. |
| 11,243,687 B2 | 2/2022 | Kim et al. |
| 2004/0034842 A1 | 2/2004 | Mantey et al. |
| 2004/0049370 A1 | 3/2004 | Stanley et al. |
| 2004/0172609 A1 | 9/2004 | Hassibi et al. |
| 2008/0005713 A1 | 1/2008 | Singh et al. |
| 2008/0109782 A1 | 5/2008 | Adelman et al. |
| 2008/0301592 A1 | 12/2008 | Voldman |
| 2012/0005547 A1 | 1/2012 | Chang et al. |
| 2012/0066659 A1 | 3/2012 | Chen et al. |
| 2012/0209888 A1 | 8/2012 | Chung |
| 2012/0304140 A1 | 11/2012 | Boshart et al. |
| 2013/0311152 A1 | 11/2013 | Walker |
| 2015/0269297 A1 | 9/2015 | Tuan |
| 2016/0110369 A1 | 4/2016 | Cervelli et al. |
| 2017/0098024 A1 | 4/2017 | Aggarwal et al. |
| 2017/0124235 A1 | 5/2017 | Ferguson et al. |
| 2019/0042684 A1 | 2/2019 | Toub et al. |
| 2019/0163854 A1 | 5/2019 | Beck et al. |
| 2019/0211475 A1* | 7/2019 | Ito ........................ G06F 30/327 |
| 2020/0380188 A1 | 12/2020 | MacRae et al. |
| 2020/0380192 A1 | 12/2020 | MacRae et al. |
| 2020/0410153 A1 | 12/2020 | MacRae et al. |
| 2022/0043953 A1 | 2/2022 | Mason et al. |

FOREIGN PATENT DOCUMENTS

| | | | |
|---|---|---|---|
| WO | 2009020431 A1 | 2/2009 | |
| WO | 2018019371 A1 | 2/2018 | |

OTHER PUBLICATIONS

Brinson, M.E. et al., "Adaptive subcircuits and compact Verilog-A macromodels as integrated design and analysis blocks in Qucs circuit simulation", International journal of electronics. May 1, 2011, 14 pages.

Tan, X.D. et al., "Hierarchical symbolic analysis of analog integrated circuits via determinant decision diagrams", IEEE Transactions on Computer-Aided Design of Integrated Circuits and Systems. Apr. 2000, Abstract Only, 19 pages.

Dialog Semiconductor, "GreenPAK Programmable Mixed-Signal Matrix with In-System Programmability and Advanced Analog Features", Dec. 3, 2020.

Elad Alon et al., "Injecting Agile Into Analog Design", Berkeley Annual Research Symposium 2018, Mar. 1, 2018, 22 pages.

Bruce, J.D.et al., "Analog layout using ALAS!", IEEE Journal of Solid-State Circuits, Abstract Only, Feb. 1996; 31 (2):271-4.

O'Brien, P.R. et al., "Modeling the Driving-Point Characteristic of Resistive Interconnect for Accurate Delay Estimation", The Best of ICCAD. Springer, Boston, MA, 2003. 393-402.

Martins R et al., "Automatic layout generation of analog integrated circuits", IEEE Transactions on Computer-Aided Design of Integrated Circuits and Systems. Oct. 16, 2013;32(11):1641-54. Abstract only.

Chang E. et al., E. BAG2: A process-portable framework for generator-based AMS circuit design. In 2018 IEEE Custom Integrated Circuits Conference (CICC) Apr. 8, 2018 (pp. 1-8). Abstract only.

Hakhamaneshi K. et al., BAGNET: Berkeley Analog Generator with Layout Optimizer Boosted with Deep Neural Networks. In 2019 IEEE/ACM International Conference on Computer-Aided Design (ICCAD) Nov. 4, 2019 (pp. 1-8). IEEE. Abstract Only.

Gielen G.G. et al., "Computer-aided design of analog and mixed-signal integrated circuits", Proceedings of the IEEE. Dec. 2000; 88(12):1825-54, Abstract only.

Anna Goldie et al., "Placement Optimization with Deep Reinforcement Learning", ISPD: International Symposium on Physical Design 2020, Mar. 29, 2020, 5 pages.

Victor P. Nelson, "Computer-Aided Design of ASICs of Concept to Silicon", Feb. 10, 2016. 52 pages.

Sambuddha Bhattacharya, "Correct-by-Construction Layout-Centric Retargeting of Large Analog Designs*", DAC 2004, Jun. 7, 2004, San Diego, CA, 6 pages.

Marin, D et al., "CONNAN: A Computer-Aided Design Tool based on Sharing Information for Analog Circuit Sizing", PATMOS. Sep. 1997.

Weng, Y.P. et al., "Fast analog layout prototyping for nanometer design migration", In 2011 IEEE/ACM International Conference on Computer-Aided Design (ICCAD). Nov. 7, 2011 (pp. 517-522). IEEE.

"GreenPAK Designer User Guide", Dialog Semiconductor, Santa Clara, CA, Apr. 19, 2021, 132 pages.

"GreenPAK", Dialog Semiconductor, Jan. 2020, 7 pages.

David Guilherme et al., "Automatic Layout Generation of Power MOSFET Transistors in Bulk CMOS", IEEE International Conference on Electronics, Circuits and Systems (ICECS), Dec. 7, 2014.

Non Final Office Action for U.S. Appl. No. 16/886,432, dated Feb. 8, 2021, 11 pages.

Non Final Office Action for U.S. Appl. No. 16/886,544, dated Mar. 9, 2021, 21 pages.

Mirhoseini, et al. "A Graph Placement Methodology For Fast Chip Design", dated Jun. 9, 2021, 23 pages.

Non Final Office Action for U.S. Appl. No. 16/882,217, dated Feb. 3, 2022, 15 pages.

Non Final Office Action for U.S. Appl. No. 16/886,432, dated Sep. 7, 2021, 12 pages.

Non Final Office Action for U.S. Appl. No. 16/886,544, dated Mar. 2, 2022, 10 pages.

* cited by examiner

*Params_8 (Replica)*

*Ckt_spec:*
*M1 a, b, c (n_type_6v, W4, L1, F3, M)*
*MR a, b, d (n_type_6v, WR, L1, F=1, M=1)*

AUTOMATED CIRCUIT GENERATION

CROSS-REFERENCE TO RELATED APPLICATIONS

This Application is a continuation of, and claims the benefit of priority to, U.S. patent application Ser. No. 16/882,217, filed May 22, 2020, the contents of which are hereby incorporated herein by reference. This Application further claims the benefit of priority to U.S. Provisional Patent Application Ser. No. 62/854,848 filed May 30, 2019, the contents of which are hereby incorporated herein by reference.

BACKGROUND

The present disclosure pertains to electronic circuits, and in particular, to techniques for automatically generating circuit schematics and layouts.

Electronic circuits have become ubiquitous in modern society. From smartphones, personal computers, televisions, and a host of other consumer electronic devices to industrial equipment, scientific instruments, communications systems, and almost every aspect of the Internet, electronic circuits, typically in the form of integrated circuits (or "chips"), have had a dramatic impact on human existence.

However, developing electronic circuits can be time consuming and costly.

Typically, teams of highly trained electrical engineers and a host of the electronic circuit professionals spend long periods of time designing circuit schematics and laying out the circuitry to form a chip with the desired functionality. Circuit schematics may include each transistor in the circuit together with connections between the transistors. The schematics can be used to simulate how the electronic circuit will operate to ensure proper functionality. Next, the transistors are laid out as geometric shapes. The layout (sometimes referred to as the "mask design") is a representation of an integrated circuit in terms of planar geometric shapes which may, for example, correspond to the physical aspects of the circuit to be created in silicon (e.g., on a wafer which is then cut into individual chips). For example, the layout may represent patterns of metal, oxide, or semiconductor layers that make up the physical components of the integrated circuit.

Designing circuit schematics and creating layouts for an entire electronic circuit can be a tedious and time-consuming process. In particular, for analog circuits, transistor level schematics are typically prepared by very experienced and highly trained analog circuit design professionals. Designing schematics from scratch can take several months depending on the complexity of the circuitry. Once the design is created, analog circuit design professionals typically work with layout professionals to create the layout. The layout process can also take weeks or even months.

Discovering techniques for generating schematics and layouts automatically may reduce chip development cycle times, streamline the development process, and provide a wide range of other potential advantages.

DETAILED DESCRIPTION

Described herein are techniques for automated circuit generation. Some or all of the techniques described herein may be used to make an integrated circuit, for example. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

In various embodiments and combinations, the following disclosure describes techniques for automatically generating electronic circuits using software. Some embodiments described below may generate circuit schematics or circuit layouts, or both, in response to parameters. Parameters may specify a variety of circuit properties, and a software system may generate schematics or layouts, or both, for a wide range of circuits based on the parameters, for example. In some embodiments described herein, a design interface may allow a user to define a circuit to be generated by selecting functional circuit components and specifying parameters. In some embodiments, the design interface may be a high level representation of the circuits, such as a behavioral level representation, for example, which may require less knowledge of, or experience with, circuit design techniques than would be required to define a transistor level schematic, for example. Thus, in some example embodiments, a user with far less or very little circuit design knowledge or experience may define circuits, and computer software may generate schematics or layouts, or both, in response to the less skilled or less experienced user's input. Additionally, circuit schematic design and layout development cycle times, which can be long using traditional approaches, can be dramatically reduced using an automated circuit design techniques described herein. The present techniques are particularly advantageous in the field of analog circuit design. A variety of innovations are disclosed below for use in various embodiments of the present disclosure. The innovations disclosed below may be implemented either alone or in various combinations with other innovations described here according to various embodiments and used as part of a process for making an integrated circuit, for example.

Parameterized Circuit Schematic Generation

Figure 1:
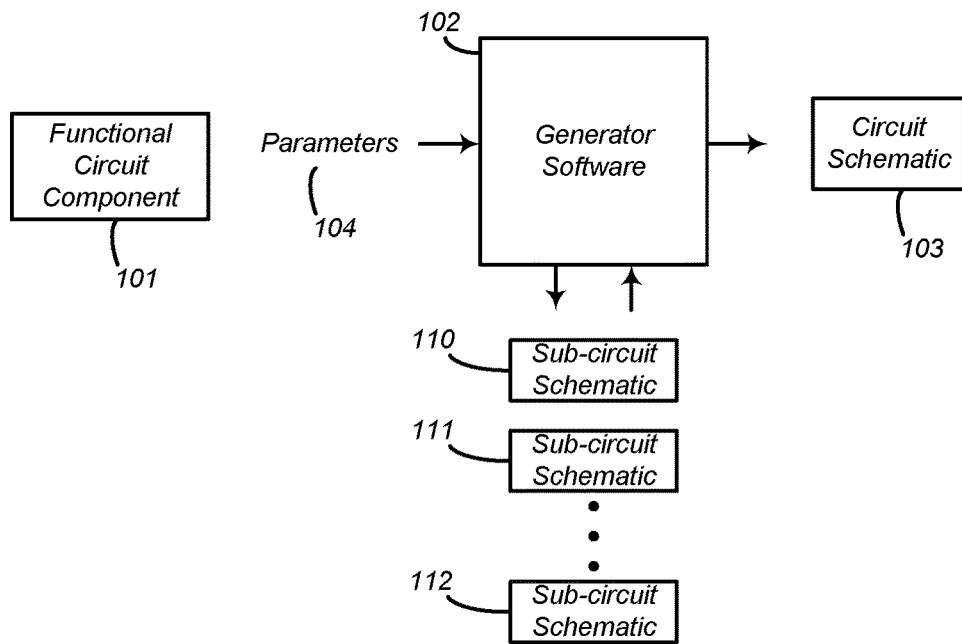
FIG. 1 illustrates a system for automated circuit generation of according to one embodiment.

FIG. 1 illustrates a system for automated circuit generation according to one embodiment. Features and advantages of the present disclosure include a system capable of automatically generating circuit schematics based on input parameters, for example, where different parameter values may result in different circuit schematics being generated automatically. As illustrated in FIG. 1, a generator software system 102 may receive parameters 104 and produce a circuit schematic 103. Generator software system 102 may execute on at least one computer system, for example, and comprise computer code, which when executed by one or more computers causes the computer(s) to perform operations for performing the techniques described herein. The parameters may be received in generator 102 in a variety of data formats as information specifying circuitry to be generated, for example.

Parameters 104 may comprise a plurality of circuit specification parameters corresponding to at least one functional circuit component 101, for example. Circuit specification parameters may specify properties of a circuit to be generated, for example. For instance, circuit specification parameters in some example embodiments may be variables having particular values. As illustrated in more detail below, circuit specification parameters may specify electrical properties of the circuit to be generated (e.g., voltages or currents) or may specify physical properties of circuits to be generated (e.g., whether an input uses an N-type or P-type transistor or the physical structure of a capacitor or resistor). In some embodiments, circuit specification parameters may correspond to particular functional circuit components, such as functional circuit component 101. In various embodiments, the functional circuit components may be analog functional circuit components, for example. For example, one set of circuit specification parameters may correspond to one functional circuit component (e.g., a comparator) and another set of parameters may correspond to a different functional circuit component (e.g., a delay circuit or oscillator). Accordingly, a comparator may have a different set of parameters than an oscillator, although in some embodiments, distinct sets of parameters for different functional circuit components may have one or more of the same individual parameters (e.g., parameters specifying an input stage type or a supply voltage value). Parameters 104 may be implemented using a variety of techniques. In some embodiments, circuit specification parameters may be received as text, for example, specifying variable names and values. In other embodiments, circuit specification parameters may be implemented as code (e.g., digital code values or a wide range of other coding techniques) for specifying properties of the circuit to be generated to embody functional circuit component 101, for example. It is to be understood that a variety of coding techniques could be used to embody circuit specification parameters to specify properties of the circuit to be generated.

Parameters 104 are received by generator 102. Generator 102 may select (i.e., determine or otherwise identify) a plurality of sub-circuit schematics 110-112 based on the circuit specification parameters. For example, one set of values (or a code) for the received circuit specification parameters may result in selection of sub-circuit schematic 110 and sub-circuit schematic 111. Another set of values (or another encoding) for the received circuit specification parameters may result in selection of sub-circuit schematic 110, sub-circuit schematic 111, and sub-circuit schematic 112, for example. Once the appropriate sub-circuit schematics are selected, the identified sub-circuits schematic may be combined to form circuit schematic 103. Accordingly, circuit schematic 103 implements the functional circuit component 101 having the properties specified by parameters 104.

While the following disclosure describes combining sub-circuit schematics, it is to be understood that other sub-circuit models may be used in other embodiments. Schematics typically refer to models describing connections of components used in a circuit (e.g., transistors, resistors, capacitors, inductors, and the like). The embodiments described herein may not be limited to the particular modeling techniques used to represent the sub-circuits and circuits, for example.

Embodiments of the present disclosure may be particularly advantageous to generating analog circuit schematics. Analog circuits are different from digital circuits in that digital circuits process binary voltages (representing zeros and ones) using simple logic circuits with transistors that are substantially either fully turned on or fully turned off, whereas analog circuits typically involve circuitry with transistors that are operable across some range between fully turned on and fully turned off (e.g., across a linear range). Analog circuits may be dependent on particular voltages and currents in the circuit to perform a wide variety of operations where components (e.g., capacitors, transistors, resistors, inductors) in the system operate across ranges of voltage or current, for example. A subset of analog circuits are mixed signal circuits. Mixed signal circuits are analog circuits that include some digital circuitry that is integrated together with and works together with analog circuitry. Mixed signal circuits are to be distinguished from digital circuits that are not integrated with and/or perform functions substantially independent of analog circuitry, for example. The differences between analog circuit design (e.g., analog/mixed signal circuit design) and digital circuit design are known by those skilled in the art.

Embodiments of the present disclosure may be used to automatically generate analog circuit schematics and/or layouts, for example, based on circuit specification parameters. As mentioned above, the circuit specifications parameters may correspond to one or more functional analog circuit components, such as a comparator, oscillator, delay, etc. . . . . The circuit specification parameters may specify properties of the analog circuit to be generated, such as a comparator with a P-type or N-type input, for example. The circuit specification parameters may be used, in some example applications, to select predefined analog sub-circuit schematics corresponding to a particular functional analog circuit component. For example, as illustrated in a more detailed example below, generator 102 may select a predefined P-type comparator sub-circuit schematic, a first predefined hysteresis sub-circuit schematic, and a predefined deglitch sub-circuit schematic based on one set of parameters to form a circuit schematic for a comparator functional circuit component having one set of properties, and generator 102 may select a predefined N-type comparator sub-circuit schematic and another predefined hysteresis circuit schematic using another set of parameters to form a circuit schematic for a comparator functional circuit component having another set of properties, for example.

Figure 2:
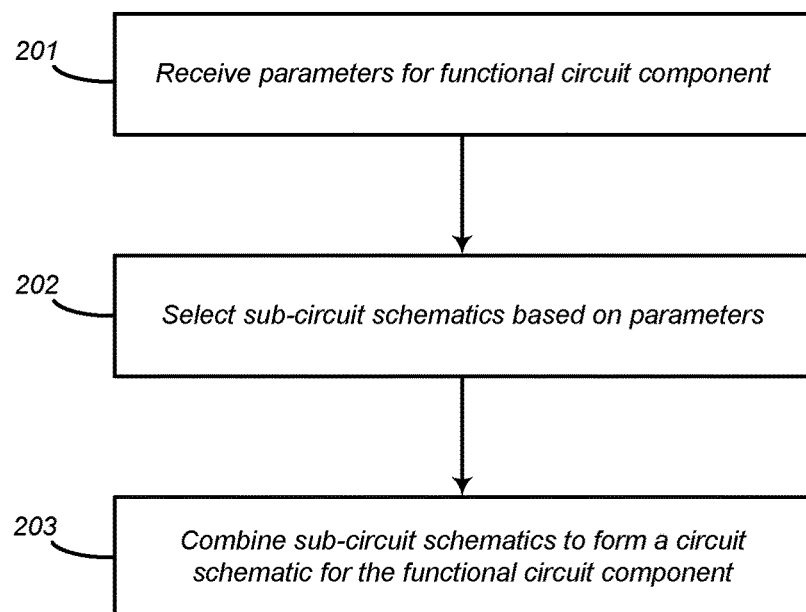
FIG. 2 illustrates a method for automated circuit generation according to one embodiment.

FIG. 2 illustrates a method for automated circuit generation according to one embodiment. The method may be performed by software executing on one or more computers, for example. At 201, a plurality of circuit specification parameters are received that correspond to at least one functional circuit component. The circuit specification parameters may be represented in a variety of ways, such as variables and values in text or as code, for example. As mentioned above, received parameters may include one or more sets of parameters associated with different functional analog circuit components (e.g., one set of parameters corresponding to a first functional analog circuit component and another set of parameters corresponding to a second functional analog circuit component). At 202, particular sub-circuit schematics are selected based on the circuit specification parameters. In one embodiment, different functional circuit components may have different sets of predefined sub-circuit schematics. Selection may include selecting a subset of the predefined sub-circuit schematics corresponding to the functional circuit component based on the circuit specification parameters. For example, a comparator may have an N-type comparator sub-circuit schematic, a P-type comparator sub-circuit schematic, and various other sub-circuit schematics in the set of schematics corresponding to the comparator functional circuit component. The P-type sub-circuit schematic may be selected based on one or more parameters having a particular value, and the N-type sub-circuit schematic may be selected based on the one or more parameters having different values, for example. At 203, the software system combines the selected sub-circuit schematics to form a circuit schematic for the functional circuit component. The sub-circuit schematics may be in the form of functional component level circuit blocks (or designs) having a variety of input and output terminals (or pins) in the schematic. Accordingly, combining may include coupling pins together between the sub-circuit schematics and/or coupling pins of the sub-circuit schematics to other pins of other circuit schematics, for example. An example of coupling pins between sub-circuit schematics is illustrated in more detail below.

FIGS. 3A-D illustrate examples of automated circuit schematic generation according to various embodiments. As illustrated in various examples below, particular values for a set of circuit specification parameters may correspond to a specific instance of a particular functional circuit component (e.g., a comparator with particular properties to be generated). There may be many of the same functional circuit components with different circuit specification parameters and corresponding different circuit schematics formed from different selected sub-circuits, for example. In certain embodiments, different values for one set of circuit specification parameters may generate different analog circuit schematics having different electrical properties for one corresponding functional circuit component. For example, parameters 302 corresponding to functional circuit component 303 may be coded with different values. In this example, a set of N parameters (where N is an integer) is illustrated as variables a1, a2, a3, . . . aN having a first set of values [a1=x1, a2=x2, a3=x3, . . . , aN=xN]. Generator software 301 receives parameters 302 having the first set of values and selects a subset of sub-circuit schematics 310-315. The selected sub-circuit schematics are combined to form a circuit schematic for the functional circuit component 303 according to the received parameters. In this example, the first set of parameter values result in sub-circuit schematics 310-312 being selected and combined to form circuit schematic 303A.

Figure 3A:
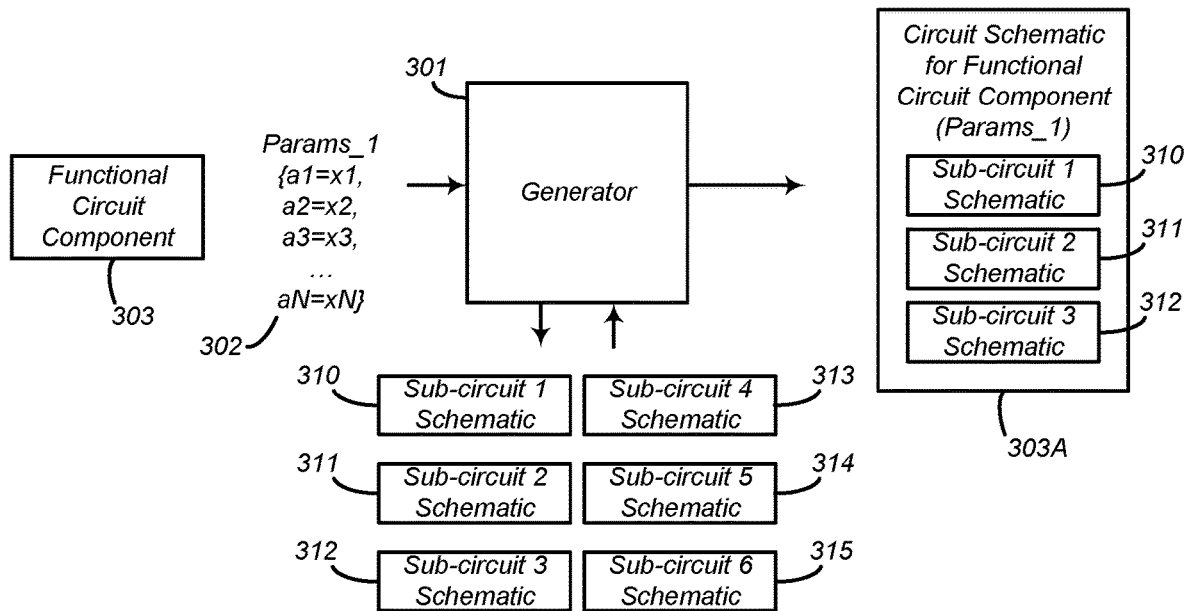
FIGS. 3A-D illustrate examples of automated circuit schematic generation according to various embodiments.
Figure 3B:
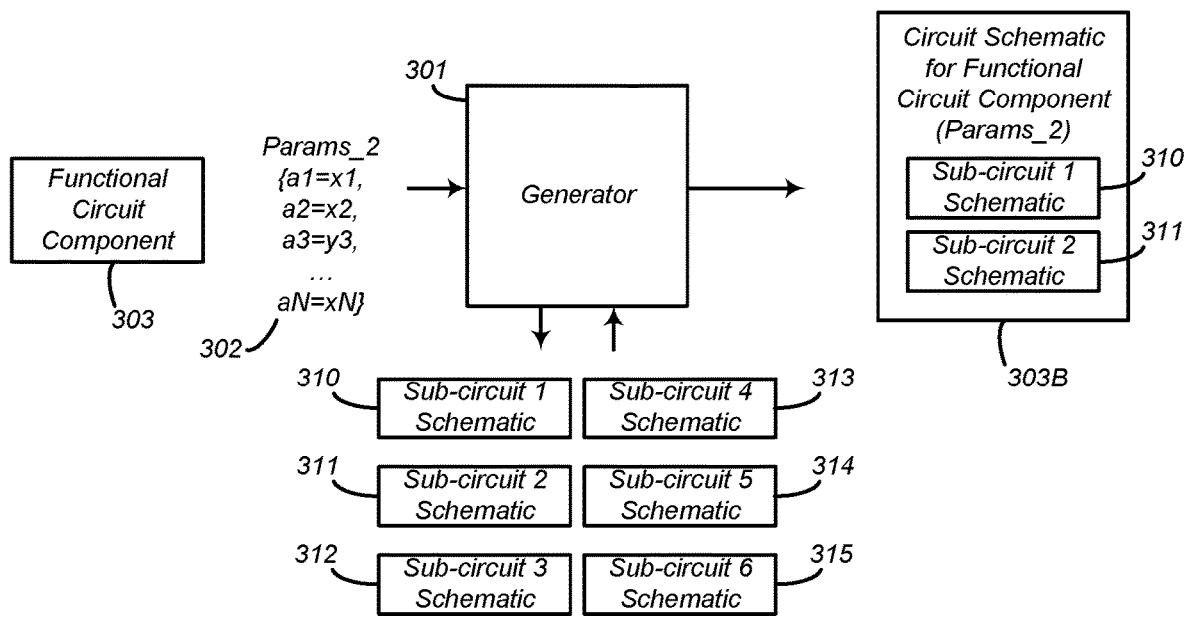

FIG. 3B illustrates parameters 302 having a second set of values [a1=x1, a2=x2, a3=y3, . . . , aN=xN]. Here, parameter a3 has changed its value from x3 to y3. Therefore, the sub-circuit schematics selected changes. In this example, when a3=y3 sub-circuit schematic 312 is no longer selected and included in the circuit schematic 303B with sub-circuit schematics 310 and 311.

Figure 3C:
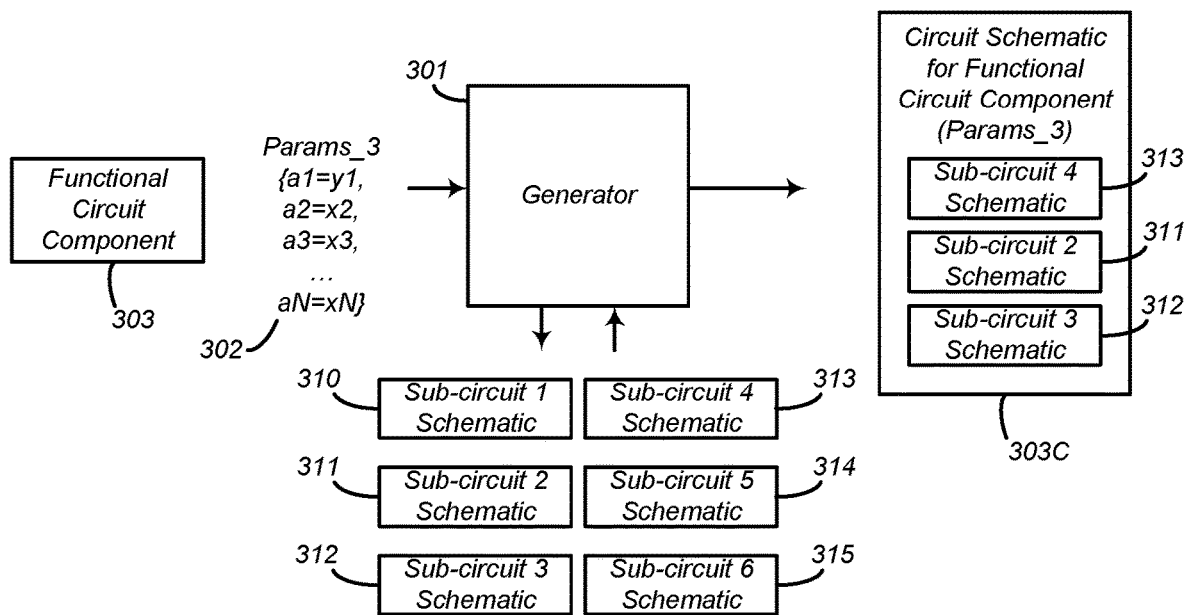

FIG. 3C illustrates parameters 302 having a third set of values [a1=y1, a2=x2, a3=x3, . . . , aN=xN]. Here, parameter a1 has changed its value from x1 to y1 and parameter a3=x3. Therefore, the sub-circuit schematics selected changes again. In this example, when a1=y1 sub-circuit schematic 310 is no longer selected. Rather, sub-circuit schematic 313 is selected and included in the circuit schematic 303C with sub-circuit schematics 311 and 312.

Figure 3D:
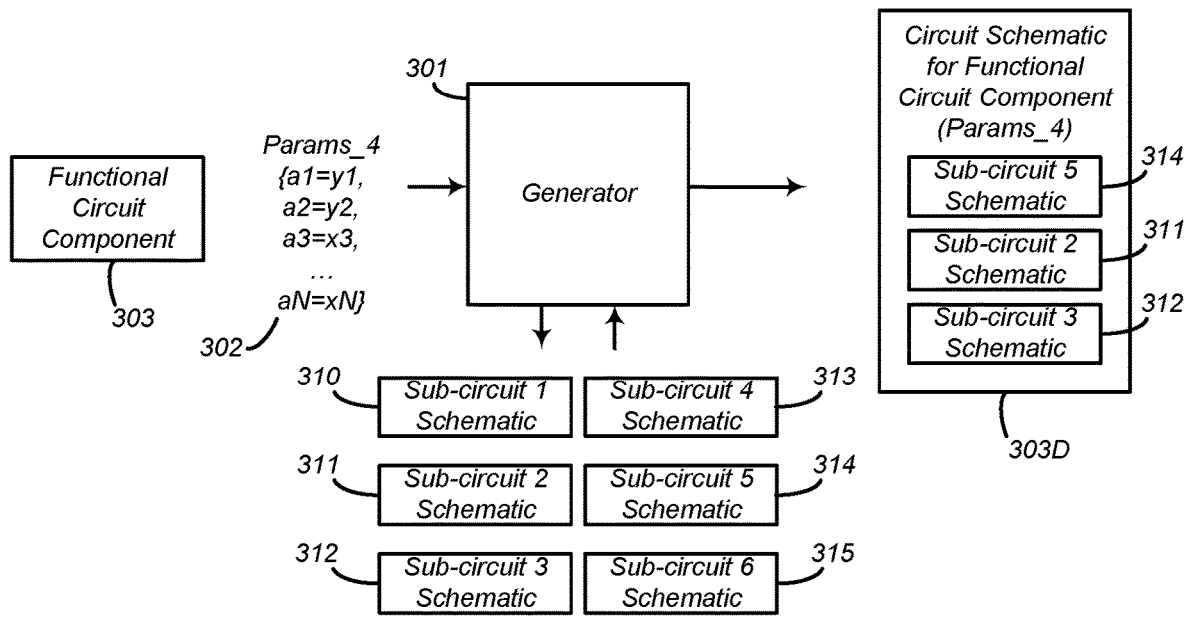

FIG. 3D illustrates parameters 302 having a fourth set of values [a1=y1, a2=y2, a3=x3, . . . , aN=xN]. Here, parameter a1 and a2 having values of y1 and y2, respectively, results in sub-circuit schematic 314 being selected and included in the circuit schematic 303D with sub-circuit schematics 311 and 312.

Figure 4A:
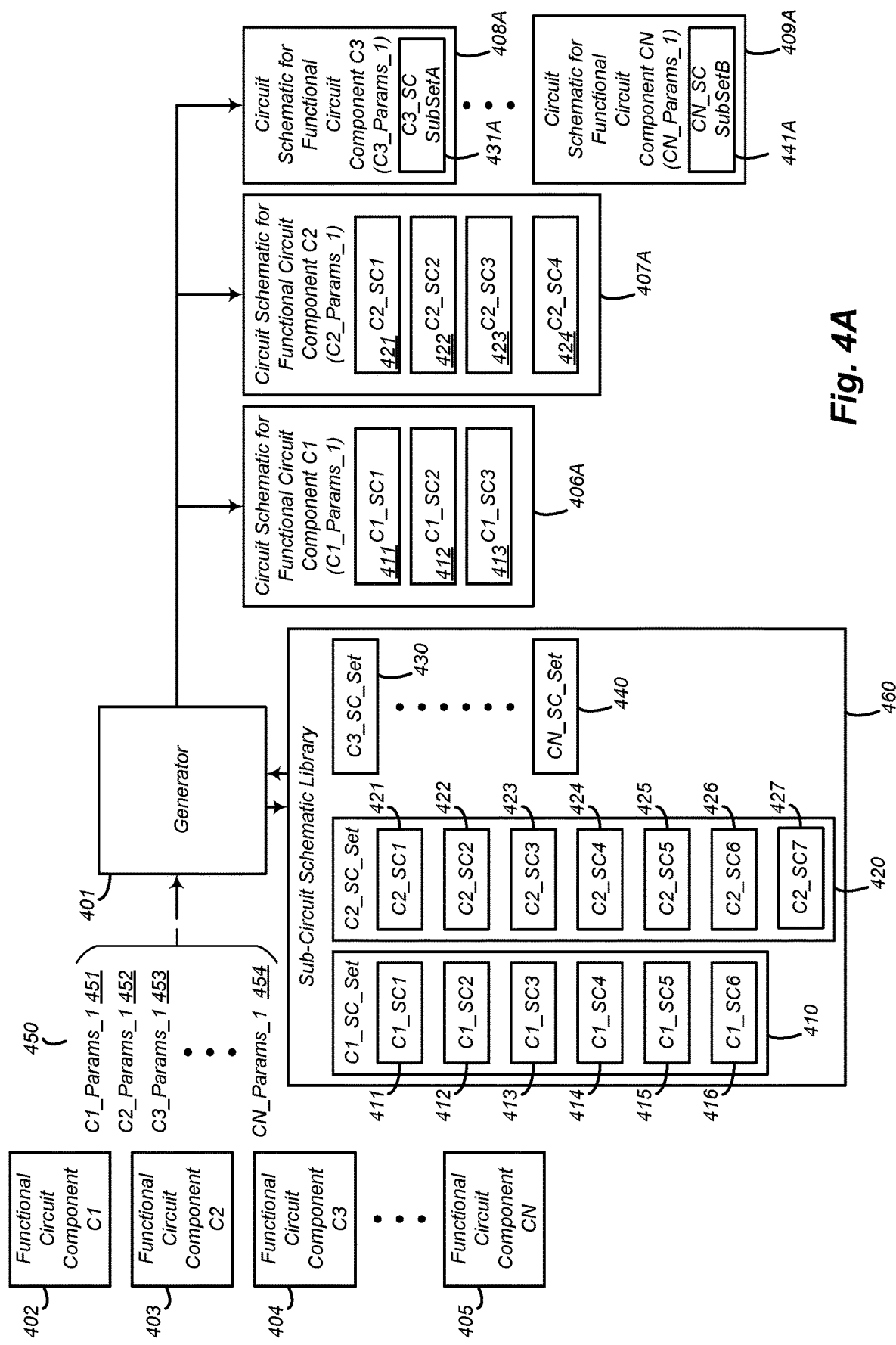
FIGS. 4A-D illustrate examples of automated circuit schematic generation according to further embodiments.

Features and advantages of some embodiments of the present disclosure may include receiving circuit specification parameters corresponding to a plurality of functional circuit components and automatically generating circuit schematics implementing each functional circuit component based on the parameters. FIGS. 4A-D illustrate different parameter sets (or encodings) generating different circuit schematics for different functional circuit components according to an embodiment. Referring to FIG. 4A, in this example, a generator software system 401 receives parameters 450 corresponding to a plurality of functional circuit components 402-405 (components C1, C2, C3, C4, and so on up to CN, where N is an integer corresponding to the number of different functional circuit components). C1-CN may be a comparator, an oscillator, a delay circuit, a current generator, a voltage reference, or a wide variety of other analog functional circuit components used in analog circuits, for example. In this example, generator 401 may receive N sets of circuit specification parameters, where each different functional circuit component has a corresponding set of circuit specification parameters. In particular, a first set of parameters 451, C1_Params, correspond to component C1 402, a second set of parameters 452, C2_Params, correspond to component C2 403, a third set of parameters 453, C3_Params, correspond to component C3 404, and so on up to a final set of parameters 454, CN_Params, corresponding to component CN 405, where N is an integer representing a number of functional circuit components for which corresponding circuit schematics are being generated, for example. Each set of parameters 451-454 may specify properties of the circuit schematic to be produced by having different parameter values. In this example, parameters 451 have a first set of values, which are represented here as "C1_Params_1". Similarly, parameters 452 have a first set of values "C2_Params_1", parameters 453 have a first set of values "C3_Params_1", and so on for parameters 454 having values "CN_Params_1".

FIGS. 4A-D show examples illustrating that different circuit specification parameters 450 for different corresponding functional circuit components may have different corresponding sets of predefined sub-circuit schematics. For example, predefined analog sub-circuits may be stored in a library 460 shown in FIG. 4A. In this example, there are multiple sets of sub-circuits 410, 420, 430, and 440 corresponding to different functional circuit components 402, 403, 404, and 405, respectively. Accordingly, C1_Params 451 corresponding to functional circuit component 402 (C1) may be used to select sub-circuit schematics from C1 sub-circuit set ("C1_SC_Set") 410 comprising analog sub-circuit schematics 411-416, for example. Similarly, C2_Params 452 corresponding to functional circuit component 403 (C2) may be used to select sub-circuit schematics from C2 sub-circuit schematic set ("C2_SC_Set") 420 comprising analog sub-circuit schematics 421-427, for example. Likewise, C3_Params 453 corresponding to functional circuit component 404 (C3) may be used to select sub-circuit schematics from C3 sub-circuit schematic set ("C3_SC_Set") 430 and so on up to CN_Params 454 corresponding to functional circuit component 405 (CN), which may be used to select sub-circuit schematics from CN sub-circuit schematic set ("CN_SC_Set") 440 (sub-circuits not shown).

Parameters 451-454 may have different values that result in different combinations of corresponding sub-circuits. In this example, each set of parameters 451-454 receives a first set of parameter values (e.g., particular values are designated here with an "_1", "2", etc. . . . ). For instance, a first set of values for circuit specification parameter 451 is designated C1_Params_1, a first set of values for circuit specification parameter 452 is designated C2_Params_1, and so on. In this example, generator 401 receives parameter values C1_Params_1 and combines sub-circuit schematics C1_SC1 411, C1_SC2 412, and C1_SC3 413 from C1_SC_Set 410 to produce an analog circuit schematic 406A corresponding to functional circuit component C1 402. Similarly, generator 401 receives parameter values C2_Params_1 and combines sub-circuit schematics C2_SC1 421, C2_SC2 422, C2_SC3 423, and C2_SC4 424 from C2_SC_Set 420 to produce an analog circuit schematic 407A corresponding to functional circuit component C2 403. Likewise, generator 401 receives parameter values C3_Params_1 and combines sub-circuit schematics (not shown) from C3_SC_Set 430 to produce an analog circuit schematic 408A corresponding to functional circuit component C3 404. Analog circuit schematic 408A comprises a first subset of sub-circuit schematics (C3_SC SubsetA) 431A from C3_SC_Set 430. Finally, generator 401 receives parameter values CN_Params_1 and combines sub-circuit schematics (not shown) from CN_SC_Set 440 to produce an analog circuit schematic 409A corresponding to functional circuit component CN 405. Analog circuit schematic 409A comprises a first subset of sub-circuit schematics (CN_SC SubsetB) 441A from CN_SC_Set 440.

Figure 4B:
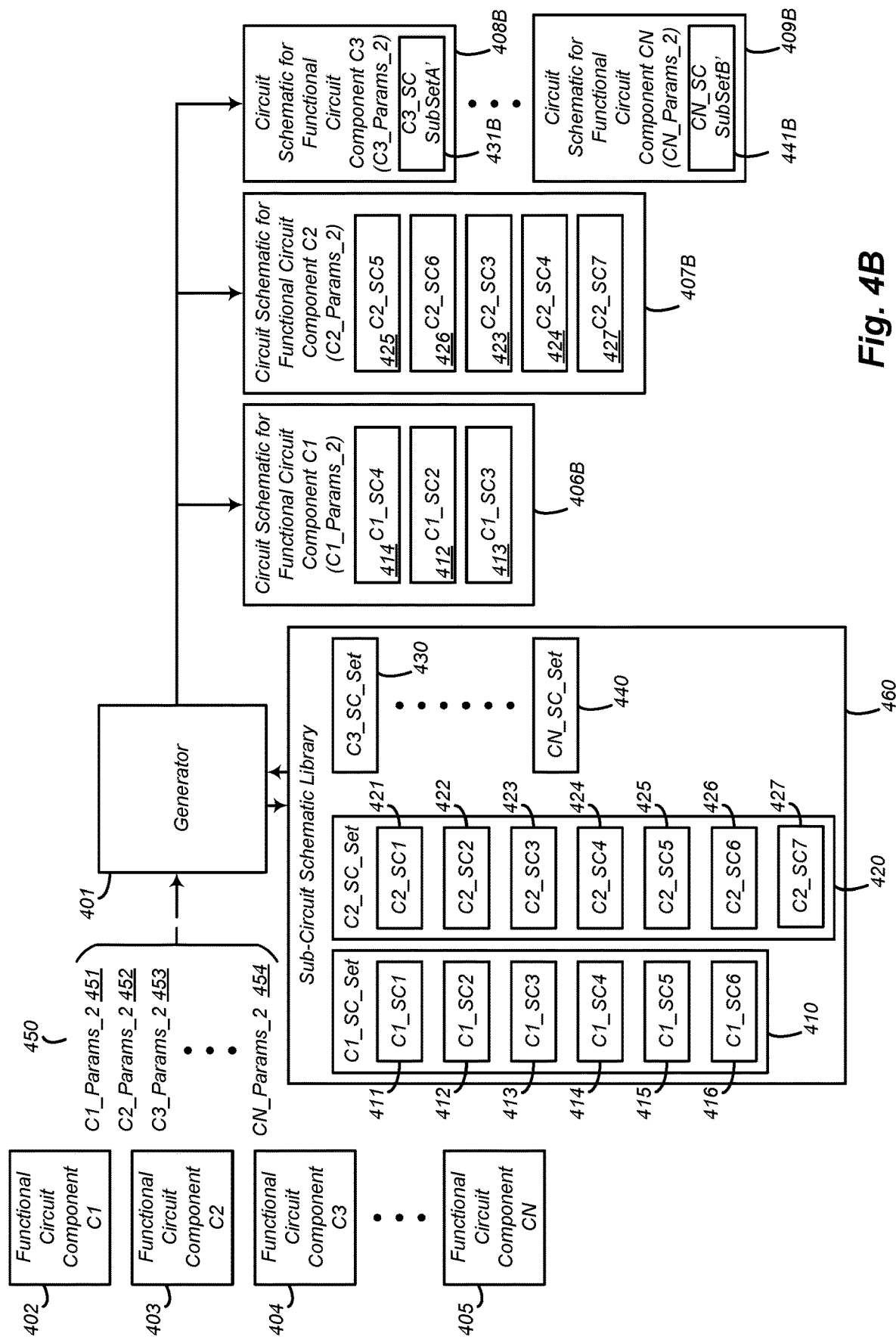

FIG. 4B illustrates generating another circuit using another set of parameters according to an embodiment. In this example, the set of parameters 451-454 receive different sets of parameter values. For instance, a new set of values for circuit specification parameters 451 is designated C1_Params_2, a new set of values for circuit specification parameters 452 is designated C2_Params_2, and so on. In this example, generator 401 receives parameter values C1_Params_2 and selects and combines sub-circuits C1_SC4 414, C1_SC2 412, and C1_SC3 413 from C1_SC_Set 410 to produce an analog circuit schematic 406B corresponding to functional circuit component C1 402. Similarly, generator 401 receives parameter values C2_Params_2 and selects and combines sub-circuits C2_SC5 425, C2_SC6 426, C2_SC3 423, and C2_SC4 424 from C2_SC_Set 420 to produce an analog circuit schematic 407B corresponding to functional circuit component C2 403. Likewise, generator 401 receives parameter values C3_Params_2 and selects and combines sub-circuits (not shown) from C3_SC_Set 430 to produce an analog circuit schematic 408B corresponding to functional circuit component C3 404. Analog circuit schematic 408B comprises a second subset of sub-circuit schematics (C3_SC SubsetA') 431B from C3_SC_Set 430. Finally, generator 401 receives parameter values CN_Params_2 and selects and combines sub-circuits (not shown) from CN_SC_Set 440 to produce an analog circuit schematic 409B corresponding to functional circuit component CN 405. Analog circuit schematic 409B comprises a second subset of sub-circuit schematics (CN_SC SubsetB') 441B from CN_SC_Set 440.

Figure 4C:
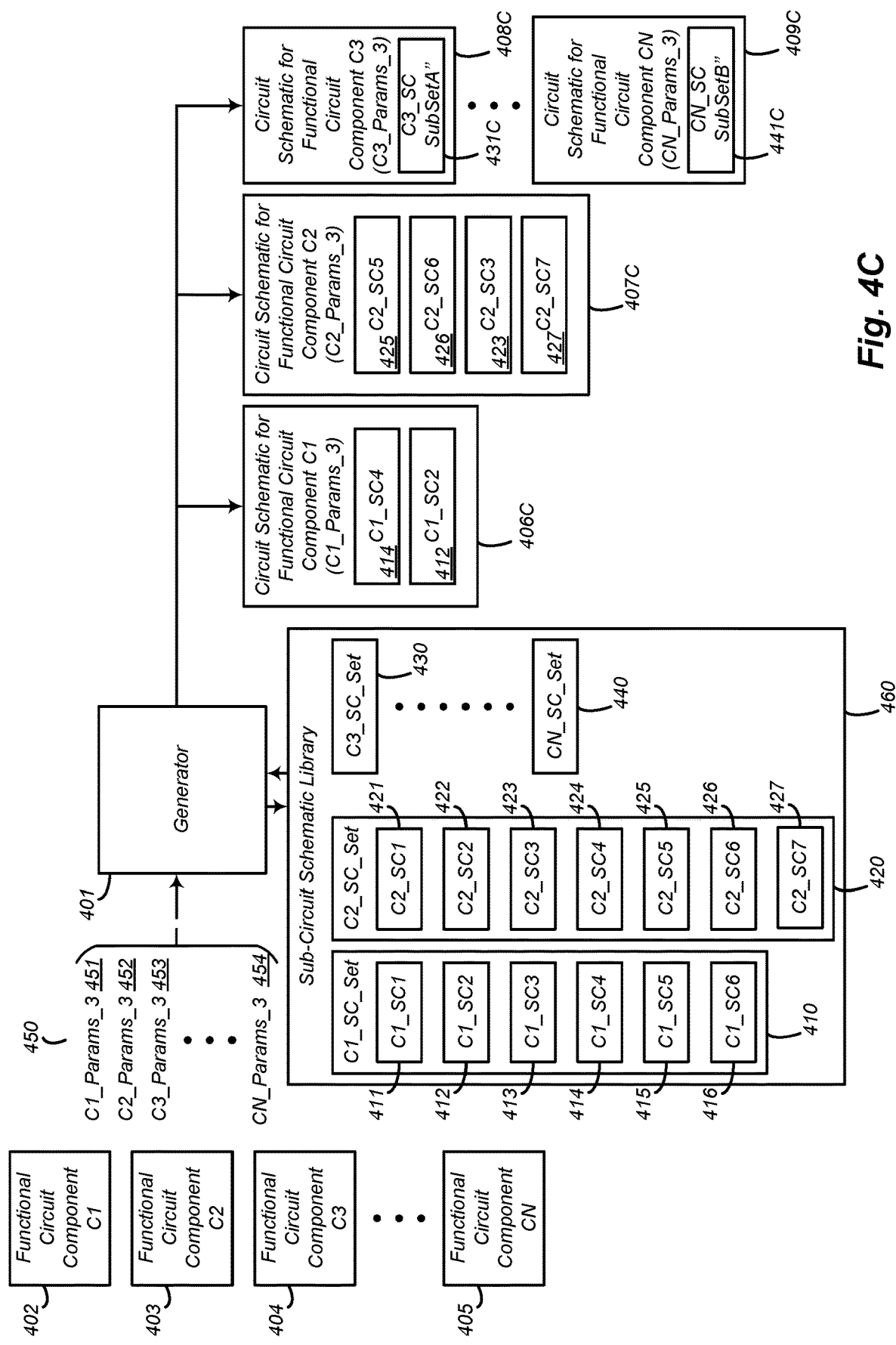

FIG. 4C illustrates generating yet another circuit using yet another set of parameters according to an embodiment. In this example, each set of parameters 451-454 receives a third set of parameter values. For instance, a new set of values for circuit specification parameters 451 is designated C1_Params_3, a new set of values for circuit specification parameters 452 is designated C2_Params_3, and so on. In this example, generator 401 receives parameter values C1_Params_3 and selects and combines sub-circuits C1_SC4 414 and C1_SC2 412 from C1_SC_Set 410 to produce an analog circuit schematic 406C corresponding to functional circuit component C1 402. Similarly, generator 401 receives parameter values C2_Params_3 and selects and combines sub-circuits C2_SC5 425, C2_SC6 426, C2_SC3 423, and C2_SC7 427 from C2_SC_Set 420 to produce an analog circuit schematic 407C corresponding to functional circuit component C2 403. Likewise, generator 401 receives parameter values C3_Params_3 and selects and combines sub-circuits (not shown) from C3_SC_Set 430 to produce an analog circuit schematic 408C corresponding to functional circuit component C3 404. Analog circuit schematic 408C comprises a third subset of sub-circuit schematics (C3_SC SubsetA") 431C from C3_SC_Set 430. Finally, generator 401 receives parameter values CN_Params_3 and selects and combines sub-circuits (not shown) from CN_SC_Set 440 to produce an analog circuit schematic 409C corresponding to functional circuit component CN 405. Analog circuit schematic 409C comprises a third subset of sub-circuit schematics (CN_SC SubsetB") 441C from CN_SC_Set 440.

Figure 4D:
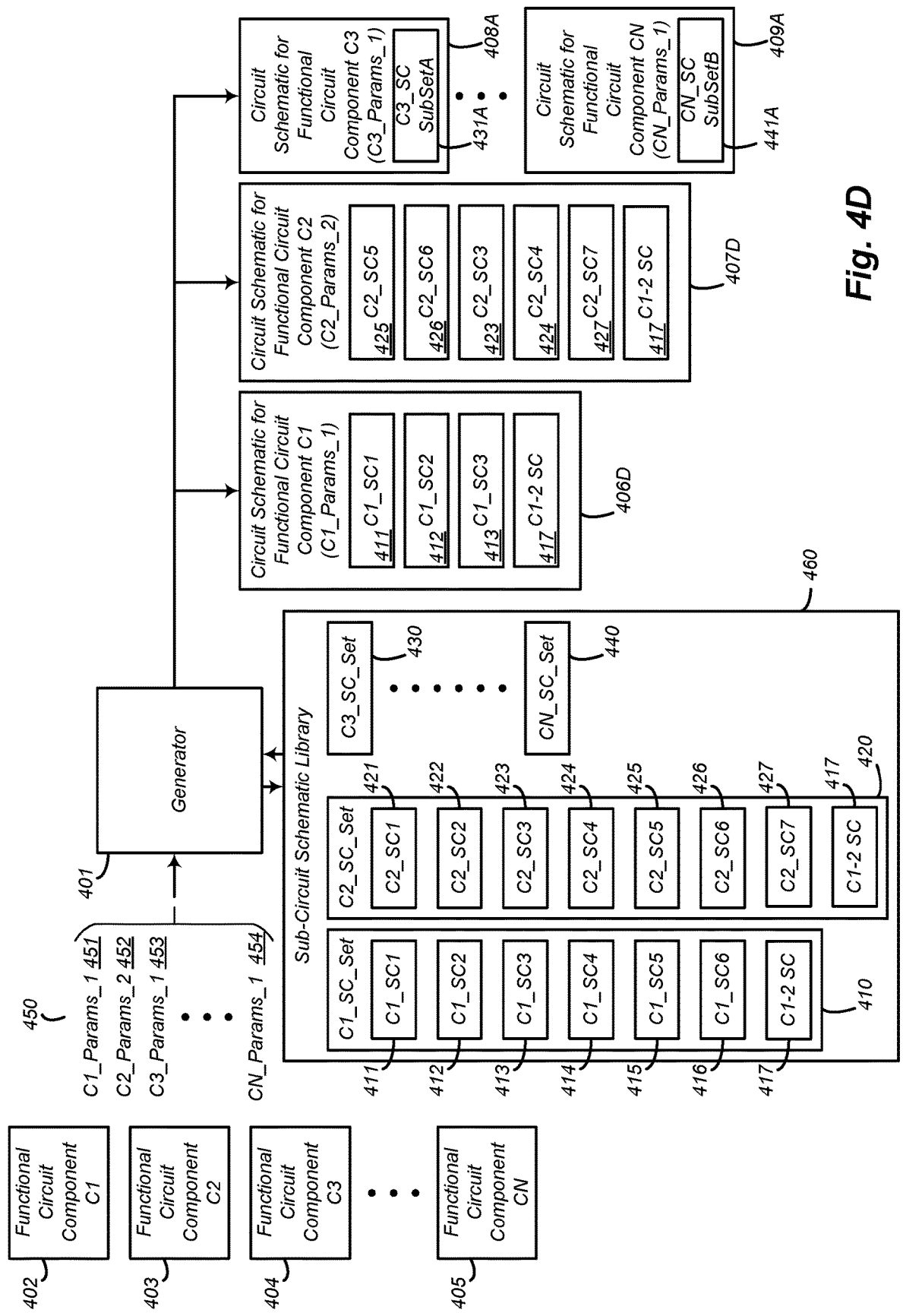

FIG. 4D illustrates an embodiment where different sub-circuit sets for different functional circuit components may include the same sub-circuit. For example, in some embodiments, different functional circuit components may have a corresponding unique set of predefined sub-circuit schematics. Referring to FIG. 4A, sub-circuit set C1_SC_Set 410 may be a different set of sub-circuit schematics than C2_SC_Set 420 or C3_SC_Set 430. In particular, the sub-circuits combined to form different comparators may be different than the sub-circuits combined to form different oscillators or different delay circuits, for example. Accordingly, each functional circuit component may have corresponding unique sets of sub-circuit schematics. However, in various embodiments, even though the sets may be unique, one or more sub-circuit schematics in some sets may be shared. For example, a set of sub-circuit schematics for a comparator may access a resistor divider sub-circuit, and the resistor divider sub-circuit may also be associated with a set of sub-circuits for an oscillator, for example. Accordingly, a unique set may include one or more unique predefined analog sub-circuit schematics only used for the corresponding functional circuit component, or alternatively, a unique set may include one or more predefined analog sub-circuit schematics used for a plurality of corresponding functional circuit components. This is illustrated in FIG. 4D where sub-circuit schematic C1-2 SC 417 is included in sets C1_SC_Set 410 and C2_SC_Set 420. Accordingly, parameters 451 and 452 for components C1 and C2, respectively, may generate schematics 406D and 407D that both include C1-2 SC 417, for example.

Figure 5:
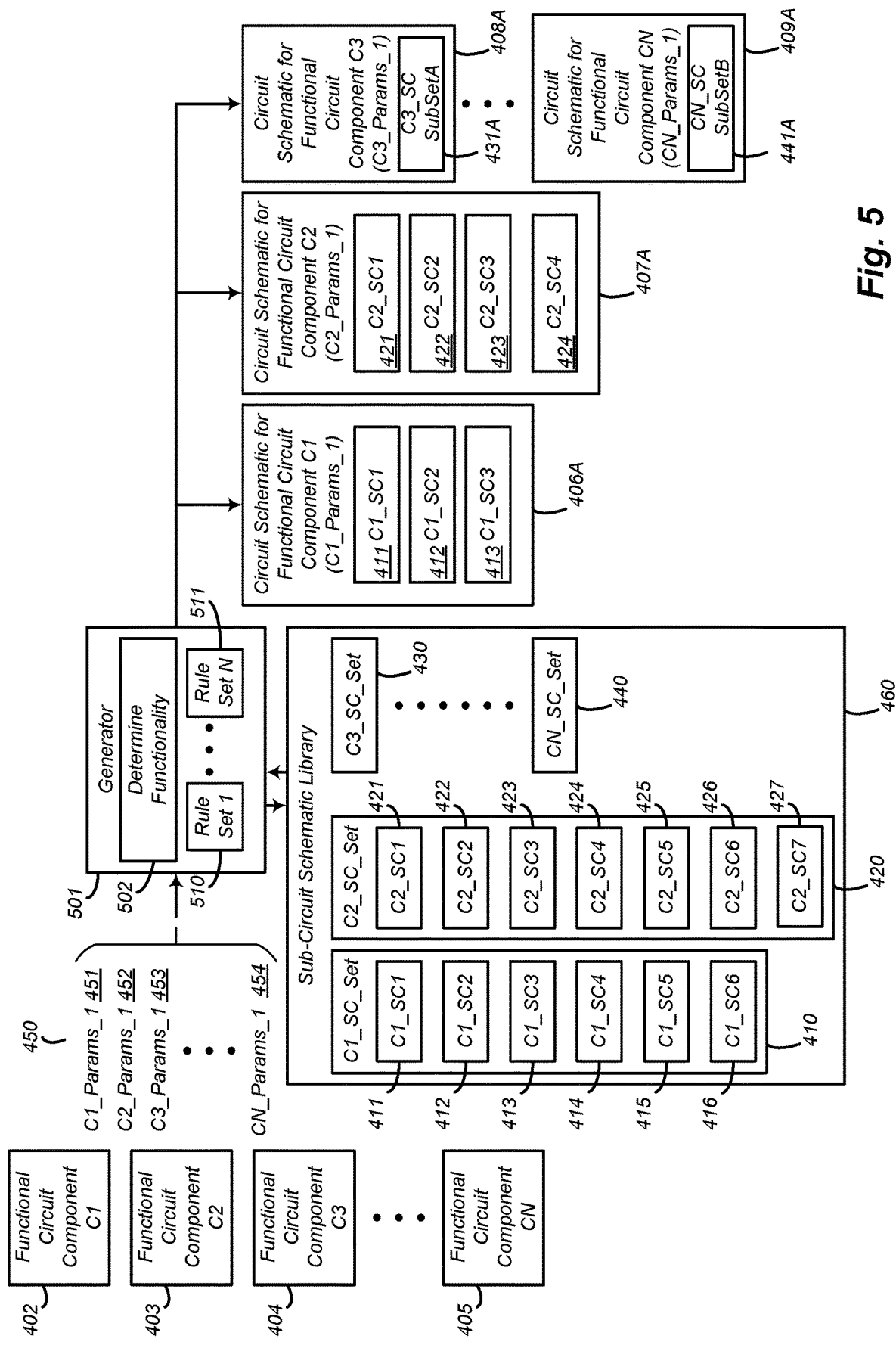
FIG. 5 illustrates example functional blocks of a generator according to an embodiment.

FIG. 5 illustrates example functional blocks of a generator according to an embodiment. As described above, in certain example embodiments generator 501 may receive circuit specification parameters corresponding to different types of functional analog circuit components (e.g., C1, C2, C3, . . . , CN). The parameters may specify the properties of the circuit to be generated using predefined analog sub-circuit schematics, for example. Accordingly, when parameters are received by generator 501, the parameters may be analyzed by determine functionality block 502, which determines which functional component the parameters correspond to. Block 502 may receive a set of parameters, determine the appropriate corresponding functional circuit component (here, C1, C2, C3, . . . , CN; e.g., a comparator, oscillator, delay, etc. . . . ), and access one of a plurality of different rule sets 510-511 to further process the parameters. Block 502 and the rule set blocks 510-511 as described and in further examples below may be implemented in software code, for example, or as combinations of software code and imported data (e.g., data about the parameters, different rules, sub-circuits, combinations of circuits, etc.), for example.

In some embodiments, a plurality of circuit schematics, such as one or more of schematics 406A-D, 407A-D, 408A-D, and 409A-D, for different functional components may be coupled together in various combinations into a schematic for a circuit comprising a plurality of parameterized instances of functional circuit components, for example. One circuit schematic may comprise a schematic for functional circuit component C1 402 based on one set of parameters (e.g., circuit schematic 406D), a schematic for functional circuit component C2 403 based on one set of parameters (e.g., circuit schematic 407C), a schematic for functional circuit component C3 404 based on one set of parameters (e.g., circuit schematic 408D), and a schematic for functional circuit component CN 405 based on one set of parameters (e.g., circuit schematic 409B). Alternatively, combinations of parameters and functional circuit components may generate a circuit schematic comprising a schematic for functional circuit component C1 402 based on another set of parameters (e.g., circuit schematic 406B), no schematic for functional circuit component C2 403 (e.g., C2 is not included), a schematic for functional circuit component C3 404 based on another set of parameters (e.g., circuit schematic 408C), and no schematic for functional circuit component CN 405 (e.g., CN also not included). Any combination of parameters for different instantiations of functional circuit components may be used to automatically generate a schematic with various combinations of one or more of the same or different functional circuit components, for example. In some embodiments, the schematic may be used to simulate an entire chip of functional circuit components coupled together. The schematics may optionally be processed by an electronic design automation (EDA) software system, such as a transistor schematic and layout editing tool (e.g., Cadence®, Mentor Graphics®, or Silvaco®) to produce a layout, perform layout versus schematic ("LVS") and/or design rule checks ("DRC"), and may be sent to a manufacturing facility (e.g., a semiconductor fabrication or "FAB") to produce an integrated circuit (e.g., a chip) having the desired properties, for example. Typically, designing schematics for an analog integrated circuit can take lot of time and effort by analog circuit design professionals. Advantageously, systems and methods using the techniques described herein may generate a schematic for an electronic circuit (e.g., a complete chip) very quickly and in substantially less time that would be required if designing each circuit using traditional techniques.

Generator 501 may analyze the parameters to determine a corresponding rule set that should be used. For example, if the parameters include one or more particular variables or values, then one rule set may be appropriate, but if the parameters include one or more other particular variables or values, then another rule set may be appropriate. In some embodiments, the parameters may include information specifying a functional circuit component. For example, the parameters received by generator 501 may include text specifying a functional circuit component (e.g., "comparator," "oscillator," or "voltage reference") or one or more identifiers (IDs) such as one or more codes for uniquely determining the rule set that should be used for the corresponding the functional circuit component, for example. The existence of particular parameters in a parameter set may, in other embodiments, be used to determine which functional circuit components the parameters are for and which set of sub-circuits are to be selected from, for example.

In this example, there are N different rule set blocks 510-511 corresponding to N different functional circuit component types (where N is an integer, e.g., 3, 4, 5, etc. . . . ). Parameters corresponding to different functional circuit components may have corresponding rule sets. For example, parameters 451 for C1 may be processed using a first rule set, parameters for C2 may be processed using a second rule set, parameters for C3 may be processed using a third rule set, and so on up to parameters for CN, which may be processed using an Nth rule set. As an example, the different rule sets may be configured to analyze the parameter values, select particular sub-circuits from the appropriate sub-circuit sets (e.g., for each functional circuit component), and perform some or all of the processing for combining the sub-circuits to form a circuit schematic for a corresponding functional circuit component, for example. Referring again to FIG. 5, C1_Params_1 invoke one rule set for selecting sub-circuits 411, 412, and 413 from set 410, which when combined form circuit schematic 406A. Similarly, C2_Params_1 invoke a second rule set for selecting sub-circuits 421, 422, 423, and 424 from set 420, which when combined form circuit schematic 407A. Likewise, C3_Params_1 invoke a third rule set for selecting sub-circuits in subsetA 431A from set 430, which when combined form circuit schematic 408A. Finally, CN_Params_1 invoke a yet another rule set for selecting sub-circuits in subsetB 441A from set 440, which when combined form circuit schematic 409A.

In one example embodiment of generator 501, a circuit specification is generated and provided to an EDA tool. The circuit specification may specify sub-circuit schematics and pin connections to form a combined circuit, for example. For example, a circuit specification may describe the sub-circuit schematics used to form a circuit as well as the connections between various sub-circuit schematic nodes, for example. In some example embodiments, the circuit specification may include identifiers (e.g., cell names or instance names) for particular sub-circuit schematics to be included in the circuit. The circuit specification may further include descriptions of how pins of the sub-circuit schematics are connected (e.g., a pin map described below). As described in more detail below, one example circuit specification is a netlist, such as Verilog.v, for example. The EDA tool may receive the circuit specification, retrieve the specified sub-circuit schematics based on the circuit specification, and generate a transistor level circuit schematic comprising selected sub-circuit schematics.

Figure 6A:
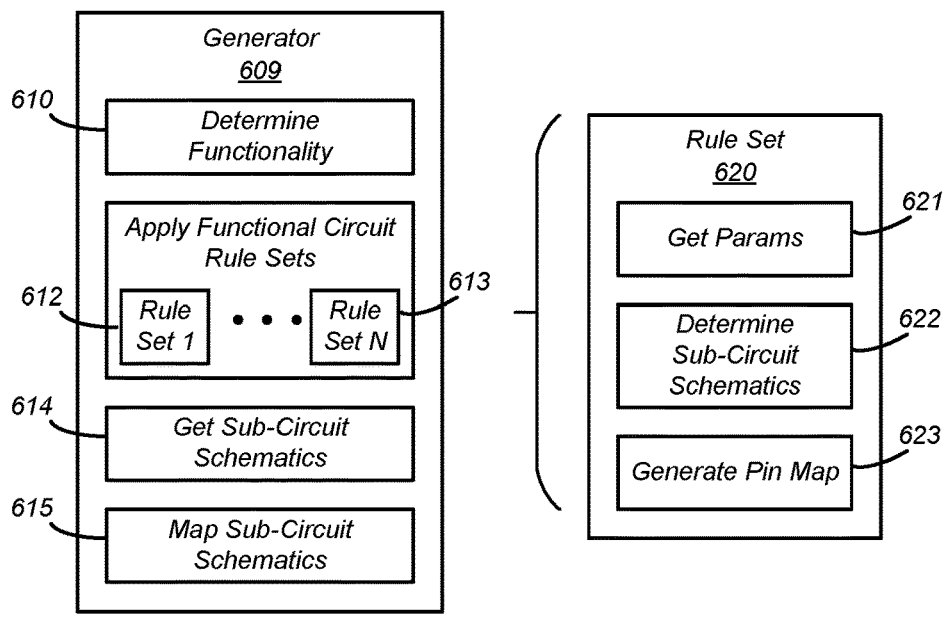
FIG. 6A illustrates another example block diagram of an automated circuit generator according to another embodiment.

FIG. 6A illustrates another example block diagram of an automated circuit generator according to another embodiment. In this example, generator 609 includes program code to determine functionality 609, apply rules 612-613, retrieve sub-circuit schematics 614, and connect sub-circuit schematics 615. For example, when the process starts, determine functionality block 610 may, for example, evaluate one or more received parameter sets and determine which rule set to apply (e.g., a comparator rule set, an oscillator rule set, or a voltage reference rule set). Generator 609 may invoke one of the appropriate rule sets 612-613. An example rule set is illustrated at 620. In this example, the rule set 620 may include a sub-block 621 (e.g., of code) to retrieve the parameter values, a sub-block 622 to determine sub-circuits based on the parameter values, and a sub-block 623 to generate a pin map, for example. Generating a pin map may include, for example, retrieving pin lists from the sub-circuits to be combined. In one embodiment, the pin map connections may be embodied in a netlist, such as a verilog ".v" file, for example. Another block 614 may retrieve the sub-circuit schematics determined by block 622, for example. A block 615 may map the schematic pins of the sub-circuits. In one embodiment, the schematic pins are connected based on the pin map, for example. The above described blocks may be implemented as software code, for example, using a variety of techniques. While generator 609 is shown here for illustrative purposes as being one group of blocks, it is to be understood that the blocks making up generator 609 may be implemented using different software coding techniques using different languages and may be implemented as a plurality of different modules, for example. In one example embodiment described in more detail below, a generator software system comprises blocks implemented in C++ and other blocks implemented in a scripting language.

Figure 6B:
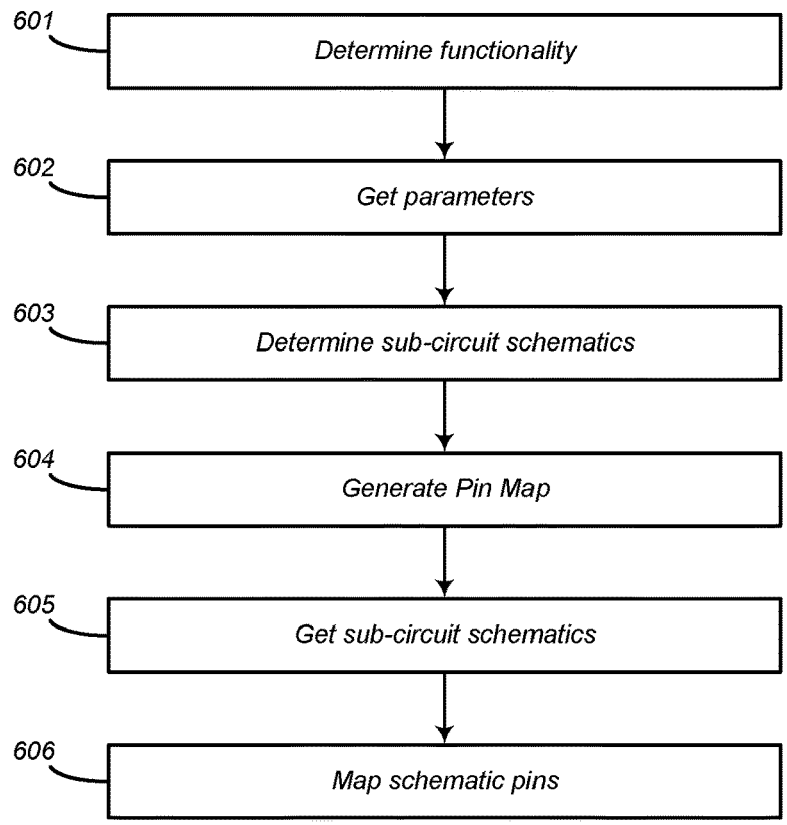
FIG. 6B illustrates an example process of automatically generating a circuit according to an embodiment.

FIG. 6B illustrates an example process of automatically generating a circuit according to an embodiment. While the following process description is presented in a particular order, it is to be understood that one or more of the following may occur in a different order. At 601, functionality of the circuit to be generated is determined for parameters to be processed. The functionality may correspond to a particular functional circuit component, such as a comparator, oscillator, voltage reference, current source, or other parameterized analog building block, for example. In this example, functionality may be determined using an identifier, such as a functional circuit component name (e.g., "Comparator," "Oscillator," "Delay Circuit," etc. . . . ). For example, a generator may retrieve the functional circuit component name, and then select parameters to retrieve based on the name. At 602, the parameters are retrieved. At 603, the parameters are analyzed to determine sub-circuits to be used to form the circuit to be generated, for example. At 604, a pin map of the sub-circuits to be used to form the circuit is generated. As described in more detail below, sub-circuit schematic pins may be mapped together, in some cases, and to inputs and outputs of the circuit to be generated, for example. Some pins may be mapped between different sub-circuit schematics, while others may be mapped to inputs or outputs of the circuit to be generated. A pin map may be embodied in a circuit specification as described above, for example, which specified the sub-circuit schematics and the mapping between pins. At 605, sub-circuit schematics to be combined are retrieved (e.g., from a library of released sub-circuits). At 606, the sub-circuit schematic pins may be connected based on the pin map, for example. In one example embodiment described below, a generator software component may output a netlist (e.g., in the form of a Verilog ".v" file) mapping the pins. Blocks 614 and 615 may be implemented as a script for an electronic design automation (EDA) system (e.g., Cadence®, Mentor®, Silvaco®), which may retrieve and combine the sub-circuit schematics as illustrated at 605 and 606, for example.

Figure 7A:
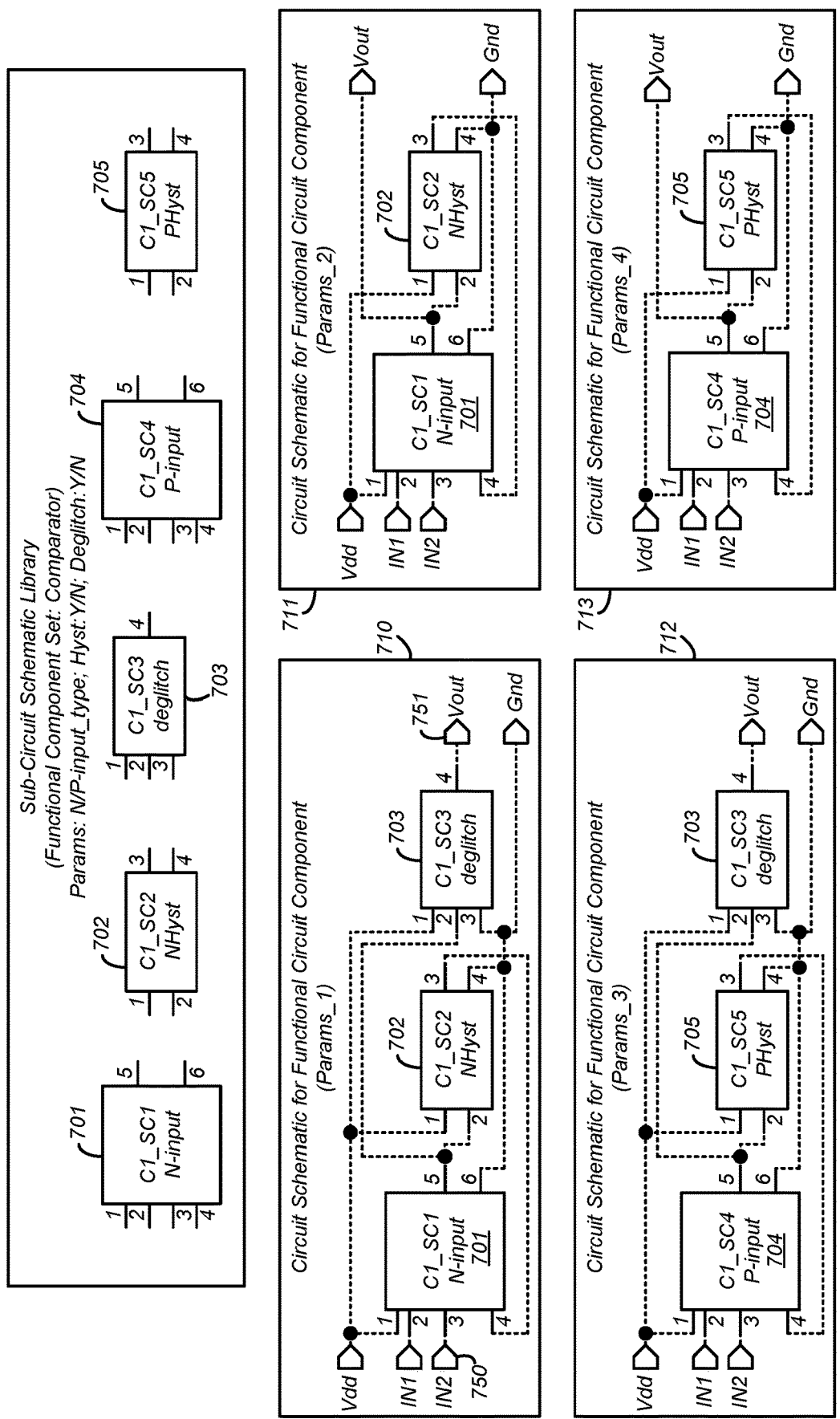
FIGS. 7A-B illustrate an example of mapping pins according to one embodiment.
Figure 7B:
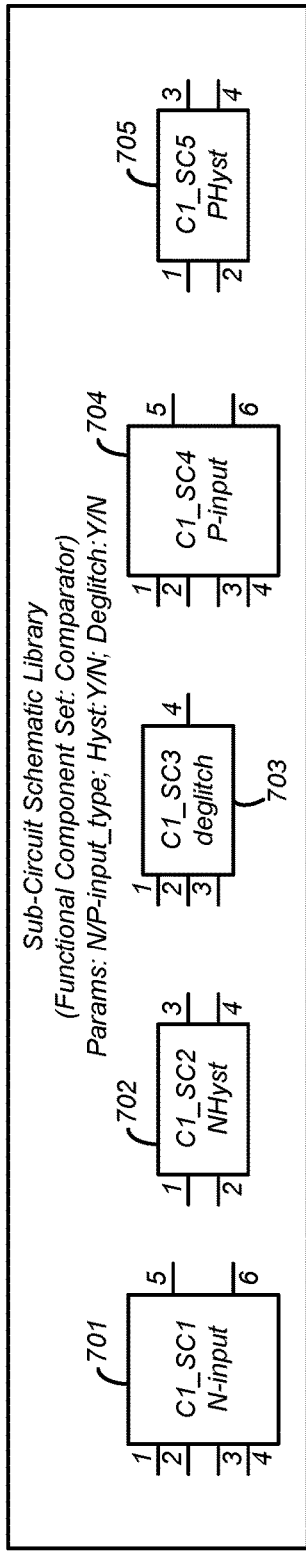
Figure 7B:
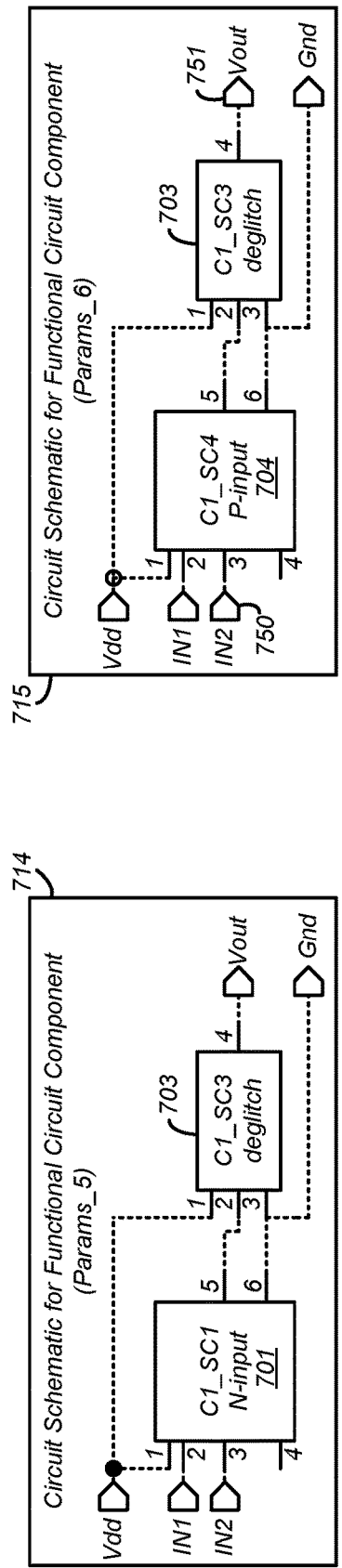
Figure 7B:
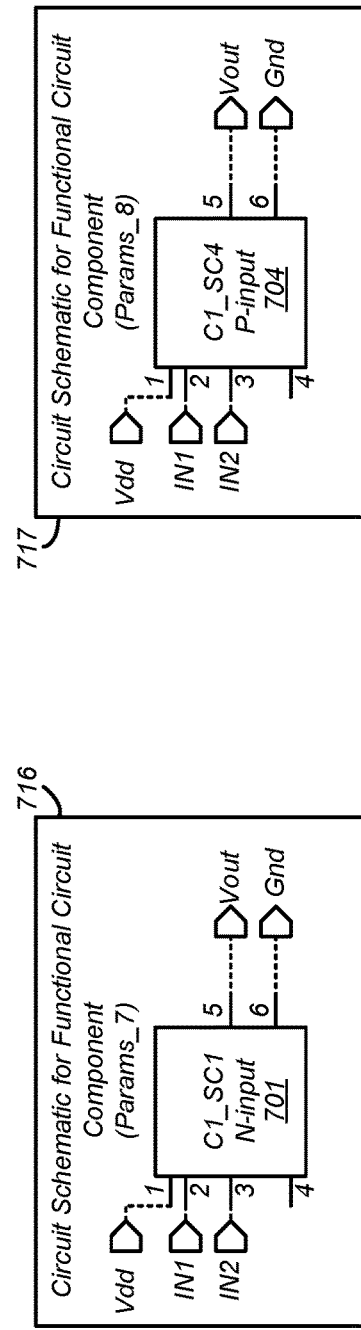

FIGS. 7A-B illustrate an example of mapping pins according to one embodiment. In this example, the functional circuit component is a comparator circuit, and the circuit specification parameters specify an input type (e.g., an N-type or P-type input stage, "N/P-input type"), hysteresis (e.g., Yes or No, "Hyst"), and deglitch (e.g., Yes or No). In this example, the comparator has a set of sub-circuits schematics 701-705 which may be selected based on the parameters to generate a comparator having the specified properties (e.g., input type, hysteresis, or deglitch). For instance, in this example C1_SC1 is an N-type input stage comparator sub-circuit schematic 701, C1_SC2 is a hysteresis sub-circuit schematic (NHyst) 702 operable with N-type sub-circuit schematic 701, C1_SC3 is a deglitch sub-circuit schematic 703, C1_SC4 is an P-type input stage comparator sub-circuit schematic 704, and C1_SC5 is a hysteresis sub-circuit schematic (PHyst) 705 operable with P-type sub-circuit schematic 704. Each of the sub-circuit schematics 701-705 may comprise transistor level schematics, for example, for implementing the functionality of a particular sub-circuit.

Sub-circuit schematics according to some embodiments of the present disclosure may have a plurality of pins, including a plurality of analog pins, for coupling voltages and currents into and out of each sub-circuit schematic. In some embodiments, the pins may be mapped so that pins in the sub-circuit schematics are either connected to pins of other sub-circuit schematics or to a pin of the combined circuit (e.g., an input/output pin of the resulting combined circuit). In one example embodiment, mapping pins of different sub-circuit schematics may be based on a plurality of pin maps, wherein different pin maps specify different connections between pins of the plurality of sub-circuit schematics and/or I/O pins of the circuit schematic for different combinations of selected sub-circuit schematics. Such pin maps may be defined in the code of the circuit generator or defined externally (e.g., in a data record) and imported (e.g., as part of a circuit specification imported into an EDA tool), for example. A particular mapping may be based on one of the pin maps, for example. The pin map used for mapping pins may be based on the particular sub-circuit schematics selected. For example, one combination of selected sub-circuit schematics may have one pin map, and another combination of selected sub-circuit schematics may have another pin map. Each pin map may ensure that each unique combination of sub-circuit schematics is connected together so that the resulting circuit schematic works as desired across all parameter values, for example.

Accordingly, mapping may include specifying connections between one or more pins of the sub-circuit schematics, for example. In some embodiments, mapping may include specifying connections between one or more pins of one or more sub-circuit schematics and inputs or outputs of the circuit schematic (e.g., Vdd, ground, Vin, Vout, etc. . . . of a symbol for the circuit schematic formed by the sub-circuit schematics). In one embodiment, the software may determine the sub-circuit schematics to be used to form a particular circuit, and then map pins specific to the combination of particular sub-circuit schematics, for example.

Referring again to FIG. 7A, in this example, N-input sub-circuit schematic 701 comprises pins 1-6, NHyst sub-circuit schematic 702 comprises pins 1-4, deglitch sub-circuit schematic 703 comprises pins 1-4, P-input sub-circuit schematic 704 comprises pins 1-6, and PHyst sub-circuit schematic 705 comprises pins 1-4. These pins may be mapped together as illustrated in the examples described below. This example comparator is just one example of many types of functional circuit components that may be generated using the techniques described herein. Other functional circuit components, such as oscillators, delay circuits, voltage references, bias currents, etc. . . . could be generated from parameters using the techniques described herein, and other comparators may have other parameters for selecting other sub-circuits, for example. Accordingly, this example is merely illustrative.

As mentioned above, features and advantages of the present disclosure may select particular sub-circuit schematics based on the parameters and combine the sub-circuit schematics. In this example, combining the sub-circuit schematics includes mapping the analog pins of the sub-circuit schematics to form the circuit schematic for the at least one functional circuit component (e.g., a comparator). The mapping may be done automatically by a software system.

Circuit schematic 710 illustrates one example circuit schematic generated based on one set of parameter values. Here, a first set of parameter values (Params_1) may be "Input type=N," "Hysteresis=Yes," and "Deglitch=Yes." Accordingly, N-input sub-circuit schematic 701, NHyst sub-circuit schematic 702, and deglitch sub-circuit schematic 703 are selected and combined to form circuit schematic 710. For this combination of parameters, mapping pins may include the following:

1. Mapping pin 1 of sub-circuit schematic 701 to pin 1 of sub-circuit schematic 702 and pin 1 of sub-circuit schematic 703 (which in this example is the supply voltage input of each sub-circuit) and mapping these pins to a Vdd input pin.
2. Mapping pin 2 of sub-circuit schematic 701 (e.g., a first comparator input pin) to input pin IN1.
3. Mapping pin 3 of sub-circuit schematic 701 (e.g., a second comparator input pin) to input pin IN2 750.
4. Mapping pin 4 of sub-circuit schematic 701 (e.g., a hysteresis control input) to pin 3 of sub-circuit 702 (e.g., a hysteresis control output).
5. Mapping pin 5 of sub-circuit schematic 701 (e.g., a comparator output) to pin 2 of sub-circuit 702 (e.g., a hysteresis input) and to pin 2 of sub-circuit 703 (e.g., a deglitch input).
6. Mapping pin 6 of sub-circuit schematic 701, pin 4 of sub-circuit schematic 702, and pin 3 of sub-circuit schematic 703 together and to a ground (GND) pin.
7. Mapping pin 4 of sub-circuit schematic 703 to an output pin (Vout) 751.

Circuit schematic 711 illustrates another example circuit schematic generated based on another set of parameter values. Here, a second set of parameter values (Params_2) may be "Input type=N," "Hysteresis=Yes," and "Deglitch=No." Accordingly, N-input sub-circuit schematic 701 and NHyst sub-circuit schematic 702 are selected (deglitch sub-circuit schematic 703 is not selected) and combined to form circuit schematic 711. For this combination of parameters, mapping pins may include the following:

1. Mapping pin 1 of sub-circuit schematic 701 to pin 1 of sub-circuit schematic 702 (which in this example is the supply voltage input of each sub-circuit) and mapping these pins to a Vdd input pin.
2. Mapping pin 2 of sub-circuit schematic 701 (e.g., a first comparator input pin) to input pin IN1.
3. Mapping pin 3 of sub-circuit schematic 701 (e.g., a second comparator input pin) to input pin IN2.
4. Mapping pin 4 of sub-circuit schematic 701 (e.g., a hysteresis control input) to pin 3 of sub-circuit 702 (e.g., a hysteresis control output).
5. Mapping pin 5 of sub-circuit schematic 701 (e.g., a comparator output) to pin 2 of sub-circuit schematic 702 (e.g., a hysteresis input) and to output pin Vout.
6. Mapping pin 6 of sub-circuit schematic 701 and pin 4 of sub-circuit schematic 702 together and to a ground (GND) pin.

Circuit schematic 712 illustrates another example circuit schematic generated based on another set of parameter values. Here, a third set of parameter values (Params_3) may be "Input type=P," "Hysteresis=Yes," and "Deglitch=Yes." Accordingly, P-input sub-circuit schematic 704, PHyst sub-circuit schematic 705, and deglitch sub-circuit schematic 703 are selected and combined to form circuit schematic 712. For this combination of parameters, mapping pins may include the following:

1. Mapping pin 1 of sub-circuit schematic 704 to pin 1 of sub-circuit schematic 705 and pin 1 of sub-circuit schematic 703 (which in this example is the supply voltage input of each sub-circuit) and mapping these pins to a Vdd input pin.
2. Mapping pin 2 of sub-circuit schematic 704 (e.g., a first comparator input pin) to input pin IN1.
3. Mapping pin 3 of sub-circuit schematic 704 (e.g., a second comparator input pin) to input pin IN2.

4. Mapping pin 4 of sub-circuit schematic 704 (e.g., a hysteresis control input) to pin 3 of sub-circuit schematic 705 (e.g., a hysteresis control output).
5. Mapping pin 5 of sub-circuit schematic 704 (e.g., a comparator output) to pin 2 of sub-circuit schematic 705 (e.g., a hysteresis input) and to pin 2 of sub-circuit schematic 703 (e.g., a deglitch input).
6. Mapping pin 6 of sub-circuit schematic 704, pin 4 of sub-circuit schematic 705, and pin 3 of sub-circuit schematic 703 together and to a ground (GND) pin.
7. Mapping pin 4 of sub-circuit schematic 703 to an output pin (Vout).

Circuit schematic 713 illustrates another example circuit schematic generated based on another set of parameter values. Here, a fourth set of parameter values (Params 4) may be "Input type=P," "Hysteresis=Yes," and "Deglitch=No." Accordingly, P-input sub-circuit schematic 704 and PHyst sub-circuit schematic 705 are selected (deglitch sub-circuit schematic 703 is not selected) and combined to form circuit schematic 713. For this combination of parameters, mapping pins may include the following:
1. Mapping pin 1 of sub-circuit schematic 704 to pin 1 of sub-circuit schematic 705 (which in this example is the supply voltage input of each sub-circuit) and mapping these pins to a Vdd input pin.
2. Mapping pin 2 of sub-circuit schematic 704 (e.g., a first comparator input pin) to input pin IN1.
3. Mapping pin 3 of sub-circuit schematic 704 (e.g., a second comparator input pin) to input pin IN2.
4. Mapping pin 4 of sub-circuit schematic 704 (e.g., a hysteresis control input) to pin 3 of sub-circuit schematic 705 (e.g., a hysteresis control output).
5. Mapping pin 5 of sub-circuit schematic 704 (e.g., a comparator output) to pin 2 of sub-circuit schematic 705 (e.g., a hysteresis input) and to output pin Vout.
6. Mapping pin 6 of sub-circuit schematic 704 and pin 4 of sub-circuit schematic 705 together and to a ground (GND) pin.

Referring now to FIG. 7B, circuit schematic 714 illustrates another example circuit schematic generated based on another set of parameter values. Here, a fifth set of parameter values (Params_5) may be "Input type=N," "Hysteresis=No," and "Deglitch=Yes." Accordingly, N-input sub-circuit schematic 701 and deglitch sub-circuit schematic 703 are selected (NHyst sub-circuit schematic 702 is not selected) and combined to form circuit schematic 714. For this combination of parameters, mapping pins may include the following:
1. Mapping pin 1 of sub-circuit schematic 701 to pin 1 of sub-circuit schematic 703 (which in this example is the supply voltage input of each sub-circuit) and mapping these pins to a Vdd input pin.
2. Mapping pin 2 of sub-circuit schematic 701 (e.g., a first comparator input pin) to input pin IN1.
3. Mapping pin 3 of sub-circuit schematic 701 (e.g., a second comparator input pin) to input pin IN2.
4. Pin 4 of sub-circuit schematic 701 (e.g., a hysteresis control input) may be unconnected.
5. Mapping pin 5 of sub-circuit schematic 701 (e.g., a comparator output) to pin 2 of sub-circuit schematic 703 (e.g., deglitch input).
6. Mapping pin 6 of sub-circuit schematic 701 and pin 3 of sub-circuit schematic 703 together and to a ground (GND) pin.
7. Mapping pin 4 of sub-circuit schematic 703 to output pin Vout.

Circuit schematic 715 illustrates another example circuit schematic generated based on another set of parameter values. Here, a sixth set of parameter values (Params_6) may be "Input type=P," "Hysteresis=No," and "Deglitch=Yes." Accordingly, P-input sub-circuit schematic 704 and deglitch sub-circuit schematic 703 are selected (PHyst sub-circuit schematic 705 is not selected) and combined to form circuit schematic 715. For this combination of parameters, mapping pins may include the following:
1. Mapping pin 1 of sub-circuit schematic 704 to pin 1 of sub-circuit schematic 703 (which in this example is the supply voltage input of each sub-circuit) and mapping these pins to a Vdd input pin.
2. Mapping pin 2 of sub-circuit schematic 704 (e.g., a first comparator input pin) to input pin IN1.
3. Mapping pin 3 of sub-circuit schematic 704 (e.g., a second comparator input pin) to input pin IN2.
4. Pin 4 of sub-circuit schematic 704 (e.g., a hysteresis control input) may be unconnected.
5. Mapping pin 5 of sub-circuit schematic 704 (e.g., a comparator output) to pin 2 of sub-circuit schematic 703 (e.g., deglitch input).
6. Mapping pin 6 of sub-circuit schematic 704 and pin 3 of sub-circuit schematic 703 together and to a ground (GND) pin.
7. Mapping pin 4 of sub-circuit schematic 703 to output pin Vout.

Circuit schematic 716 illustrates another example circuit schematic generated based on another set of parameter values. Here, a seventh set of parameter values (Params_7) may be "Input type=N," "Hysteresis=No," and "Deglitch=No." Accordingly, N-input sub-circuit schematic 701 is selected (NHyst sub-circuit schematic 702 and deglitch sub-circuit schematic 703 are not selected) to form circuit schematic 716. For this combination of parameters, mapping pins may include the following:
1. Mapping pin 1 of sub-circuit schematic 701 to a Vdd input pin.
2. Mapping pin 2 of sub-circuit schematic 701 (e.g., a first comparator input pin) to input pin IN1.
3. Mapping pin 3 of sub-circuit schematic 701 (e.g., a second comparator input pin) to input pin IN2.
4. Pin 4 of sub-circuit schematic 701 (e.g., a hysteresis control input) may be unconnected.
5. Mapping pin 5 of sub-circuit schematic 701 (e.g., a comparator output) to output pin Vout.
6. Mapping pin 6 of sub-circuit schematic 701 to a ground (GND) pin.

Circuit schematic 717 illustrates another example circuit schematic generated based on another set of parameter values. Here, an eighth set of parameter values (Params_8) may be "Input type=P," "Hysteresis=No," and "Deglitch=No." Accordingly, P-input sub-circuit schematic 704 is selected (PHyst sub-circuit schematic 705 and deglitch sub-circuit schematic 703 are not selected) to form circuit schematic 717. For this combination of parameters, mapping pins may include the following:
1. Mapping pin 1 of sub-circuit schematic 704 to a Vdd input pin.
2. Mapping pin 2 of sub-circuit schematic 704 (e.g., a first comparator input pin) to input pin IN1.
3. Mapping pin 3 of sub-circuit schematic 704 (e.g., a second comparator input pin) to input pin IN2.
4. Pin 4 of sub-circuit schematic 704 (e.g., a hysteresis control input) may be unconnected.
5. Mapping pin 5 of sub-circuit schematic 704 (e.g., a comparator output) to output pin Vout.

6. Mapping pin 6 of sub-circuit schematic 704 to a ground (GND) pin.

In one embodiment, at least a part of the mapping is performed by rules described above. For example, a particular rule associated with particular parameter values/selected sub-circuits may determine which pins exist for the selected sub-circuit schematics.

Advantageously, mapped analog pins may have predetermined compatibility. For example, because the sub-circuit schematics are predefined, the operability of different sub-circuit schematics (and sub-circuit schematic pins that may be connected) may have predetermined compatibility by design. For instance, in the example shown in FIGS. 7A-B, an N-input comparator sub-circuit schematic 701 may be designed to be used with an N-hysteresis sub-circuit schematic 702, and a P-input comparator sub-circuit schematics 704 may be designed to be used with an P-hysteresis sub-circuit schematic 705. Deglitch sub-circuit schematic may be designed for use with either the N-type or P-type schematics. Accordingly, the pins of sub-circuits may be designed to be automatically coupled together, for example, to form different circuits that operate as designed. For example, an input pin on one sub-circuit may be designed to receive a voltage input within a particular range. A pin may be designed to have predetermined compatibility with another pin, wherein one pin generates a signal with particular voltage or current characteristics and the other pin is designed to receive and process the signal, for example. Various pins may be designed to receive voltages or currents (or both) across particular predetermined ranges during operation of the combined circuit, for example.

While the above example illustrates particular predefined analog sub-circuit schematics, it is to be understood that a wide variety of predefined sub-circuit schematics may be used. In various embodiments, a predefined sub-circuit schematic may comprise as few as one component or many components. For example, sub-circuit schematics may comprise one or more active components (e.g., transistors) or one or more passive components (e.g., resistors, capacitors, or inductors). Sub-circuit schematics according to various embodiments may include, for example, two transistors configured as a differential pair, transistors and/or resistors configured as a load, transistors configured as a current mirror, a variety of complete or partial cascode structures, various forms of delay stages, trim circuits, or even a single component, for example. Sub-circuit schematics according to other embodiments may include a large number of components. Examples of more complex sub-circuit schematics include a bandgap stage, an input stage of a comparator or amplifier, regulation stages, or other more complex combinations of components to perform other analog/mixed signal functions. Additionally, analog sub-circuit schematics may comprise digital circuits, including inverters, registers, latches, and a variety of logic gates (e.g., AND, OR, NAND, NOR, XOR) to receive digital signal inputs from or provide signal outputs to digital circuitry incorporated in a mixed signal circuit, for example. Advantageously, different sub-circuit schematics may be combined to form different functional circuits with different operational functions (e.g., a comparator with or without deglitch, trim, hysteresis, etc. . . . ). For example, a circuit designer may design various sub-circuit schematics and ensure interoperability to meet a range of different operational functions. The software may then access the predefined sub-circuit schematics and automatically generate analog circuits based on circuit specification parameters (e.g., from a user). In some embodiments, sub-circuit schematics for one or more functional circuit component may be combined and included with sub-circuit schematics for another functional circuit component (e.g., a voltage buffer functional circuit component may be used as a sub-circuit in circuitry for another functional circuit component). Accordingly, a wide variety of analog/mixed-signal integrated circuit architectures may be decomposed into sub-circuit schematics and recombined on the fly using the techniques described herein to automate generation of analog circuitry. The particular granularity and combination of various sub-circuit schematics may be a matter of design choice as would be understood by those skilled in the art of analog circuit design in light of the current disclosure.

Parameterized Circuit Layout Generation

Figure 8:
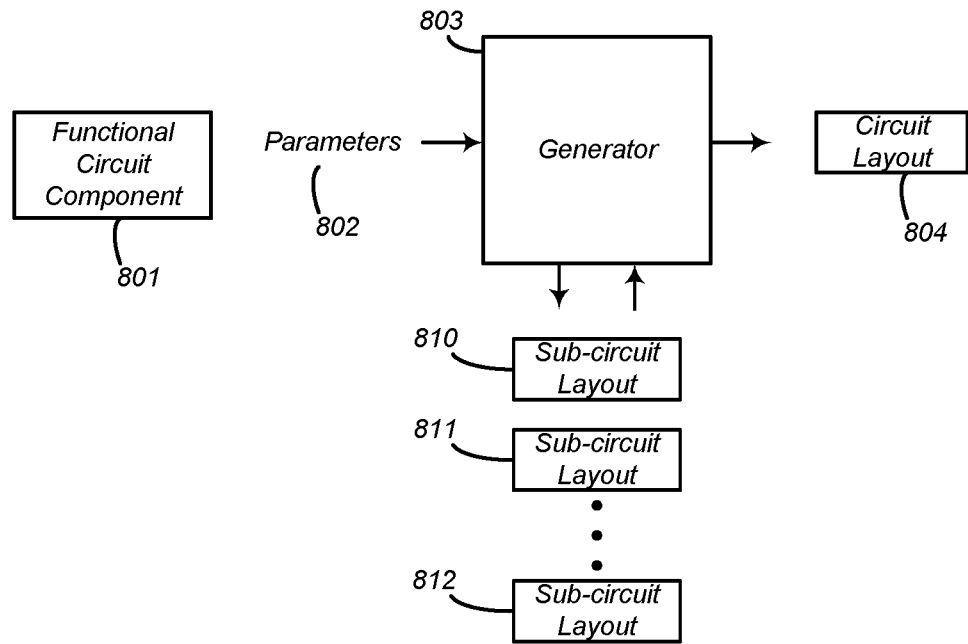
FIG. 8 illustrates a system for automated circuit generation according to another embodiment.

FIG. 8 illustrates a system for automated circuit generation according to another embodiment. Features and advantages of the present disclosure include a system capable of automatically generating a circuit layout based on input parameters, for example, where different values may result in different layouts. As illustrated in FIG. 8, a generator software system 803 may receive parameters 802 and produce a circuit layout 804. Generator software system 803 may execute on at least one computer system, for example, and comprise computer code, which when executed by a computer causes the computer to perform operations for performing the techniques described herein.

Parameters 802 comprise a plurality of circuit specification parameters corresponding to at least one functional circuit component 801 substantially similar to the circuit specification parameters described above, for example. For instance, circuit specification parameters may specify properties of a circuit layout to be generated, for example, and may correspond to particular functional circuit components (e.g., a comparator with particular properties, an oscillator with particular properties, a delay circuit with particular properties, etc. . . . ). The parameters may be used to generate a circuit layout for a particular functional circuit component with different properties based on the parameter values (e.g., a layout for a comparator with a p-type input stage or a layout for a comparator with an n-type input stage, etc. . . . ). Additionally, in one example embodiment, one set of circuit specification parameters may correspond to one functional circuit component (e.g., a comparator) and another set of parameters may correspond to a different functional circuit component (e.g., a delay circuit or oscillator). It is to be understood that a variety of coding mechanisms could be used to embody circuit specification parameters to specify properties of the circuit to be generated.

In this example embodiment, parameters 802 are received by generator 803. Generator 803 may use a plurality of sub-circuit layouts 810-812 to generate a circuit layout 804 based on the circuit specification parameters. For example, one set of values (or encoding) for the received circuit specification parameters may result in use of sub-circuit layout 810 and sub-circuit layout 811. Another set of values (or another encoding) for the received circuit specification parameters may result in use of sub-circuit layout 810, sub-circuit layout 811, and layout 812, for example. The appropriate sub-circuit layouts may be combined to form circuit layout 804. Accordingly, circuit layout 804 is a circuit layout for the functional circuit component 801 having the properties specified by parameters 802. Layout 804, in turn, may be used to manufacture a physical circuit for functional circuit component 801.

Embodiments of the present disclosure may be particularly advantageous to generating analog circuit layouts.

Embodiments of the present disclosure may be used to automatically generate analog circuit layouts, for example, based on parameters. The circuit specifications parameters may correspond to one or more functional analog circuit components, such as a comparator, oscillator, delay, etc. . . . . The circuit specification parameters may specify properties of the analog circuit to be generated, such as a comparator with a P-type or N-type input, for example. The circuit specification parameters may be used to determine predefined analog sub-circuit layouts corresponding to the functional analog circuit component. For example, as illustrated in a more detailed example below, generator 803 may select a predefined P-type comparator sub-circuit layout, a first predefined hysteresis circuit layout, and/or a predefined deglitch circuit layout based on the parameters to form a layout for a comparator functional circuit component using one set of parameters, and generator 803 may select a predefined N-type comparator sub-circuit layout and predefined deglitch circuit layout using another set of parameters. The subset of predefined analog sub-circuit layouts identified using the circuit specification parameters may be combined to form an analog circuit layout for functional analog circuit component 801.

Figure 9:
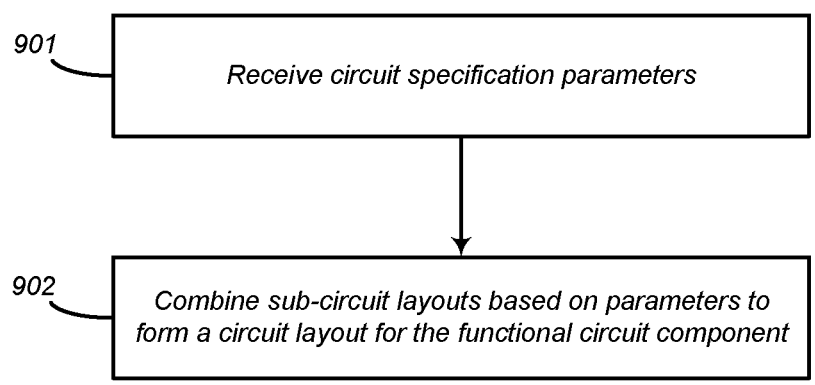
FIG. 9 illustrates a method for automated circuit generation of according to one embodiment.

FIG. 9 illustrates a method for automated circuit generation of according to one embodiment. The method may be performed by software executing on one or more computers, for example. At 901, a plurality of circuit specification parameters are received that correspond to at least one (or more) functional circuit component. At 902, particular sub-circuit layouts are combined based on the circuit specification parameters to form a circuit layout for the functional circuit component. In one embodiment, each functional circuit component may have a different set of predefined sub-circuit layouts, and a subset of the predefined sub-circuit layouts corresponding to the functional circuit component are combined based on the circuit specification parameters. For example, a comparator may have an N-type comparator sub-circuit layout and a P-type comparator sub-circuit layout in the set of layouts corresponding to the comparator. The P-type sub-circuit layout may be used based on one or more parameters having particular values, and the N-type sub-circuit layout may be used based on the one or more parameters having different values, for example. The sub-circuit layouts may be in the form of functional circuit blocks having a variety of input and output terminals (or pins) in the layout. Accordingly, combining may include coupling pins together between the sub-circuit layouts and/or coupling pins of the sub-circuit layouts to other pins of other circuit layouts, for example.

FIGS. 10A-D illustrate examples of automated circuit layout generation according to various embodiments. In certain embodiments, different values for the circuit specification parameters generate different analog circuit layouts having different properties for a corresponding functional circuit component. For example, parameters 1002 corresponding to functional circuit component 1001 may be coded with different values. In this example, a set of N parameters (where N is an integer) is illustrated as variables a1, a2, a3, . . . aN having a first set of values [a1=x1, a2=x2, a3=x3, . . . , aN=xN]. Generator software 1003 receives parameters 1002 having the first set of values and uses a subset of sub-circuit layouts 1010-1015. The sub-circuit layouts are combined to form a circuit layout 1004A for the functional circuit component 1001 according to the received parameters. In this example, the first set of parameter values result in sub-circuit layouts 1010-1012 being combined to form circuit 1004A.

Figure 10A:
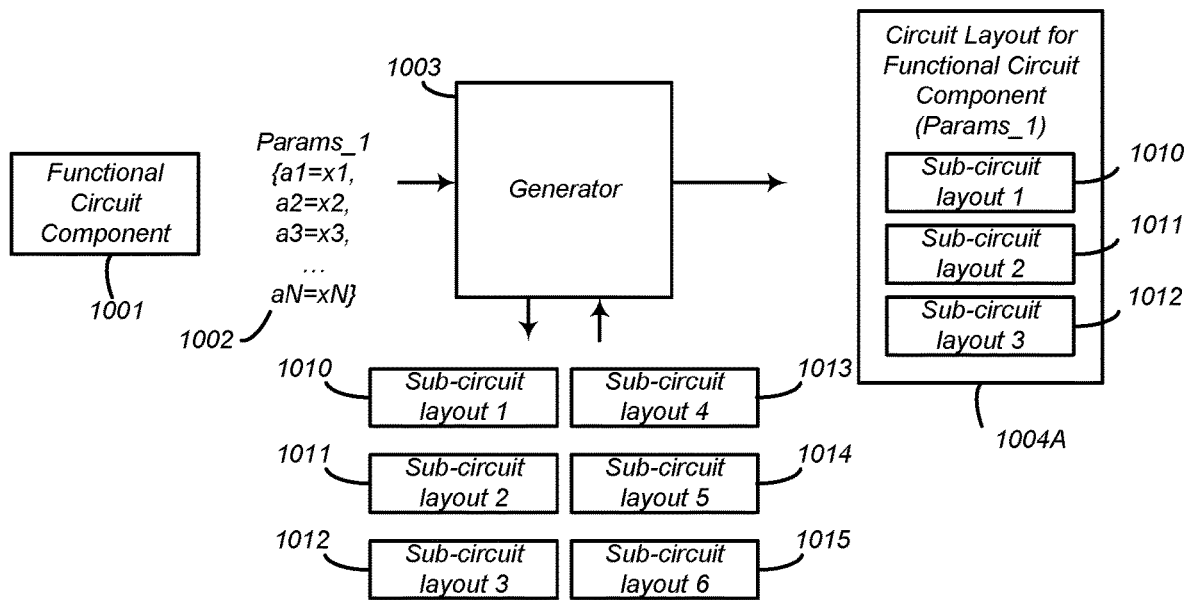
FIGS. 10A-D illustrate examples of automated circuit layout generation according to various embodiments.
Figure 10B:
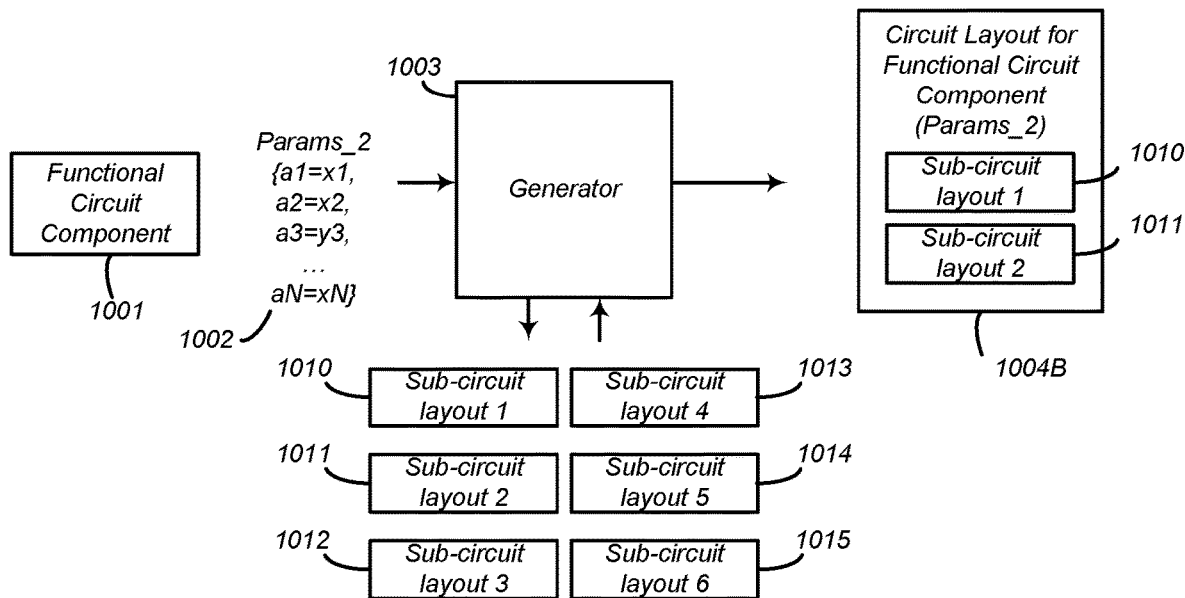

FIG. 10B illustrates parameters 1002 having a second set of values [a1=x1, a2=x2, a3=y3, . . . , aN=xN]. Here, parameter a3 has changed its value from x3 to y3. Therefore, different sub-circuit layouts are combined to form circuit layout 1004B. In this example, when a3=y3 sub-circuit layout 1012 is no longer included in the circuit layout 1004B with sub-circuit layouts 1010 and 1011.

Figure 10C:
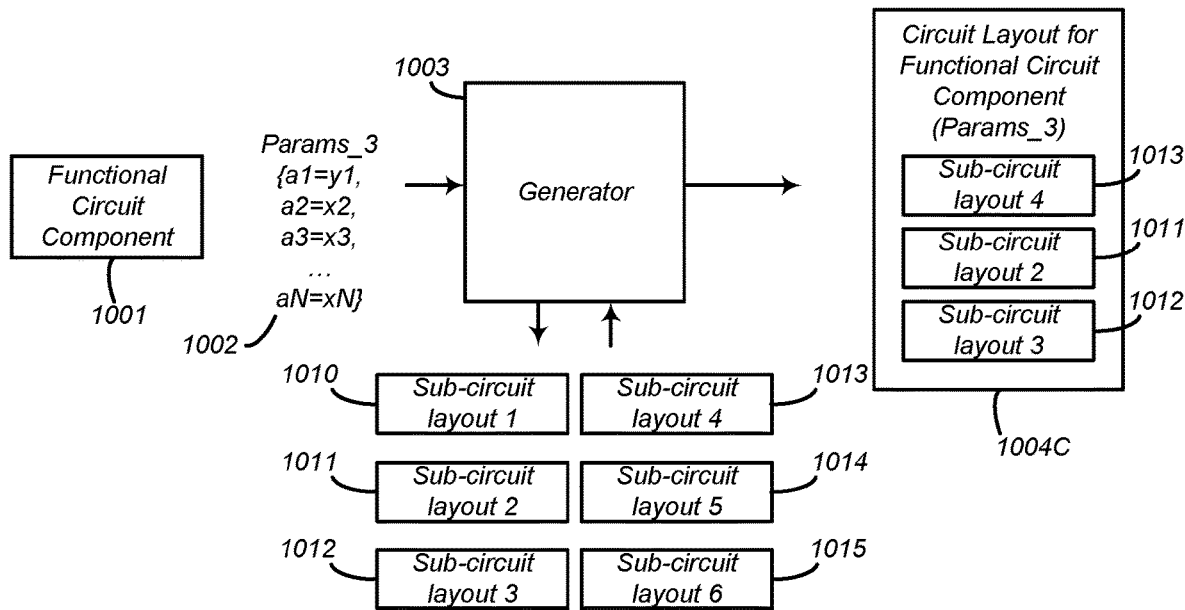

FIG. 10C illustrates parameters 1002 having a third set of values [a1=y1, a2=x2, a3=x3, . . . , aN=xN]. Here, parameter a1 has changed its value from x1 to y1 and parameter a3=x3. Therefore, the sub-circuits used changes again. In this example, when a1=y1 sub-circuit layout 1010 is no longer used. Rather, sub-circuit layout 1013 is included in the circuit layout 1004C with sub-circuit layouts 1011 and 1012.

Figure 10D:
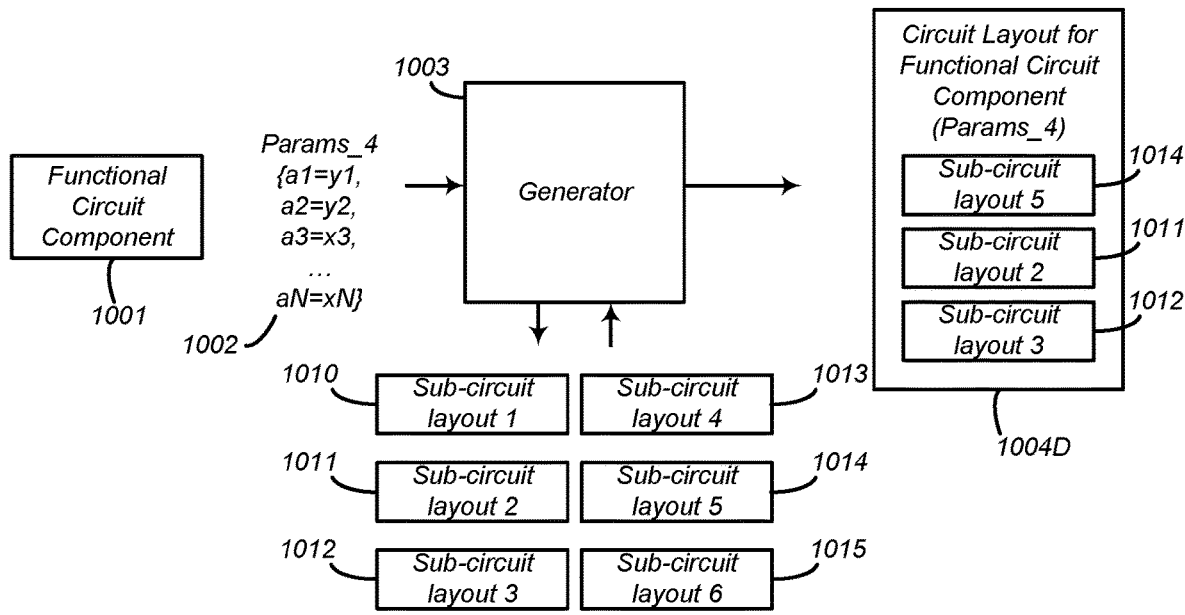

FIG. 10D illustrates parameters 1002 having a third set of values [a1=y1, a2=y2, a3=x3, . . . , aN=xN]. Here, parameters a1 and a2 having values of y1 and y2, respectively, result in sub-circuit layout 1014 being included in the circuit layout 1004D with sub-circuit layouts 1011 and 1012.

Figure 11A:
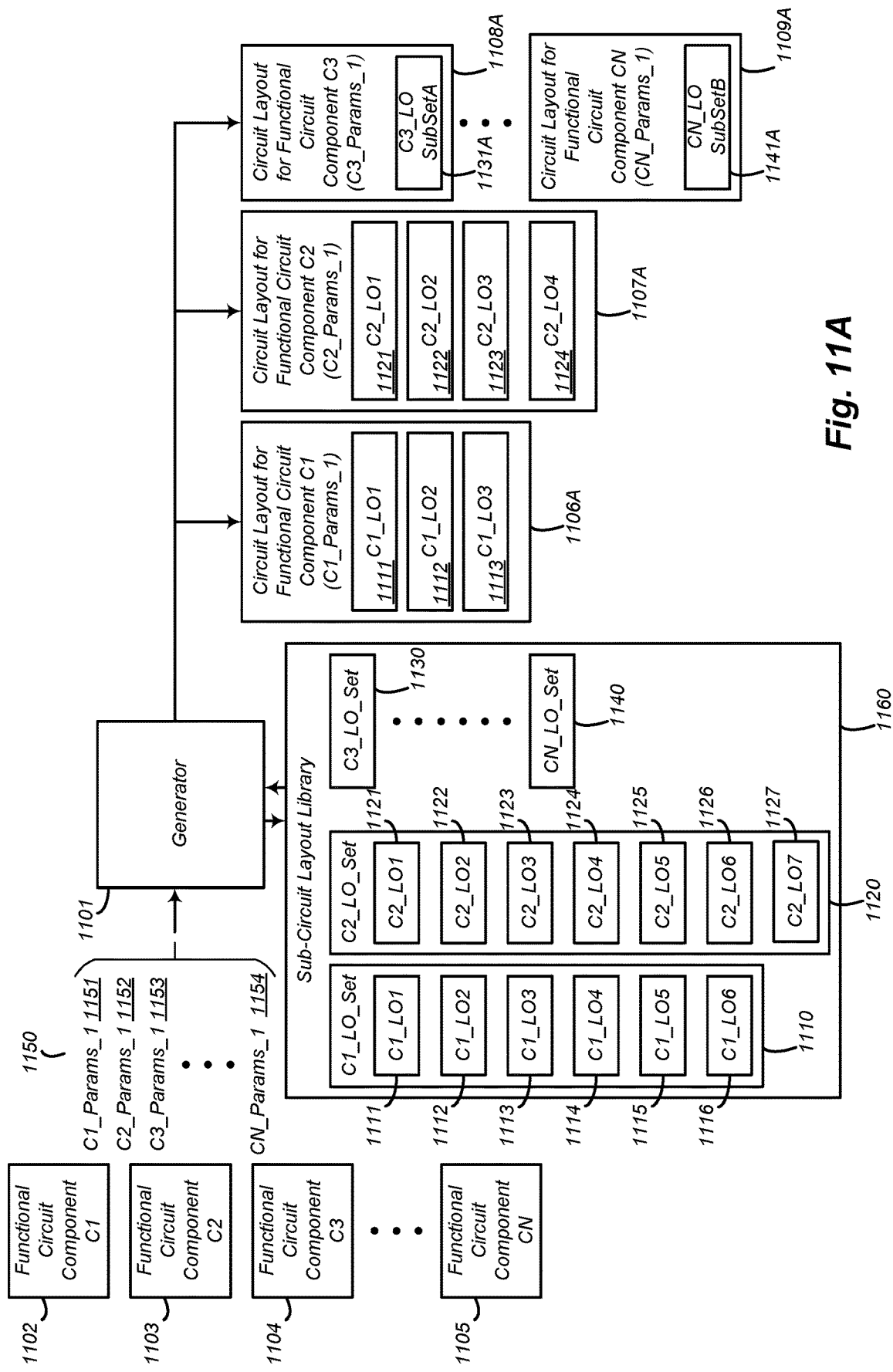
FIGS. 11A-D illustrate examples of automated circuit layout generation according to further embodiments.

Features and advantages of some embodiments of the present disclosure may include receiving circuit specification parameters 1150 corresponding to a plurality of functional circuit components and automatically generating circuit layouts implementing each functional circuit component based on the parameters. FIGS. 11A-D show different parameter sets generating different circuit layouts for different functional circuit components according to an embodiment. Referring to FIG. 11A, in this example, a generator software system 1101 receives parameters 1150 corresponding to a plurality of functional circuit components 1102-1105 (components C1, C2, C3, C4, and so on up to CN, where N is an integer corresponding to the number of functional circuit components for which corresponding circuits are being generated). C1-CN may be a comparator, an oscillator, a delay circuit, a current generator, a voltage reference, or a wide variety of other analog functional circuit components used in analog circuits, for example. In this example, generator 1101 may receive N sets of circuit specification parameters, where each different functional circuit component has a corresponding set of circuit specification parameters. In particular, a first set of parameters 1151, C1_Params, correspond to component C1 1102, a second set of parameters 1152, C2_Params, correspond to component C2 1103, a third set of parameters 1153, C3_Params, correspond to component C3 1104, and so on up to a final set of parameters 1154, CN_Params, corresponding to component CN 1105, for example. Each set of parameters 1151-1154 may specify properties of a circuit to be produced by having different parameter values, for example. In this example, parameters 1151 have a first set of values, which are represented here as "C1_Params_1". Similarly, parameters 1152 have a first set of values "C2_Params_1", parameters 1153 have a first set of values "C3_Params_1", and so on for parameters 1154 having values "C4_Params_1".

FIGS. 11A-D illustrate examples of automated circuit layout generation according to further embodiments. FIGS. 11A-D show examples illustrating that different circuit specification parameters for different corresponding functional circuit components may have different corresponding sets of predefined sub-circuit layouts. For example, referring to FIG. 11A, predefined analog sub-circuit layouts may be stored in a library 1160 (e.g., a layout library). In this example, there are multiple sets of sub-circuit layouts 1110, 1120, 1130, and 1140 corresponding to different functional circuit components 1102, 1103, 1104, and 1105, respectively. Accordingly, C1_Params 1151 corresponding to functional circuit component 1102 (C1) may be used to combine sub-circuit layouts from C1 sub-circuit layout set ("C1_LO_Set") 1110 comprising analog sub-circuit layouts 1111-1116, for example. Similarly, C2_Params 1152 corresponding to functional circuit component 1103 (C2) may be used to combine sub-circuit layouts from C2 sub-circuit layout set ("C2_LO_Set") 1120 comprising analog sub-circuit layouts 1121-1127, for example. Likewise, C3_Params 1153 corresponding to functional circuit component 1104 (C3) may be used to combine sub-circuit layouts from C3 sub-circuit layout set ("C3_LO_Set") 1130 (sub-circuit layouts not shown) and so on up to CN_Params 1154 corresponding to functional circuit component 1105 (CN), which may be used to combine sub-circuit layouts from CN sub-circuit layout set ("CN_LO_Set") 1140 (sub-circuit layouts not shown), for example.

Parameters 1151-1154 may have different values that result in different combinations of corresponding sub-circuit layouts. In this example, each set of parameters 1151-1154 receives a first set of parameter values (e.g., particular values are designated here with an "_1", "_2", etc. . . . ). For instance, a first set of values for circuit specification parameters 1151 is designated C1_Params_1, a first set of values for circuit specification parameters 1152 is designated C2_Params_1, and so on. In this example, generator 1101 receives parameter values C1_Params_1 and combines sub-circuit layouts C1_LO1 1111, C1_LO2 1112, and C1_LO3 1113 from C1_LO_Set 1110 to produce an analog circuit layout 1106A corresponding to functional circuit component C1 1102. Similarly, generator 1101 receives parameter values C2_Params_1 and combines sub-circuits C2_LO1 1121, C2_LO2 1122, C2_LO3 1123, and C2_LO4 1124 from C2_LO_Set 1120 to produce an analog circuit layout 1107A corresponding to functional circuit component C2 1103. Likewise, generator 1101 receives parameter values C3_Params_1 and combines sub-circuit layouts (not shown) from C3_LO_Set 1130 to produce an analog circuit layout 1108A corresponding to functional circuit component C3 1104. Analog circuit layout 1108A comprises a first subset of sub-circuit layouts (C3_LO SubsetA) 1131A from C3_LO_Set 1130. Finally, generator 1101 receives parameter values CN_Params_1 and combines sub-circuit layouts (not shown) from CN_LO_Set 1140 to produce an analog circuit layout 1109A corresponding to functional circuit component CN 1105. Analog circuit layout 1109A comprises a first subset of sub-circuit layouts (CN_LO SubsetB) 1141A from CN_LO_Set 1140. In some embodiments, a plurality of circuit layouts, such as one or more of layouts 1106A, 1107A, 1108A, and 1109A, for different functional components may be coupled together into a layout for a circuit comprising a plurality of parameterized instances of functional components, for example.

Figure 11B:
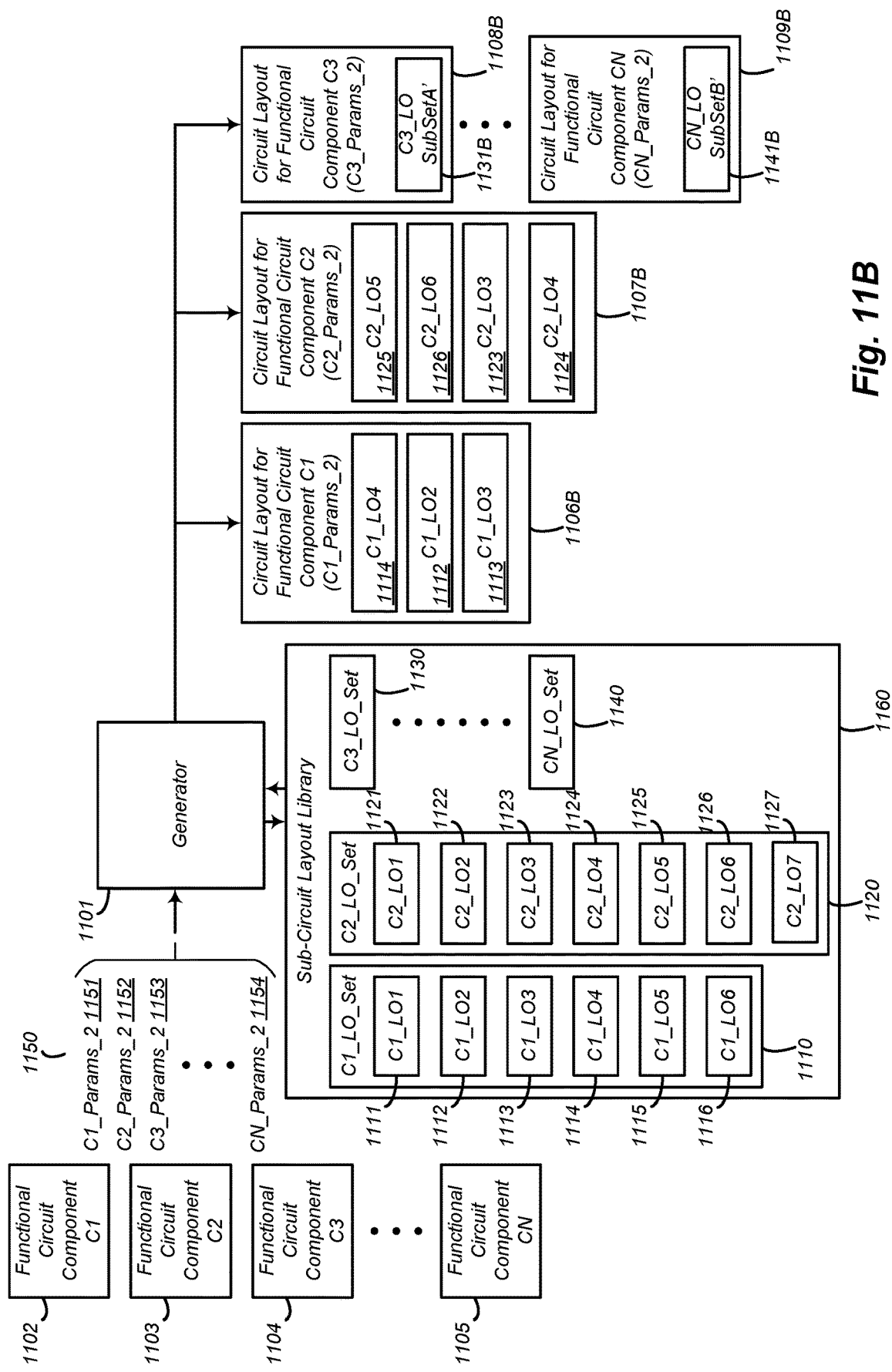

FIG. 11B illustrates generating another circuit layout using another set of parameters according to an embodiment. In this example, each set of parameters 1151-1154 receives a different set of parameter values. For instance, a new set of values for circuit specification parameters 1151 is designated C1_Params_2, a new set of values for circuit specification parameters 1152 is designated C2_Params_2, and so on. In this example, generator 1101 receives parameter values C1_Params_2 and combines sub-circuit layouts C1_LO4 1114, C1_LO2 1112, and C1_LO3 1113 from C1_LO_Set 1110 to produce an analog circuit layout 1106B corresponding to functional circuit component C1 1102 having different properties than layout 1106A, for example. Similarly, generator 1101 receives parameter values C2_Params_2 and combines sub-circuit layouts C2_LO5 1125, C2_LO6 1126, C2_LO3 1123, and C2_LO4 1124 from C2_LO_Set 1120 to produce an analog circuit layout 1107B corresponding to functional circuit component C2 1103 having different properties than layout 1107A, for example. Likewise, generator 1101 receives parameter values C3_Params_2 and combines sub-circuit layouts (not shown) from C3_LO_Set 1130 to produce an analog circuit layout 1108B corresponding to functional circuit component C3 1104 having different properties than layout 1108A, for example. Analog circuit layout 1108B comprises a second subset of sub-circuit layouts (C3_LO SubsetA') 1131B from C3_LO_Set 1130. Finally, generator 1101 receives parameter values CN_Params_2 and combines sub-circuit layouts (not shown) from CN_LO_Set 1140 to produce an analog circuit layout 1109B corresponding to functional circuit component CN 1105 having different properties than layout 1109A, for example. Analog circuit layout 1109B comprises a second subset of sub-circuit layouts (CN_LO SubsetB') 1141B from CN_LO_Set 1140.

Figure 11C:
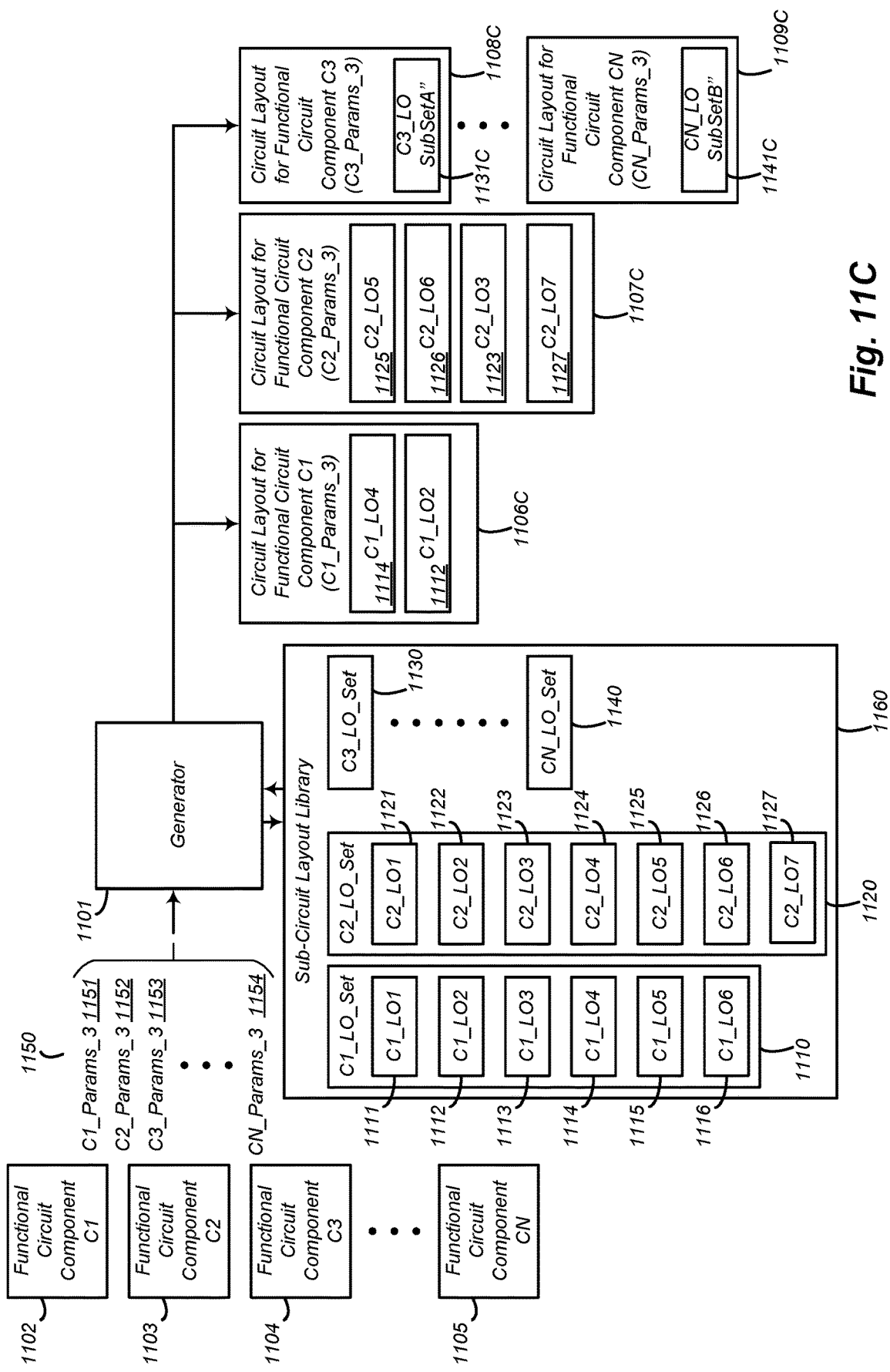

FIG. 11C illustrates generating yet another circuit layout using yet another set of parameters according to an embodiment. In this example, each set of parameters 1151-1154 receives a third set of parameter values. For instance, a new set of values for circuit specification parameters 1151 is designated C1_Params_3, a new set of values for circuit specification parameters 1152 is designated C2_Params_3, and so on. In this example, generator 1101 receives parameter values C1_Params_3 and combines sub-circuit layouts C1_LO4 1114 and C1_LO2 1112 from C1_LO_Set 1110 to produce an analog circuit layout 1106C corresponding to functional circuit component C1 1102 having different properties than layouts 1106A and 1106B, for example. Similarly, generator 1101 receives parameter values C2_Params_3 and combines sub-circuit layouts C2_LO5 1125, C2_LO6 1126, C2_LO3 1123, and C2_LO7 1127 from C2_LO_Set 1120 to produce an analog circuit layout 1107C corresponding to functional circuit component C2 1103. Likewise, generator 1101 receives parameter values C3_Params_3 and combines predefined sub-circuit layouts (not shown) from C3_LO_Set 1130 to produce an analog circuit layout 1108C corresponding to functional circuit component C3 1104 having different properties than layouts 1108A and 1108B, for example. Analog circuit layout 1108C comprises a third subset of sub-circuit layouts (C3_LO SubsetA") 1131C from C3_LO_Set 1130. Finally, generator 1101 receives parameter values CN_Params_3 and combines sub-circuit layouts (not shown) from CN_LO_Set 1140 to produce an analog circuit layout 1109C corresponding to functional circuit component CN 1105 having different properties than layouts 1109A and 1109B, for example. Analog circuit layout 1109C comprises a third subset of sub-circuit layouts (CN_LO SubsetB") 1141C from CN_LO_Set 1140.

Figure 11D:
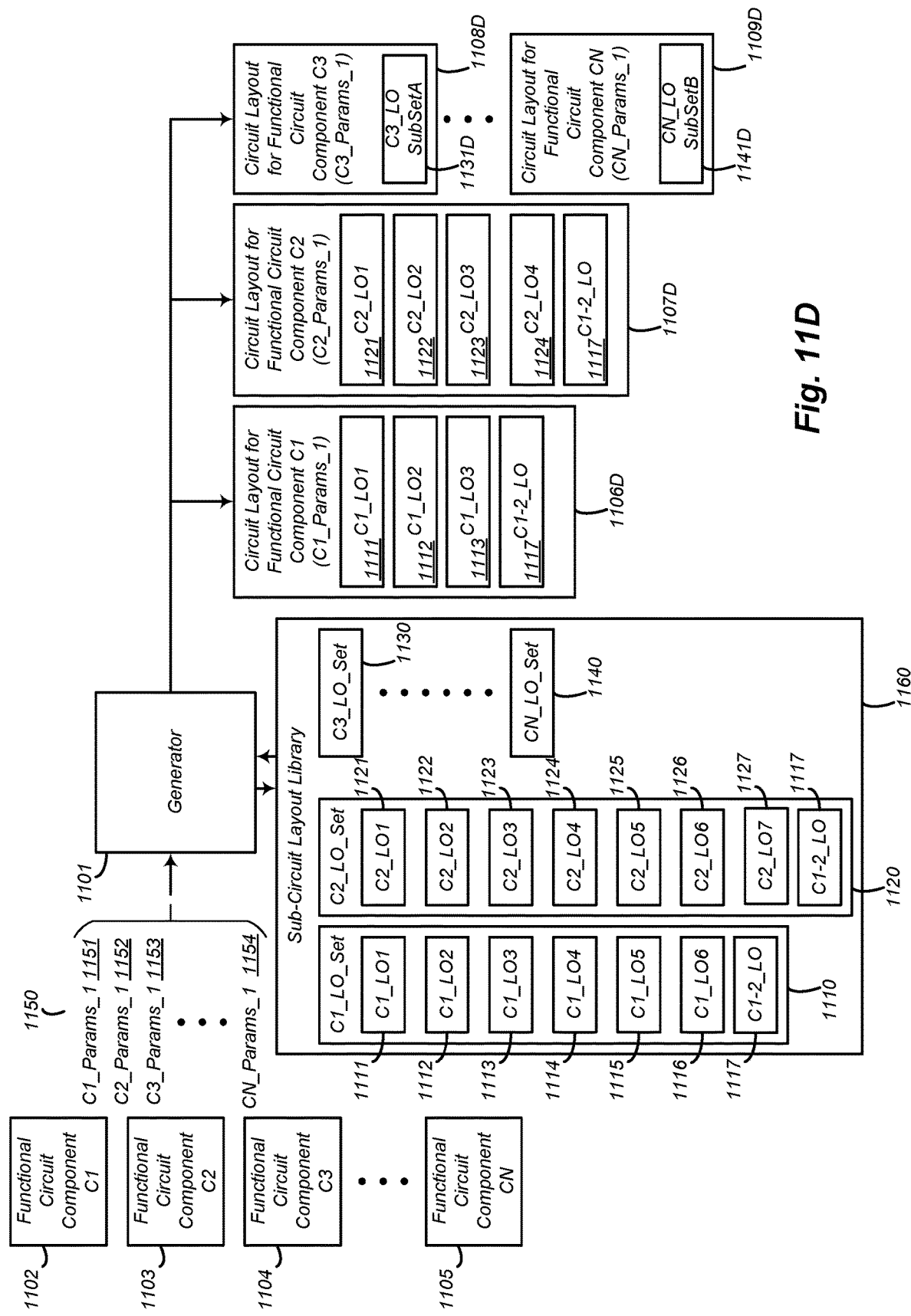

FIG. 11D illustrates an embodiment where different sub-circuit layout sets for different functional circuit components may include the same sub-circuit layout. For example, in some embodiments, different functional circuit components may have a corresponding unique set of predefined sub-circuit layouts. Referring to FIG. 11A, sub-circuit layout set C1_LO_Set 1110 may be a different set of sub-circuit layouts than C2_LO_Set 1120 or C3_LO_Set 1130. In particular, sub-circuit layouts combined to form different comparators may be different than the sub-circuit layouts combined to form different oscillators or different delay circuits, for example. Accordingly, each functional circuit component may have corresponding unique sets of sub-circuit layouts. However, in various embodiments, even though the sets are unique, one or more sub-circuit layouts in some sets may be shared. For example, a set of sub-circuit layouts for a comparator may access a resistor divider sub-circuit layout, and the resistor divider sub-circuit layout may also be associated with a set of sub-circuit layouts for an oscillator, for example. Accordingly, a unique set of layouts may include one or more unique predefined analog sub-circuit layouts only used for the corresponding functional circuit component, or alternatively, a unique set of layouts may include one or more predefined analog sub-circuit layouts used for a plurality of different functional circuit components. In this example, a sub-circuit layout C1-2_LO 1117 is included in both C1_LO_Set 1110 and C2_LO_Set 1120. Further, in this example, C1_Params_1 combines C1-2_LO 1117 with other layouts 1111-1113 to form layout 1106D, and C2_Params_1 combines C1-2_LO 1117 with other layouts 1121-1124 to form layout 1107D, for example.

In some embodiments, a plurality of circuit layouts, such as one or more of layouts 1106A-D, 1107A-D, 1108A-D, and 1109A-D, for different functional components may be coupled together in various combinations into a layout for a circuit comprising a plurality of parameterized instances of functional components, for example. One circuit layout may comprise a layout for functional circuit component C1 1102 based on one set of parameters (e.g., circuit layout 1106D), a layout for functional circuit component C2 1103 based on one set of parameters (e.g., circuit layout 1107C), a layout for functional circuit component C3 1104 based on one set of parameters (e.g., circuit layout 1108D), and a layout for functional circuit component CN 1105 based on one set of parameters (e.g., circuit layout 1109B). Alternatively, combinations of parameters and functional circuit components may generate a layout for functional circuit component C1 1102 based on another set of parameters (e.g., circuit layout 1106B), no layout for functional circuit component C2 1103 (e.g., C2 is not included), a layout for functional circuit component C3 1104 based on another set of parameters (e.g., circuit layout 1108C), and no layout for functional circuit component CN 1105 (e.g., CN also not included). Any combination of parameters for different functional circuit components may be used to automatically generate a layout with various combinations of one or more of the same or different functional circuit components, for example. In some embodiments, the layouts may be used to produce an entire chip of functional circuit components coupled together. The layouts may optionally be further processed by a layout editing tool in an EDA software tool (e.g., using auto-routing features of tools such as Cadence®, Mentor Graphics®, or Silvaco®), perform layout versus schematic ("LVS") (e.g., when schematics are also generated) and/or design rule checks ("DRC"), for example, and may be sent to a manufacturing facility (e.g., a semiconductor fabrication or "FAB") to produce an integrated circuit (e.g., a chip) having the desired properties, for example. Typically, designing layouts for an analog integrated circuit can take lot of time and effort by analog circuit design and layout professionals. Advantageously, systems and methods using the techniques described herein may generate a schematic or layout, or both, for an electronic circuit (e.g., a complete chip) very quickly and in substantially less time that would be required if designing each circuit using traditional techniques.

Figure 12A:
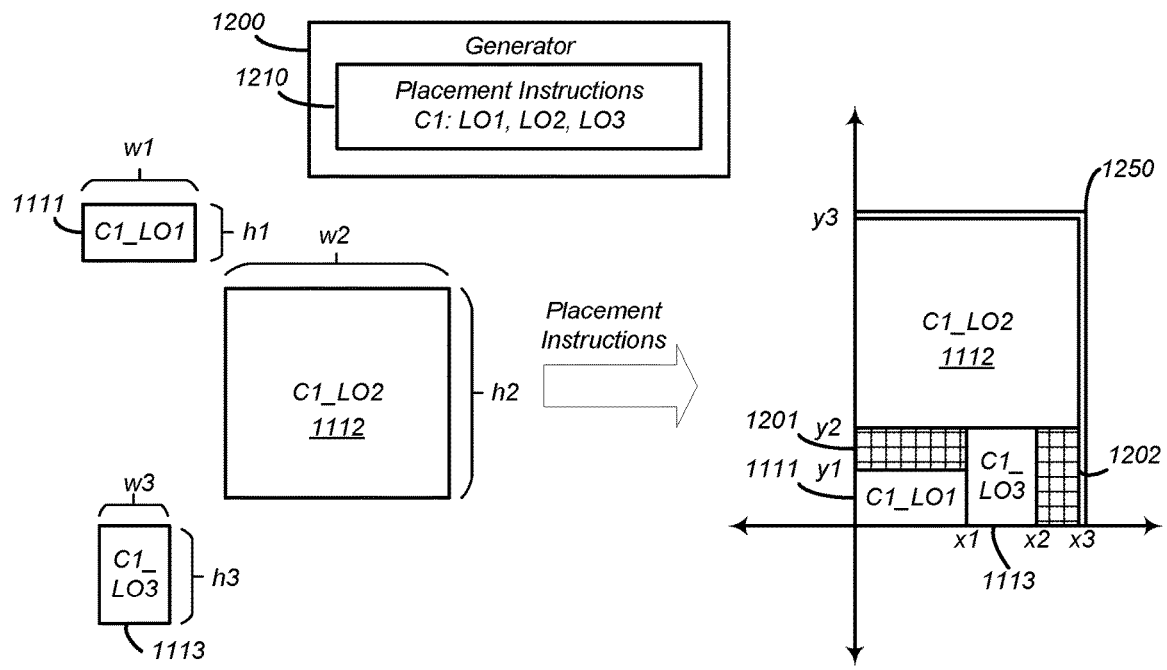
FIG. 12A illustrates an example of generating a circuit layout according to one embodiment.

FIG. 12A illustrates an example of generating a circuit layout according to one embodiment. In some embodiments, combining predefined sub-circuit layouts may be based on a plurality of layout placement instructions to arrange the sub-circuit layouts to form the circuit layout. In this example, generator 1200 includes layout placement instructions 1210 that arrange sub-circuit layouts C1_LO1 1111, C1_LO2 1112, and C1_LO3 1113. Each sub-circuit layout may have a geometry, such as a square or rectangle having a height, h, and width, w, for example. More specifically, in this example, C1_LO1 1111 has a height h1 and width w1, C1_LO2 1112 has a height h2 and a width w2, and C1_LO3 1113 has a height h3 and width w3. Various heights and widths of different sub-circuit layouts may be the same, but are often different, for example. In other embodiments, sub-circuit layouts may have a wide variety of other shapes (e.g., with more sides or even open areas within the shape for placing other sub-circuit layouts). It is to be understood that simple geometries are shown here for illustrative purposes. Placement instructions 1210 may arrange the sub-circuit layouts 1111, 1112, and 1113 to produce the combined circuit layout 1250, for example. In some instances, one or more of the layout placement instructions 1210 arrange the sub-circuit layouts 1111-1113 according to an x, y-coordinate system. In this example, layout placement instructions 1210 may specify coordinates for arranging the sub-circuit layouts. As but one example, placement instructions 1210 may place the lower left corner of C1_LO1 1111 at (0,0) coordinates, the lower left corner of C1_LO3 1113 at (x1=w1,0), and the lower left corner of C1_LO2 1112 at (0, y2=h3). The combined sub-circuit layouts 1111-1113 form circuit layout 1250, which may be one example layout placement to form circuit layout 1106A corresponding to functional circuit component C1 1102 in FIG. 11A, for example. Circuit layout 1250 may include unused space (also known as "white space" or "dead space") 1201 between the height of C1_LO3, y2=h3, and height of C1_LO1, y1=h1. Another unused space may exist at 1202 between the right edge of C1_LO3 at x2=(w1+w3) and the edge of C1_LO2 at x3=w2, for example. It is generally desirable to reduce the amount of unused space on an integrated circuit. Placement instructions according to various embodiments may optimize the combination of sub-circuit layouts to reduce unused space as illustrated in examples below.

Figure 12B:
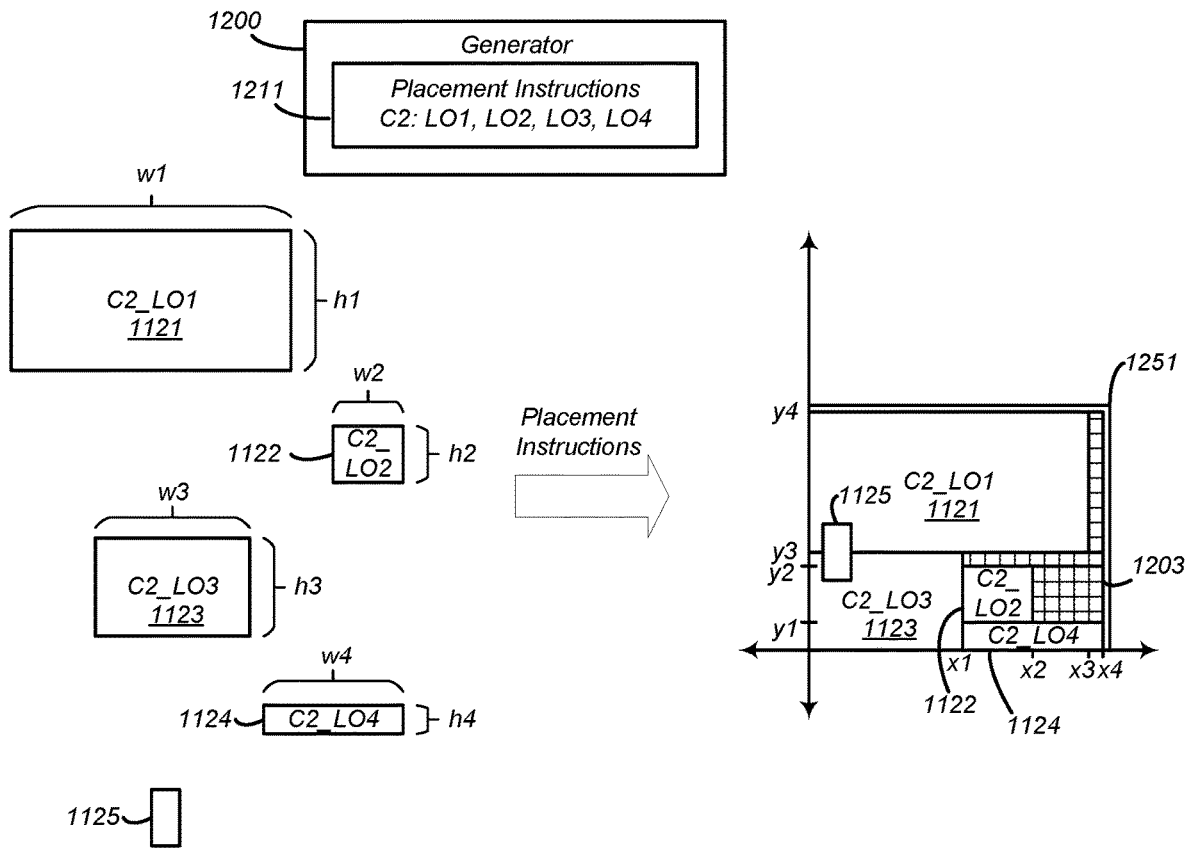
FIG. 12B illustrates another example of generating a circuit layout according to one embodiment.

FIG. 12B illustrates another example of generating a circuit layout according to one embodiment. In this example, layout placement instructions 1211 are executed to combined sub-circuit layouts C2_LO1 1121 having a height h1 and width w1, C2_LO2 1122 having a height h2 and width w2, C2_LO3 1123 having a height h3 and width w3, and C2_LO4 1124 having a height h4 and width w4. In this case, the bottom left corner of C2_LO3 is arranged at (0,0), the bottom left corner of C2_LO4 is arranged at (x1=w3, 0), the bottom left corner of C2_LO2 is arranged at (x1=w3, y1=h4), and the bottom left corner of C2_LO1 is arranged at (x1=h3, 0). The resulting unused space is shown at 1203. The combined sub-circuit layouts 1121-1124 form circuit layout 1251, which is one example layout placement to form circuit layout 1107A corresponding to functional circuit component C2 1103 in FIG. 11A.

Embodiments of the present disclosure may arrange sub-circuit layouts and connect nodes (or pads) of the sub-circuit layouts together using metallization layers and routing techniques and tools know to those skilled in the art. In one embodiment, a connection between pins of one sub-circuit layout may be formed by a predefined layout (e.g., of a metal layer or polysilicon layer) and arranged as described herein to connect pins of two sub-circuit layouts, for example. The same technique may be used to connect pins of combined circuit layouts, for example, so that the use of auto-routing tools is reduced or eliminated. FIG. 12B illustrates an example predefined metal layout 1125 arranged to connect a pin on C2_LO3 1123 and C2_LO1 1121.

Figure 13A:
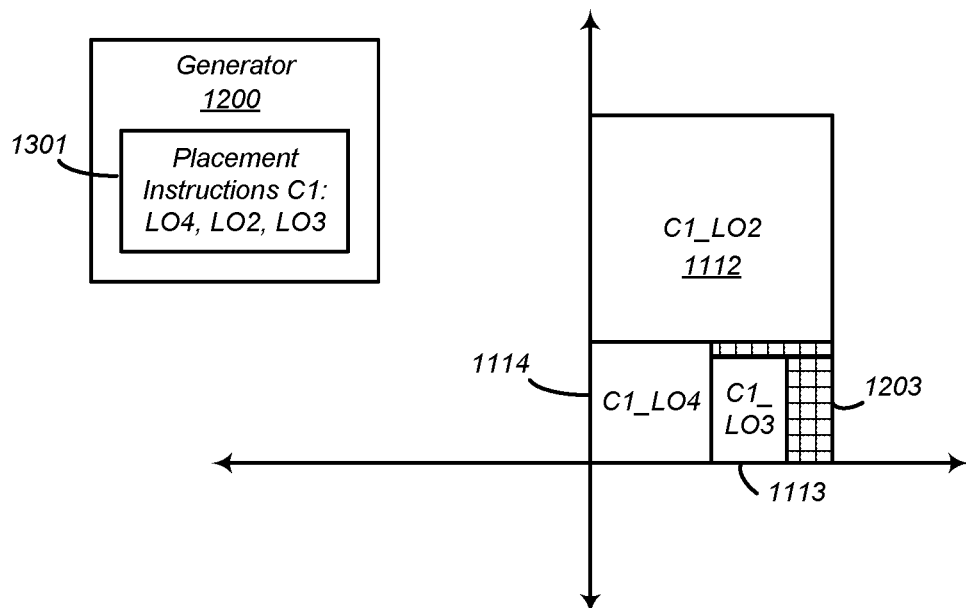
FIG. 13A illustrates an example circuit layout generated from different parameters and placement instructions according to an embodiment.
Figure 13B:
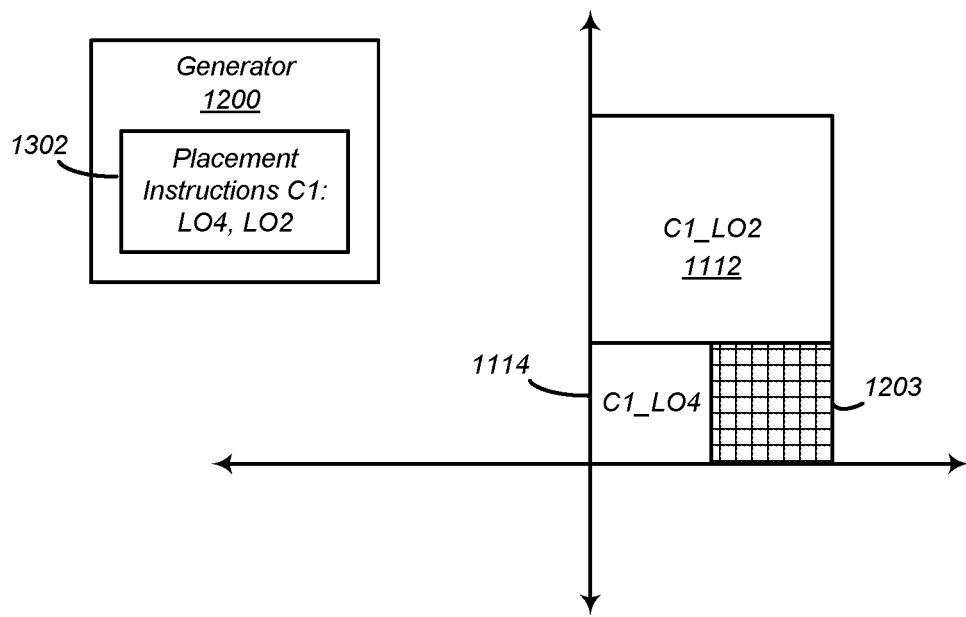
FIG. 13B illustrates another example combination of parameter values and placement instructions according to another embodiment.

It is to be understood that any number of instances of parameterized functional circuit components in a variety of combinations may be generated using the above described techniques to form a circuit layout. For instance, FIG. 13A illustrates an example circuit layout generated from different parameters (e.g., C1_Params_2) and placement instructions 1301 for C1_LO4, C1_LO2, and C1_LO3 to form an example circuit layout 1106B corresponding to functional circuit component C1 of FIG. 11B. Similarly, FIG. 13B illustrates another example combination of parameter values and placement instructions. When the parameter values are changed again (e.g., C1_Params_3), the resulting sub-circuit layouts 1114 and 1112 and placement instructions 1302 for C1_LO4 and C1_LO2 form an example circuit layout 1106C corresponding to functional circuit component C1 of FIG. 11C.

In one example embodiment, different circuit layouts may be formed from different sets of sub-circuit layouts associated with different corresponding layout placement instructions. For example, in one embodiment, when sub-circuit layouts 1111, 1112, and 1113 are combined, a particular set of layout placement instructions (e.g., placement instructions 1210) associated with sub-circuit layouts 1111, 1112, and 1113 are used for arranging the sub-circuit layouts as illustrated in FIG. 12A. Conversely, when sub-circuit layouts 1121, 1122, 1123, and 1124 are combined, another particular set of layout placement instructions (e.g., placement instructions 1211) associated with sub-circuit layouts 1121, 1122, 1123, and 1124 are used for arranging the sub-circuit layouts as illustrated in FIG. 12B. Likewise, when sub-circuit layouts 1114, 1112, and 1113 are combined, as illustrated in FIG. 13A, yet another particular set of layout placement instructions (e.g., placement instructions 1301) associated with sub-circuit layouts 1114, 1112, and 1113 are used for arranging the sub-circuit layouts. FIG. 13B illustrates another set of layout placement instructions 1302 associated with sub-circuit layouts C1_LO4 1114 and C1_LO2 1112 used for yet another set of parameter values. When sub-circuit layouts 1114 and 1112 are combined, as illustrated in FIG. 13B, layout placement instructions 1302, which are associated with sub-circuit layouts 1114 and 1112 are used for arranging the sub-circuit layouts.

In some embodiments, a plurality of layout placement instructions associated with a particular combination of sub-circuit layouts may be predefined. When the layout placement instructions are executed, the associated sub-circuit layouts are arranged into a combined circuit layout. As illustrated in an example below, the layout placement instructions may operate on particular sub-circuit layouts to sequentially position (or reposition) each sub-circuit layout to form the combined circuit layout, for example.

Figure 14:
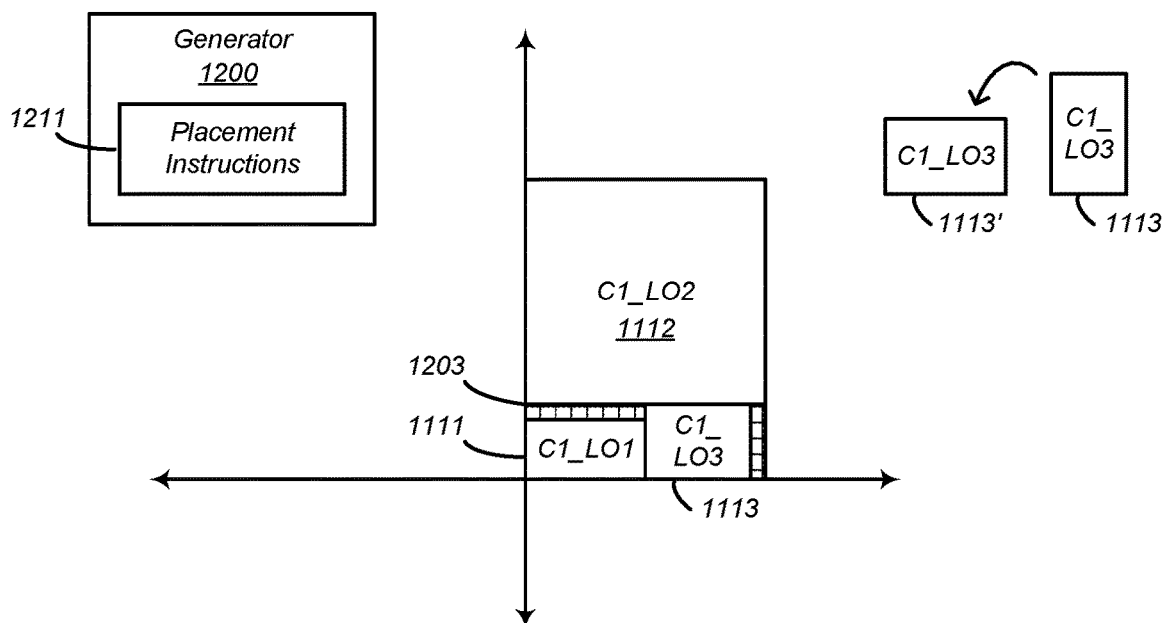
FIG. 14 illustrates another example of generating a circuit layout using a rotation layout placement instruction according to an embodiment.

FIG. 14 illustrates another example of generating a circuit layout using a layout placement instruction according to an embodiment. Features and advantages of the present disclosure may include a plurality of layout placement instructions that rotate sub-circuit layouts, for example. For instance, in this example, the layout placement instructions in FIG. 12A further include a rotation of C1_LO3 1113 as shown at 1113'. By rotating C1_LO3, C1_LO2 may be brought down the y-axis closer to C1_LO1, thereby reducing both the unused space and the entire circuit layout area, for example.

Figure 15:
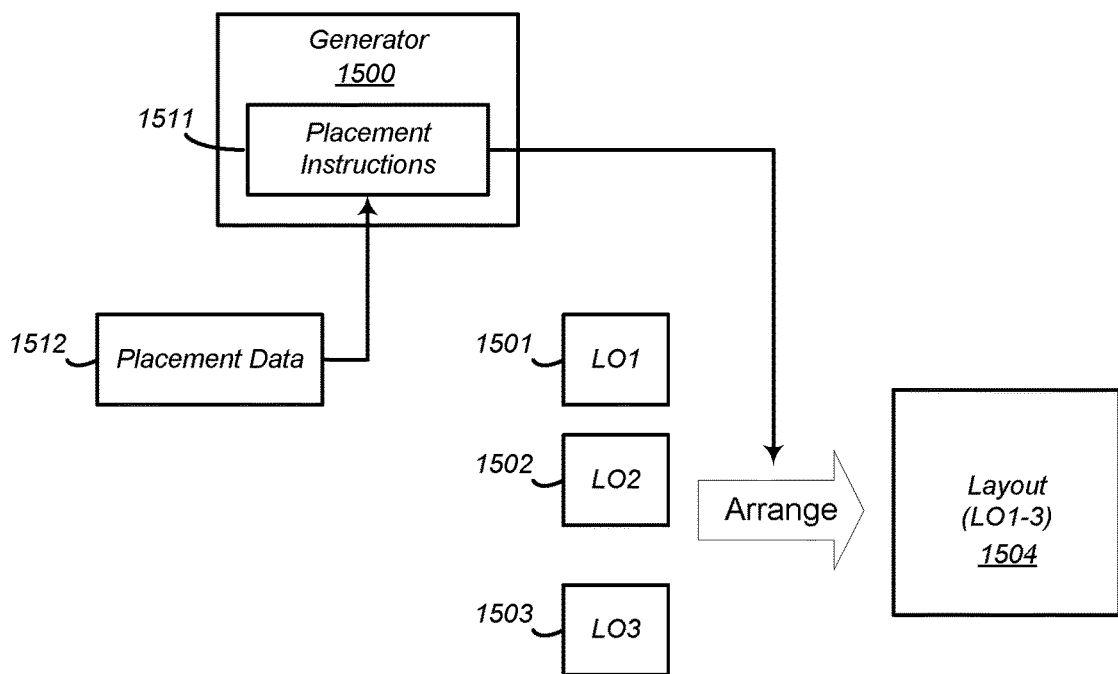
FIG. 15 illustrates another example of generating circuit layouts using layout placement instructions according to an embodiment.

FIG. 15 illustrates another example of generating circuit layouts using layout placement instructions according to an embodiment. In this example, generator software system 1500 may include layout placement instructions 1511 that access placement data 1512 from an external data record. For example, a wide range of placement data to arrange the sub-circuit layouts may be defined in an external data record. The external data record may be an external data file sequentially specifying particular sub-circuit layouts and corresponding coordinates or rotations or other placement information for arranging each layout, for example. In one embodiment, the layout placement instructions comprise executable instructions that access data specifying the arrangement of the sub-circuit layouts, for example. In one embodiment, the external data record includes placement data for arranging a particular combination of sub-circuit layouts. For example, if layouts A, B, and C are to be arranged, then an external data record for arranging layouts A, B, and C may be accessed. Alternatively, if layouts A, D, and E are to be arranged, then another external data record for arranging layouts A, D, and E may be accessed.

In one example embodiment, the layout placement instructions are predefined in an external data record. In this example, the external data record may comprise a sequence of layouts and associated placement instructions to be performed on the layout. One example of such an external data record is as follows:

```
// Begin Arrangement of LO1, LO2, and LO3
PLACE <path> LO1 0 0
PLACE <patb> LO2 2.2 0 R90
PLACE <patb> LO3 6.1 0
// end
```

The above externally defined layout placement instructions have the form: <cmd> <library/location> <sub-circuit_layout_name="cell_name">x1 y1 R1, where <cmd> is the layout placement instruction (e.g., "PLACE"), <library/location> is the path to where the layout is stored, <sub-circuit_layout_name="cell_name"> is the name of the layout to be operated on (e.g., a filename in a directory), x1 is an x-coordinate, y1 is a y-coordinate, and R1 is a rotation. The above data record may be read into generator software 1500 and used to define execution of the layout placement instructions, for example. In this example, generator 1500 receives the data record and arranges LO1 1501 at the (0,0) coordinates, then arranges LO2 1502 at the (2.2,0) coordinates with a 90 degree rotation, and then arranges LO3 1503 at the (6.1,0) coordinates, for example, to form layout LO1-3 1504.

In some embodiments, generator software 1500 may comprise executable scripts for performing the techniques described herein. In one embodiment described below, a script may be executed by EDA software (e.g., Cadence®, Mentor Graphics®, or Silvaco®), for example, to access predefined sub-circuit layouts and arrange them according to the predefined placement instructions, for example.

Design Interface

Figure 16:
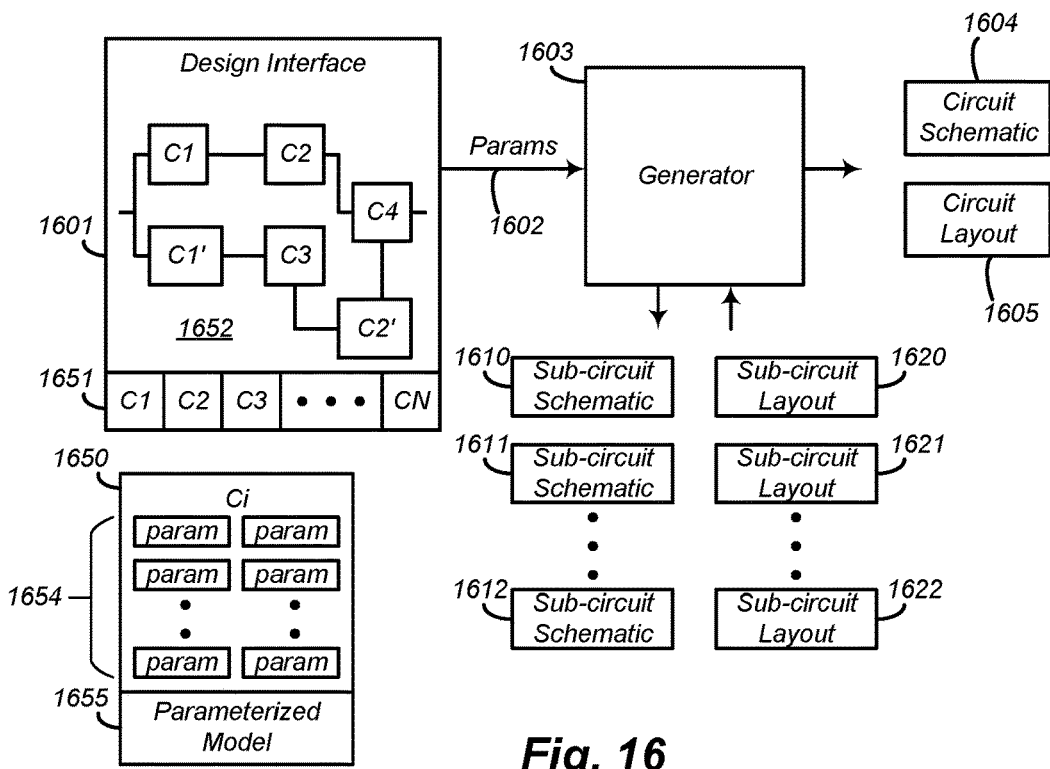
FIG. 16 illustrates another example design interface according to an embodiment.

Additional features and advantages of some embodiments include a design interface that allows users to create circuit designs in software and produce schematics and/or layouts, for example. FIG. 16 illustrates another example embodiment including an example of such a design interface. In this example, a design interface 1601 may be used to specify one or more functional circuit components C1-CN. In various example embodiments, a design interface may be a graphical user interface (UI), a data sheet (e.g., text based), a natural language interface (e.g., receiving spoken inputs), or machine to machine interface to receive instructions from another machine. In this example, a user may drag and drop (or otherwise select) any of functional circuit components C1-CN from a pallet 1651 to a canvas 1652 and connect the components together to create a circuit. In this example, functional circuit components C1, C2, C3, and C4 have been coupled together to form a circuit. The user may then configure the functional circuit components by setting parameters associated with the different functional circuit components. An example set of parameters 1654 for a functional circuit component Ci (where i=1 to N) is shown at 1650. In some example embodiments, different functional circuit components may have different sets of parameters for specifying the properties of the functional circuit components. As mentioned above, for example, a comparator may have parameters for setting a type of input stage, hysteresis, deglitch, or any other type of parameter that the system (e.g., the generator and predefined sub-circuit schematics and layouts) is designed to support, for example. In this example, a user has selected and configured two different types of functional circuit component C1 (i.e., C1 and C1') and two different types of functional circuit components C2 (e.g., C2 and C2').

In some embodiments, design interface 1601 may include behavioral models for the parameterized functional circuit components. A behavioral model may be a higher level model than a transistor level model used to simulate transistor level circuit schematics, for example. A behavioral model may describe the functional behavior of the circuit, including voltages, currents, and signals, for example, but does not capture all the physical aspects of a circuit implementation. A transistor (or device) level model attempts to capture the physical behavior of the circuit (e.g., the underlying physics of the devices and how they will actually work). A behavioral model may describe (or emulate) what the circuit is supposed to do, while the transistor level model may describe how the devices in a design will behave. While a transistor level model may provide more detail about the operation of the circuit, a behavioral level model may generate simulation results faster. In one example embodiment, the behavioral model may be a piecewise linear model of underlying models for the functional circuit components, for example.

Features and advantages of the present disclosure include providing parameterized functional circuit components with underlying configurable behavioral models that correspond to actual simulations of combinations of particular sub-circuit schematics so that a circuit can be defined in the design interface and a combined schematic and/or a layout can be generated automatically. For example, functional circuit component Ci may have an associated configurable (or parameterized) model 1655 so that as parameters 1654 are changed, the behavior of the functional circuit component in the design interface Ci changes. The design interface may perform a behavioral model simulation of the circuits, for example. The parameters may then be used to generate a circuit schematic and layout having substantially similar behavior. For example, device level simulations of sub-circuits combined to form a circuit schematic 1604 may substantially match the behavioral model simulations in the design interface.

As one example, a circuit may be defined in the UI 1601 by selecting functional circuit component C1 and then selecting desired parameters (e.g., a1=x1, a2=x2, a3=x3) for C1. The behavioral model for C1 may be configurable based on the parameters. Thus, the behavioral model for C1 with parameters (a1=x1, a2=x2, a3=x3) may be simulated to produce simulations results to indicate to the user how C1 will operate. Advantageously, the same parameters (a1=x1, a2=x2, a3=x3) are used to select one or more sub-circuit schematics 1610-1612 (e.g., as described in various embodiments above), which are combined to produce circuit schematic 1604. The selected sub-circuit schematics may be designed and combined (based on the parameters) to produce substantially matching simulation results between the behavioral model simulation (here, of C1(a1=x1, a2=x2, a3=x3)) and the device model simulation of sub-circuits selected using parameter values a1=x1, a2=x2, and a3=x3, where the device model simulation is more detailed and may take longer to obtain than the behavioral model simulation, for example. Additionally, one or more sub-circuit layouts 1620-1622 for each of the sub-circuit schematics combined to form circuit schematic 1604 based on the parameter values may then be combined to produce a corresponding layout 1605 automatically using the techniques described herein, for example. A variety of the same or different functional circuit components may be selected and configured with the same or different parameters, for example, to generate a variety of circuits and layouts.

Accordingly, a user may select functional circuit components, configure the functional circuit components with parameter values, and connect the components to obtain a desired circuit functionality at the behavioral level, which is typically not subject to actual device level technical challenges and potential errors. The parameters 1602 used in the selected functional circuit components may then be received by generator 1603 to automatically generate a schematic and/or a layout for the user's circuit, for example. Accordingly, users may define and generate very advanced analog and mixed signal circuit schematics and layouts without being required to have all the skills typically associated with analog and mixed signal transistor level circuit design and layout. Furthermore, the present system has the advantage of producing schematics and layouts very quickly, thereby reducing analog and mixed signal circuit schematic design and layout cycle times and associated costs. For example, some analog circuit design and layout cycle times may be on the scale of months depending on complexity. Using the techniques described herein, generating an analog circuit design and layout may be on the scale of days, hours, or even minutes, for example, depending on complexity.

Example Design and Automated Circuit Generation Process and System

Figure 17:
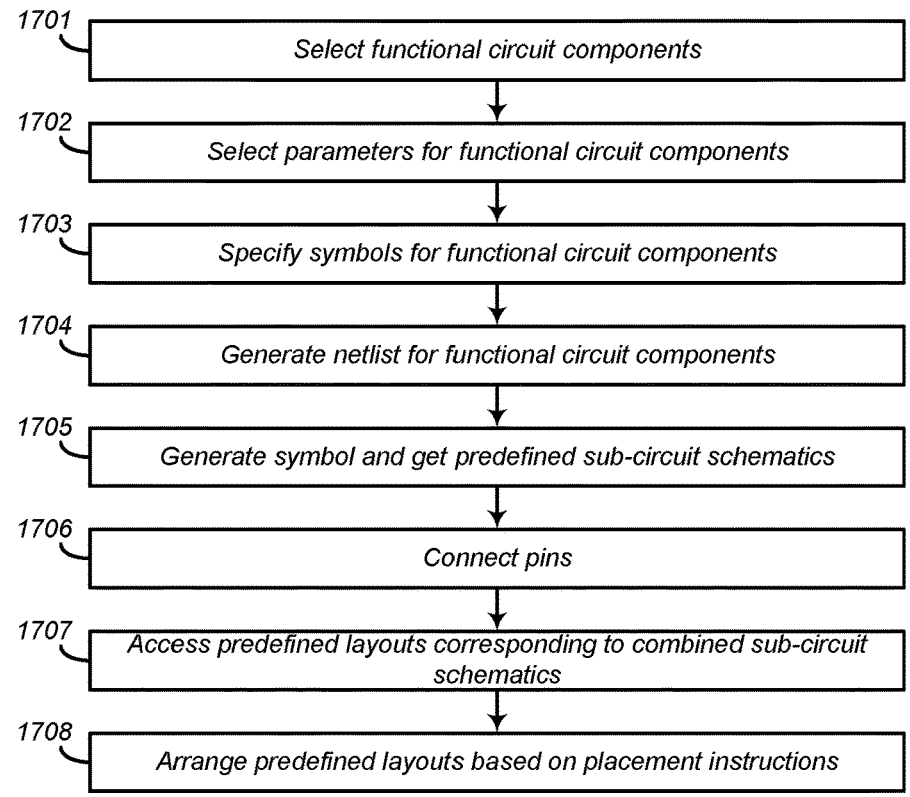
FIG. 17 illustrates an example design and automated circuit generation process according to another embodiment.
Figure 18:
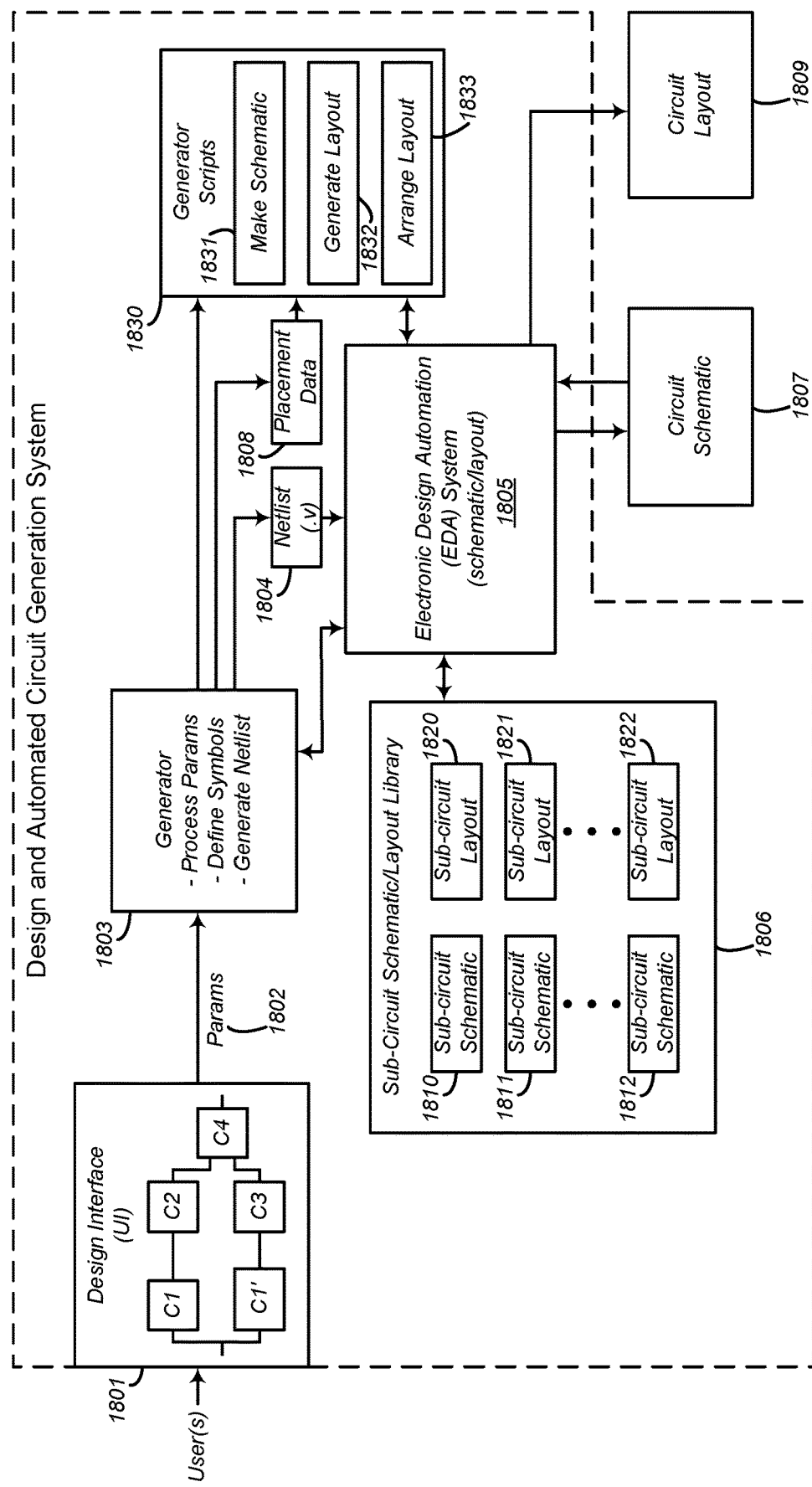
FIG. 18 illustrates an example design and automated circuit generation system according to another embodiment.

FIG. 17 illustrates an example design and automated circuit generation process according to another embodiment. The process shown in FIG. 17 shall be explained with reference to FIG. 18. FIG. 18 shows an example design and automated circuit generation system according to another embodiment.

Referring to FIG. 17, the process may begin at 1701 with the selection of functional circuit components (e.g., by a user) using design interface 1801. At 1702, circuit specification parameters are selected for the functional circuit components. The parameters may specify particular properties of the functional circuit components to be generated, for example. In FIG. 18, a user has selected and configured five (5) functional circuit components (e.g., C1, C2, C1', C3, and C4, where C1 and C1' are the same functional component with different parameters).

Figure 19:
FIG. 19 illustrates symbols for different functional circuit components according to an embodiment.

In this example, generator software includes generator software component 1803 for receiving and processing the circuit specification parameters 1802, specifying symbols, and generating a netlist. Generator software of the present example further includes generator scripts 1830 for combining selected sub-circuit schematics and arranging sub-circuit layouts. Generator software in this example may send instructions to an EDA system 1805 (e.g., for editing schematics and layouts). One example system that may be used for system 1805 is an EDA system from Cadence®, for example. In other example embodiments, functionality of the EDA system may be included in the generator software. At 1703 the circuit specification parameters are received by generator component 1803 and a symbol is specified for the functional circuit components. An example of a symbol specification is illustrated in an example netlist below. FIG. 19 illustrates symbols for different functional circuit components according to an embodiment. Symbols may be created based on the particular values of the circuit specification parameters, for example. For instance, one set of parameter values may be used to define symbol 1901 and another set of parameter values may be used to define symbol 1902. The symbols may be used to encapsulate (or represent) particular sub-circuit schematics selected based on the parameter values, for example. Referring to FIG. 18, generator component 1803 may determine the sub-circuit schematics 1810-1812 to be used from the received parameter values and read all the pins for those sub-circuit schematics through EDA system 1805, for example. As mentioned above, generator component 1803 may specify connections between pins of the sub-circuit schematics and may further specify connections between pins of the sub-circuit schematics and their corresponding symbol (e.g., using a pin map). Referring again to FIG. 17, a netlist 1804 may be generated for the functional circuit components at 1704. Netlist 1804 may specify connections between the pins of the sub-circuit schematics selected for each parameterized functional circuit component (e.g., a comparator) and between such pins and the pins of the symbol. Generator component 1803 may further output placement data 1808 based on the parameter values and sub-circuits to be combined, as explained further below. The netlist 1804 may provide instructions for creating the symbol and connecting pins of sub-circuit schematics, for example, and may include a name of one or more sub-circuit schematics, a name for the symbol, and information for coupling pins together. In one example implementation, the netlist may be a verilog ".v" file, for example. An example output netlist for one sub-circuit schematics and one symbol is shown below:

```
//Parameterized Functional Circuit Component Circuit Generator
//Functional Circuit Component: comparator
//Parameters:
//NAME: comparator_XU0; SPEED:slow; TYPE:n; EDGE:rising;
/HYSTERESIS:register; HYSTERESIS:20mV; DEGLITCH:no; VMAX:6V
//1. Specify sub-circuit schematic "comparatorinnslow" to be
// accessed through EDA System 1805
module comparatorinnslow ( V, en, INN, INP, out, G, IP, INN-
HYSTPBIAS,
RISEHYST, FALLHYST, a, SUB ); //sub-circuit name and pins
input RISEHYST;
input V;
input INP;
output INNHYSTPBIAS;
output out;
output [1:0] a; //bus output
input FALLHYST;
input IP;
input INN;
input G;
input en;
input SUB;
```

```
endmodule
//2. Instructions to Create Symbol for Parameterized Functional Circuit
Component module comparator_XU0 (enable_comparator, IP,
comparator_out, COMPARATOR_INP, register_comphysteresis,
COMPARATOR_INN,G, V,SUB);
input V;
input enable_comparator;
input IP; // bias current
input COMPARATOR_INP;
input COMPARATOR_INN;
output comparator_out;
input G;
input SUB;
input [1:0] register_comphysteresis;
//end symbol specification
//Define 2-wire bus "a"
wire[1:0] a;
//Create instance of sub-circuit "comparatorinnslow" - instance name
"Xcompn"
//Specify connection between sub-circuit pins and symbol pins (or other
sub
circuit pins) comparatorinnslow Xcompn(
.V (V), //specify connection between stone pin name (.V) and symbol pin
name (V).en (enable_comparator), //specify connection between enable
pins
INN (COMPARATOR_INN),
.INP (COMPARATOR_INP),
.IP (IP),
.a ({a1,a0}), //output bus "a" of comparator to wire "a" above
.INNHYSTPBIAS (n1), //floating
.FALLHYST (n2). // floating
RISEHYST (n3), // floating
.SUB (SUB),
.out (comparator_out),
.G (G)
);
endmodule
```

The above netlist may be stored in a location for later access by generator scripts 1830, for example. It is to be understood that the above netlist is just one example technique for specifying symbols and connections between pins. Other techniques may also be used.

Once the netlist is generated, generator component 1803 may signal generator component 1830 to start executing scripts 1831-1833. In this example, one or more scripts to generate the circuit schematic 1831 may be executed by EDA system 1805 to get predefined sub-circuit schematics at step 1705 in FIG. 17. The pins may be connected according to netlist 1804 as illustrated at step 1706 in FIG. 17, for example. For example, the netlist may be entered by the scripts into the EDA system 1805 to produce the combined circuit schematic 1807. The result is one or more symbols, created as described above, and inside each symbol (e.g., down in the schematic hierarchy) are the sub-circuit schematics used to form each symbol with pins coupled together based on the netlist. A symbol represents the transistor (or device) level schematic for a functional circuit component having the parameter values received by the generator, for example. In the case of multiple functional circuit components with corresponding sets of parameter values, multiple symbols and corresponding schematics may be created in the EDA system, for example.

Referring again to FIG. 17, the combined sub-circuit schematics are used to access predefined sub-circuit layouts 1820-1822 at 1707. For example, in one embodiment each sub-circuit schematic 1810-1812 has one or more corresponding predefined sub-circuit layouts 1820-1822. The sub-circuit schematics may be used by a generate layout script 1832 to retrieve the corresponding sub-circuit layout using EDA system 1805. At 1708, predefined sub-circuit layouts are arranged based on layout placement instructions.

Advantageously, placement data 1808 may be retrieved to automatically by arrange layout script 1833 to arrange each sub-circuit layout as described above and generate a circuit layout 1809.

Example Generator

Figure 20A:
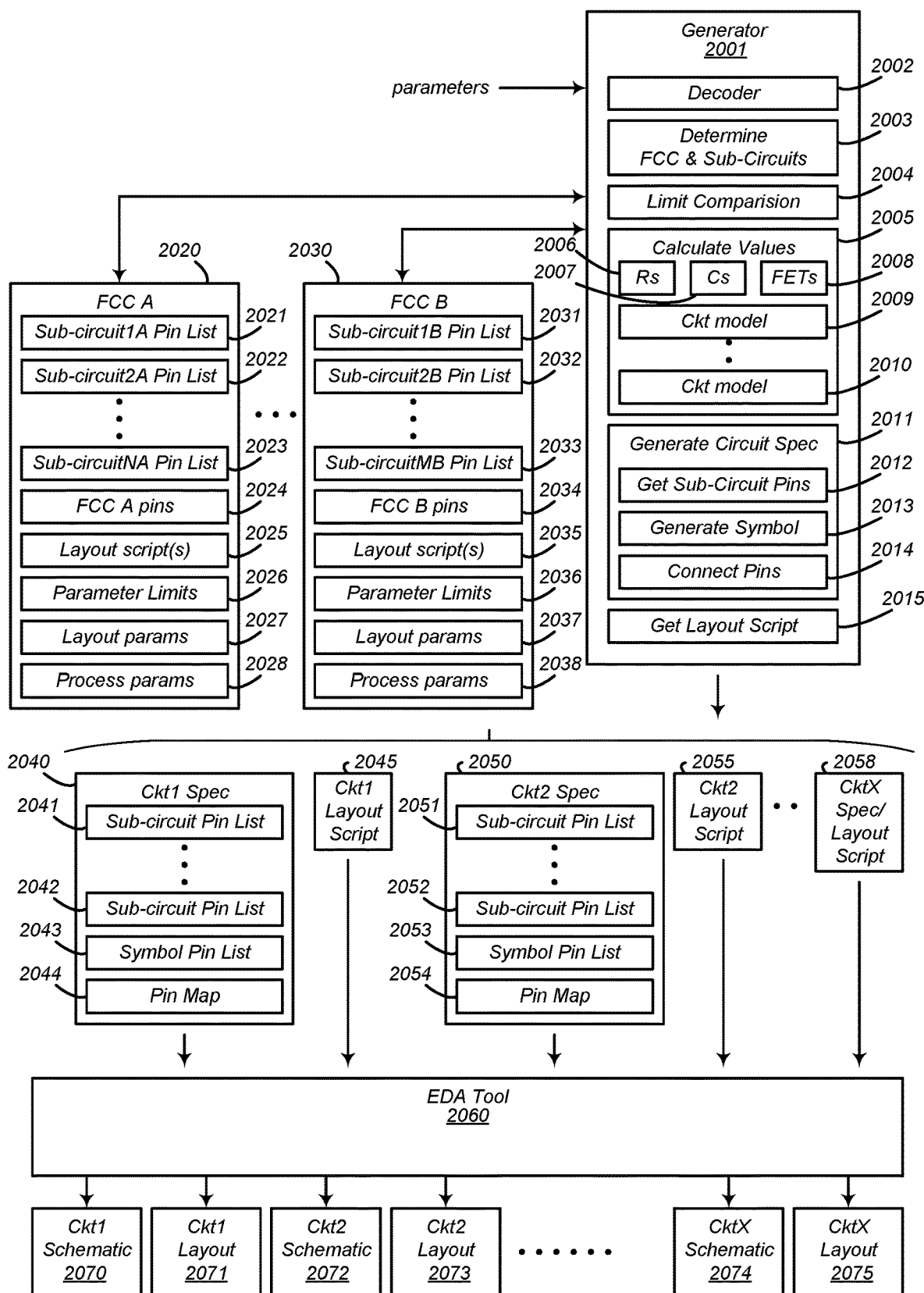
FIG. 20A illustrates an example generator software system 2001 according to one embodiment.

FIG. 20A illustrates an example generator software system 2001 according to one embodiment. It is to be understood that the following is just one example implementation of a generator for performing the techniques described herein. Other software architectures may be used for implementing some or all of the techniques described herein.

Generator 2001 may receive parameters that specify an analog circuit to be generated. The parameters may correspond to one or more different functional circuit components. As mentioned above, information specifying the circuit to be generated may be received in a wide range of ways. Accordingly, generator 2001 may include a decoder 2002 to receive the parameters and extract the information. In one embodiment, the parameters are received as text, and decoder 2002 parses the text and extracts the parameters. Generator 2001 may include an FCC & Sub-circuit determining block 2003 to receive the parameters and determine which functional circuit component(s) are to be generated and which sub-circuits are to be used in each functional circuit component. Generator 2001 may include a limit comparison block 2004 to compare the parameters for various functional circuit components and ensure that the parameters are within predefined limits. If the parameters are outside the limits, the circuit may not work, and the system may trigger an error signal or default to other parameter values, for example.

In various embodiments, a generator system may receive predefined information about the circuits to be generated to facilitate automated circuit schematic and/or layout generation. Generators according to various embodiments may access sub-circuit pin lists, layout scripts to be associated with particular circuit schematics or families of circuit schematics, parameter limits (describe above), layout parameters (e.g., lengths of various components), process parameters, and/or generate custom functional circuit component pin lists based on the received parameters, for example. In this example, each functional circuit component has associated data used by generator 2001. For example, data associated with one functional circuit component (FCC A) 2020 may include a plurality of pin lists 2021-2023 for different sub-circuit schematics (e.g., sub-circuit schematics 1A-NA), a pin list 2024 for the functional circuit component (e.g., all possible pins used in various version of FCC A), one or more layout scripts 2025 used with various versions of FCC A 2020, parameter limits 2026 for FCC A, layout parameters 2027 (e.g., component lengths for calculated values described in more detail below), and process parameters 2028 (e.g., used for some calculated values and/or automated layout as described in more detail below). Other data for other functional circuits components (e.g., FCC B 2030) may include similar data 2031-2038, for example. Such data may be stored in files or in a database accessible by generator 2001, for example. In some embodiments, some data may be hardcoded into the generator code.

Generator 2001 may access data for functional circuit components to perform a variety of functions. In some embodiments described in more detail below, generator 2001 may include code for determining resistor attributes, capacitor attributes, and/or transistor attributes (e.g., code blocks 2006-2008, respectively, referred to herein as calculated values 2005). One or more of code blocks may receive layout parameters or process parameters for a particular functional circuit component, for example, as described in more detail below. Calculated values 2005 may include one or more circuit models 2009-2010 (e.g., corresponding to particular functional circuit components) for deriving various values used by blocks 2006-2008, for example, from values in the received parameters. Examples of a bias current model and delay circuit model are presented below for illustrative purposes, but other circuit models may be included in generator 2001, for example. Calculated values 2005 may determine a component value (e.g., for a resistor, capacitor, or transistor), which may be based on layout parameters (e.g. one or more predefined dimensions for use in the layout). In various embodiments, a plurality of components (e.g., segments or unit components) are created in the circuit specification and connected for form one combined component. In one embodiment, component values are encoded in an identifier associated with a plurality of component symbols included the circuit specification. In one embodiment, component values are encoded in symbol names for the components, for example as described in more detail below.

In various embodiments, generator may include code for generating a circuit specification based on the parameters. In this example, generate circuit specification code 2011 comprises code 2012 (get sub-circuit pins) for retrieving pins for the sub-circuit schematics to be used in the circuit to be generated, code 2013 to generate a symbol for the circuit to be generated, and code 2014 (e.g., connect pins) to connect pins of the sub-circuits and pins of the symbol, for example. In this example, the connected pins in the circuit specification form a pin map as described above.

Generate circuit specification 2011 may receive an indication of which sub-circuits schematics are to be included in the circuit specification, and may retrieve pin lists for those sub-circuit schematics (e.g., one or more of pin lists 2021-2023 or 2031-2033). An illustrative pin list for sub-circuit A generated in a circuit specification is as follows:

---
Module <sub-circuitA> (pin1, ..., pinN)
Input pin1
...
output pinN
endmodule

---

Where the above is for N pins, some of which may be input pins and others output pins, for example. In one embodiment, the pin lists may be functional views of sub-circuit schematics received from an EDA tool 2060, for example.

Additionally, in this example, generate symbol 2013 may determine which pins (e.g., out of all possible pins for a particular functional circuit component) are to be included on the symbol based on the parameters. For example, FCC A pins 2024 may be received and the parameters evaluated to determine which pins should be incorporated into a symbol for the circuit to be generated. An illustrative symbol generated based on the parameters is as follows:

```
Module <symbolname> (pin1, ..., pinM)
Input pin1
...
output pinM
<sub_circuits & connections>
endmodule
``` endmodule

Where <sub_circuits & connections> specifies the sub-circuits and connections as illustrated below. Connect pins 2014 may map the pins of one or more sub-circuit schematics to pins of other sub-circuit schematics or pins of the symbol. The mappings may be included in the code for connect pins 2014, for example. In one embodiment, code for connect pins 2014 includes string generators for various possible combinations of the sub-circuit schematics and symbols that are selected based on the parameters. The following illustrates a pin map generated in a circuit specification is as follows:

```
Module <symbolname> (pin1, ..., pinM)
Input pin1
...
output pinM
sub-circuit_1 (.subcir1_pin1 (symbol/subcir_pin),
.subcir1_ pin2 (symbol/subcir_pin), ...,
.subcir1_pinX (symbol/subcir_pin))
sub-circuit_2 (.subcir2_pin1 (symbol/subcir_pin),
.subcir2_pin2 (symbol/subcir_pin), ...,
.subcir2_pinY (symbol/subcir_pin))
...
sub-circuit_K(.subcirK_pin1 (symbol/subcir_pin),
.subcirK_pin2 (symbol/subcir_pin), ...,
.subcirK_pinZ (symbol/subcir_pin))
endmodule
```

The result is a circuit specification for a symbol comprising M pins having K sub-circuits. Pin connections are established by "subcir1_pin1 (symbol_pin/subcir_pin)". The following establishes a connection between a pin "VOUT" on sub-circuit "AMP" with pin "VIN" on another sub-circuit:

```
Module EXAMPLE_SYMBOL (IN, VCC, OUT)
Input IN //symbol pin
Input VCC //symbol pin
output OUT //symbol pin
AMP_1 (
.VIN (IN) // connect vin pin on AMP_1 with IN pin on symbol
.VDD (VCC) // connect vdd pin on AMP_1 with VCC pin on symbol
.VOUT (VIN) // connect VOUT pin of AMP_1 with VIN pin of
another sub-circuit (not shown).
endmodule
```

Features and advantages of some embodiments may include generating layout scripts for automated layout generation of circuits. In one embodiment, the layout scripts may be customized for particular circuits embodied in the circuit specifications. Generator 2001 may include code for retrieving one or more predefined layout scripts customized for one or more circuits generated based on the received parameters. Generate layout script code 2015 may retrieve layout scripts for a particular functional circuit component or particular combinations or configurations of the sub-circuit schematics (and calculated resistors, capacitors, or transistors, if any) based on the received parameters, for example.

Therefore, generator 2001 may produce a circuit specification 2040/2050 and a layout script 2045/2055 for each circuit generated in response to received parameters. As illustrated at 2040 for a first circuit (Ckt1 Spec) and 2050 for a second circuit (Ckt2 Spec), the circuit specifications may include sub-circuit schematic pin lists 2041-2042/2051-2052, symbol pins 2043/2053 (which may encapsulate the sub-circuit schematics and any calculated components), and pin maps 2044/2054 specifying connections of the pins, for example. In various embodiments, one or more functional circuit components may be incorporated into a circuit specification. Some embodiments may include multiple functional circuit components coupled together to form a more complex circuit, for example.

Circuit specifications and layout scripts may be received and processed by an EDA tool 2060. For example, an EDA tool may receive the circuit specification as a Verilog.v file and generate the symbol populated with the predefined sub-circuits and connected together according to the pin map, for example. A variety of circuit schematics 2070, 2072, 2074 may be generated using different circuit specifications. The circuit schematics may be converted to layout instances and automatically positioned for form layouts 2071, 2073, and 2075.

Figure 20B:
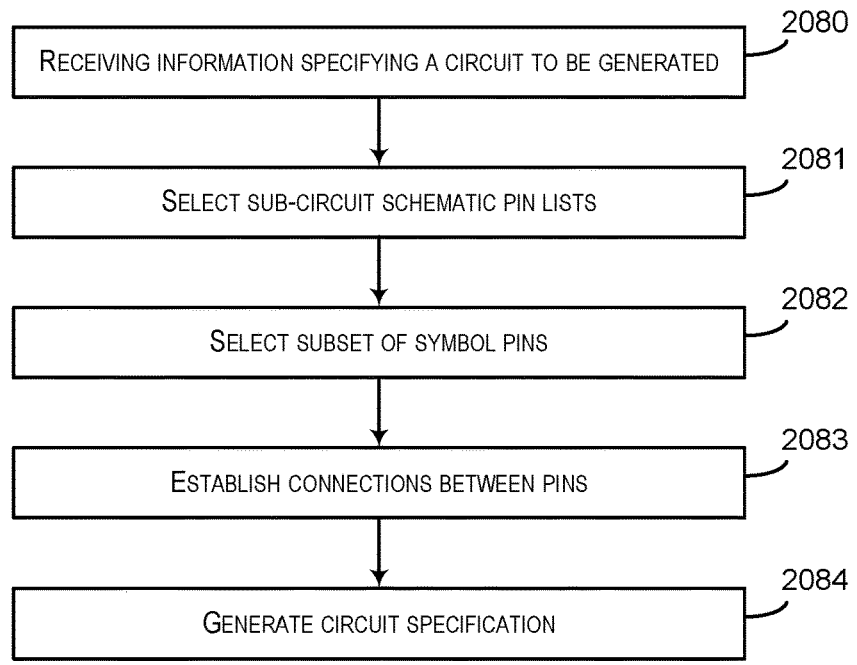
FIG. 20B illustrates an example method of generating a circuit specification according to an embodiment.

FIG. 20B illustrates an example method of generating a circuit specification according to an embodiment. In this example, information specifying a circuit to be generated is received at 2080. The information may be in the form of parameters, which may be parsed, for example, or in another format, which may be decoded, for example. In some embodiments, the system may retrieve parameter limits and compare one or more parameters to the parameter limits to verify the parameters. Sub-circuit schematic pin lists may be selected at 2081 (e.g., based on parameters specifying the circuit to be generated). For example, one or more pin lists corresponding to one or more sub-circuit schematics may be selected based on the information. Each pin list may include sub-circuit schematic pins for a corresponding sub-circuit schematic. In one embodiment, the pin lists and symbol may correspond to a particular functional circuit component. As mentioned above, different functional circuit components may have different associated sub-circuit schematic pin lists and predefined pins for functional circuit component symbols. At 2082, a subset of the predefined pins for the symbol is selected based on said information. Different manifestations of each functional circuit component may have different pins (e.g., a comparator with shutdown may have a shutdown pin, but a comparator without shutdown may not). However, in some embodiments, symbols produced for the same functional circuit component may have certain pins in common across all parameters (e.g., a voltage to current converter may always have a voltage input pin, VIN, a supply voltage pin, VDD, ground, GND, and a current pin, which may be source or sink based on the parameters). At 2083, connections between the sub-circuit schematic pins and the subset of the plurality of predefined pins for the symbol may be established. At 2084, the circuit specification is generated. The circuit specification includes sub-circuit schematic pins from the one or more pin lists corresponding to one or more sub-circuit schematics, the subset of predefined pins for the symbol, and connections between the sub-circuit schematic pins and the subset of predefined pins for the at least one symbol. The circuit specification may be processed in an EDA tool to produce a circuit schematic, for example. Additionally, a layout script may be retrieved based on the information, where the layout script is configured to automatically position layout instances for a circuit generated from the circuit specification to produce a layout. The system may also retrieve process parameters. The layout script and process parameters may be sent to the EDA tool for generating a layout, for example.

Figure 20C:
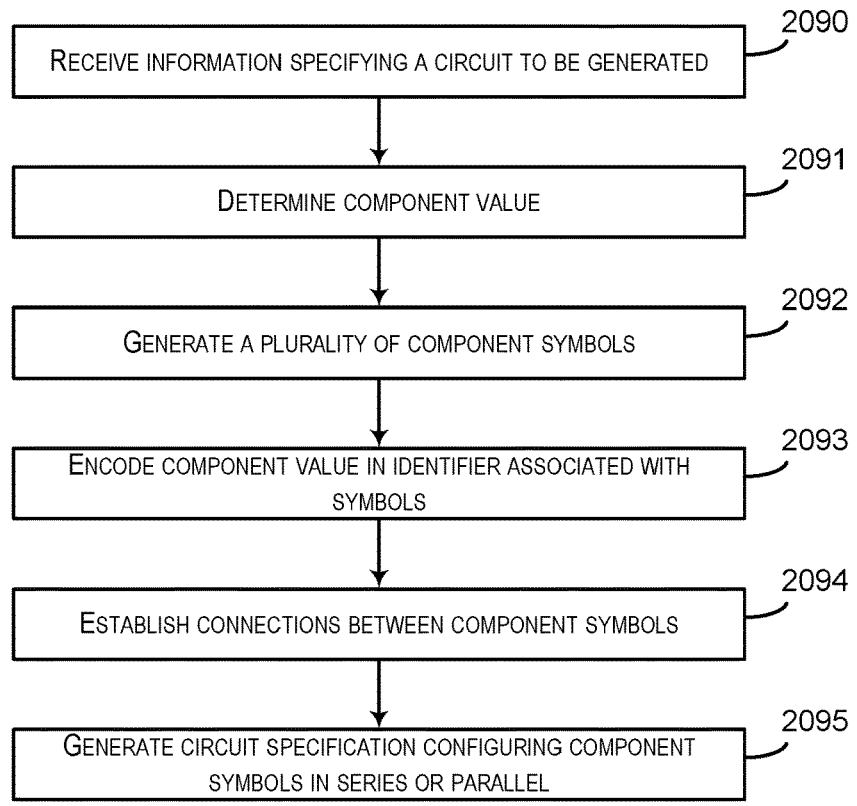
FIG. 20C illustrates a method of generating a circuit specification according to another embodiment.

FIG. 20C illustrates a method of generating a circuit specification according to another embodiment. Features and advantages of the present disclosure include generating symbols for calculated component values, which is described in more detail below. The following is one example technique for generating a circuit specification for calculated component values. At 2090, the system receives information specifying an electronic circuit to be generated. At 2091, the system determines a component value for at least one component of the electronic circuit based on the information. In various embodiments, the component may a resistor (e.g., the component value comprises a resistance), a capacitor (e.g., the component value comprises a capacitance), or a transistor (e.g., a FET, where the component value comprises a gate width, a number of fingers, etc. . . . ). At 2092, the system generates a plurality of component symbols. The number of symbols may be part of the calculation of the component value as described below for resistors, capacitors, and transistors. At 2093, the system encodes the component value in an identifier associated with each of the component symbols. For example, the identifier may be a symbol name, for example, and the component value may be encoded in the symbol name. At 2094, the system establishes connections between the component symbols. At 2095, the system generates a circuit specification to configure the component symbols in series or in parallel, or both. The circuit specification may be sent to an EDA tool and used to generate a circuit schematic.

It is to be understood that a circuit specification may include multiple symbols for multiple functional circuit components. Each symbol may include symbols for calculated component values. Functional circuit components may also be configured in hierarchies, where a symbol for a first functional circuit component is encapsulated by a symbol for a second functional circuit component and sub-circuit schematics for the first functional circuit component are coupled to pins of the second functional circuit component symbol, for example. Commonly used functional circuit components (e.g., buffers, current mirrors, etc. . . . ) thus may be used as building blocks for other functional circuit components, for example.

Calculated Values

The present disclosure further relates to automatically generating electrical components such as resistors, capacitors, or transistors.

In various embodiments, it may be advantageous to automatically generate circuits where resistor, capacitor, or transistor values may vary (e.g., continuously). For example, one circuit may require a resistor, capacitor, or transistor having a particular value, and another instance of the circuit may require a resistor, capacitor, or transistor having another value. Accordingly, techniques for automatically generating resistors, capacitors, or transistors that may vary across a range of values are disclosed herein.

Figure 21A:
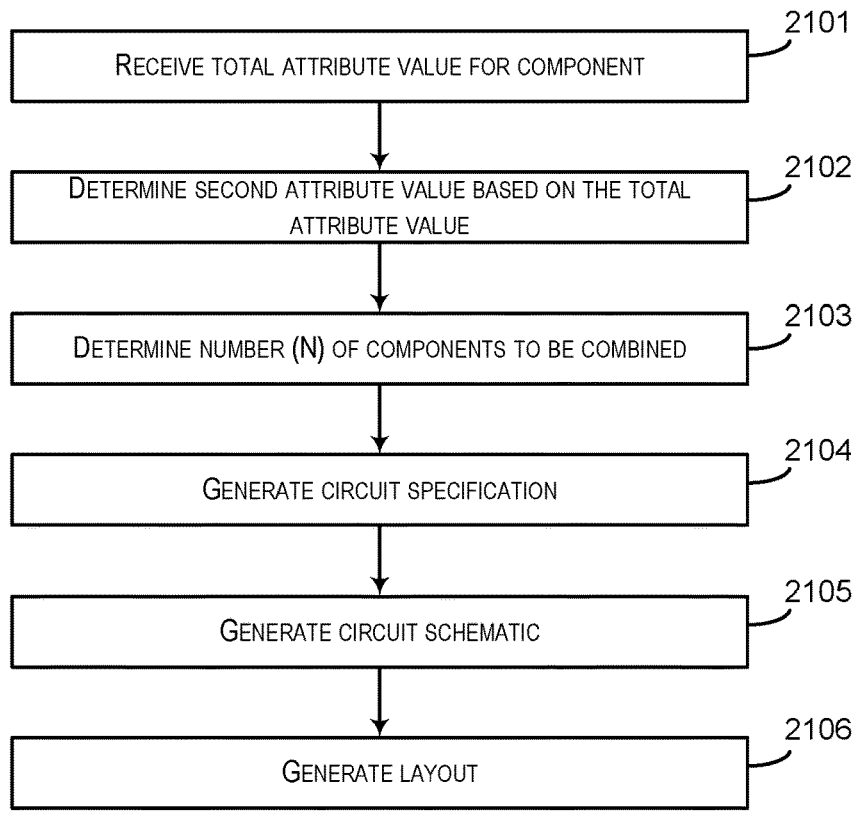
FIG. 21A illustrates a method of generating circuit components across a range of values according to one embodiment.

FIG. 21A illustrates a method of generating circuit components across a range of values according to one embodiment. Features and advantages of the present disclosure may include generating components across a range of values by configuring multiple such components (e.g., unit components) to form a combined component. For example, a total attribute value for a component to be generated may be received by the system at 2101. The total attribute value may be a total resistance, total capacitance, or total gate width of a resistor, capacitor, or transistor to be generated, respectively, for example. The total attribute value may be received from a variety of sources. In some embodiments, the total attribute value is received as a parameter (e.g., specified by a user). In other embodiments, the total attribute value is determined by the system based on other parameters (e.g., parameters for a circuit model or an on resistance). The total attribute value may be used to determine a second attribute value at 2102, which is used to determine a number (N) of components to be combined to form the component to be generated (at 2103) such that the combined components have the total attribute value. As illustrated in examples below for various different component types (e.g., resistors, capacitors, and transistors), unit components (e.g., resistor segments, unit capacitors, or transistors have unit gate lengths) may be combined to form a combined component having the total attribute value (e.g., total resistance, total capacitance, or total gate width). In one embodiment, at least one layout parameter is received by the system, and the second attribute value for the component be generated is determined based on the at least one layout parameter. In various embodiments, the layout parameter may specify a length along a dimension of the component to be generated. For example, for a resistor, the layout parameter may specify a resistor layout segment length. For a capacitor, the layout parameter may specify a maximum length along a first dimension of a unit capacitor (e.g., a maximum width). For a transistor, the layout parameter may specify a unit gate width. Advantageously, by incorporating one or more layout parameters specifying physical attributes of a layout, both a circuit and a layout may be generated automatically as further illustrated in examples below.

At 2104 a circuit specification is generated. As mentioned above, a circuit specification may specify components of a schematic to be generated and connections between the components. For example, if the system determines that a number (N) of components having the second attribute value may be combined to form a component with the total attribute value, the circuit specification may specify N such components (e.g., N resistors: R1, . . . , RN, N capacitors: C1, . . . , CN, or N transistors: M1, . . . , MN). The circuit specification may also specify the connections such the N components combine to form the total attribute value of the combined component (e.g., resistors connected in series and/or parallel, capacitors connected in series and/or parallel, or transistor connected in parallel).

At 2105, a transistor level schematic is generated comprising a plurality of components configured with the second attribute value. For example, in one embodiment, the circuit specification may be received by an EDA software tool (e.g., as a Verilog input). The EDA tool may read the circuit specification and generate an empty symbol for each component specified in the circuit specification. In one example embodiment, a script may be used to insert a component into each symbol and configure the component with the second attribute value. Terminals of the component are then connected automatically to terminals of the symbol. The symbols may be connected together based on the circuit specification. Accordingly, the plurality of components form a combined component having the total attribute value. At 2106, a layout is generated. The layout may include N layout instances corresponding to the component configured to produce the total attribute value. In various example described below, each component may be converted to a layout instance (e.g., a resistor layout component, capacitor layout component, or transistor layout component). The layout instances may be automatically placed using a predefined script associated with a particular circuit being generated, for example.

Figure 21B:
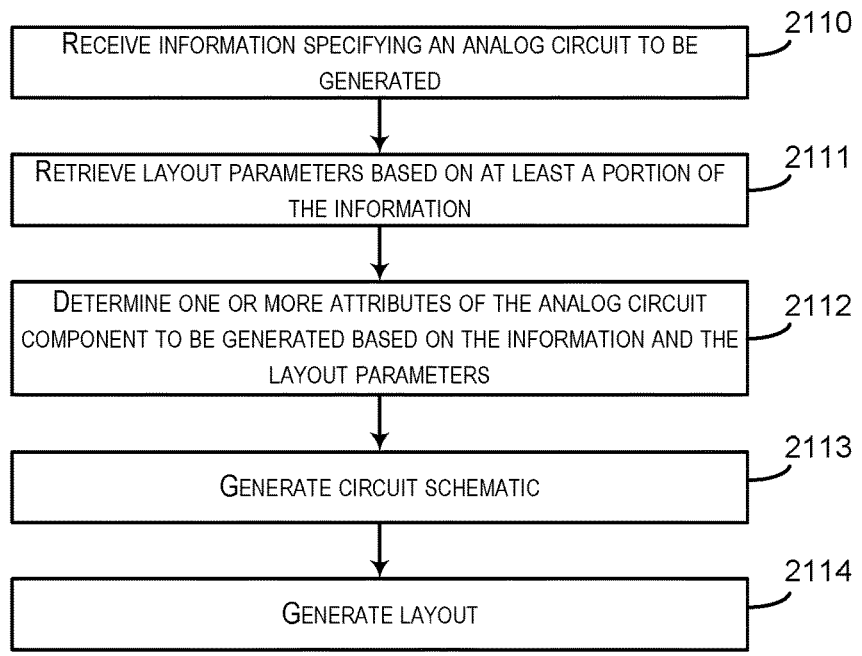
FIG. 21B illustrates a method of generating circuit components across a range of values according to another embodiment.

FIG. 21B illustrates a method of generating circuit components across a range of values according to another embodiment. As mentioned above, features and advantages of the present disclosure include incorporating layout parameters into a design flow as the circuit is being generated. Typically, layout is performed after a circuit is designed. Embodiments of the present disclosure may incorporate layout parameters as part of the circuit generation process to allow a circuit schematic and layout to be generated automatically. For example, at 2110, information specifying an analog circuit to be generated is received by the system. At 2111, layout parameters are retrieved based on at least a portion of the information. For example, different manifestations of a particular analog circuit (e.g., a comparator, current source, oscillator, powerFET, bias current, etc. . . . ) may have resistors, capacitors, and transistors that vary in sized based on parameters of the circuit being generated. If the circuit includes a resistor, layout parameters for a resistor may be retrieved. If the circuit includes a capacitor, layout parameters for the capacitor may be retrieved. If the circuit includes a transistor, layout parameters for the transistor may be retrieved. The layout parameters may be predefined based on the particular circuit being generated, and the layout parameters are used with associated circuits. Accordingly, parameters used to generate the layout (e.g., predefined lengths along various dimensions) may be included in the circuit generation process to automate the circuit and layout generation process, for example. At 2112, one or more attributes of an analog circuit component are determined based on the information specifying the analog circuit to be generated and the layout parameters. At 2113, a transistor level schematic of the analog circuit is generated comprising one or more of the analog circuit components, and the one or more analog circuit components are configured with the attributes. At 2114, a layout is generated from the transistor level schematic. The layout may include a plurality of layout instances corresponding to the one or more analog circuit components, where each layout instances is automatically positioned in the layout by layout placement instructions. As illustrated in various examples below, the layout instances may be positioned based on the attributes of the analog circuit component (e.g., a resistor may be placed based on the resistor segment length, a capacitor may be placed based on a capacitor width, and a transistor may be placed based on a gate width). In some embodiments, layout parameters used to determine attributes of components are also used to position layout instances derived from circuit schematics for the components.

Figure 21C:
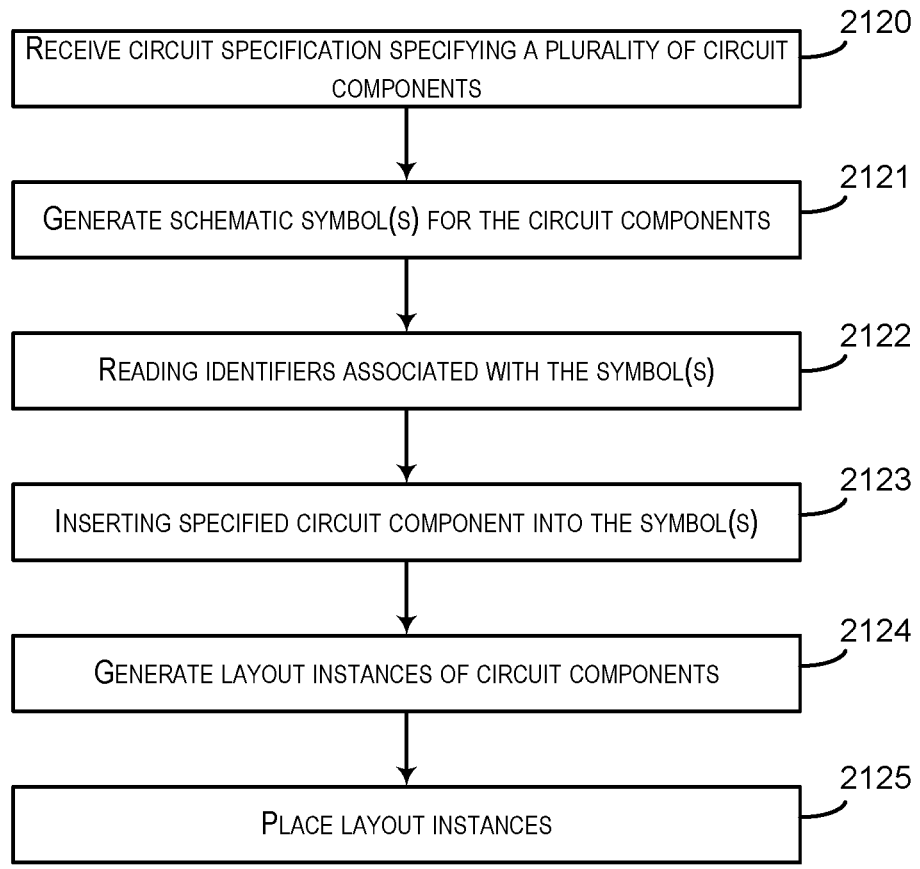
FIG. 21C illustrates a method of generating circuit components across a range of values according to yet another embodiment.

FIG. 21C illustrates a method of generating circuit components across a range of values according to yet another embodiment. As mentioned above, features and advantages of some embodiments of the present disclosure may include techniques for specifying and generating analog circuits in EDA tools that may not support automated analog circuit generation. For example, existing EDA tools do not have a mechanism for receiving an analog circuit specification that may be used to automatically generate a transistor level analog circuit schematic and automatically generate an efficient analog circuit layout for complex parameterized analog functional circuit components. Embodiments of the disclosure may generate a circuit specification and use predefined scripts to convert the circuit specification into a transistor level schematic and/or a layout, for example.

Automated Generation of Resistors

Features and advantages of the present disclosure include automated generation of resistors. In some embodiments, resistors may be generated across a range of values for use in transistor level circuits and/or layouts, for example.

Figure 22:
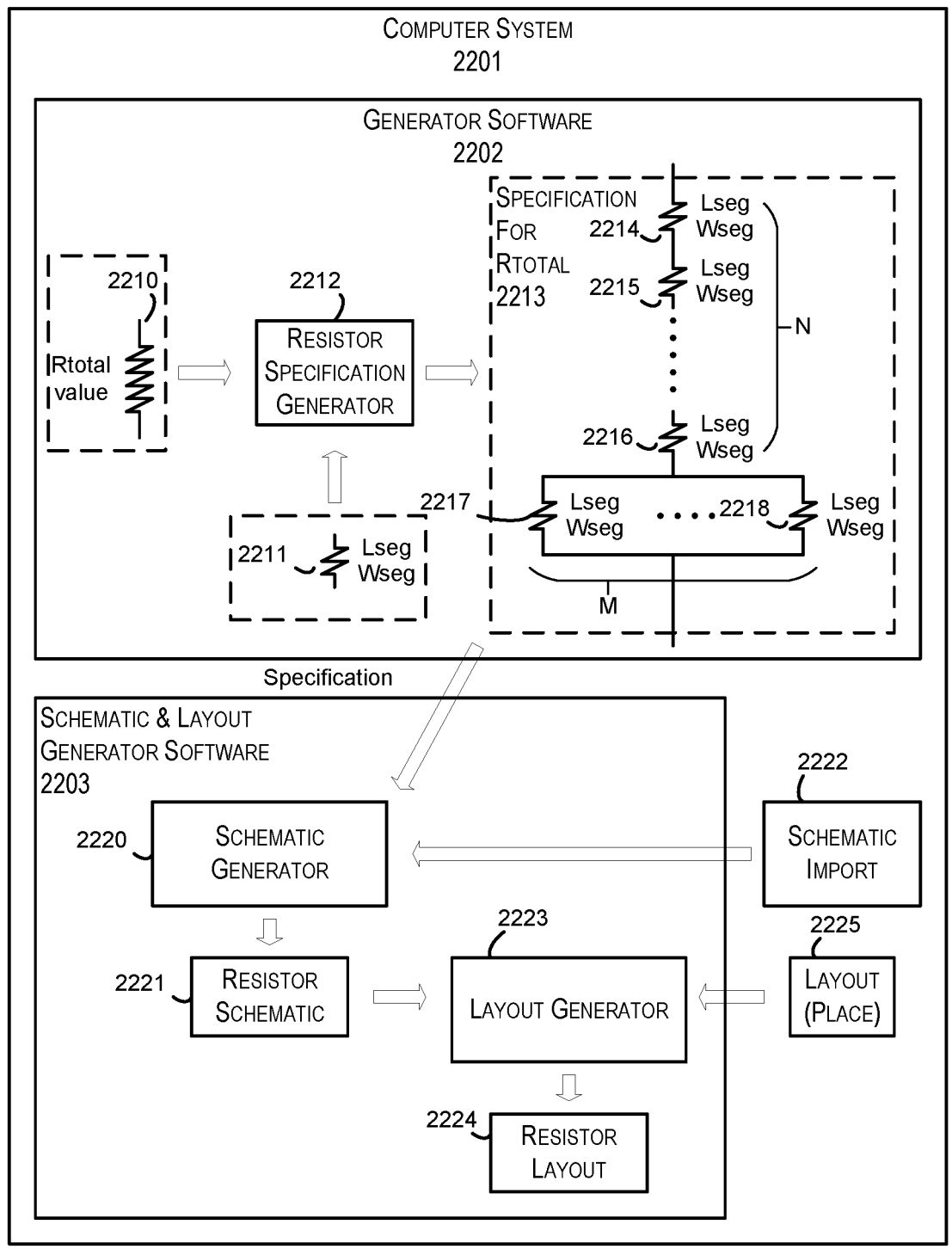
FIG. 22 illustrates a computer-implemented system for automatically generating resistors according to an embodiment.

FIG. 22 illustrates a computer-implemented system for automatically generating resistors according to an embodiment. A computer-implemented system as described herein may include software executing on a computer system 2201, which may include one or more computers (e.g., server computers). In this example, computer system 2201 executes generator software 2202 and schematic & layout generator software 2203. It is to be understood that other example implementations may partition the software differently (e.g., as a single software system performing the functionality described herein or as more software components).

Features and advantages of the present disclosure may automatically generate schematics, layouts, or both, that include resistors based on specified or calculated resistor values received by the system, for example. For instance, a system according to the present disclosure may receive a resistor value and automatically generate a schematic for the resistor, a layout for the resistor, or both. In this example, a resistor value Rtotal, corresponding to a resistor 2210 is to be generated by a resistor specification generator component 2212 of generator software 2202. In various embodiments, one or more resistor values may be specified by a user, for example, and received by generator software 2202 as an input parameter. In other embodiments, one or more resistor values may be calculated based on other parameters received by generator 2202, for example, as described in more detail below.

Features and advantages of some embodiments include converting a resistor value into segments, such as series resistor segments to be generated, parallel resistor segments to be generated, or one or more combinations of both series and parallel resistors. For example, resistor specification generator 2212 may determine a first number N of resistor segments to be configured in series and/or a second number M of resistor segments to be configured in parallel to approximately produce the resistor value Rtotal. In one embodiment, the resistance of the resistor segments may be the same, for example. Once the numbers N and/or M are determined, a circuit specification 2213 (e.g., for Rtotal) may be generated to produce a schematic, a layout, or both, for example. In this example, resistor specification generator 2212 may generate a circuit specification 2213 to configure the first number N of resistor segments in series and/or the second number M of resistor segments in parallel. While one series combination of resistors and one parallel combination of resistors for producing Rtotal is illustrated here, it is to be understood that only series combinations, only parallel combinations, or multiple series and/or parallel combinations could be used to obtain Rtotal within an allowable tolerance, for example.

In various embodiments, the circuit specification 2213 may specify a configuration for a plurality of components. In this example, the components correspond to resistor segments (e.g., as illustrated by resistor segments 2214-2218), and circuit specification 2213 may specify connections between the resistor segments. For instance, the circuit specification may be a netlist, such as a verilog.v file as mentioned above, where connections between components are based on common specified nodes in the netlist.

Example embodiments of the present disclosure may further receive one or more predefined physical dimensions for a resistor segment 2211. Predefined physical dimensions may be set to advantageously optimize layout of the different resistor values, for example, as further illustrated below. For example, the predefined physical dimension may be a predefined length of a resistor segment, Lseg, and/or the predefined width of a resistor segment, Wseg. Predefined physical dimensions may be associated with the resistor value to be generated so that particular resistors to be generated may access the predefined physical dimensions. Accordingly, when a particular resistor value, Rtotal, for a particular circuit or project is received, associated parameters such as Lseg and/or Wseg for the particular resistor may be obtained from a known storage location (e.g., from a memory, file, or database), for example.

In some embodiments, different resistors to be generated for different resistor values may have different corresponding predefined physical dimensions (e.g., lengths and/or widths). Thus, one resistor to be generated with a first value, Rtotal1, may have a first corresponding predefined length and/or predefined width, and another resistor to be generated with a second value, Rtotal2, may have a second corresponding predefined length and/or predefined width. As mentioned above and illustrated further by way of example below, incorporating one or more predefined physical dimensions may be used to improve the layout of a resistor across a range of resistor values, for example.

In some embodiments, resistor specification generator 2212 may further receive a sheet resistivity, for example.

The following equations illustrate an example calculation of N and M based on a predefined length, predefined width, and sheet resistivity:

N=Number of Resistor Segments 2211 in Series may be based on the whole number portion of Rtotal divided by the resistance of the segment, Rsegment (e.g., Div(Rtotal/Rsegment, i.e., the quotient of Rtotal divided by Rsegment).
M=Number of Resistor Segments 2211 in Parallel is based on the remainder portion of Rtotal divided by the resistance of the segment, Rsegment (e.g., Mod(Rtotal/Rsegment). In one example embodiment, a maximum number of parallel resistors may be specified and the value for M is the number of parallel resistors that result in Rtotal to within an allowable tolerance, for example.
Lseg stored in BIO; Wseg calculated from process design rules
The resistance of a segment can be written as:

$$Rseg=\rho(Lseg/Wseg),$$

where $\rho$ (rho) is the sheet resistivity (known as "sheet rho", which is a parameter specified by the particular semiconductor manufacturing process used), Lseg is the segment length, and Wseg is the segment width (e.g., which may be set based on current density and the particular resistor type used). Accordingly, the resistance of a resistor segment may be based on length, width, and/or rho.

The total resistor value, Rtotal, may be determined as follows:

$$Rtotal=(Rseg*M)-\text{Series only},$$

$$Rtotal=(Rseg/N)-\text{Parallel only},$$

$$Rtotal=(Rseg*M)+(Rseg/N)-\text{Combination of Series and Parallel}.$$

Features and advantages of certain embodiments may further include generating a schematic for the resistor value based on the circuit specification. In this example, circuit specification 2213 is sent from generator software system 2202 to a schematic and layout generator software system 2203. Schematic and layout generator software system 2203 may be an electronic design automation (EDA) software system as mentioned above, for example. Software system 2203 may include a schematic generator component 2220 to generate a resistor schematic 2221 from the circuit specification 2213. Schematic generator component 2220 may receive a netlist, for example, and convert the netlist to schematic symbols and connections between the schematic symbols, for example. However, some schematic generators may not be able to set the attributes of components, such as resistors, to particular specified values based on a netlist. Accordingly, in one example embodiment, a schematic import component 2222 may analyze the circuit specification 2213 or the generated schematic 2221, for example, and set attributes of components, such as the resistors, in the generated schematic.

In one example embodiment, the circuit specification 2213 may specify components corresponding to resistor segments, and the schematic generator 2220 may generate schematic symbols without resistor segments for such components (e.g., if the component name in a netlist does not exist in software system 2203's library, the generated symbol may be empty). Thus, initially, the generated schematic includes a plurality of empty symbols, where pins of the symbols are coupled together as specified in the received netlist. Schematic import component 2222 may identify empty components and execute an algorithm for inserting resistor segments into the symbols. For example, schematic import component 2222 may automatically insert a resistor segment in each of the empty schematic symbols and connect terminals of the inserted resistor segment with the pins of the schematic symbol, for example.

In some embodiments, schematic import component 2222 may include code for setting the attributes of the resistors. For example, attributes for a resistor may include physical dimensions of the resistor, such as length and width. Attributes may also include a resistor type (e.g., polysilicon, doped polysilicon, or metal). Attributes of one or more resistors may be passed between software components in various ways. In one embodiment, the specification may include information for setting the attributes. For example, attributes may be encoded in an identifier for a component in the circuit specification 2213 (e.g., encoded in name(s) of resistor(s) in the netlist). Accordingly, when a symbol for the component in the netlist is used to create a symbol, the symbol may include the identifier. The identifier may be read by schematic import component 2222, for example, and used to place a resistor inside the empty symbol. In other embodiments, attributes may be stored in a predefined location and accessed by schematic import component 2222, for example. More detailed example techniques for passing attributes for resistors are presented below for illustrative purposes.

Accordingly, schematic generator 2220 may output a resistor schematic 2221. Resistor schematic 2221 may include a plurality of symbols having pins. Each symbol may have a resistor segment embedded inside. As mentioned above, the symbols are coupled together in one or more series and/or parallel configurations. The combined symbols, each with an internal resistor segment, for example, form the desired total resistor value, Rtotal. In some example embodiments, the resistor segments used to form one total resistor value, Rtotal, may each have the same length, width, and resistor type.

Features and advantages of some embodiments of the present disclosure may include automatically generating a resistor layout from a resistor schematic. For example, resistor schematic 2221 may be converted into a resistor layout 2224 by layout generator 2223. Layout generator 2223 may convert the resistor segments inside the symbols of the schematic into polygons, for example, where each polygon has the dimensions specified for a corresponding resistor segment. In one embodiment, layout placement instructions 2225 may be executed to position each polygon in the layout as described in more detail below. Accordingly, the resistor segments forming the total resistor value, Rtotal, in the schematic may be automatically converted to resistor layout 2224.

Figure 23:
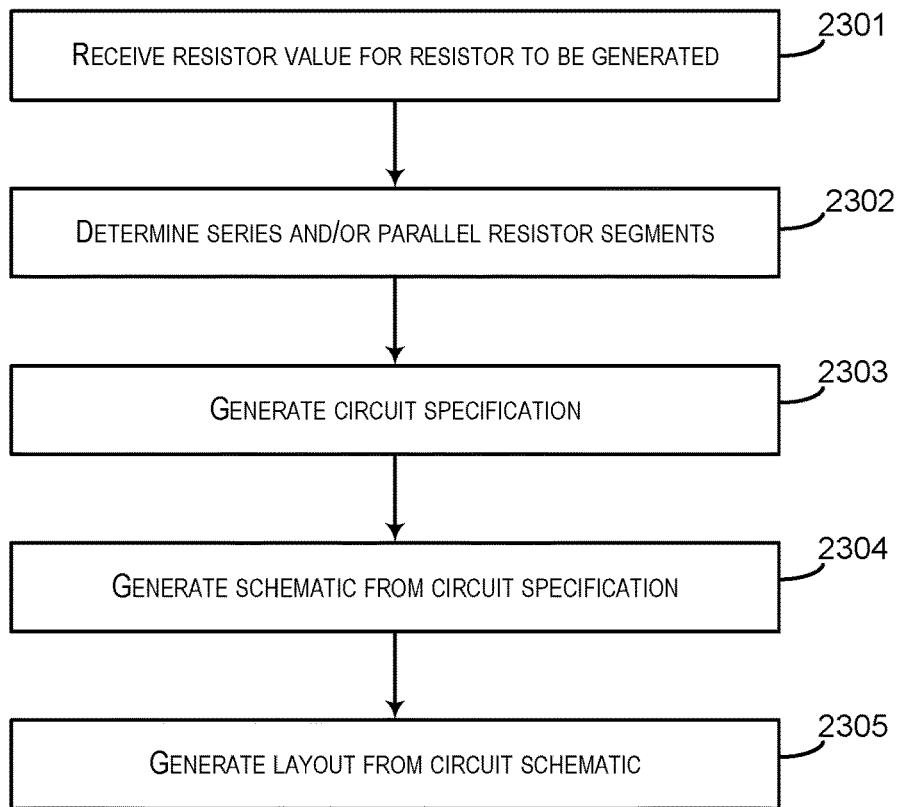
FIG. 23 illustrates a method of generating a resistor according to an embodiment.

FIG. 23 illustrates a method of generating a resistor according to an embodiment. In one embodiment, the present disclosure includes software, which when executed performs a method as follows. At 2301, a resistor value to be generated may be received. At 2302, the software may determine at least one number of series configured resistor segments or at least one number of parallel configured resistor segments (or both) to produce the received resistor value. At 2303, a circuit specification is generated. The circuit specification may specify a configuration of a plurality of components corresponding to resistor segments, for example. At 2304, a schematic is generated based on the circuit specification. The schematic may include a plurality of symbols corresponding to the plurality of components. Each symbol may comprise a resistor segment, for example. The symbols are coupled together automatically based on the circuit specification to produce the resistor value. At 2305, a layout may be generated from the circuit schematic. The layout may comprise polygons corresponding to each resistor segment. In one embodiment, the polygons are placed automatically by layout placement instructions.

Figure 24:
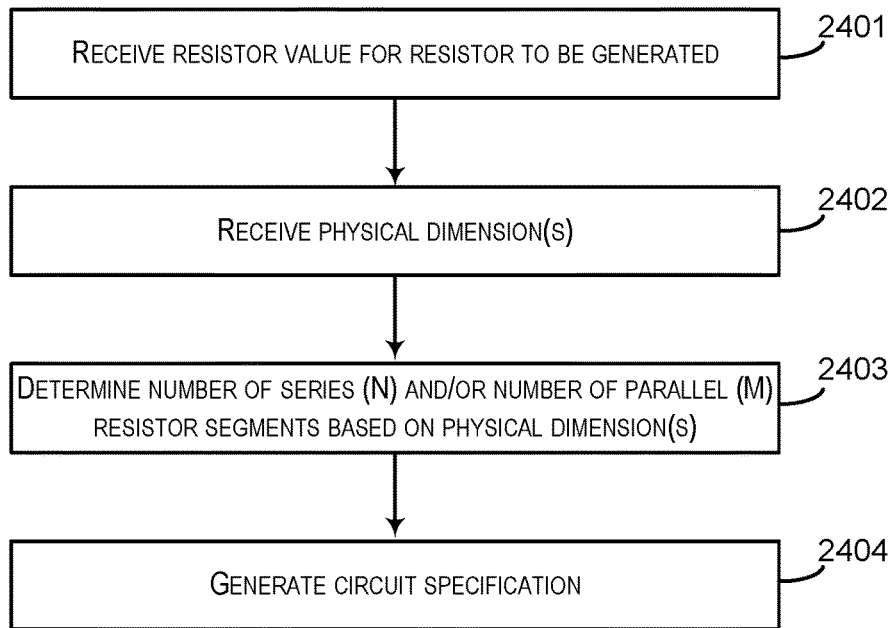
FIG. 24 illustrates a method of generating a resistor according to another embodiment.

FIG. 24 illustrates a method of generating a resistor according to another embodiment. In this example, a resistor value for a resistor to be generated is received at 2401, and at least one physical dimension corresponding to at least one resistor segment is received 2402. Physical dimensions, such as length and/or width, may be advantageously used in this example to optimize the layout of a plurality of resistor segments that produce the resistor value, for example. At 2403, the software may determine at least one number of series configured resistor segments and/or at least one number of parallel configured resistor segments to produce the received resistor value. At 2404, a circuit specification is generated.

Figure 25A:
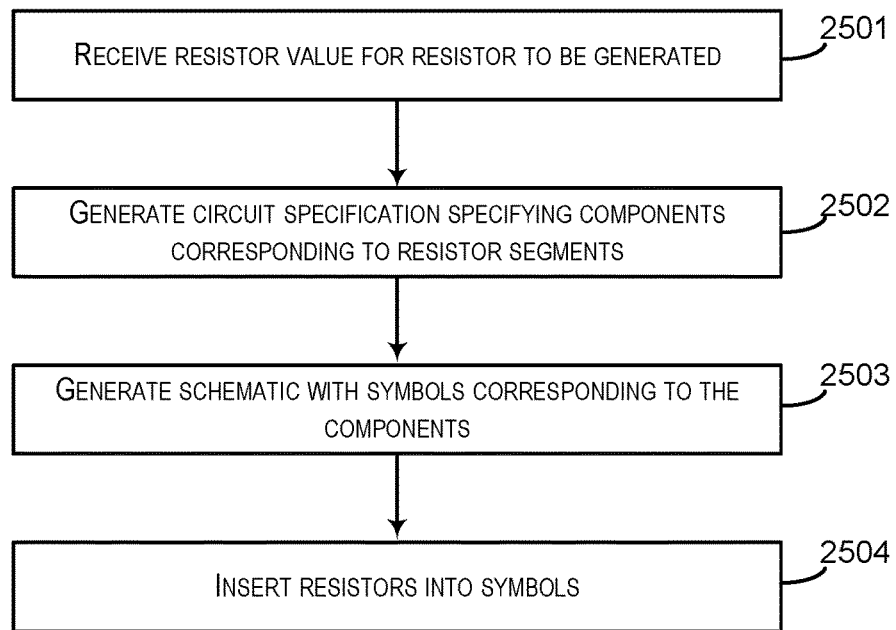
FIG. 25A illustrates a method of generating a resistor according to yet another embodiment.

FIG. 25A illustrates a method of generating a resistor according to yet another embodiment. In this example, a resistor value for a resistor to be generated is received at 2501, and a circuit specification is generated at 2502. Here, the circuit specification specifies components corresponding to resistor segments. A schematic is generated at 2503 based on the circuit specification. The schematic includes symbols corresponding to the components in the circuit specification. In this example, the symbols may not have resistors segments (e.g., the symbols are empty). Accordingly, at 2504, resistor segments are inserted into the symbols. The symbols, and inserted resistor segments, may be coupled together in the schematic to produce the resistor value.

Figure 25B:
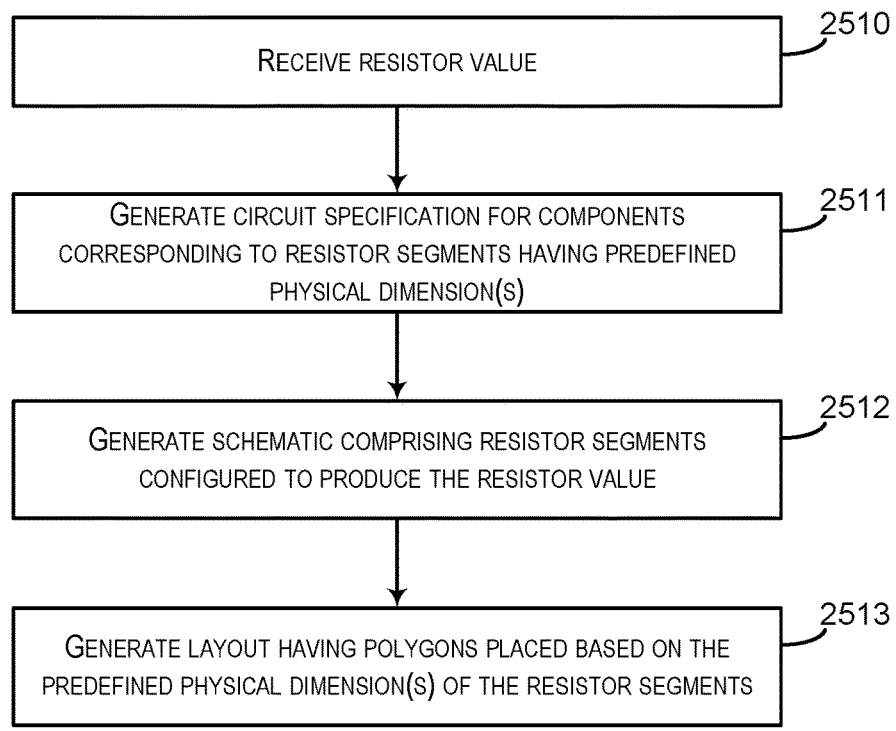
FIG. 25B illustrates a method of generating a resistor according to yet another embodiment.

FIG. 25B illustrates a method of generating a resistor according to yet another embodiment. In this example, a resistor value for a resistor to be generated is received at 2510, and a circuit specification is generated at 2511. Here, the circuit specification specifies components corresponding to resistor segments having one or more predefined physical dimensions. At 2512, a schematic is generated based on the circuit specification. The schematic comprises resistor segments configured to produce the resistor value (e.g., in series and in parallel). At 2513, a layout is generated. The layout comprises polygons corresponding to the resistor segments. The polygons may be advantageously placed based on the one or more predefined physical dimensions of the resistor segments to produce the layout of the resistor, for example.

Figure 25C:
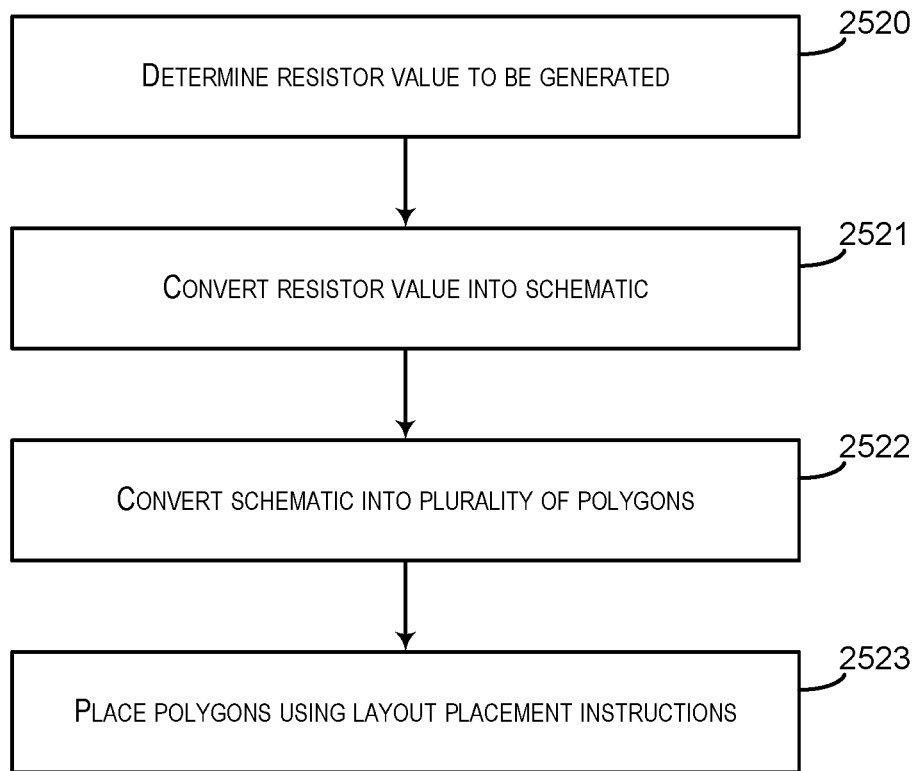
FIG. 25C illustrates a method of generating a resistor according to yet another embodiment.

FIG. 25C illustrates another embodiment. Various embodiments of the present disclosure may apply some or all of the techniques described herein in various combinations and at various different levels to automate resistor generation. In this example, a resistor value is determined at 2520 (e.g., by a circuit generation engine). The resistor value may be converted into a schematic at 2521 (e.g., into an EDA transistor level circuit schematic in Cadence®). The schematic, in turn, is converted into polygons at 2522. The polygons for the resistor may be placed automatically by layout placement instructions at 2523. For example, the particular circuit being generated may be associated with a plurality of layout placement instructions that position each of the polygons for the resistor in particular locations in the layout. The layout placement instructions may sequentially place each polygon and connect the terminals of the polygons to produce the desired resistor value, for example.

Example Embodiments for Generating Resistors

Figure 26:
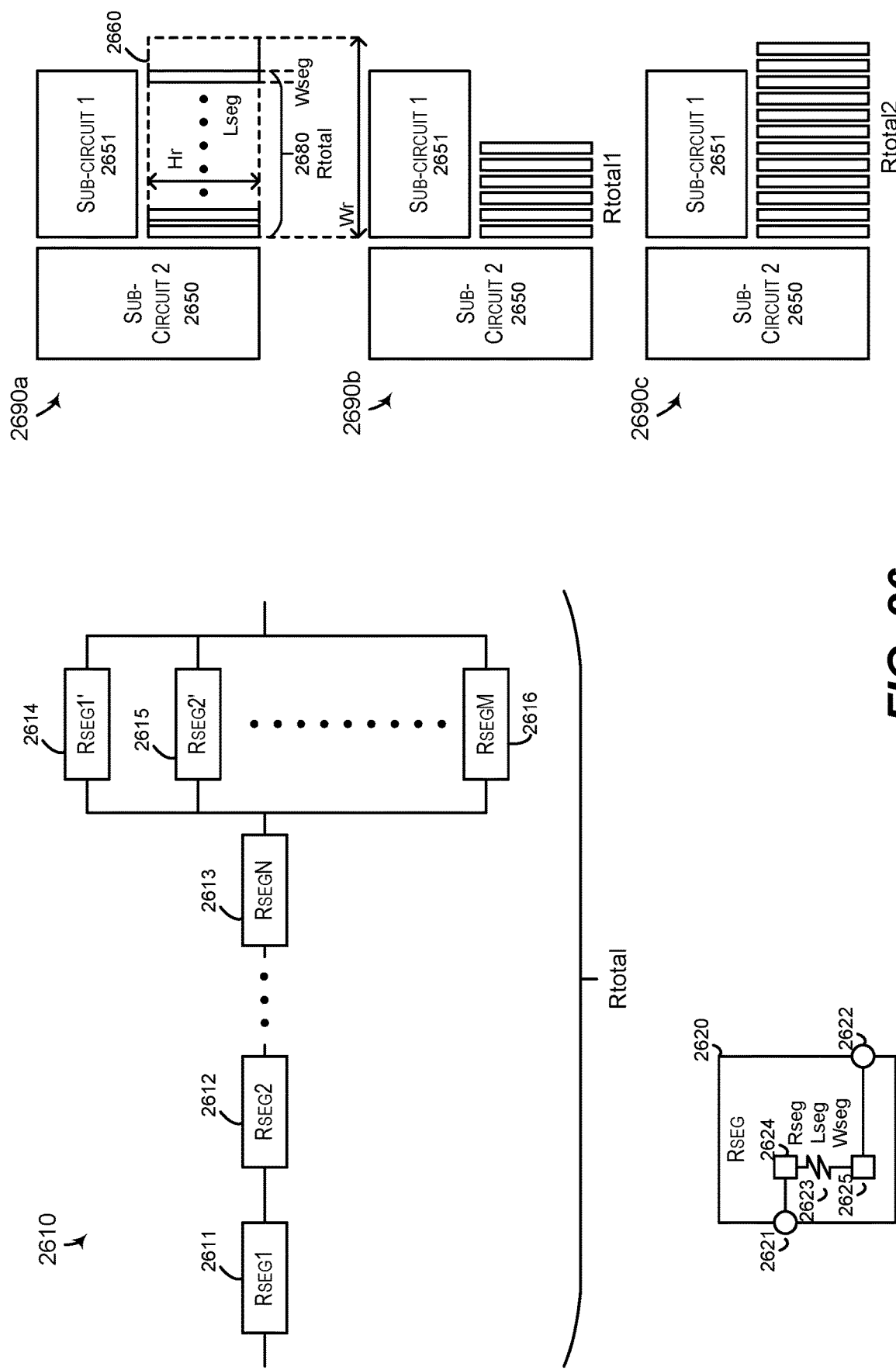
FIG. 26 illustrates an example resistor schematic and layout according to an embodiment.

FIG. 26 illustrates an example resistor schematic and layout according to an embodiment. In this example, a resistor schematic 2610 comprises N symbols 2611-2613 coupled together in series and M symbols 2614-2616 coupled together in parallel. The symbols may be coupled together via pins, for example. The parallel symbols are in series with the series configured symbols as shown. An example symbol 2620 includes symbol pins 2621 and 2622. Symbol 2620 comprises a resistor segment 2623, Rseg, having a first terminal 2624 and a second terminal 2625. As mentioned above, in some embodiments, symbol 2620 may be generated without a resistor segment (e.g., as an empty symbol). Resistor segment, Rseg, may have been inserted in symbol 2620 by software. The software may further connect resistor terminal 2624 to symbol pin 2621 and connect resistor terminal 2625 to symbol pin 2622, for example. In one embodiment, the software may comprise scripts that execute in an electronic design automation (EDA) software system, for example (e.g., Skill scripts in Cadence®), which may detect an empty symbol instance resulting from a schematic generated in response to receiving a netlist, for example, and insert the resistor automatically. The scripts may further set attributes of the inserted resistor using the values generated as described above.

The combined resistance of the resistor segments in the symbols 2611-2616 may produce the total resistor value to be generated, Rtotal. As mentioned above, in some embodiments, the resistor segments may have the same resistor segment values, Rseg, the same predefined length, Lseg, and the same predefined width, Wseg, for example. Using one or more known lengths and/or widths for the resistor segments may advantageously allow efficient automated layout.

Example layouts 2690a-c illustrate how different resistor values may be automatically generated according to various embodiments. Layout 2690a comprises two (2) sub-circuits 2650 and 2651 and a resistor comprising a plurality of resistor layout segments 2680. Resistor layout segments 2680 may correspond to a plurality of polygons, for example, in a layout. Resistor layout segments 2680 may be generated from a resistor schematic, such as schematic 2610, for example. Accordingly, in this example, the resistor segments 2623 in symbols 2611-2616 generate corresponding polygons 2680. In other embodiments it is possible that a single resistor in a schematic may be converted into multiple polygons and automatically placed as described herein, for example. In this example, each of the resistor layout segments 2680 has the same length, Lseg, and width, Wseg. Resistor layout segments 2680 may be laid out in parallel as shown (e.g., side by side along a length or width) and coupled together (e.g., using metal or polySi) in series and/or in parallel (e.g., as illustrated in schematic 2610) so the total resistance is Rtotal.

As illustrated in layouts 2690a-c, a different number of resistor layout segments 2680 may be used to produce different values of Rtotal. Some values of Rtotal may result in fewer resistor layout segments, while other values of Rtotal may result in more resistor layout segments. Layouts 2690b and 2690c illustrate two resistance values for Rtotal. Layout 2690b has fewer resistor layout segments than layout 2690c. However, the value of Rtotal for layout 2690b may be greater than or less than the value of Rtotal for layout 2690c depending on the configuration of parallel and series resistors. Advantageously, the number of resistor layout segments used across different designs for different values of Rtotal may vary by placing the resistor layout segments side-by-side (e.g., along their lengths) and coupling them together according to different numbers of series and/or parallel combinations, as shown. As described in more detail below, layout placement instructions may place the resistor layout segments in parallel along their lengths in an area reserved for the resistor layout segments. In this example, an area 2660 vertically below the layout for sub-circuit 1 2651 and horizontally adjacent to sub-circuit 2650 in the layout is reserved for resistor layout segments 2680. The reserved area 2660 in the layout may comprise a polygon having one dimension (here, a reserved height, Hr) approximately equal to the resistor segment length (e.g., plus an offset) and a second dimension (here, a reserved width, Wr) equal to a multiple of the width (e.g., plus an offset or space between segments) to fit resistor layout segments across a range of total resistor values, Rtotal. In one example embodiment, the reserved width, Wr, is equal to a multiple of the resistor layout segment width plus an offset to fit a minimum number of resistor layout segments and a maximum number of resistor layout segments to produce resistors from a minimum total resistor value, Rtotal_min, to a maximum total resistor value, Rtotal_max, for example.

Figures 27A, 27B:
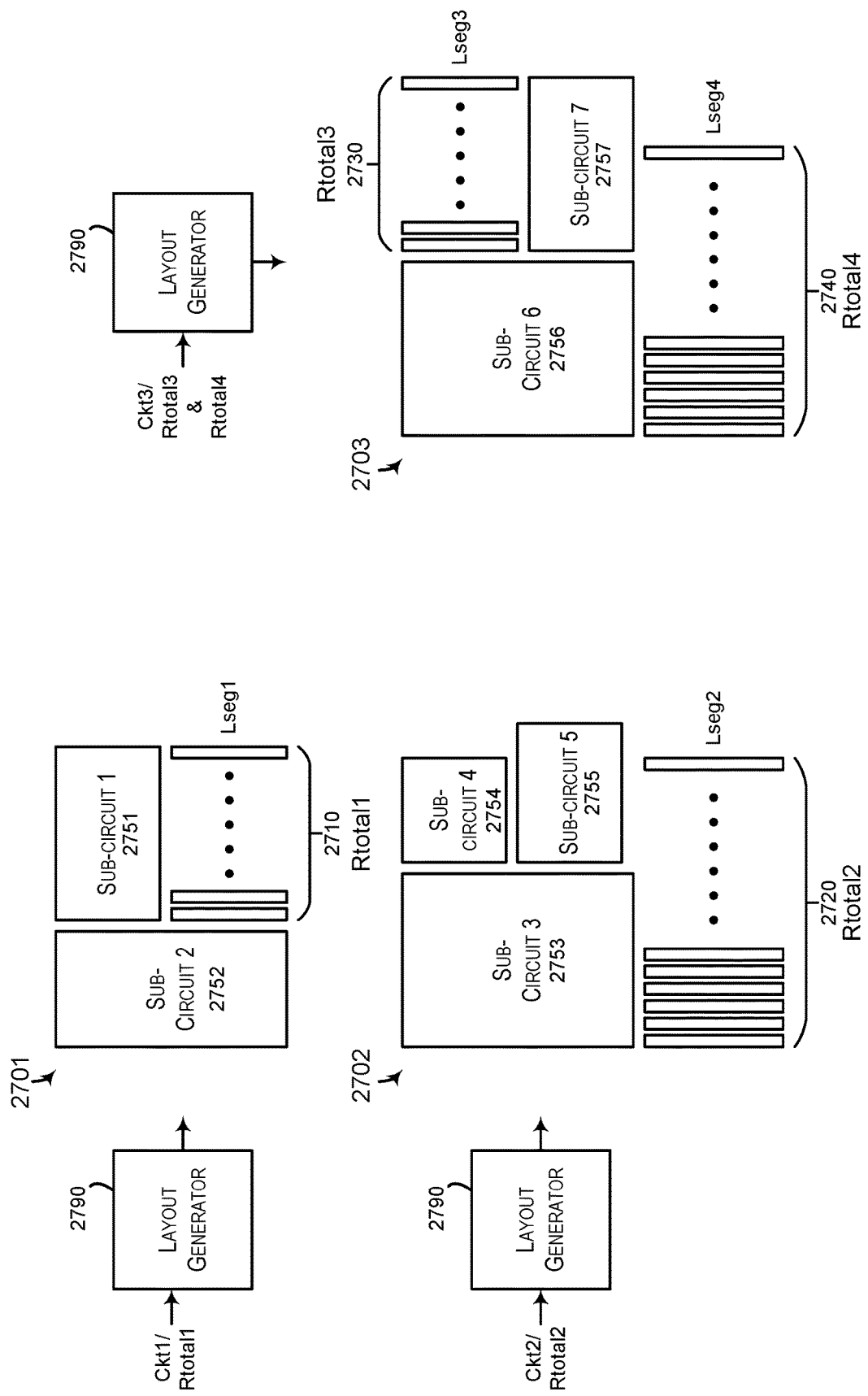
FIG. 27A illustrates example layouts generated for two resistor values used with two different circuits according to an embodiment.
FIG. 27B illustrates two resistor values used with the same circuit according to an embodiment.

FIG. 27A illustrates example layouts generated for two resistor values used with two different circuits according to an embodiment. In this example, a first resistor value, Rtotal1, for use with a first circuit (Ckt1) may be converted to a layout by layout generator software 2790. In one embodiment, the resistor value (e.g., Rtotal1) is a calculated value for one functional circuit component (e.g., a bias current generator) specified using parameters as described above, for example. Rtotal1 may be used to produce a schematic comprising a plurality of resistor segments as described above. The resistor segments may have a first predefined length, Lseg1, as well as other attributes, associated with Rtotal1 and the corresponding circuit (Ckt1) and included in the schematic, for example. The resistor segments in the schematic are converted to resistor layout segments 2710, with each resistor layout segment having the first predefined length, Lseg1, as illustrated in layout 2701. Layout 2701 may further include sub-circuits corresponding to circuitry for the first circuit (e.g., current bias circuitry) that Rtotal1 is used with, for example. Generator 2790 may implement the first circuit as sub-circuit layouts 2751 and 2752, for example.

A second resistor value, Rtotal2, for use with a second circuit (Ckt2) may be converted to a layout by layout generator software 2790. Here, Rtotal2 is a calculated value for another functional circuit component (e.g., an oscillator) specified using parameters as described above, for example. Rtotal2 may be used to produce a schematic comprising a plurality of resistor segments as described above. The resistor segments may have a second predefined length, Lseg2, as well as other attributes, associated with Rtotal2 and the second circuit (Ckt2) and included in the schematic, for example. The resistor segments in the schematic are converted to resistor layout segments 2720, with each resistor layout segment having the second predefined length, Lseg2, as illustrated in layout 2702. Layout 2702 may further include sub-circuits corresponding to circuitry for the second circuit (e.g., oscillator circuitry) that Rtotal2 is used with, for example. Generator 2790 may implement the second circuit as sub-circuit layouts 2753 and 2755, for example.

The examples in FIG. 27A illustrate that resistor values used with different circuits may have different predefined physical dimensions in some embodiments. In various embodiments of each circuit, more or fewer resistor layout segments 2710 and 2720 may be used in conjunction with circuits 2751/2752 and 2753/2754/2755 as Rtotal1 and Rtotal2 change, respectively. However, the segment lengths, Lseg1 and Lseg2, may stay the same. As illustrated by examples below, however, physical dimensions such as length may change based on which other sub-circuits are included in the circuit to optimize layout, for example.

FIG. 27B illustrates two resistor values used with the same circuit according to an embodiment. In this example, two resistor values Rtotal3 and Rtotal4 for two different resistors to be generated are provided to layout generator software 2790, which produces layout 2703, for example. In this example, the first received resistor value, Rtotal3, which corresponds to a first resistor in the circuit, is converted to resistor layout segments 2730 that each have a length, Lseg3. Similarly, the second received resistor value, Rtotal4, which corresponds to a second resistor in the circuit, is converted to resistor layout segments 2740 that each have a length, Lseg4. Generator 2790 may generate a layout for a circuit as sub-circuit layouts 2756 and 2757, for example. It is to be understood that in yet other embodiments, Rtotal3 and Rtotal4 may use the same resistor segment length, Lseg, for example.

Figure 28:
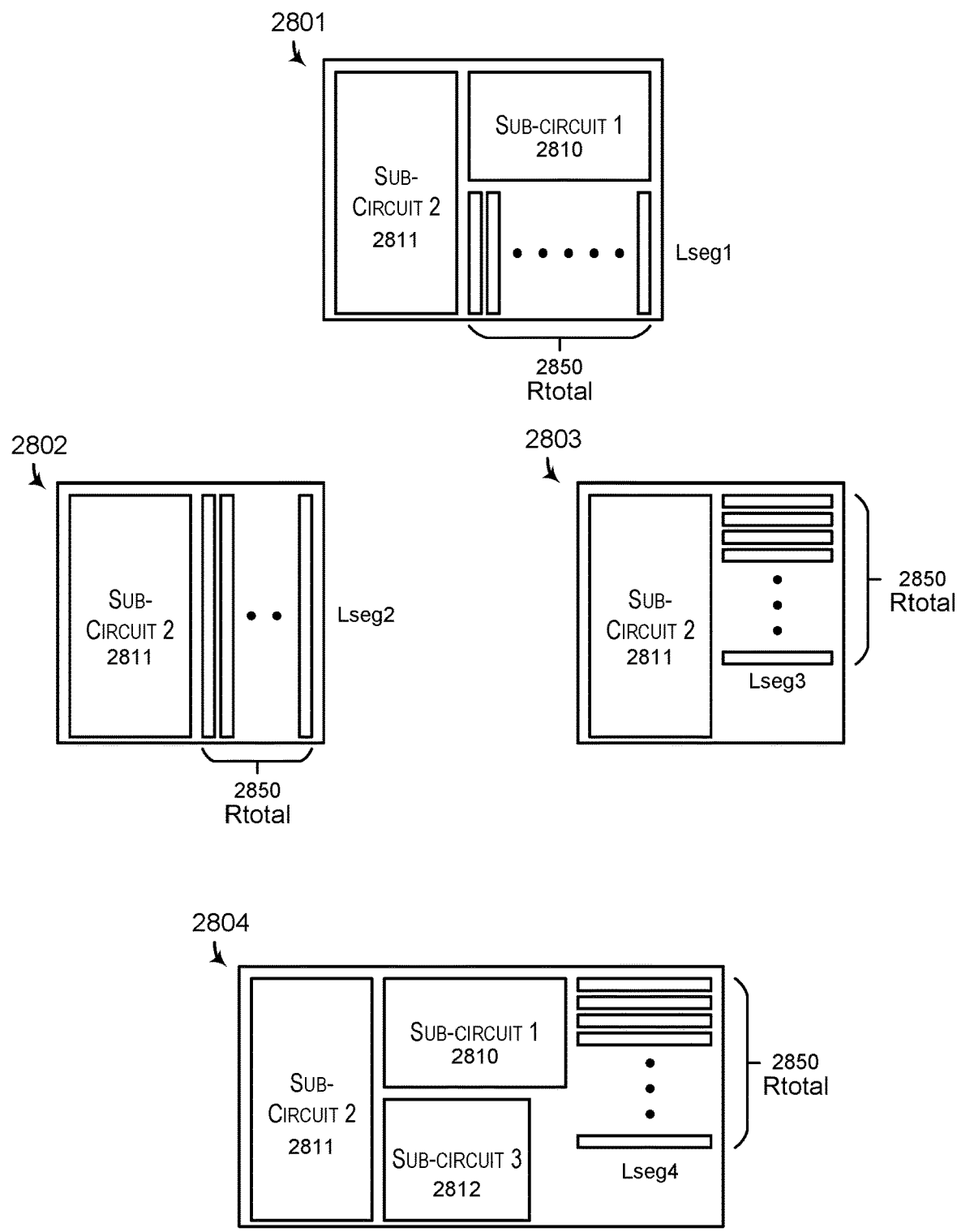
FIG. 28 illustrates example layouts generated for a resistor value for different sub-circuit configurations according to an embodiment.

FIG. 28 illustrates example layouts generated for a resistor value for different sub-circuit configurations according to an embodiment. In some embodiments, different physical dimensions may be used for the same resistor value, Rtotal 2850, depending on the other circuitry used in the layout. For example, as the surrounding circuitry changes (e.g., when different parameter types or values select different sub-circuits), different size resistor layout segments may be used to fit in different open spaces to optimize the resulting layout. In this example, a resistor value of Rtotal may be implemented in resistor layout segments having a length, Lseg1, when the resistor is included in a circuit with sub-circuits 2810 and 2811 as illustrated in layout 2801. However, the resistor value Rtotal may result in resistor layout segments having different lengths or configurations when the resistor is included in a different circuit with sub-circuit 2811 as illustrated in layouts 2802 and 2803, for example. Layout 2802 illustrates one example segment length, Lseg2, that may be used when only sub-circuit 2811 is in the layout, and alternatively, layout 2803 illustrates another example segment length, Lseg3, that may be used when only sub-circuit 2811 is also in the layout. Layout 2804 illustrates that another segment length, Lseg4, may be used when yet another combination of sub-circuits 2810-2812 are in the same layout as the resistor layout segments for Rtotal. As illustrated from layouts 2801-2804, different layouts with different sub-circuits may result in different options for laying out resistor segments. For one combination of sub-circuits, one set of physical dimensions (e.g., Lseg and/or Wseg) may form a more optimal layout (e.g., smaller size or better electrical performance). When the combination of sub-circuits changes, a different set of physical dimensions for the resistor segments may result in a more optimal layout. In one example embodiment, parameters for one or more functional circuit components may be evaluated, and different predefined physical dimensions may be accessed associated with resistor segments based on the parameters so that the layout and/or placement of the resistor layout segments in the layout changes based on the other sub-circuits in the layout, for example.

Figure 29:
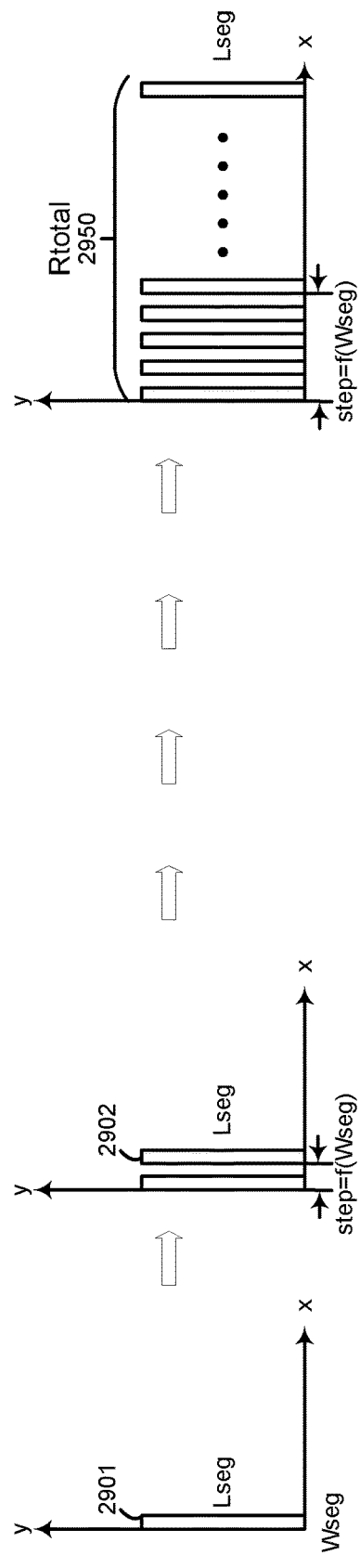
FIG. 29 illustrates an example layout of resistor segments according to an embodiment.

FIG. 29 illustrates an example layout of resistor segments according to an embodiment. Features and advantages of some embodiments of the present disclosure may include automatically generating and placing resistor layout segments (e.g., polygons) to produce resistor values received in a software system, for example. FIG. 29 illustrates automatic placement of a plurality of resistor layout segments 2950 to produce a resistor value, Rtotal. In this example, a first resistor layout segment 2901 having a length, Lseg, and width, Wseg, is placed at the (0,0) coordinates of the x,y-axis. A second resistor layout segment 2902 having the same length and width is placed in parallel along the length of first resistor layout segment 2901 (i.e., side by side) and offset from segment 2901. The resulting placement of segment 2902 is (x=Wseg+offset,y=0), which is a function of Wseg, for example. The sum of Wseg and the offset are referred to as a "step," which may be used to iteratively place each segment. Accordingly, the resistor layout segments 2950 in this example may be placed based on a predefined physical dimension (e.g., here Wseg) according to the following equation: Place (i*step, 0), where "i" is equal to 0 to (1−total number of resistor layout segments) and "step" is a placement offset based on Wseg (e.g., Wseg plus an additional Design Rule Check offset "DRC offset," which may be stored and accessed during runtime), for example. In some embodiments, each resistor layout segment may be associated with a unique identifier (e.g., an instance name), and the unique identifiers may be named so that the resistor layout segments may be sorted. Accordingly, the resistor layout segment identifiers may be sorted (e.g., R1, R2, R3, . . . etc.) and then each resistor layout segment may be sequentially placed (e.g., in a software loop) to produce a layout of Rtotal, for example.

Figure 30:
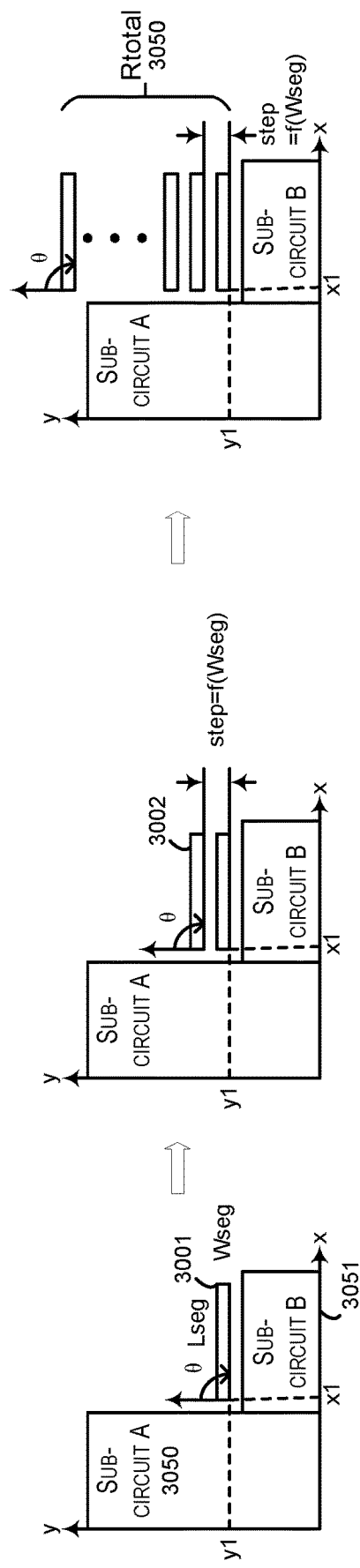
FIG. 30 illustrates another example layout of resistor segments according to an embodiment.

FIG. 30 illustrates another example layout of resistor segments according to an embodiment. This example illustrates that layout placement instructions may be used to place resistor layout segments at predefined locations in a layout, and such placement instructions may further be used to rotate the resistor layout segments, for example. For instance, here, a resistor layout segment 3001 is placed at the x1, y1 starting coordinates of the x,y-axis in a reserved area adjacent to (e.g., to the right of) the layout of sub-circuit A 3050 and adjacent to (e.g., above) the layout of sub-circuit B 3051. Resistor layout segment 3001 is further rotated by an angle θ=90 degrees, for example.

A resistor layout segment 3002 is further placed at the x1,y1 starting coordinates and offset along the y-axis based on the width and other factors (e.g., DRC). As above, segment 3002 is rotated by an angle θ=90 degrees. Similarly, additional resistor layout segments may be placed to produce a total resistor value of Rtotal. Accordingly, the resistor layout segments in FIG. 30 may be placed based on a predefined physical dimension (e.g., here Wseg) according to the following equation: Place (x1, y1, step, r=90°, p=+), where x1 is the x-axis initial placement coordinate, y1 is the y-axis initial placement coordinate, step is the placement offset based on Wseg (e.g., step=f(Wseg)), "r" is the rotation, and "p" is the polarity of the steps (up or down/left or right). Generally, example embodiments of the present disclosure may include a script that executes layout placement instructions that specify placement of a resistor, a starting x-coordinate, a starting y-coordinate, an offset based on at least one physical dimension of the resistor segments, a rotation, and a polarity (e.g., p=+/−). In FIGS. 29 and 30, the resistor layout segments are successively placed at increasing values along the x-axis (FIG. 29) and y-axis (FIG. 30) (e.g., positive polarity steps), but it is to be understood that the polarity of the steps may also be in negative direction, for example.

Figure 31:
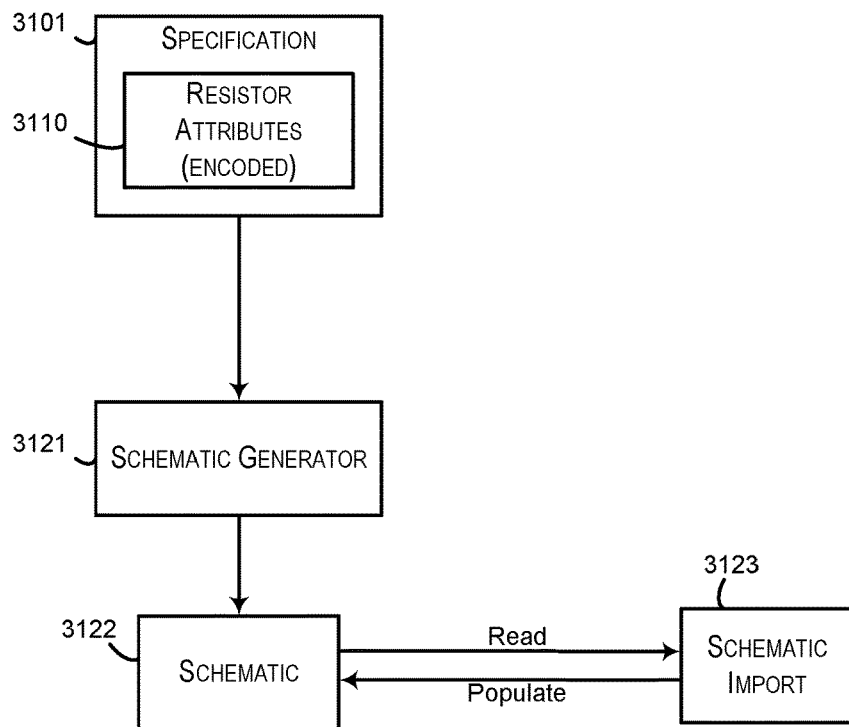
FIG. 31 illustrates passing resistor attributes according to an embodiment.

FIG. 31 illustrates passing resistor attributes according to an embodiment. In certain embodiments, it may be advantageous to receive resistor attributes, such as length, width, or resistor type, for use in a schematic. In one embodiment, a circuit specification is used to generate a schematic that includes a symbol for a resistor. However, some schematic generators in certain electronic design automation (EDA) software systems may not have the ability to receive netlists that specify resistors or values for resistors used in transistor level schematics. Accordingly, in one embodiment, a circuit specification may be generated with one or more identifiers, which may be used set the attributes of the resistor. For example, one or more resistor values may be encoded in the name of the symbol in the circuit specification. For instance, specification 3101 may include an identifier for the component, such as a component name. The component identifier may include one or more encoded resistor attributes 3110. For example, a component in circuit specification 3101 may have the name "rlpp3000rpo5p22u2p5u," where "rlpp3000" corresponds to a particular library, rpo corresponds to a resistor type (e.g., poly, poly++, or metal, here rpo="poly"), "5p22u" corresponds to a 5.22 micrometer resistor length, and "2p5u" corresponds to a 2.5 micrometer width, for example. The following example code illustrates taking a resistor cellname and splitting it up to decode resistor parameters:

```
if(strncmp(Cname "rlpp3000rpo" 10)=0 then
    rexCompile("rlpp3000rpo")
    newstring=rexReplace(Cname "" 1) //comment: string becomes 40p0u2p0u
    rexCompile("p")
    newptstring=rexReplace(newstrnng "." −1) //comment −1 replaces all "p" with "." , string becomes 40.0u2.0u
    paramstring=parseString(newptstring "u") //comment: string split to ("40.0" "2.0")
// comment: length first then width 1=40.0 w=2.0
    length=car(paramstring)
    width=cadr(paramstring)
)
```

The specification may be received by a schematic generator component 3121 to convert the circuit specification into a schematic 3122 (e.g., a transistor level schematic).

The schematic 3122 may initially comprise symbols corresponding to resistor components in the circuit specification. However, the symbols corresponding to the resistor may initially be empty. Schematic import component 3123 may read the name of a symbol in the schematic and (i) insert a resistor value in the schematic, (ii) connect the resistor terminals to the symbol pins, and (iii) populate the attributes of the resistor based on the encoded name. For example, based on the encoding above, schematic import component 3123 may select and insert a polysilicon resistor in a symbol from the "rlpp3000" library having a Lseg=5.22 um and Wseg=2.5 um, for example.

Example series and parallel resistors specified in a circuit specification is as follows:

Example 1: Parallel connected resistor components named "rlpp3000rpo7p5u2p0u":

```
//Type poly :0.20000Kohm Resistor
module rlpp3000rpo7p5u2p0u (RP, RN);
    inout RP;
    inout RN;
endmodule
rlpp3000rpo7p5u2p0u R0(
    .RP (RP),
    .RN (RN),
);
rlpp3000rpo7p5u2p0u R1(
    .RP (RP),
    .RN (RN),
);
rlpp3000rpo7p5u2p0u R2(
    .RP (RP),
    .RN (RN),
);
```

Example 2: Series connected resistor components named "rlpp3000rpo24p8u2p0u":

```
module rlpp3000rpo24p8u2p0u (RP,RN);
    inout RP;
    inout RN;
endmodule
rlpp3000rpo24p8u2p0u R4(
    .RP (RP),
    .RN (RP_1),
);
rlpp3000rpo24p8u2p0u R5(
    .RP (RP_1),
    .RN (RP_2),
);
rlpp3000rpo24p8u2p0u R6(
    .RP {RP_2),
    .RN (RP_3),
);
```

In Example 1 above, the first module statement defines a component named "rlpp3000rpo7p5u2p0u" having two terminals RP and RN (e.g., positive and negative). The following statements create 3 instances of the component named R1, R2, and R3, which have their positive and negative terminals connected together. Similarly, in Example 2 above, the module statement defines a component named "rlpp3000rpo24p8u2p0u," which also has two terminals (positive and negative). The statements that follow create three instances of the component named R0, R1, and R2. However, the terminals of the components R4, R5, and R6 are connected in series (e.g., the negative terminal of R0 is assigned to node RP1 and the positive terminal of R1 is also assigned to RP1, etc. . . . ). Accordingly, receiving instances R1, R2, and R3 in an EDA tool (e.g., as a verilog input) may result in 3 component symbols being created in a transistor level schematic having symbol names rlpp3000rpo7p5u2p0u and instance names R1, R2, and R3. The symbols are coupled together in parallel. Similarly, receiving instances R4, R5, and R6 may result in 3 component symbols being created in a transistor level schematic having symbol names rlpp3000rpo24p8u2p0u and instance names R4, R5, and R6. These symbols are coupled together in series. In each case, the symbol names may be read and resistors with the encoded attributes may be inserted as described above.

Figure 32:
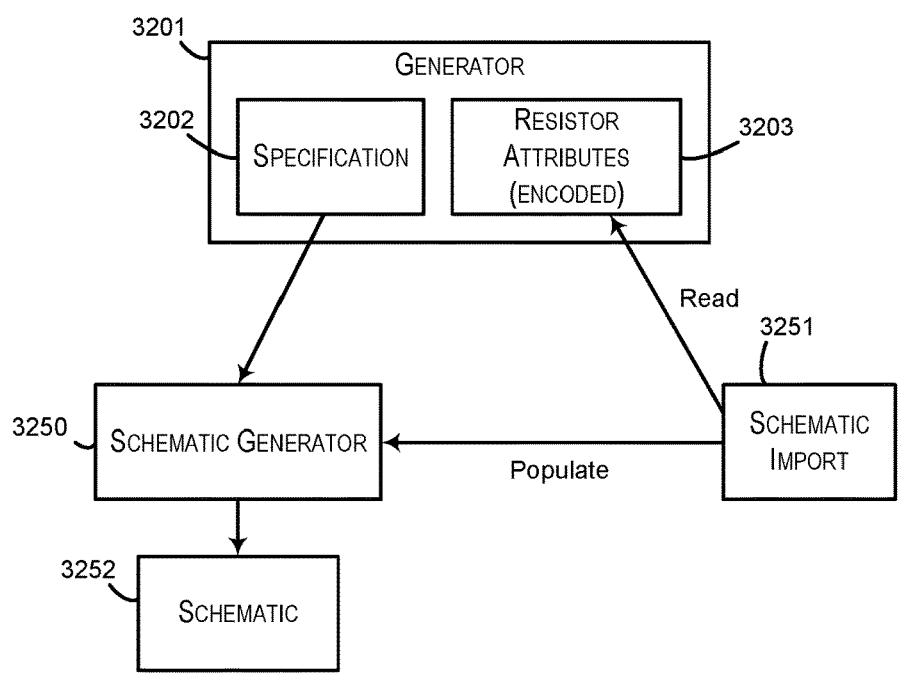
FIG. 32 illustrates passing resistor attributes to a schematic according to another embodiment.

FIG. 32 illustrates passing resistor attributes to a schematic according to another embodiment. In this example, specification 3202 is sent from generator 3201 to schematic generator 3250. Resistor attributes 3203 for one or more resistors to be generated in the schematic may be stored in a location accessible by schematic import component 3251, for example. In one embodiment, the resistor attributes may be encoded as above, or alternatively the resistor attributes may not be encoded (e.g., stored in a table or as text or in any other manner that can be retrieved from an accessible computer memory location). Schematic import component 3251 may read the resistor attributes 3203 and then populate a schematic using the schematic generator 3250 with the resistor attributes, for example. The resulting schematic 3252 may include resistors inserted in symbols as described above with attributes of the resistor in the schematic filled in with attributes 3203, for example.

As mentioned above, in one example embodiment, a generator is a first program that may receive circuit parameters and produce a specification of a circuit to be generated. The circuit specification may be sent to an electronic design automation (EDA) software systems, which may include a schematic generator. A schematic import component may comprise one or more scripts for performing the techniques described in FIGS. 31 and 32, for example.

Figure 33:
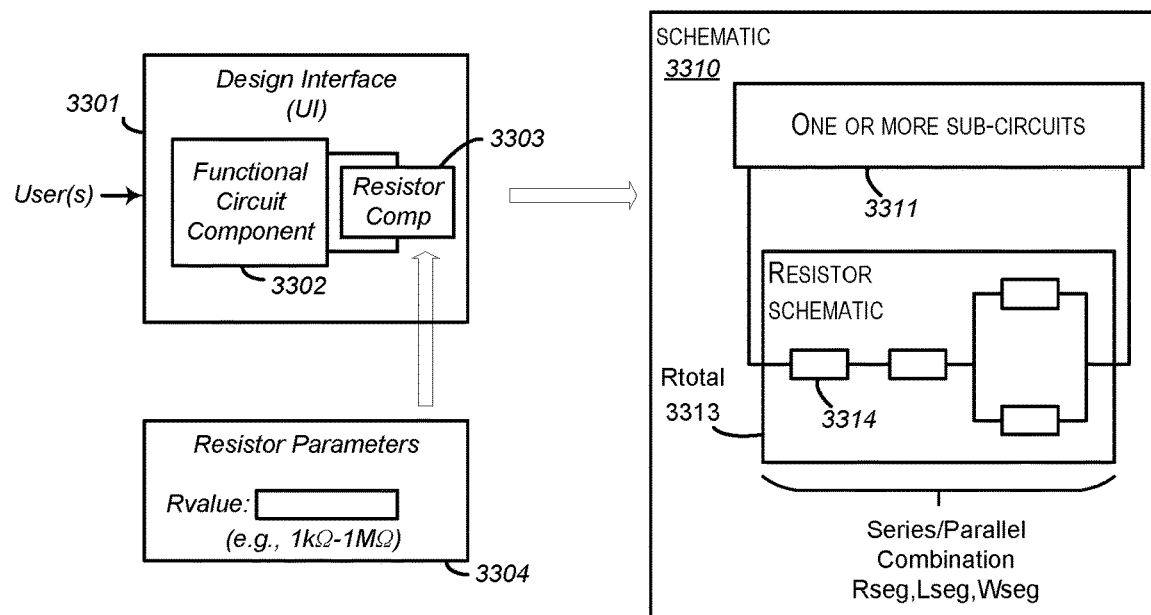
FIG. 33 illustrates generating a resistor specified in a user interface according to an embodiment.

FIG. 33 illustrates generating a resistor specified in a user interface according to an embodiment. In this example, a user may design a circuit in a design user interface (UI) 3301 (aka a front end). The design UI 3301 may perform a high level behavioral simulation of the circuit, for example, rather than a transistor level simulation. In this example, the user has selected a first functional circuit component 3302 (e.g., a comparator or amplifier) and a resistor component 3303. Components 3302 and 3303 are coupled together in the design interface. A user may specify a resistor value for resistor component 3303 in user interface 3304, for example, and input a desired value for Rtotal. In this example, Rtotal may be within a predefined range from a minimum value, Rmin=100 ohms, to a maximum value, Rmax=1 megaohm. Functional circuit component 3302 may also have user selected parameters, for example, as described above. Parameters from the UI 3301 may be used to generate a schematic 3310. The schematic may include one or more sub-circuits 3311 selected based on the parameters received for functional circuit component 3302. Additionally, the schematic may include a resistor schematic for Rtotal 3313. The resistor schematic 3313 may comprise a plurality of symbols, such as symbol 3314, configured in series and/or parallel that each include a resistor segment, for example. The combined schematic may approximately produce the value of Rtotal entered by the user (e.g., to within a degree of error acceptable for the proper function of the circuit).

Figure 34:
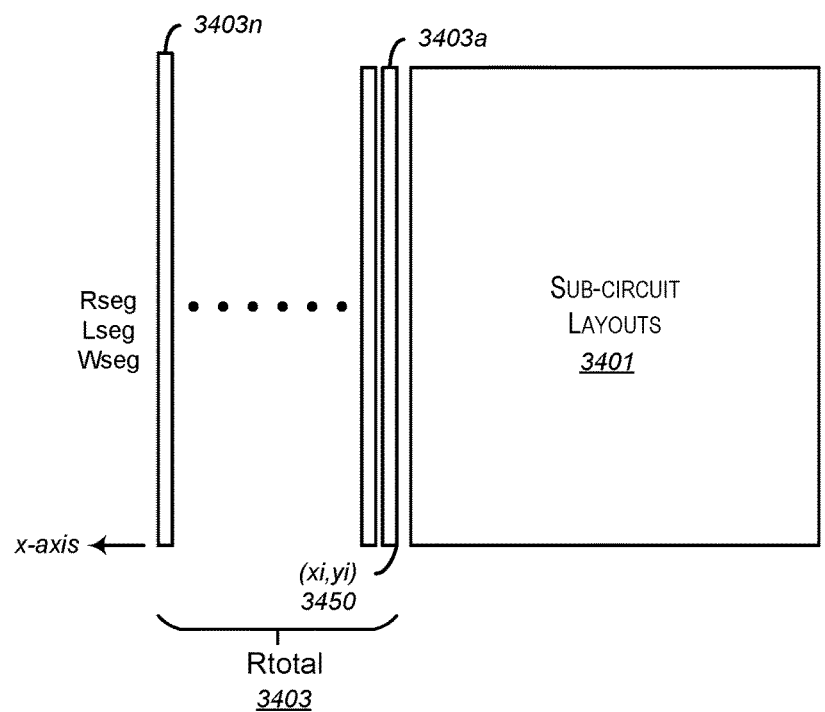
FIG. 34 illustrates an example layout of a resistor specified in a user interface according to an embodiment.

FIG. 34 illustrates an example layout of a resistor specified in a user interface. In this example, parameters for functional circuit component 3302 are used to generate sub-circuit layouts 3401. The user entered value for resistor component 3303 (e.g., Rtotal) is used to generate and place a plurality of resistor layout segments 3403a-n that each have a predefined segment length and segment width to form, in combination, the value of Rtotal 3403, for example. As the user entered value of Rtotal changes, the number of resistor layout segments 3403a used to produce Rtotal changes. In this example, for any resistor value Rtotal, the first resistor layout segment may be placed in the layout starting at a position adjacent to the layout of sub-circuit 3401 (e.g., position (xi,yi) 3450), and then subsequent resistor layout segments may be placed at positions offset along the x-axis (e.g., here, in the negative x-axis direction so that the segments are configured in parallel along their lengths and spaced apart by an offset).

Figure 35:
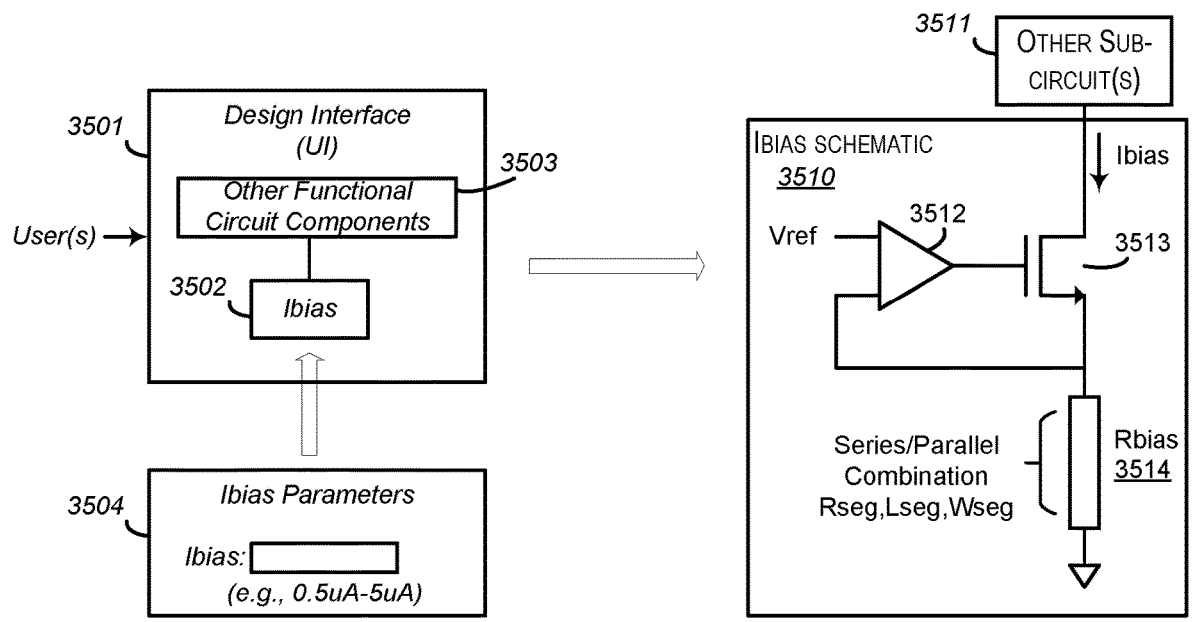
FIG. 35 illustrates generating a resistor based on circuit parameters specified in a user interface according to an embodiment.

FIG. 35 illustrates generating a resistor based on circuit parameters specified in a user interface according to an embodiment. As mentioned above, one or more resistor values, Rtotal, may be received as a result of a calculation by the generator software. In this example, a user may design a circuit in design user interface (UI) 3501 that includes a first functional circuit component 3502 (e.g., here, a bias current generator circuit) and one or more other functional circuit components 3503. Components 3502 and 3503 are coupled together in the design interface (e.g., the bias current is coupled to one or more of the other functional circuit components). The user may specify parameters for each functional circuit component, which are sent to generator software. Parameters for component 3502 may be used to calculate one or more resistor values based on a model. In this example, a user may enter a desired current for the bias current generator circuit 3502 in user interface 3504, for example. The user may input a desired value for Ibias in a text field, for example. In this example, Ibias may be within a predefined range from a minimum value, Ibias min=0.5 uA, to a maximum value, Ibias_max=5 uA. Other functional circuit components 3503 may also have user selected parameters, for example. Parameters from the UI 3501 may be used to generate a schematic, which may include an Ibias schematic 3510 and sub-circuit schematics 3511 for the other functional circuit components 3503. Additionally, the Ibias schematic 3510 may include a resistor schematic 3514 for Rtotal. The resistor schematic 3514 may comprise a plurality of symbols, as illustrated in FIG. 33, configured in series and/or parallel that each include a resistor segment, for example. The combined schematic may produce approximately the value of Rtotal calculated by the generator software (e.g., to within a degree of error acceptable for the proper function of the circuit).

The following example illustrates one resistor calculation by generator software in response to receiving parameters for a bias current generator functional circuit component 3502. If a user enters a value of Ibias between Ibias min and Ibias_max, Rbias may be calculated based on a circuit model as follows:

$$Ibias=Vref/Rbias \rightarrow Rbias=Vref/Ibias.$$

where Vref may be a known parameter entered as part of either functional circuit components 3502 or 3503, calculated based on yet other parameters, or automatically set by the software based on other parameters (e.g., Vdd), for example. Thus, the above equation for Rbias is an example circuit model that may be used to determine Rbias based on values of Ibias received as parameters. Accordingly, a user may enter one value (e.g., of a continuous range of values) as a parameter, and generator software may convert the value into a resistor value, Rtotal, to be implemented as a schematic, layout, or both, for example. As described above, the generator software may access predefined physical dimensions for resistor segments and convert Rbias into a series and/or parallel combination of resistors having a known segment resistance, Rseg, length, Lseg, and Width, Wseg. The schematic for Rbias may be generated as described above and coupled to a schematic for transistor 3513 and amplifier 3512 to produce Ibias schematic 3510, for example. While calculating resistor values is illustrated here in the context of a bias current generator circuit, it is to be understood that resistor values may be calculated for a wide range of other analog or mixed signal circuits by those skilled in the art of analog/mixed signal circuit design.

Figure 36:
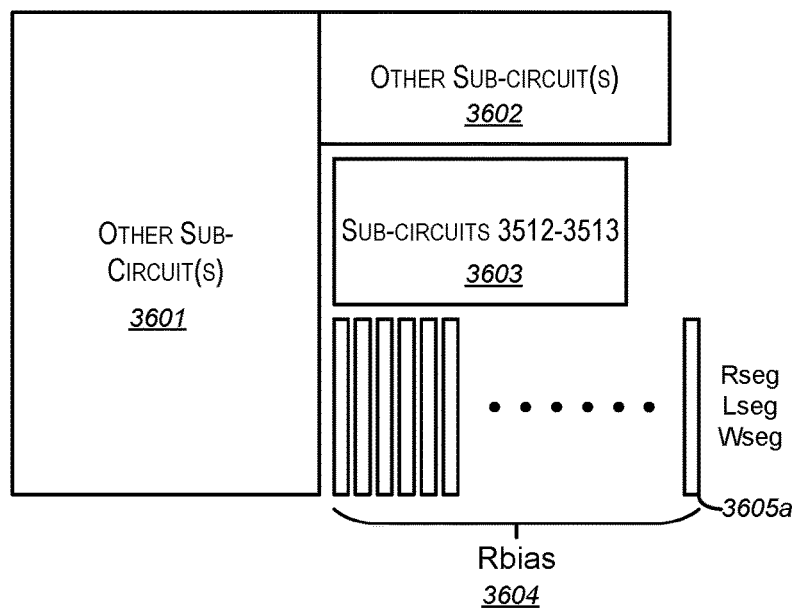
FIG. 36 illustrates an example layout of a resistor determined from parameters according to an embodiment.

FIG. 36 illustrates an example layout of a resistor determined from parameters according to an embodiment. One or more functional circuit components 3503 and corresponding parameters may result in layouts 3601 and 3602. Ibias 3502 and parameters entered for Ibias (e.g., 0.5 uA to 5.0 uA) may result in layout 3603 corresponding to sub-circuits 3512 and 3513, for example, and a layout of resistor layout segments 3604 for the calculated value of Rbias. As described above, each resistor layout segment 3605a may have the same resistor segment value, Rseg, length, Lseg, and Width, Wseg, for example, which combine to form Rbias. Accordingly, as the value entered by a user for a particular circuit parameter changes across a continuous range of values, a calculated resistor value changes, and the resulting number of resistor layout segments to produce the calculated resistor value changes. Such example embodiments may advantageously allow generator software to receive parameters across a continuous range of values (e.g., from a user) and automatically generate analog circuit schematics and/or analog circuit layouts to implement the specified circuit behavior, for example.

Automated Generation of Resistor Dividers

Figure 37A:
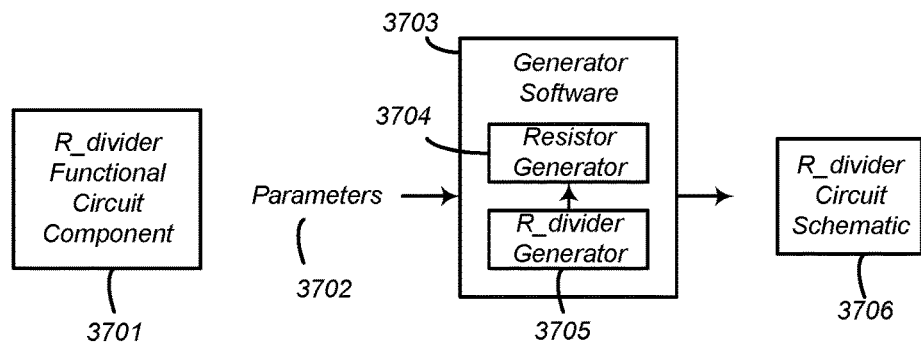
FIGS. 37A-C illustrates generating resistor dividers according to an embodiment.
Figure 37B:
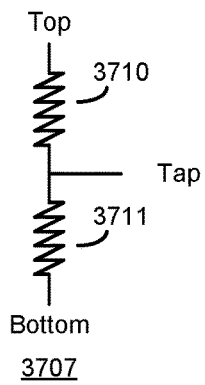
Figure 37B:
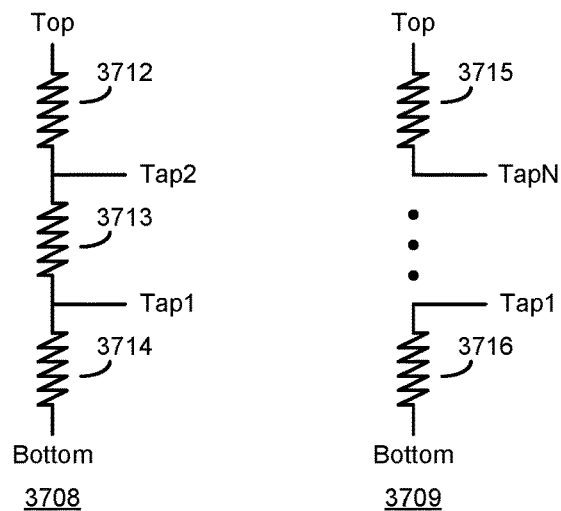
Figure 37C:
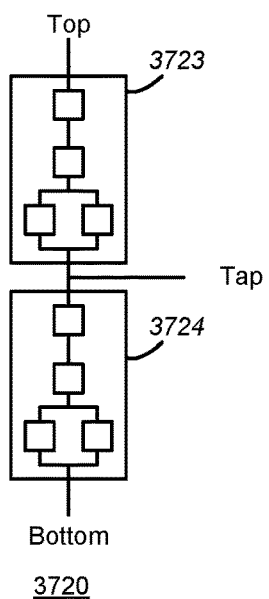
Figure 37C:
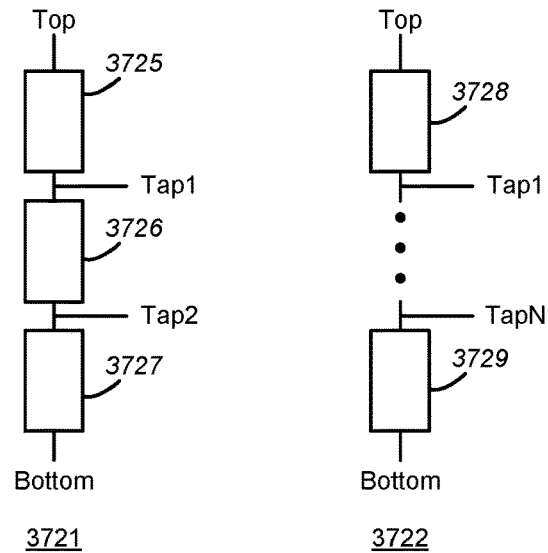

Features and advantages of some embodiments of the present disclosure may include automated generation of resistor dividers. FIGS. 37A-C illustrates generating resistor dividers according to an embodiment. For example, in various embodiments, a resistor divider functional circuit component 3701 may have parameters corresponding to total resistance, number of taps, enable/disable functions, and the like. Parameter values 3702 for a configured resistor divider functional circuit component may be received in generator software 3703, which may comprise resistor divider generator component 3705. The parameters may specify a resistor divider to be generated. Resistor divider generator component 3705 may determine a plurality of resistor values corresponding to resistors between one or more outputs of the resistor divider.

Resistor divider generator 3705 may generate a wide range of resistor dividers 3706 with different numbers of output taps and different total resistances. Example resistor dividers are illustrated in FIG. 37B. Resistor divider 3707 includes two resistors and one output (or tap). Resistor divider 3707 may receive first reference voltage on an input terminal (Top). Top resistor 3710 includes a terminal coupled between the first reference voltage on the input, and the output tap and bottom resistor 3711 includes a terminal coupled between the output tap and a second reference voltage on a bottom terminal (e.g., ground).

Resistor divider 3708 includes three (3) resistors and two output taps. A top resistor 3712 has a terminal coupled to a top input to receive a reference voltage and a second terminal coupled to a first tap (Tap1). An intermediate resistor 3713 includes a first terminal coupled to Tap1 and a second terminal coupled to a second output tap (Tap0). The bottom resistor 3714 has a first terminal coupled to tap0 and a second terminal coupled to a bottom terminal (e.g., to receive a second reference voltage).

Resistor divider 3709 includes N output taps (where N is an integer) and N+1 resistors including top resistor 3715, bottom resistor 3716, and a plurality of intermediate resistors and taps (not shown).

FIG. 37C illustrates that each resistor in a resistor divider generated by resistor divider generator 3705 may be implemented as a plurality of series and/or parallel resistor segments as described above. For example, resistor divider generator 3705 may determine a plurality of resistor segments to approximately produce each of the plurality of resistor values illustrated in FIG. 37B. Each resistor value in FIG. 37B may be implemented as a first number of resistor segments in series and/or a second number of resistor segments in parallel. Resistor divider 3720 shows one example implementation of resistor divider 3707. In this example, top resistor 3710 is implemented as a plurality of resistor segments 3723 configured in series and/or parallel to produce the resistance value for resistor 3710. Similarly, resistor 3711 is implemented as a plurality of resistor segments 3724 configured in series and/or parallel to produce the resistance value for resistor 3711.

In some embodiments, resistor divider generator software component 3705 may determine a total resistance for the resistor divider to be generated (e.g., the sum of the resistor in series) and values of each resistor (e.g., based on output tap voltages specified in the parameters) based on a number of taps and the voltages at each tap. For example, if output taps are specified as percentages of the input voltage (e.g., Tap1=10%, Tap2=50%, Tap3=70%, etc. . . . ), values for resistors in an N-tap resistor divider 3709 may be determined as follows. Starting with the bottom resistor 3716 and moving up the resistor divider across N+1 resistors to the top resistor 3715:

$R\text{bottom}=R1=R\text{total}*\text{tap}1/100$ $R2=R\text{total}*(\text{Tap}2-\text{Tap}1)/100$ $Ri=R\text{total}*(\text{Tap}\_i-\text{Tap}\_i-1)/100$ $R\text{top}=R\_N+1*(1-\text{Tap}N)/100.$ Accordingly, in the above example, resistor values are determined based on a number of taps and a voltage difference across two of an input voltage, a plurality of tap voltages, and a bottom voltage. The voltage difference may be expressed as actual voltages or as a percentage of the input voltage as illustrated in the above example.

In one embodiment, each resistor value in the resistor divider may be sent as an input to resistor generator software component 3704 to determine values for the plurality of resistor segments for each resistor in the divider, for example. Accordingly, each resistor in the resistor divider may be implemented as a plurality of resistor segments.

Once the resistor segments are determined, a circuit specification may be generated. A circuit specification is generated to configure each of the resistor segments to form the resistor values. For resistor divider 3707, for example, the circuit specification may configure a first plurality of resistor segments in series and/or parallel to form a top resistor 3723, and the circuit specification may configure a second plurality of resistor segments in series and/or parallel to form a bottom resistor 3724. As mentioned above, the circuit specification may be netlist, for example. For resistor divider 3708, a circuit specification may configure a first plurality of resistor segments in series and/or parallel to form a top resistor 3725, a second plurality of resistor segments in series and/or parallel to form a bottom resistor 3727, and a third plurality of resistor segments in series and/or parallel to form intermediate resistor 3726 (e.g., where parameters specify two output taps). For resistor divider 3709, a circuit specification may configure a first plurality of resistor segments in series and/or parallel to form a top resistor 3728, a second plurality of resistor segments in series and/or parallel to form a bottom resistor 3729, and one or more additional pluralities of resistor segments in series and/or parallel to form one or more intermediate resistors (e.g., where parameters specify more than two output taps).

The circuit specification for the resistor divider may be used to generate a transistor level schematic comprising resistor segments configured to produce said resistor divider. As mentioned above, a transistor level schematic symbol may be generated for each resistor segment specified in the circuit specification for the resistor divider, and a resistor may be inserted into the symbol and configured with a resistor value and other attributes (e.g., Runit, Lseg, Wseg). The circuit specification may specify how the resistor segments are to be connected together in the schematic to form a resistor divider. Examples of resistor divider schematics are shown in FIG. 37C, where resistor divider 3720 includes one output tap, resistor divider 3721 includes 2 output taps, and resistor divider 3722 includes N output taps.

Figure 38A:
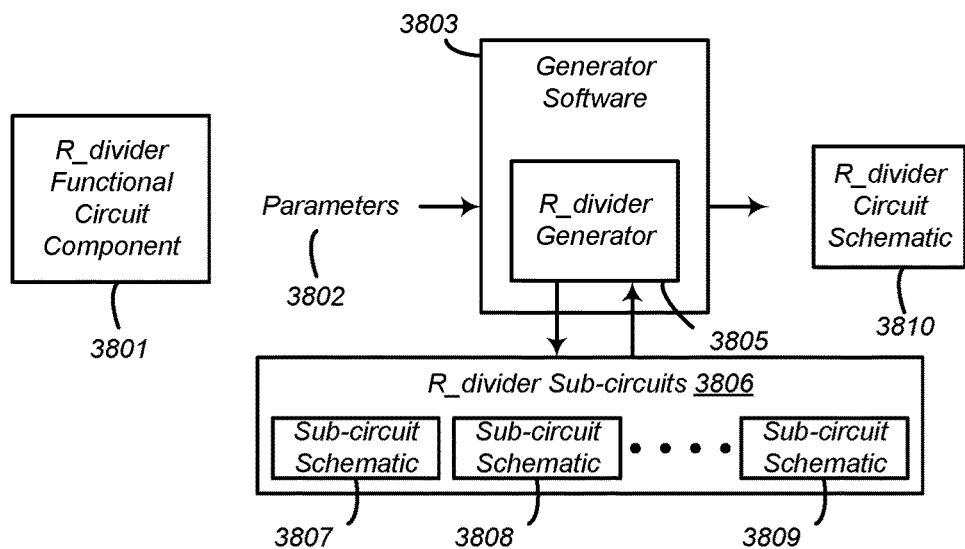
FIG. 38A illustrates a method of generating a resistor divider including sub-circuits according to another embodiment.

FIG. 38A illustrates a method of generating a resistor divider including sub-circuits according to another embodiment. In some embodiments, it may be advantageous to include active circuitry in a resistor divider. For example, parameters 3802 for a resistor divider functional circuit component 3801 may include a parameter to specify an enable function (e.g., enable=yes). Accordingly, resistor divider software component 3805 in generator software 3803 may generate a circuit specification that specifies one or more sub-circuit schematics 3807-3809 as part of the resistor divider to produce a resistor divider schematic 3810. The specified sub-circuit schematics may be configured to receive an input to enable or disable the resistor divider, for example. It is to be understood that other functionality may be incorporated into the resistor divider using other sub-circuit schematics.

Figure 38B:
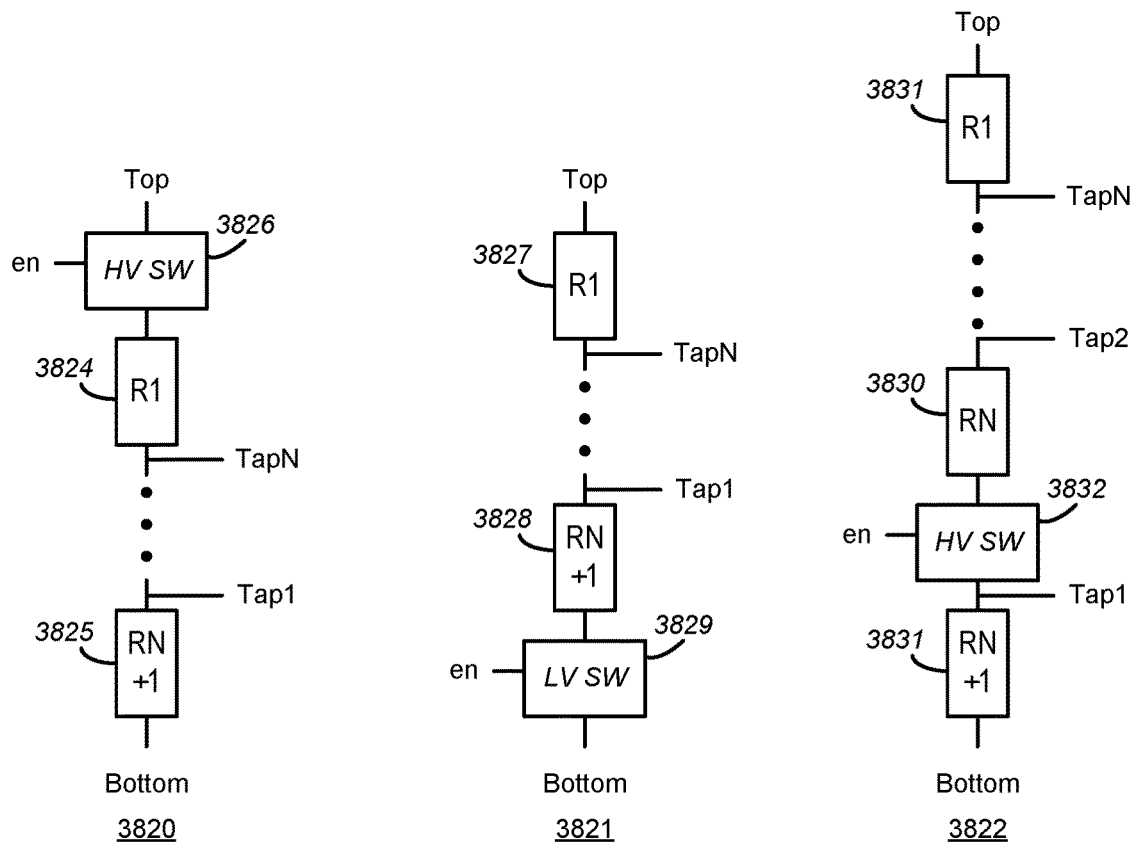
FIG. 38B illustrates various embodiments of resistor dividers with different configurations of switches.

In one embodiment, the sub-circuit schematics may comprise a switch for enabling and disabling the resistor divider. FIG. 38B illustrates various embodiments of resistor dividers with different configurations of switches. For example, in one embodiment shown in 3820, a switch 3826 is coupled between an input of the resistor divider and one or more terminals of top resistor segments used to produce a resistance R1 3824 of the resistor divider. Since each resistance 3824 . . . 3825 in divider 3820 comprises multiple resistor segments, which may be in parallel, the switch may be couple to a terminal of one segment or terminals of multiple segments in parallel. Switch 3826 may include an enable input (en) to enable or disable the resistor divider. In this example, the switch is a high voltage switch (HV SW), and may include a transistor that can withstand a high input voltage at the top of the divider. In divider 3821, a switch 3829 is coupled between a reference input of the resistor divider (e.g., ground) and one or more terminals of bottom resistor segments used to produce resistance RN+1 3828 of the resistor divider. In this case, switch 3829 may be low voltage switch that does not need to withstand the full voltage applied to the input of the divider. In divider 3822, a switch 3832 may be coupled between one of the output taps (here, Tap 1) of the resistor divider and one or more terminals of intermediate resistor segments (e.g., resistor segments in RN 3830) of the resistor divider.

Automated Generation of Capacitors

Features and advantages of the present disclosure include automated generation of capacitors. In some embodiments, capacitors may be generated across a range of values for use in transistor level circuits and/or layouts, for example.

Figure 39:
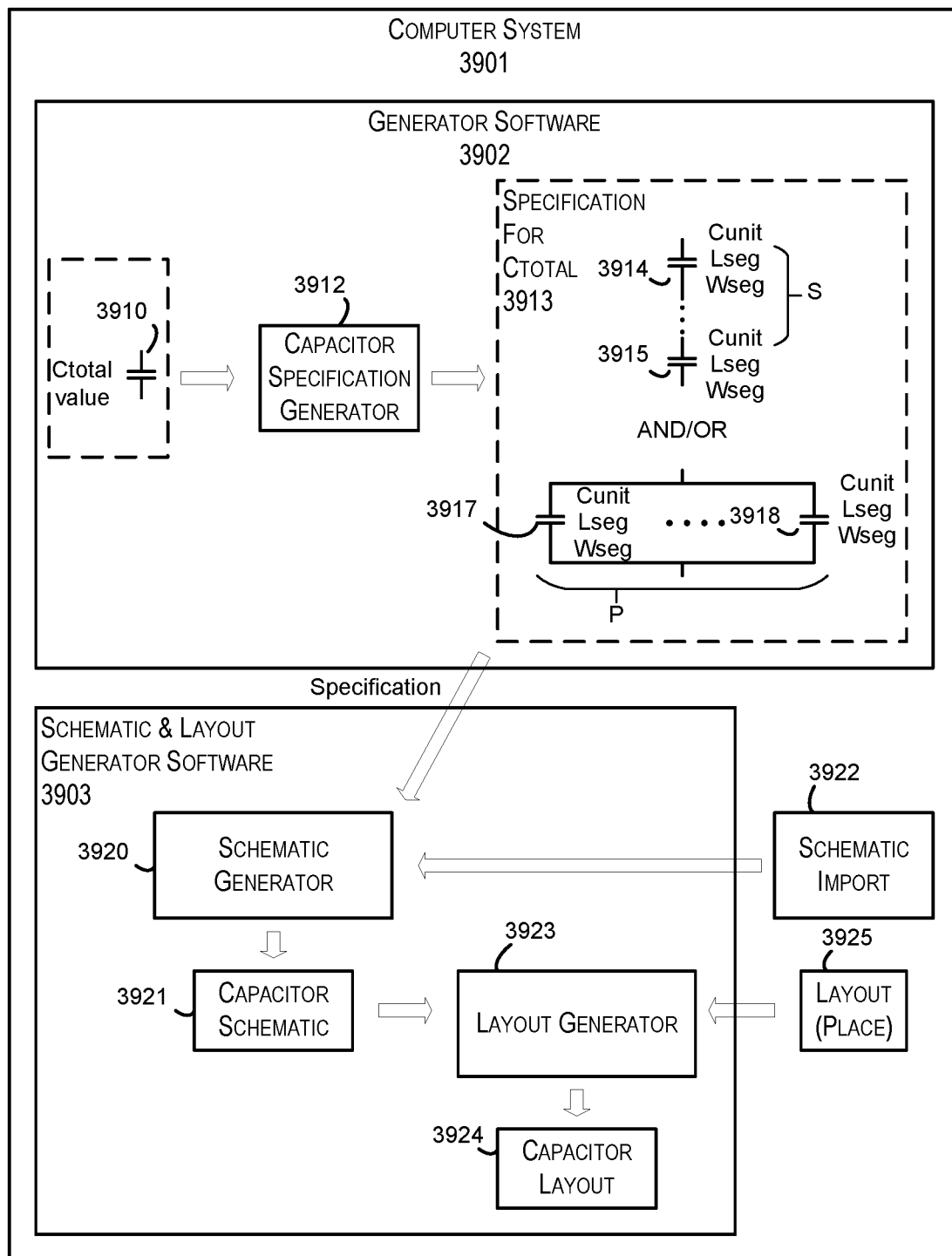
FIG. 39 illustrates a computer-implemented system for automatically generating capacitors according to an embodiment.

FIG. 39 illustrates a computer-implemented system 3901 for automatically generating capacitors according to an embodiment. Features and advantages of the present disclosure may automatically generate schematics, layouts, or both, that include capacitors based on specified or calculated capacitor values received by the system, for example. For instance, a system according to the present disclosure may receive a capacitor value and automatically generate a schematic for the capacitor, a layout for the capacitor, or both. In this example, a capacitor value Ctotal, corresponding to a capacitor 3910 is to be generated by a capacitor specification generator component 3912 of generator software 3902. In various embodiments, one or more capacitor values may be specified by a user, for example, and received by generator software as an input parameter. In other embodiments, one or more capacitor values may be calculated based on other parameters received by generator software, for example, as described in more detail below.

Features and advantages of some embodiments include converting a capacitor value into segments, such as series unit capacitor segments to be generated, parallel unit capacitor segments to be generated, or one or more combinations of both series and parallel unit capacitors. For example, capacitor specification generator 3912 may determine a first number S of capacitor segments to be configured in series and/or a second number P of capacitor segments to be configured in parallel to approximately produce the capacitor value Ctotal. S and P may be integers greater than or equal to one (1), for example. S and/or P may alternatively be represented as N. In one embodiment, the capacitance of the unit capacitors may be the same, for example. Once the numbers S of series capacitors and/or P parallel capacitors are determined, a circuit specification 3913 (e.g., for Ctotal) may be generated to produce a schematic, a layout, or both, for example. In this example, capacitor specification generator 3912 may generate a circuit specification 3913 to configure the first number S of capacitor segments in series, or alternatively, the second number P of capacitor segments in parallel (or a combination of both). While one series combination of capacitors and one parallel combination of capacitor are illustrated here as alternatives for producing Ctotal, it is to be understood that combinations of series and parallel capacitors could be used to obtain Ctotal within an allowable tolerance, for example.

In various embodiments, the circuit specification 3913 may specify a configuration for a plurality of components. In this example, the components correspond to unit capacitors (e.g., as illustrated by capacitor segments 3914-3918), and circuit specification 3913 may specify connections between the capacitor segments. For instance, the circuit specification may be a netlist, such as a verilog.v file as mentioned above, where connections between components are based on common specified nodes in the netlist.

Example embodiments of the present disclosure may further receive one or more predefined physical dimensions for a capacitor segment 3911. Predefined physical dimensions may be set to advantageously optimize layout of the different capacitor values, for example, as further illustrated below. For example, the predefined physical dimension may be a predefined maximum length along one dimension of a capacitor segment (e.g., length, Lseg) or a predefined maximum length along another dimension of the capacitor segment (e.g., width, Wseg). Predefined physical dimensions may be associated with the capacitor value to be generated so that particular capacitors to be generated may access the predefined physical dimensions. Accordingly, when a particular capacitor value, Ctotal, for a particular circuit or project is received, associated parameters such as Lseg or Wseg for the particular capacitor may be obtained from a known storage location (e.g., from a memory, file, or database), for example.

Features and advantages of certain embodiments may further include generating a schematic for the capacitor value based on the circuit specification. In this example, circuit specification 3913 is sent from generator software system 3902 to a schematic and layout generator software system 3903. Schematic and layout generator software system 3903 may be an electronic design automation (EDA) software system as mentioned above, for example. Software system 3903 may include a schematic generator component 3920 to generate a capacitor schematic 3921 from the circuit specification 3913. Schematic generator component 3920 may receive a netlist, for example, and convert the netlist to schematic symbols and connections between the schematic symbols, for example. However, some schematic generators may not be able to set the attributes of components, such as capacitor, to particular specified values based on a netlist. Accordingly, in one example embodiment, a schematic import component 3922 may analyze the circuit specification 3913 or the generated schematic 3921, for example, and set attributes of components, such as the capacitor, in the generated schematic.

In one example embodiment, the circuit specification 3913 may specify components corresponding to a plurality of unit capacitors (e.g., configured in series or parallel or both), and the schematic generator 3920 may generate schematic symbols without unit capacitors for such components (e.g., if the component name in a netlist does not exist in software system 3903's library, the generated symbol may be empty). Thus, initially, the generated schematic may include a plurality of empty symbols, where pins of the symbols are coupled together as specified in the received netlist. Schematic import component 3922 may identify empty components and execute an algorithm for inserting capacitors into the symbols. For example, schematic import component 3922 may automatically insert a capacitor in each of the empty schematic symbols and connect terminals of the inserted capacitor with the pins of the schematic symbol, for example.

In some embodiments, schematic import component 3922 may include code for setting the attributes of the capacitors. For example, attributes for a capacitor may include physical dimensions of the capacitor, such as length and width. Attributes may also include a capacitor type (e.g., metal-insulator-metal, "mim"). Attributes of one or more capacitors may be passed between software components in various ways. In one embodiment, the specification 3913 may include information for setting the attributes. For example, as mentioned above, attributes may be encoded in an identifier for a component in the circuit specification 3913 (e.g., encoded in name(s) of capacitor(s) in the netlist). Accordingly, when a symbol for the component in the netlist is used to create a symbol, the symbol may include the identifier.

The identifier may be read by schematic import component 3922, for example, and used to place a capacitor inside the empty symbol. In other embodiments, attributes may be stored in a predefined location and accessed by schematic import component 3922, for example. More detailed example techniques for passing attributes for capacitor are presented below for illustrative purposes.

Accordingly, schematic generator 3920 may output a capacitor schematic 3921. Capacitor schematic 3921 may include a plurality of symbols having pins. Each symbol may have a capacitor segment embedded inside. As mentioned above, the symbols are coupled together in one or more series and/or parallel configurations. The combined symbols, each with an internal capacitor segment, for example, form the desired total capacitor value, Ctotal. In some example embodiments, the capacitor segments used to form one total capacitor value, Ctotal, may each have the same length, width, and capacitor type.

Features and advantages of some embodiments of the present disclosure may include automatically generating a capacitor layout from a capacitor schematic. For example, capacitor schematic 3921 may be converted into a capacitor layout 3924 by layout generator 3923. Layout generator 3923 may convert the capacitors inside the symbols of the schematic into polygons, for example, where each polygon has the dimensions specified for a corresponding capacitor segment. In one embodiment, layout placement instructions 3925 may be executed to position each polygon in the layout as described in more detail below. Accordingly, the capacitor segments forming the total capacitor value, Ctotal, in the schematic may be automatically converted to capacitor layout 3924.

Figure 40A:
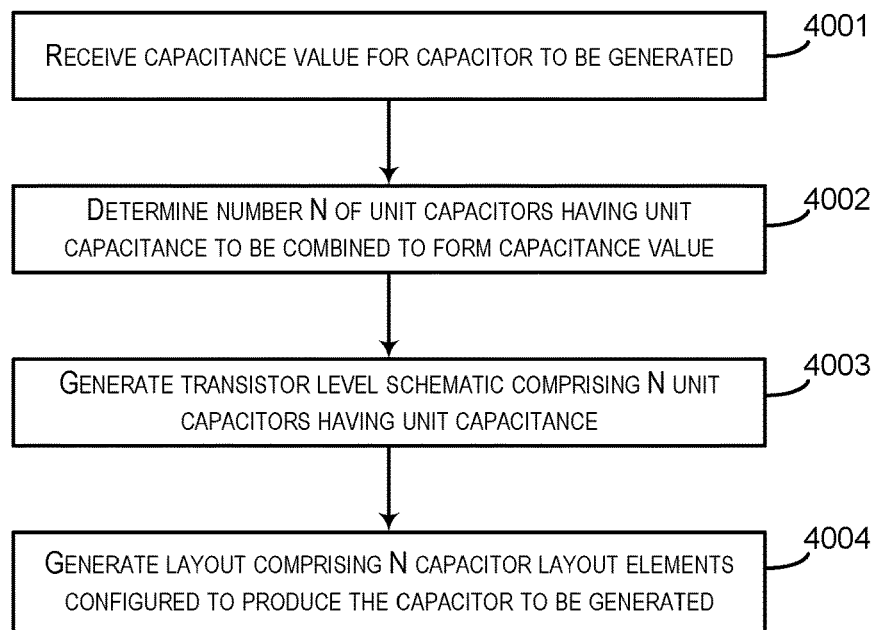
FIG. 40A illustrates a method of generating capacitors according to an embodiment.

FIG. 40A illustrates a method of generating capacitors according to an embodiment. At 4001, a capacitance value is received for a capacitor to be generated. The capacitance value may be received as an input parameter defined by a user in a user interface, for example, or the capacitance value may be received from a software module that determines a capacitance value based on parameters of a circuit to be generated, for example. At 4002, the system determines a number N of unit capacitors having a unit capacitance to be combined to form the total capacitance. The number N may alternatively be denoted as P (for parallel) capacitor segments configured in parallel or S (for series) capacitor segments to be configured in series (or as a combination of both). At 4003, a transistor level schematic is generated comprising N unit capacitor schematics having the unit capacitance. The N unit capacitor schematics are configured to produce the total capacitance of the capacitor to be generated. At 4004, a layout is generated comprising N capacitor layout elements configured to produce said capacitor.

Figure 40B:
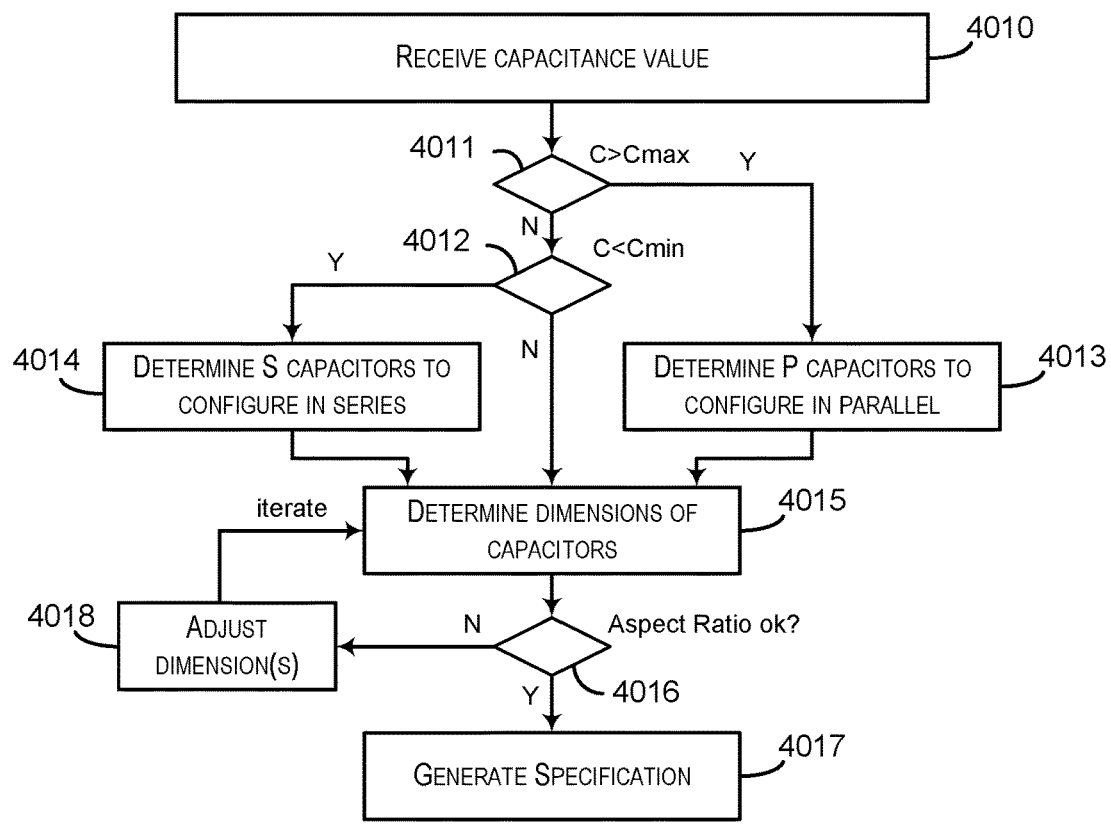
FIG. 40B illustrates one example technique for determining capacitor dimensions according to an embodiment.

FIG. 40B illustrates one example technique for determining capacitor dimensions according to an embodiment. At 4010, a capacitor value is received (e.g., Ctotal=25pf). In some embodiments, a capacitor generator software component in generator software may retrieve predefined capacitance parameters. For example, a maximum capacitance and minimum capacitance may be stored and retrieved for use in generating a capacitor. In some embodiments, different capacitors types may have different predefined maximum capacitances and/or minimum capacitances, for example, and the system may select a set of predefined capacitance parameters based on other information about a circuit or capacitor to be generated (e.g., selection based on a specified capacitor type or a capacitor type automatically selected for use in a particular analog circuit). In this example, the received capacitance, Ctotal, is compared to a predefined maximum capacitance, Cmax at 4011. If the Ctotal>Cmax, then the system may determine a number N (alternatively denoted, P) of unit capacitors, Cunit, to be configured in parallel as shown at 4013. Cunit may be a capacitance value so that N parallel unit capacitors combine to form Ctotal. Accordingly, a plurality of unit capacitors, Cunit, may be advantageously used so that the size of each capacitor is less than a predefined maximum capacitance. If Ctotal<Cmax, then at 4012 the received capacitance, Ctotal, is compared to a predefined minimum capacitance, Cmin. If Ctotal<Cmin, then the system may determine a number N (alternatively denoted, S) of unit capacitors, Cunit, to be configured in series as shown at 4014. In this case Cunit may be a capacitance value so that N series unit capacitors combine to form Ctotal. Accordingly, a plurality of unit capacitors may be advantageously used so that the size of each capacitor is greater than a predefined maximum capacitance. In this example, if Cmin<Ctotal<Cmax, then a single unit capacitor may be used. Combinations of parallel and series capacitors may be used in some embodiments to obtain capacitor values.

At 4015, the system may determine physical dimensions of the unit capacitors, Cunit. For example, in one embodiment the system may store and retrieve a predefined maximum length along a first dimension. In various embodiments, the system may configure a first length corresponding to a first dimension of the N unit capacitors to be less than or equal to a predefined maximum length along the first dimension. Further, the system may determine a second length corresponding to a second dimension of the N unit capacitors based on at least the unit capacitance, Cunit, and the first length. In one example embodiment, a unit capacitor, Cunit, in a circuit schematic may have a length attribute, Lseg, and width attribute, Wseg. Thus, the first length along the first dimension may correspond to the length attribute, Lseg, and the second length along the second dimension may correspond to the width attribute, Wseg. Accordingly, in one embodiment, Lseg may be set to a value less than or equal to a maximum length, Lmax, and the system may determine Wseg to obtain the unit capacitor value Cunit. For example, in one embodiment Lseg may initially be set to the predefined maximum length, Lmax. Wseg may be determined as follows:

$$Wseg = Cunit/[Lmax*(capacitance/um^2)]$$

Features and advantages of some embodiments may include the ability to set an aspect ratio of capacitors. A configurable (or programmable) aspect ratio may be advantageous for optimizing layout and reducing circuit area, for example. In one embodiment, the ratio of lengths along each dimension of the unit capacitor may be configured to produce a predefined aspect ratio (e.g., Wseg/Lseg). For example, once Wseg and Lseg are determined at 4015, the system may compare the aspect ratio of the calculated Wseg/Lseg to a predefined aspect ratio, which may be defined in code or retrieved from memory, for example. If the aspect ratio matches at 4016 (e.g., within a specified tolerance), then the system generates a netlist specification for the unit capacitors at 4017. However, if the aspect ratio does not match at 4016, then the system may adjust one of the dimensions (e.g., Wseg or Lseg) at 4018. For example, if the initial Lseg is set to Lmax, then Lseg may be incrementally reduced to produce an adjusted Wseg until an aspect ratio meets the predetermined aspect ratio, for example. Finally, at 4017, information specifying the capacitor may be encoded in an identifier, such as a name.

For example, the name of N capacitor components in the circuit specification netlist configuring the capacitors in series or parallel may be CAP_<cap_type>_<Lseg>_<Wseg>. Each capacitor symbol may be placed in a symbol for the composite capacitor named CAP_<cap_type>_<Lseg>_<Wseg>_N, where "cap_type" is the capacitor type (e.g., "mim"), Lseg is the length attribute, Wseg is the width attribute, and N is the number of capacitors used to create Ctotal, for example. In various embodiments, the components in transistor level schematics (including capacitors) may be generated as described above in connection with FIGS. 31 and 32, for example.

Example Embodiments for Generating Capacitors

Figure 41A:
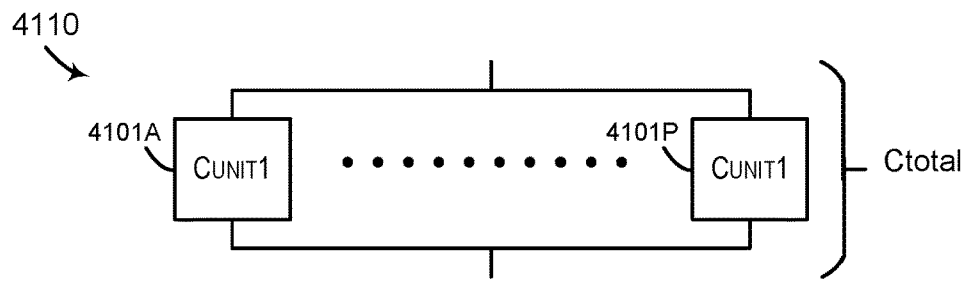
FIGS. 41A-C illustrate an example capacitor schematic generation according to an embodiment.
Figure 41B:
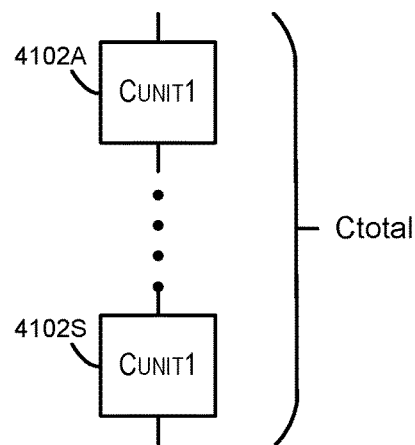
Figure 41C:
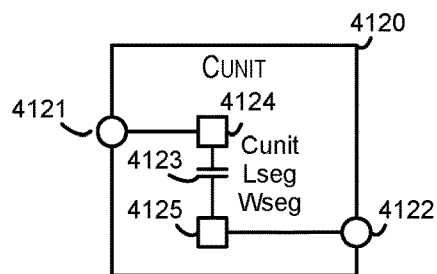

FIGS. 41A-C illustrate an example capacitor schematic generation according to an embodiment. FIG. 41A illustrates a capacitor schematic comprising P symbols 4101A-4101P coupled together in parallel. The symbols may be coupled together via pins, for example. FIG. 41B illustrates a capacitor schematic comprising S symbols 4102A-4102S coupled together in series. FIG. 41C illustrates an example symbol 4120 including symbol pins 4121 and 4122. Symbol 4120 comprises a transistor level unit capacitor 4123, Cunit, having a first terminal 4124 and a second terminal 4125. As mentioned above, in some embodiments, symbol 4120 may be generated without a unit capacitor segment (e.g., as an empty symbol). Unit capacitor segment, Cunit, may have been inserted in symbol 4120 by software. The software may further connect capacitor terminal 4124 to symbol pin 4121 and connect capacitor terminal 4125 to symbol pin 4122, for example. In one embodiment, the software may comprise scripts that execute in an electronic design automation (EDA) software system, for example (e.g., Skill scripts in Cadence®), which detect an empty symbol instance resulting from a schematic generated in response to receiving a netlist, for example, and insert the capacitor automatically. The scripts may further set attributes of the inserted capacitor using the values generated as described above.

The combined capacitance of the capacitor segments in the symbols 4101A-P or 4102A-S may produce the total capacitor value to be generated, Ctotal. As mentioned above, in some embodiments, the unit capacitors may have the same capacitor values, Cunit, the same predefined length, Lseg, and the same predefined width, Wseg, for example. Calculating lengths and widths for the unit capacitors based on predefined parameters (e.g., one or more of Cmin, Cmax, Lmax, or a programmed aspect ratio) may advantageously allow efficient automated layout.

Figure 42:
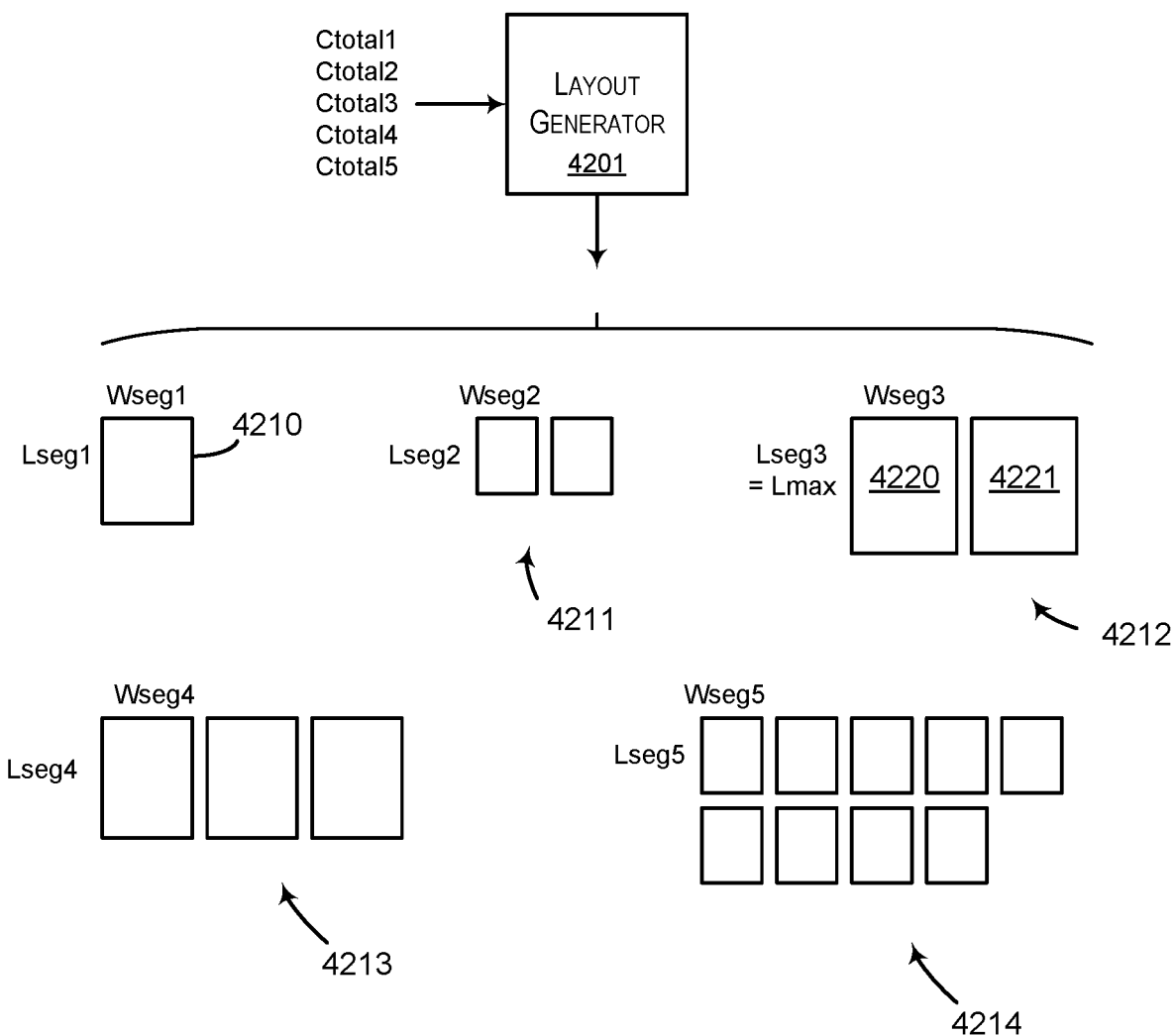
FIG. 42 illustrates example capacitor layouts according to various embodiments.

FIG. 42 illustrates example capacitor layouts according to various embodiments. Example layouts 4210-4214 illustrate how capacitor values may be automatically generated in response to different values of Ctotal (a capacitor to be generated). Generator 4201 may receive a plurality of capacitor values Ctotal1-Ctotal5 and generate layouts 4210-4214 comprising one or more capacitor layout segments (e.g., 4210 or 4220/4221) having lengths along the x-axis and y-axis equal to the attributes for Lseg and Wseg, for example. Capacitor layout segments in each capacitor layout may correspond to a plurality of polygons, for example. The polygons for each set of capacitor layout segment may have different lengths and widths. Capacitor layout segments may be generated from a capacitor schematic, such as schematic 4110 in FIG. 41A, for example. Accordingly, in this example, the capacitor segments in symbols generate corresponding polygons for capacitor layouts 4210-4214. In other embodiments it is possible that a single capacitor in a schematic may be converted into multiple polygons and automatically placed as described herein, for example. In this example, each of the capacitor layout segments may be laid out in a one (1) or two (2) dimensional array (e.g., side by side along a length or width) and coupled together (e.g., using metal or polySi) in series and/or in parallel (e.g., as illustrated in schematics shown in FIG. 41A or 41B) so the total capacitance is Ctotal. For example, capacitor layout segments may be arranged in a row up to a maximum distance, and then a new row may be started. Or capacitor layout segments may be configured in an N×M array, for example. Capacitor layout segments may be placed above portions of other circuitry. Capacitor layout segments may be implemented using metalization layers (e.g., a mim capacitor using metal 3 (M3) and a mim layer between M3 and M4) as is known by those skilled in the art.

As illustrated in layouts 4210-4214 a different number of capacitor layout segments having different sizes may be used to produce different values of Ctotal. Some values of Ctotal may result in fewer capacitor layout segments, while other values of Ctotal may result in more capacitor layout segments. Advantageously, the number of capacitor layout segments used across different designs for different values of Ctotal may vary by placing the capacitor layout segments side-by-side (e.g., along their lengths) and coupling them together according to different numbers of series and/or parallel combinations, as shown. As described in more detail below, layout placement instructions may place the capacitor layout segments in parallel along their lengths in an area reserved for the capacitor layout segments (e.g., above an area for a sub-circuit using metalizations, for example.

Figure 43:
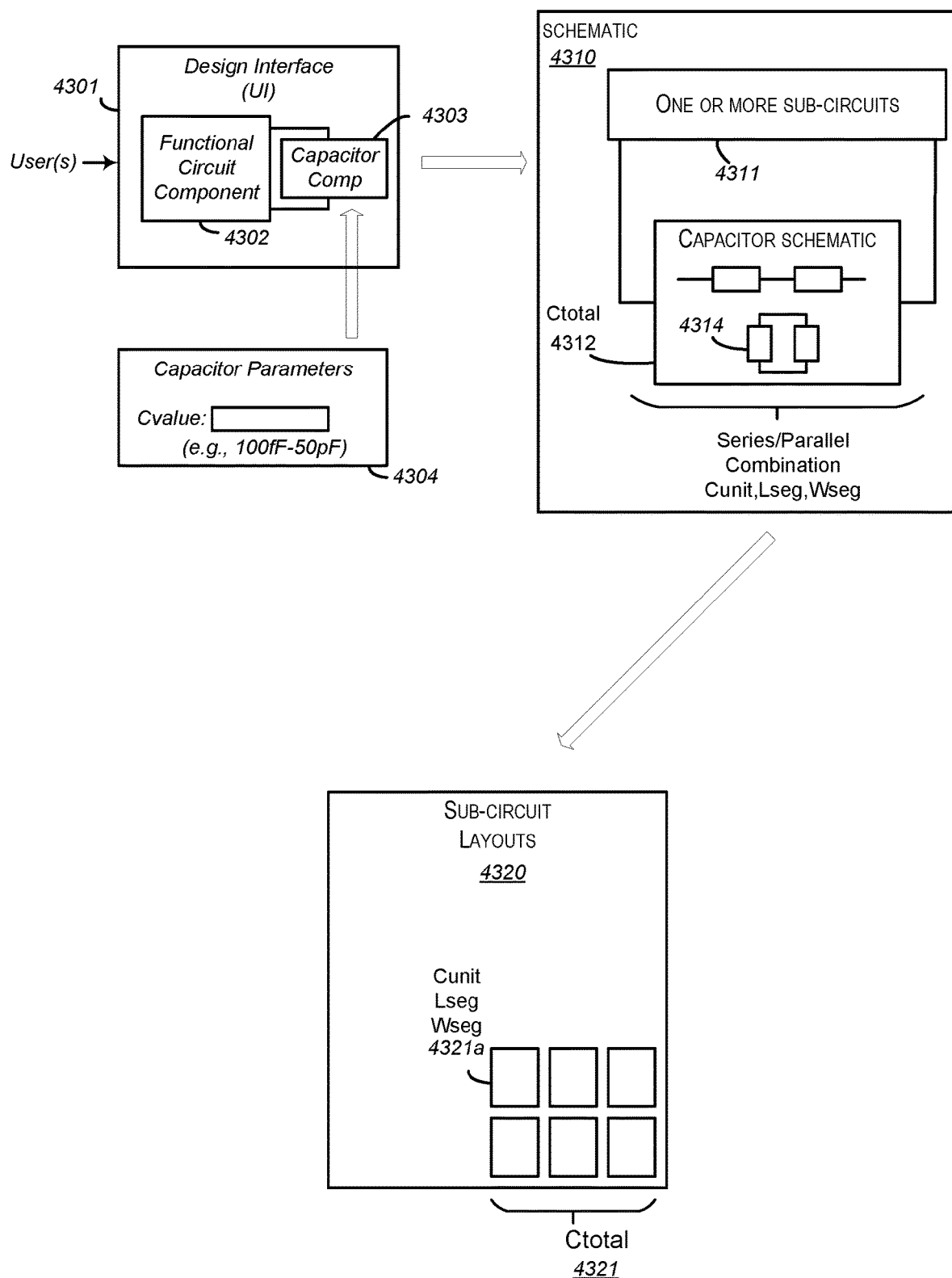
FIG. 43 illustrates generating a capacitor specified in a user interface according to an embodiment.

FIG. 43 illustrates generating a capacitor specified in a user interface according to an embodiment. In this example, the total capacitance is received as a parameter corresponding to a capacitor functional circuit component. For instance, a user may design a circuit in a design user interface (UI) 4301 (aka a front end). The design UI 4301 may perform a high-level behavioral simulation of the circuit, for example, rather than a transistor level simulation. In this example, the user has selected a first functional circuit component 4302 (e.g., a comparator or amplifier) and a capacitor functional circuit component 4303. Components 4302 and 4303 are coupled together in the design interface. A user may specify a capacitor value for capacitor component 4303 in user interface 4304, for example, and input a desired value for Ctotal. In this example, Ctotal may be within a predefined range from a minimum selectable UI value, Cmin=100 femtofarads (fF), to a maximum selectable UI value, Cmax=50 picofarads (pF). Functional circuit component 4302 may also have user selected parameters, for example, as described above. Parameters from the UI 4301 may be used to generate a schematic 4310. The schematic may include one or more sub-circuits 4311 selected based on the parameters received for functional circuit component 4302. Additionally, the schematic may include a capacitor schematic for Ctotal 4312. The capacitor schematic 4312 may comprise a plurality of symbols, such as symbol 4314, configured in series and/or parallel that each include a unit capacitor (Cunit), for example. The combined schematic may approximately produce the value of Ctotal entered by the user (e.g., to within a degree of error acceptable for the proper function of the circuit).

FIG. 43 further illustrates an example layout of a capacitor specified in a user interface. In this example, parameters for functional circuit component 4302 are used to generate sub-circuit layouts 4320. The user entered value for capacitor component 4303 (e.g., Ctotal) is used to generate and place a plurality of capacitor layout segments (e.g., capacitor layout segment 4321a) that each have the same unit capacitance, Cunit, segment length, Lseg, and segment width, Wseg, to form, in combination, the value of Ctotal 4321, for example. As the user entered value of Ctotal changes, the number of capacitor layout segments 4321 and dimensions of such segments (Wseg, Lseg) used to produce Ctotal changes. In this example, capacitor layout segments are configured in a 2-dimensional array spaced apart by an offset and configured above sub-circuit layout 4320 (e.g., using different metalization layers for the capacitor plates).

Figure 44:
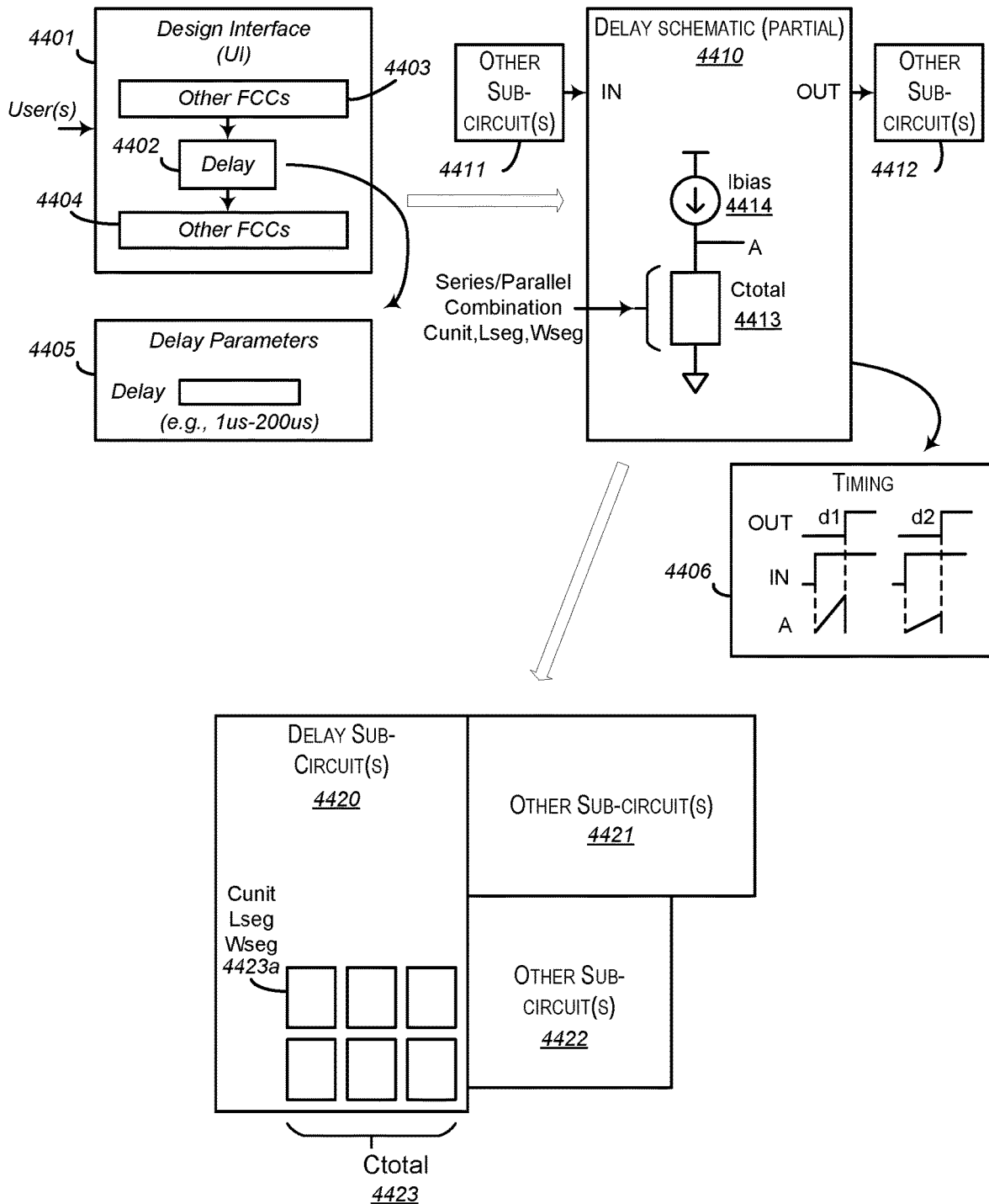
FIG. 44 further illustrates an example layout of a capacitor determined from parameters according to an embodiment.

In some embodiments, total capacitance may be produced based on information specifying a circuit to be generated. For instance, FIG. 44 illustrates generating a capacitor based on circuit parameters specified in a user interface according to an embodiment. Total capacitance may be produced based on a predefined circuit model for the circuit to be generated. For example, one or more capacitor values, Ctotal, may be received as a result of a calculation by the generator software. In this example, a user may design a circuit in design user interface (UI) 4401 that includes functional circuit component 4402 (e.g., here, a delay circuit) and one or more other functional circuit components (FCC) 4403 and 4404. Components 4402, 4403, and 4404 are coupled together in the design interface (e.g., the delay circuit receives a signal from FCC 4403 and outputs a signal to FCC 4404). The user may specify parameters for each functional circuit component. Parameters for component 4402 may be used to calculate one or more capacitor values. In this example, a user may enter a desired time delay for the delay circuit 4402 in user interface 4405, for example. The user may input a desired value for the time delay in a text field, for example. In this example, the time delay may be within a predefined range from a minimum value, delay_min=0.5 us, to a maximum value, delay_max=200 us. Other functional circuit components 4403/4404 may also have user selected parameters, for example. Parameters from the UI 4401 may be used to generate a transistor level schematic, which may include a delay schematic 4410 and sub-circuit schematics 4411 and 4412 for the other functional circuit components 4403 and 4404, respectively. Additionally, the delay schematic 4410 may include a capacitor schematic 4413 for Ctotal, a bias current schematic (ibias) 4414, and schematics for other circuitry (not shown). Capacitor 4413 and ibias 4414 are illustrated here as symbols, but it is to be understood that a transistor level schematic for ibias would include a configuration of transistor level components (e.g., n-type or p-type transistors, resistors, or capacitors). The capacitor schematic 4413 may comprise a plurality of symbols, as illustrated in FIG. 41A or 41B, configured in series and/or parallel that each include a unit capacitor, for example. The combined schematic may produce approximately the value of Ctotal calculated by the generator software (e.g., to within a degree of error acceptable for the proper function of the circuit).

The following example illustrates one capacitor calculation by generator software in response to receiving parameters for a delay circuit functional circuit component 4402. If a user enters a value of delay between delay_min and delay_max, Ctotal may be calculated (e.g., using a circuit model for the delay circuit). In this example, the delay may be based on the slope of a voltage ramp signal generated by Ibias into Ctotal. Waveforms for such a circuit are illustrated at 4406. Current Ibias into Ctotal may produce a voltage slope at node A. The voltage slope may start when an input IN is received, for example. When the voltage slope reaches a particular value, the output is triggered (other circuitry not shown). For a shorter delay, a steeper voltage slope at node A may be used. For a longer delay, the voltage slope may be lower. The voltage slope is given by the following equation:

$$\text{Voltage slope} = dv/dt = i\text{bias}/C\text{total, or}$$

$$C\text{total} = (I\text{bias} * \text{delay})/V\text{th}$$

where Vth may be the threshold voltage at node A where the output is triggered, for example. Thus, the above equation for Ctotal is an example circuit model that may be used to determine Ctotal based on values of delay received as parameters. Accordingly, a user may enter one value (e.g., of a continuous range of values) as a parameter, and generator software may convert the value into a capacitor value, Ctotal, to be implemented as a schematic, layout, or both, for example. As described above, the generator software may access predefined physical dimensions for a unit capacitor and convert Ctotal into a series and/or parallel combination of capacitors. The schematic for Ctotal may be generated as described above and coupled to a schematic for Ibias 4414 (and other delay circuit schematics) to produce delay circuit schematic 4410, for example. While calculating capacitor values is illustrated here in the context of a delay circuit, it is to be understood that capacitor values may be calculated for a wide range of other analog or mixed signal circuits by those skilled in the art of analog/mixed signal circuit design.

FIG. 44 further illustrates an example layout of a capacitor determined from parameters according to an embodiment. One or more functional circuit components 4402-4404 and corresponding parameters may result in layouts 4420-4422. Delay 4402 and parameters entered for the delay (e.g., 0.5 us to 200 us) may result in layout 4420 corresponding to sub-circuits for Ibias 4414 and other delay sub-circuits (not shown), for example, and a layout of capacitor layout segments 4423 for the calculated value of Ctotal. As described above, each capacitor layout segment (e.g., capacitor layout segment 4423a) may have the same unit capacitor value, Cunit, length, Lseg, and Width, Wseg, for example, which combine to form Ctotal. Accordingly, as the value entered by a user for a particular circuit parameter changes across a continuous range of values, a calculated capacitor value changes, and the resulting number of capacitor layout segments to produce the calculated capacitor value changes. Such example embodiments may advantageously allow generator software to receive parameters across a continuous range of values (e.g., from a user) and automatically generate analog circuit schematics and/or analog circuit layouts to implement the specified circuit behavior, for example.

Automatically Generating Transistors

Features and advantages of various embodiments of the present disclosure may further include automated generation of transistors, such as field effect transistors (FETs), for example.

Figure 45:
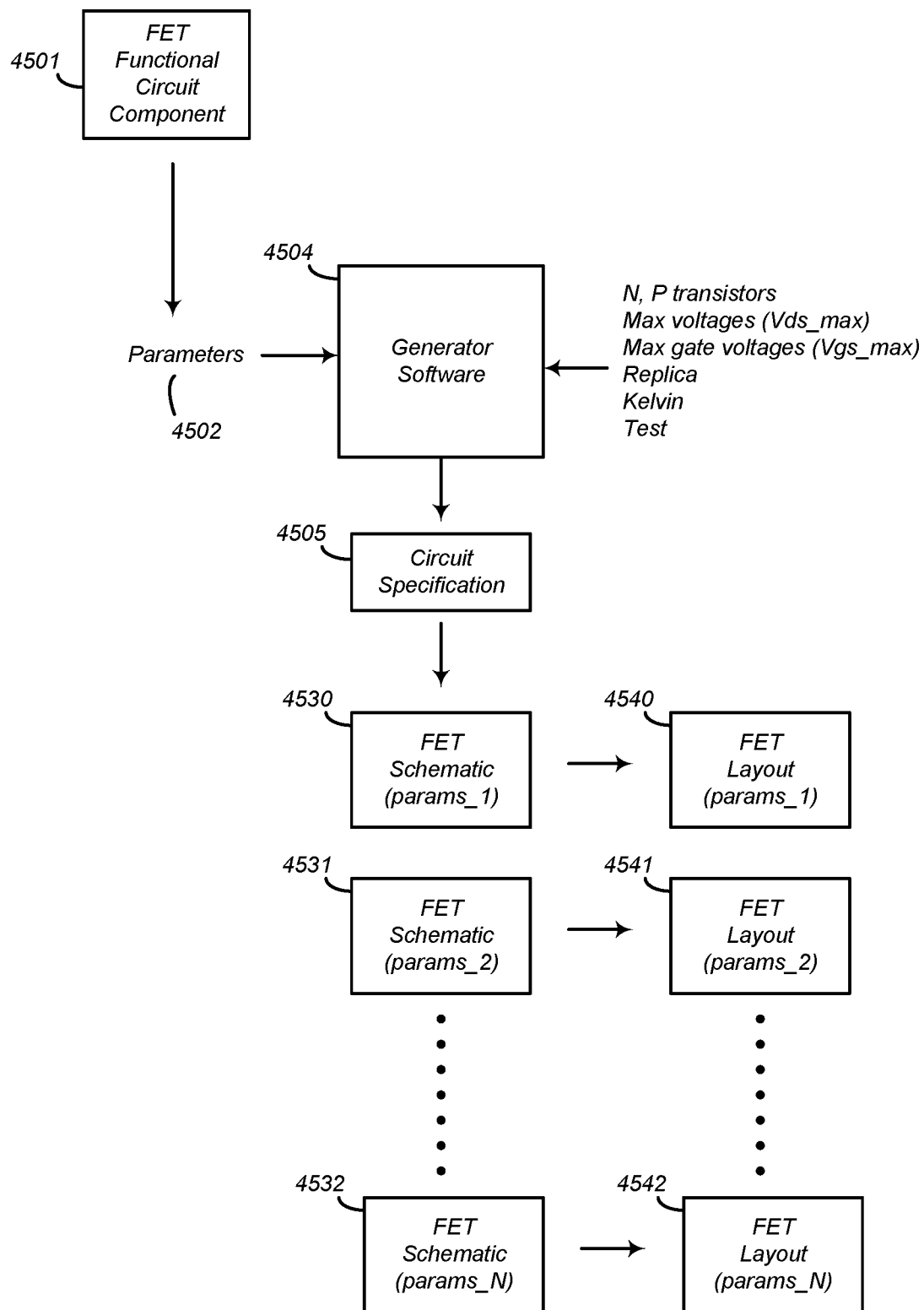
FIG. 45 illustrates automated generation of transistors according to an embodiment.

FIG. 45 illustrates automated generation of transistors, such as field effect transistors (FET), for example, according to an embodiment. In this example, generator software 4504 may receive information specifying a transistor to be generated as parameters 4502. The transistor to be generated may be a signal FET or power FET, for example. A power FET refers to a transistor configure to deliver power, typically in the form of large currents, whereas a signal FET is a transistor configured to couple signals between various nodes of the circuit. In some embodiments, parameters may be generated from a user configured FET functional circuit component 4501, where a user enters the features desired for the FET and such features are embodied in parameters 4502 and sent to generator software 4504. Generator software 4504 may automatically generate transistors having different dopant types (e.g., n-type or p-type), maximum voltages (e.g., maximum drain to source voltage, Vds_max, or maximum gate to source voltages, Vgs_max), for example. Various embodiments described herein may automatically generate transistors with replica devices and/or Kelvin connections, for example. Based on the received information specifying the transistor to be generated, generator software 4504 may produce a circuit specification 4505. Circuit specification 4505 may be a netlist, for example, specifying one or more of a particular transistor (e.g., n-type, p-type, Vds_max, Vgs_max), and may further specify additional connections and elements to form a replica transistor or Kelvin connections, for example.

Circuit specification 4505 may be used to generate a transistor schematic. As mentioned above, in some embodiments circuit specification 4505 may be received by Electronic Design Automation (EDA) software and converted into a transistor level schematic, which may be simulated at the device level, for example. In this example, N different combinations of parameter values (e.g., params_1, ..., params_N, where N is an integer) may result in N different FET transistor schematics 4530-4532. Transistor schematics 4530-4532 may be converted to FET layouts 4540-4542.

Figure 46:
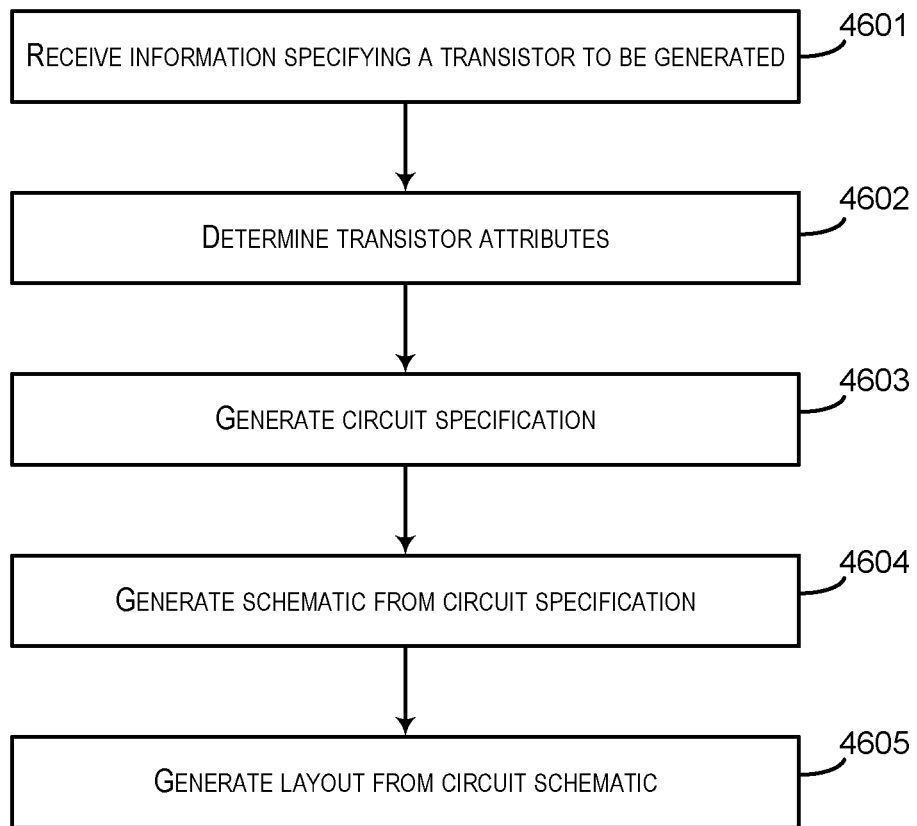
FIG. 46 illustrates a flow chart for automatically generating a transistor according to an embodiment.

FIG. 46 illustrates a flow chart for automatically generating a transistor according to an embodiment. At 4601, information specifying the transistor to be generated is received (e.g., by generator software 104). At 4602, transistor attributes may be determined from the information. Attributes may include n-type or p-type devices, maximum voltages, replica devices, or Kelvin connections as described above. In some embodiments, a user may specify an on resistance (e.g., drain to source ON resistance, "Rds_on" or just "Ron") and other attributes may be determined automatically, such as a ratio of width divided by length (W/L), number of fingers, and number of device cells, for example, as described in more detail below. In some embodiments, known layout parameters for particular transistor configurations may be retrieved and used in determining one or more attributes (e.g., gate width or aspect ratio) of the transistor to be generated, for example. At 4603, a circuit specification is generated. The circuit specification may include one or more devices configured to produce the specified transistor to be generated. At 4604, a transistor level schematic is generated from the circuit specification, and at 4605 a layout for the specified transistor is generated.

Figure 47A:
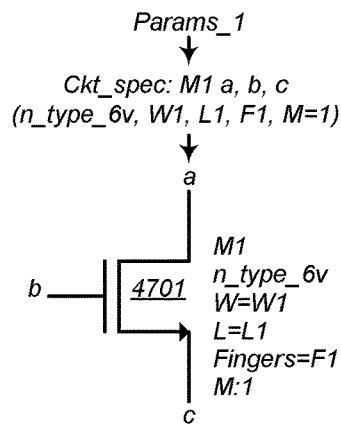
FIGS. 47A-F illustrate example transistors generated by different parameters according to various embodiments.

FIGS. 47A-47E illustrate example transistors generated by different parameters according to various embodiments. In FIG. 47A, a first set of parameters (params_1) results in a circuit specification comprising one FET device M1 coupled to nodes a, b, and c. Device M1 may further be associated with an n-type 6 volt device, for example. The received parameters may include Rds_on, for example, which may be used to determine a first gate width, w=W1, gate length, l=L1, a particular number of fingers, F=F1, and a multiplier attribute (M) (here, M=1), where W1 and L1 are values (e.g., W1=2.8 um and L1=200.0 nm) and F1 is an integer (e.g., F1=2), for example. Multiplier attribute (M) is one technique that may be used to specify a number of device cells, for example. Generally, in the following examples, W<i>, L<i>, and F<i> in the example transistors below in FIGS. 47B-47E and 48A-48B represent different values for width, length, and fingers, respectively. In this example, circuit specification parameters are used to generate a transistor level schematic for an NMOS transistor 4701. The circuit specification may be used to select a 6v n-type transistor 4701 (e.g., from a library of transistors), which is then configured with attributes including gate width, w=W1, gate length, l=L1, number of fingers, F=F1, and a multiplier attribute, M=1, for example. Transistor 4701 may be placed in a schematic and coupled to other circuitry as described herein.

Figure 47B:
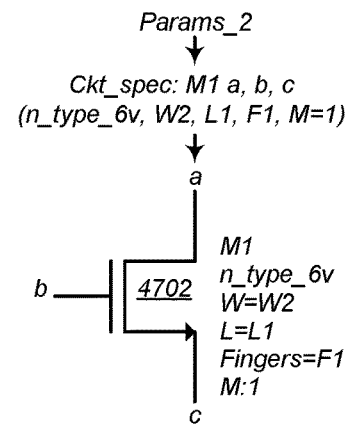

FIG. 47B illustrates a second set of parameters (params_2), which result in a circuit specification comprising one FET device M1 coupled to nodes a, b, and c. Device M1 may also be associated with an n-type Vds_max=6 volt device, for example. The received parameters may include a different Rds_on, for example, which may be used to determine a second gate width, w=W2, gate length, l=L1 (e.g., which may be the same minimum gate length), the same number of fingers F=F1, and a multiplier attribute, M=1. The circuit specification may be used to select a 6v n-type transistor 4702, which is then configured with attributes and placed in a transistor level schematic as shown in FIG. 47B and described above.

Figure 47C:
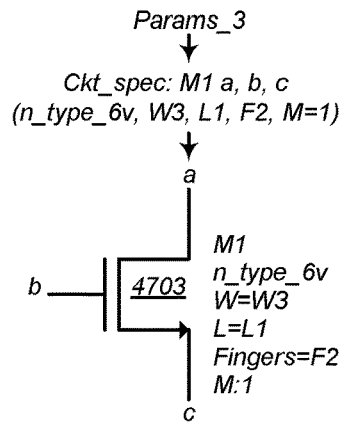

FIG. 47C illustrates a third set of parameters (params_3), which result in a circuit specification comprising one FET device M1 coupled to nodes a, b, and c. Device M1 may also be associated with an n-type Vds_max=6 volt device, for example. The received parameters may include a yet another value for Rds_on, for example, which may be used to determine a third gate width, w=W3, the same gate length, l=L1, a different number of fingers, F=F2, and a multiplier attribute, M=1. The circuit specification may be used to select a 6v n-type transistor 4703, which is then configured with attributes and placed in a transistor level schematic as shown in FIG. 47C and described above.

Figure 47D:
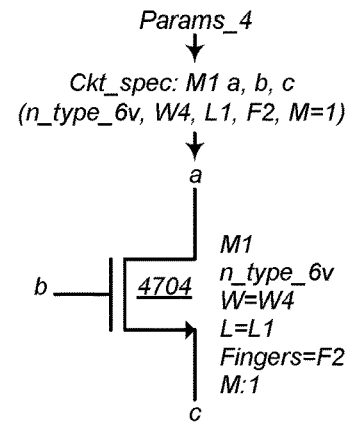

FIG. 47D illustrates a fourth set of parameters (params_4), which produce a specification for a device associated with an n-type Vds_max=6 volt device. The received parameters may include a yet another value for Rds_on, for example, which may be used to determine a fourth gate width, w=W4, the same gate length, l=L1, a same number of fingers, F=F2, as the device in FIG. 47C, and a multiplier attribute, M=1. The circuit specification may be used to select a 6v n-type transistor 4704, which is then configured with attributes and placed in a transistor level schematic as shown in FIG. 47D and described above.

From the above examples it can be seen that a wide range of devices with a range of combinations of widths and fingers may be generated based on different parameter values.

Figure 47E:
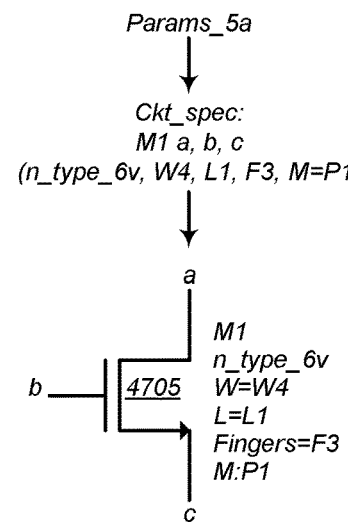

FIG. 47E illustrates another example transistor generated from a fifth set of parameter values (params_5a). In some embodiments with larger gate widths, it may be desirable to generate a plurality of device cells. In one example embodiment, params_5a may produce a circuit specification for an n-type MOS transistor with Vds_max=6 volts, a gate width, w=W4 (e.g., the transistor unit gate width, Wunit), gate length, l=L1, number of fingers, F=F3, and a multiplier attribute (M=P1, where P1 is a integer value greater than 1 specifying a number of device cells). When the circuit specification is converted to a transistor schematic, the result is transistor 4705 having width W4 and F3 number of fingers configured in parallel, and multiplier, M=P1. The drain is coupled to node a, the gate is coupled to node b, and the source is coupled to node c.

Figure 47F:
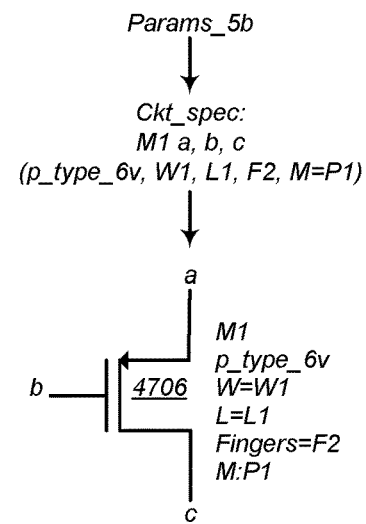

FIG. 47F illustrates another set of parameters (params_5b), which may result in a circuit specification for a p-type MOS transistor having a gate width W1, length L1, number of fingers F2, and multiplier M=P1. The circuit specification is used to generate a transistor level schematic for PMOS transistor 4706 having attributes as specified in the circuit specification as shown in FIG. 47F.

Figure 48A:
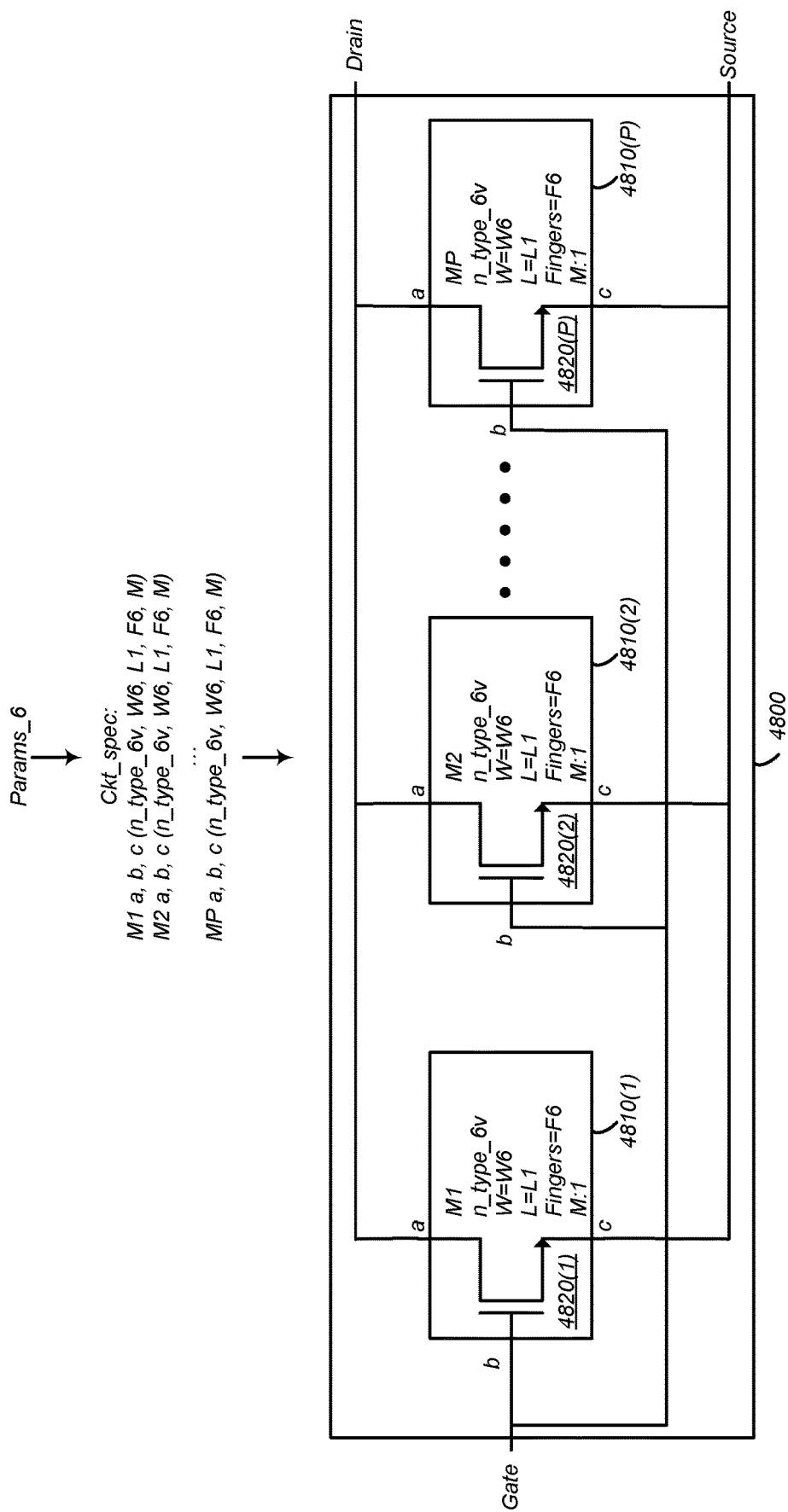
FIG. 48A illustrates another example transistor generated from another set of parameter values according to an embodiment.

FIG. 48A illustrates another example transistor generated from another set of parameter values (e.g., params_6). FIG. 48A illustrates an alternative technique for generating multiple device cells. For instance, rather than set M>1 in a single transistor's attributes to obtain multiple device cells, a transistor to be generated based on param_6 may be implemented as P (an integer) transistors in parallel. For example, a circuit specification may specify P MOSFET transistors, M1, M2, . . . , MP coupled to nodes a, b, and c. The transistors may be n-type, Vds_max=6v, unit gate width w=W6, gate length l=L1, and number of fingers, F=F6. Multiplier M attribute of each transistor is set to 1 in this example. When the circuit specification is converted to a transistor level schematic, P (an integer) n-type MOS transistors 4820(1)-4820(P) having a Vds_max=6v, width=W6, length=L1, number of fingers F=F6, and multiplier M=1 are selected and configured in parallel. For each device, the drains are coupled to node a, the gates are coupled to node b, and the sources are coupled to node c. Each transistor may be configured in one of symbols 4810(1)-4810(P), for example, and symbols 4810(A)-4810(P) may be embedded in symbol 4800 for the composite transistor having the specified characteristics, for example.

Figure 48B:
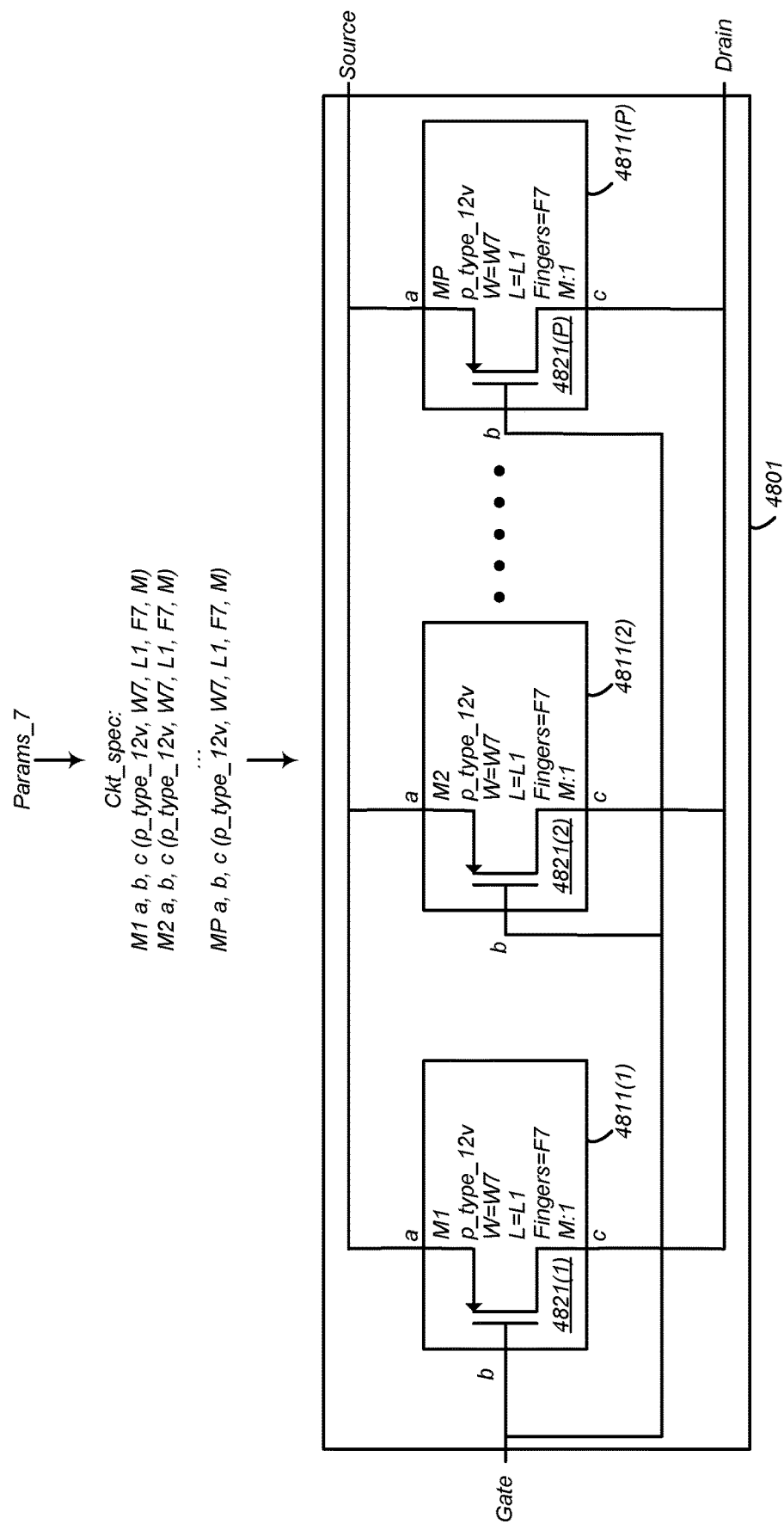
FIG. 48B illustrates another example transistor generated from another set of parameter values according to yet another embodiment.

FIG. 48B illustrates another example transistor generated from another set of parameter values (e.g., params_7). In this example, params_7 result in a circuit specification specifying P (an integer) p-type MOSFET transistors, M1, M2, . . . , MP coupled to nodes a, b, and c with Vds_max=12v, unit gate width, w=W7, gate length, l=L1, number of fingers, F=F7, and the multiplier attribute M=1. When the circuit specification is converted to a transistor schematic, P (an integer) Vds_max=12v p-type MOS transistors 4821(1)-4821(P) are selected and configured in parallel with attribute values set to width w=W7, length l=L1, number of fingers F=F7, and M=1. For each device 4821(1)-(P), the drains are coupled to node c, the gates are coupled to node b, and the sources are coupled to node a. Each transistor may be configured in one of symbols 4811(1)-4811(P), for example, and symbols 4811(1)-4811 (P) may be embedded in symbol 4801 for the composite transistor having the specified characteristics, for example.

Figure 49A:
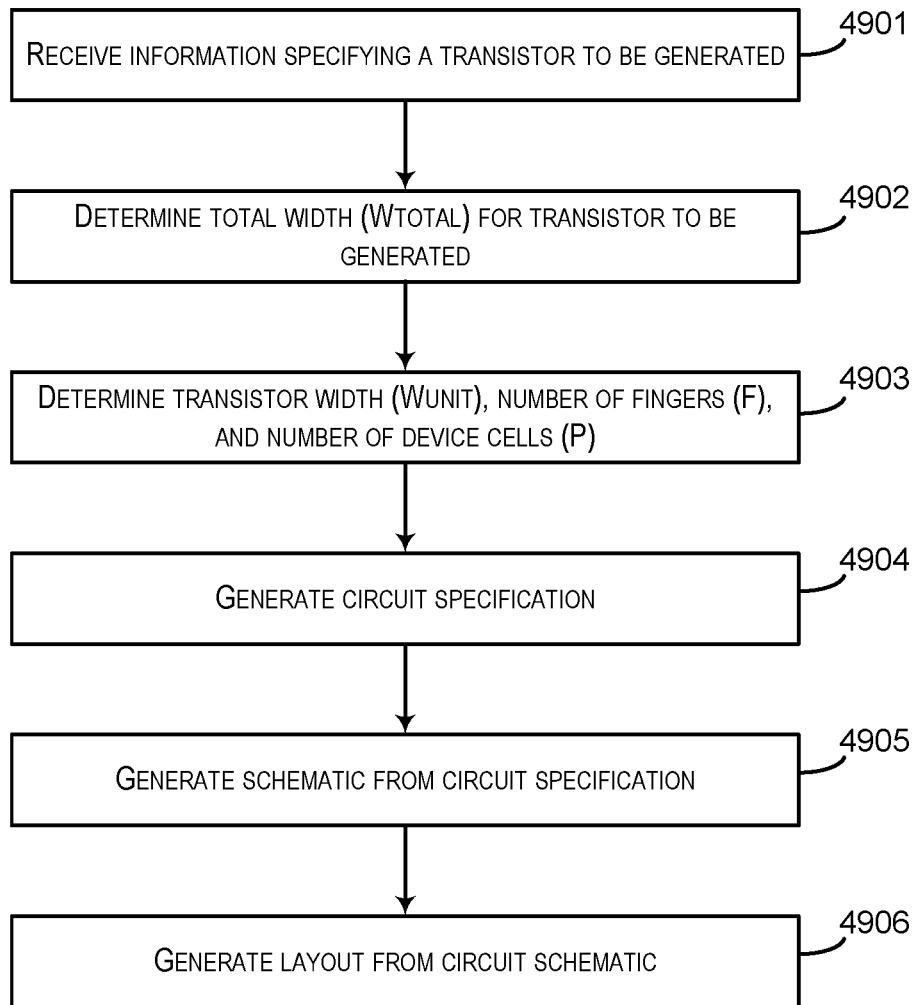
FIG. 49A illustrates an example method of generating a transistor according to another embodiment.

FIG. 49A illustrates an example method of generating a transistor according to another embodiment. At 4901, information specifying a transistor to be generated is received by generator software executing on a computer system. The information may comprise parameters describing features of an MOS transistor to be generated, such as n-type or p-type, Vds_max (e.g., 2v, 6v, 12v, 20v, 24v, 30v), Vgs_max (e.g., 2v, 6v), on resistance (Ron), Kelvin (Yes/No), Replica (Yes/No), or Test (Yes/No), for example. At 4902, a total width (Wtotal) for the transistor to be generated is determined. The gate length may be retrieved (e.g., from memory, a database, or a file), for example. One example technique for determining a width of a transistor is described below in FIG. 49B.

In one example embodiment, a transistor may be generated having a unit width, Wunit, where the transistor may have multiple fingers and/or a number of device cells (P) (e.g., based on multiplier attribute M or parallel devices) as described above. The unit width, Wunit, number of fingers, F, and number of device cells, P, configured in parallel may be determined at 4903. For example, in one embodiment, a maximum width (Wmax), maximum number of fingers (Fmax) and number of device cells (P) may be determined from the total width. For instance, if the total width is 200,000 um, Fmax=120, and Wmax=200 um, then P=9 would produce the following number of fingers (F):

$$F = Wtotal/(Wmax*P) = 200\ Kum/(200\ um*9) = 111$$

Generator software may successively determine different values F across different values of P until a value of F and P is found that results in F<Fmax, for example. In one particular example embodiment, P is set to a perfect square (i.e., the square root of P is a positive integer), which advantageously produces an N×N array of device cells in a layout as described in more detail below.

Features and advantages of the present disclosure may further include setting a unit width such that a plurality of transistor device cells have a rectangular area. The ratio of the x-dimension and y-dimension (e.g., X/Y or Y/X, where X is the length of a cell in the x-direction and Y is the length of the cell in the y-dimension) may be between about ⅔rds and about ¾ths, for example, which produces an rectangular layout structure advantageous for positioning layout structures and optimizing area of a semiconductor circuit. In one example embodiment, X/Y=0.75. Y and X of the transistor may be determined from layout parameters, where X is a function of the number of fingers, $X=f_1(F)$, and Y is a function of the unit width, $Y=f_2(Wunit)$, for example. In this example, since the number of fingers, F, may be obtained from Wtotal, Wmax, and P (above), the unit width, Wunit, may be expressed as follows:

$$Wunit = f_2^{-1}(Y) = f_2^{-1}(X/0.75) = f_2^{-1}(f_1(F)/0.75)$$

Where $X=f_1(F)$ and $Y=f_2(Wunit)$ are predefined functions based on predefined transistor layout parameters, which may be different for different transistors. Accordingly, generator software executing on a computer system may select different equations for $X=f_1(F)$ and $Y=f_2(Wunit)$ based on the information specifying the transistor to be generated (e.g., based on parameters for n-type or p-type, Vds_max, Vgs_max, or the particular transistors from a library of transistors used in a particular circuit specification). Example equations $X=f_1(F)$ and $Y=f_2(Wunit)$ for n-type and p-type transistors are illustrated below.

Accordingly, the above techniques may be used to obtain attributes of a transistor to be generated—W, L, and F. The number of device cells, P, may be configured either as M=P or as P transistors configured in parallel, for example. Thus, a circuit specification may be generated at 4904. The circuit specification may be used to generate a schematic at 4905, and a layout is generated from the circuit schematic at 4906.

Features and advantages of the present disclosure include receiving a value for on resistance (Ron) and using Ron to determine gate width (e.g., Wtotal) for a transistor. In one example embodiment, the relationship between Ron and Wtotal may be determined by generating simulation data for different values of gate-to-source voltage (Vgs), gate width (w), and temperature (T), for example, versus Ron for a particular transistor (e.g., a Vds_max=6v NMOS or a Vds=24v PMOS), which may produce data points corresponding to a particular curve for the particular transistor. An equation for the curve may be obtain by a curve fitting algorithm, such as a regression algorithm, for example. In one embodiment, coefficients for the following curve may be obtained from regression of a data set comprising Ron values across different values for Vgs, w, and T:

$$Ron = Vgs^{k1} * w^{k2} * T^{k3} * C.$$

The width of a transistor needed for a given Ron may be obtained as follows:

$$W_{total} = \left[\frac{Ron}{Vgs^{k1}T^{k3}6^v}\right]^{1/k2}$$

The above equations may use a predefined gate length, for example. In one embodiment, a width of one device cell (e.g., M=1) may be used (e.g., w=200 um) and the data set may use different values of M (e.g., sweep Vgs, M, and T vs. Ron).

Figure 49B:
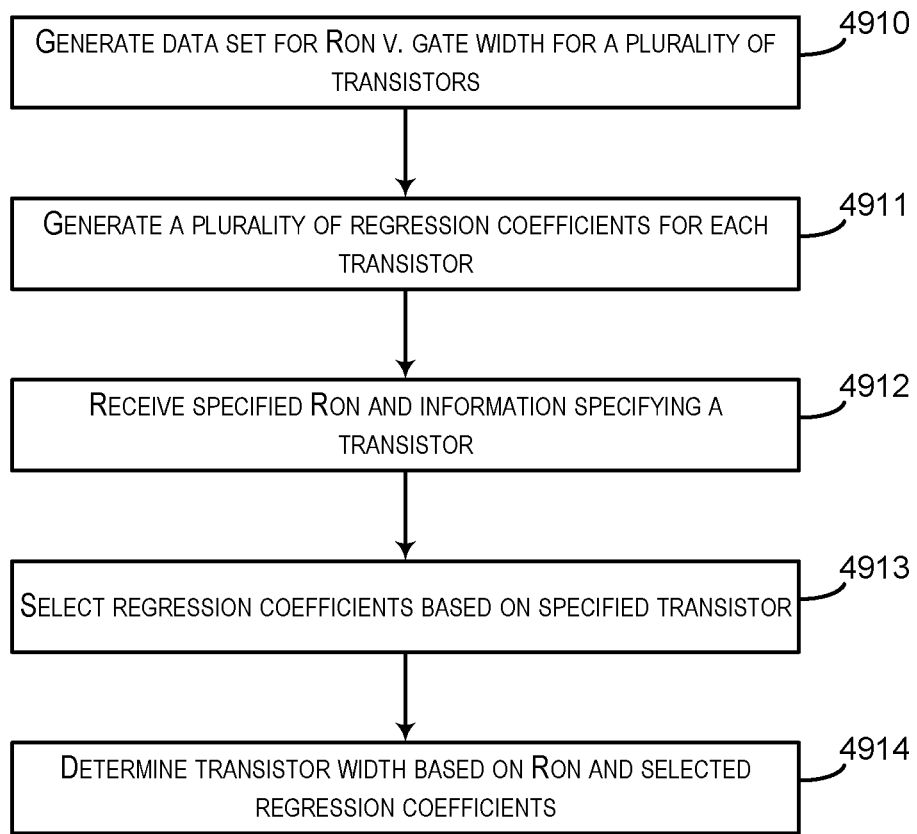
FIG. 49B illustrates an example method for converting specified values of on resistance (Ron) into gate widths according to an embodiment.

FIG. 49B illustrates an example method for converting specified values of on resistance (Ron) into gate widths (e.g., Wtotal) according to an embodiment. At 4910, data sets are generated for different values of gate width (w) resulting in different values of Ron for a plurality of transistor types. For example, various embodiments may determine values of Ron across gate widths and other transistor operating parameters, such as gate-to-source voltage (Vgs) and/or temperature (T), for example. Accordingly, different transistor types may have different corresponding data sets. For example, different transistor types (e.g., p-type, n-type, signal FET, or power FET) with different drain-to-source maximum voltages (Vds_max) and different gate-to-source maximum voltages (Vgs_max) may have different corresponding data sets. At 4911, a plurality of regression coefficients are generated for each transistor type. In one example embodiment mentioned above, the regression coefficients may comprise a Vgs coefficient (k1), a gate width coefficient (k2), a temperature coefficient (k3), and a constant (C). In some embodiments, the same regression equations and corresponding coefficients may be used across a plurality of transistor types, for example. At 4912, a value of Ron is received with information specifying a transistor type. For example, a generator software component may receive a value for Ron, a value for Vds_max, and a value for Vgs_max. The values for Vds_max, and Vgs_max may be used to select a particular transistor type (e.g., a 6v NMOS transistor) from a library of transistors, which may have Ron v. width data sets and coefficients as describe above. At 4913, regression coefficients may be selected based on the specified transistor type. At 4914, a transistor gate width may be determined based on the received value of Ron and the selected regression coefficients. The resulting gate width may be a total gate width, Wtotal, for example.

Figure 50:
FIG. 50 illustrates generating a transistor with a replica device 5001 according to an embodiment.
Figure 50:
Figure 50:
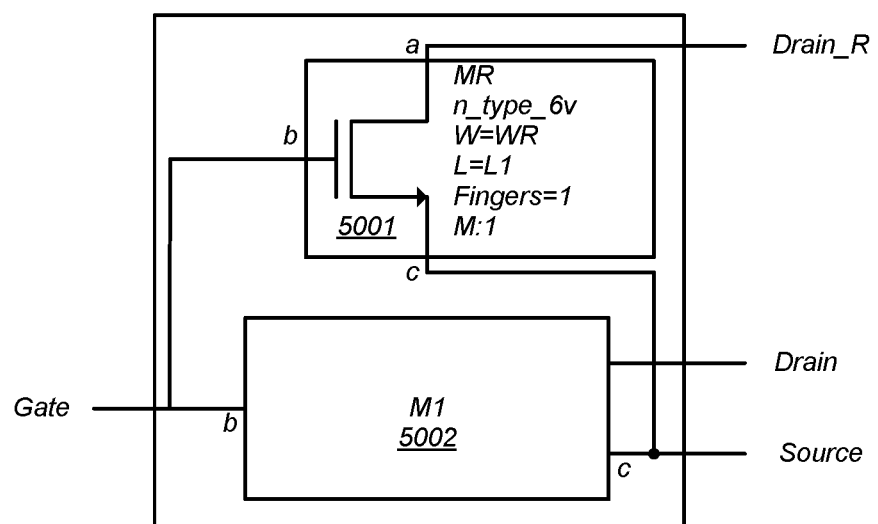

FIG. 50 illustrates generating a transistor with a replica device 5001 according to an embodiment. In this example, values for parameters (e.g., params_8) may specify that the transistor to be generated is to include a replica transistor (e.g., Replica=Yes). In this example, generator receives params_8 and generates a circuit specification comprising one Vds_max=6v NMOS transistor 5002 (e.g., "n_type_6v"), M1, having a width w=W4, length l=L1, number of fingers F=F3, and multiplier M=1. The circuit specification configures M1 to have a drain coupled to node a, a gate coupled to node b and a source coupled to node c. When a replica device is to be generate, the circuit specification further includes a replica transistor, MR, 5001 which in this example is the same device type as M1 (Vds_max=6v NMOS, here, "n_type_6v"). The length may be the same (l=L1) but the width and number of fingers may be different. In this example, the width is w=WR, number of fingers F=1, and multiplier M=1. In one example embodiment, the parameters may specify a replica gain. Accordingly, the generator may set a value for the width of the replica transistor to obtain the gain specified by the parameters, for example. For instance, if the replica gain is set to 1000:1, the ratio of the total width of M1 to the width of MR, Wtotal/Wreplica=1000/1.

Figure 51:
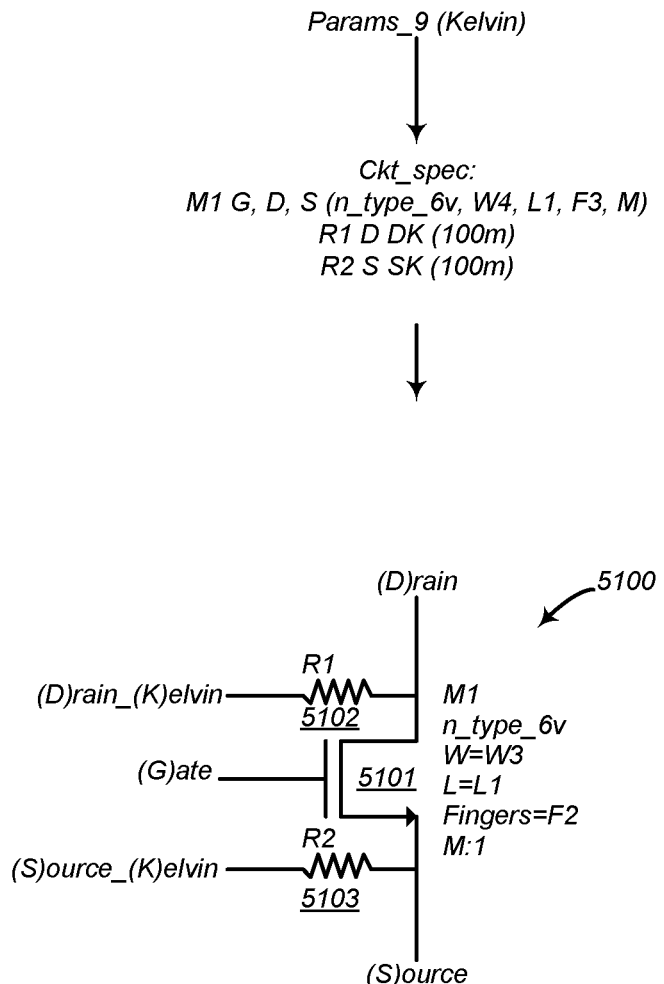
FIG. 51 illustrates generating a transistor with a Kelvin connection according to an embodiment.

FIG. 51 illustrates generating a transistor with a Kelvin connection according to an embodiment. In this example, values for parameters (e.g., params_9) may specify that the transistor to be generated is to include a Kelvin connection (e.g., Kelvin=Yes). In this example, generator receives params_9 and generates a circuit specification comprising one Vds_max=6v NMOS transistor (e.g., "n_type_6v"), M1, having a width w=W4, length l=L1, number of fingers F=F3, and multiplier M=1. The circuit specification configures M1 to have a drain coupled to node D (e.g., (D)rain), a gate coupled to node G (e.g., (G)ate) and a source coupled to node S (e.g., (S)ource). Additionally, the circuit specification is configured to produce additional terminals (e.g., (D)rain_(K)elvin, "DK" and/or (S)ource_(K)elvin, "SK") coupled to the drain and/or source along secondary conductive paths from points in the integrated circuit proximate to the drain and/or source, respectively. The secondary conductive paths may draw a very low current relative to current flowing along a primary conductive path (e.g., a path between the drain and circuitry connected to the D terminal or a path between the source and circuitry connected to the S terminal). Accordingly, the DK and SK terminals may sense voltage while minimizing current related voltage drops experienced along the primary conductive path between the drain and/or source and the S and D terminals, for example. In one example embodiment, generator may further include a resistor in the secondary conductive path (e.g., to further reduce current flowing in the secondary conductive path). Accordingly, in this example, the circuit specification includes a first resistor, R1=100 mOhms, coupled between nodes D and DK, and a second resistor, R2=100 mOhms, coupled between nodes S and SK. The circuit specification may be converted into transistor schematic 5100 including NMOS transistor 5101 and resistors 5102 and 5103 configured as shown. A layout may be generated from the transistor schematic, where the secondary path is coupled to the transistor in close proximity to either the drain or source, for example.

Figure 52A:
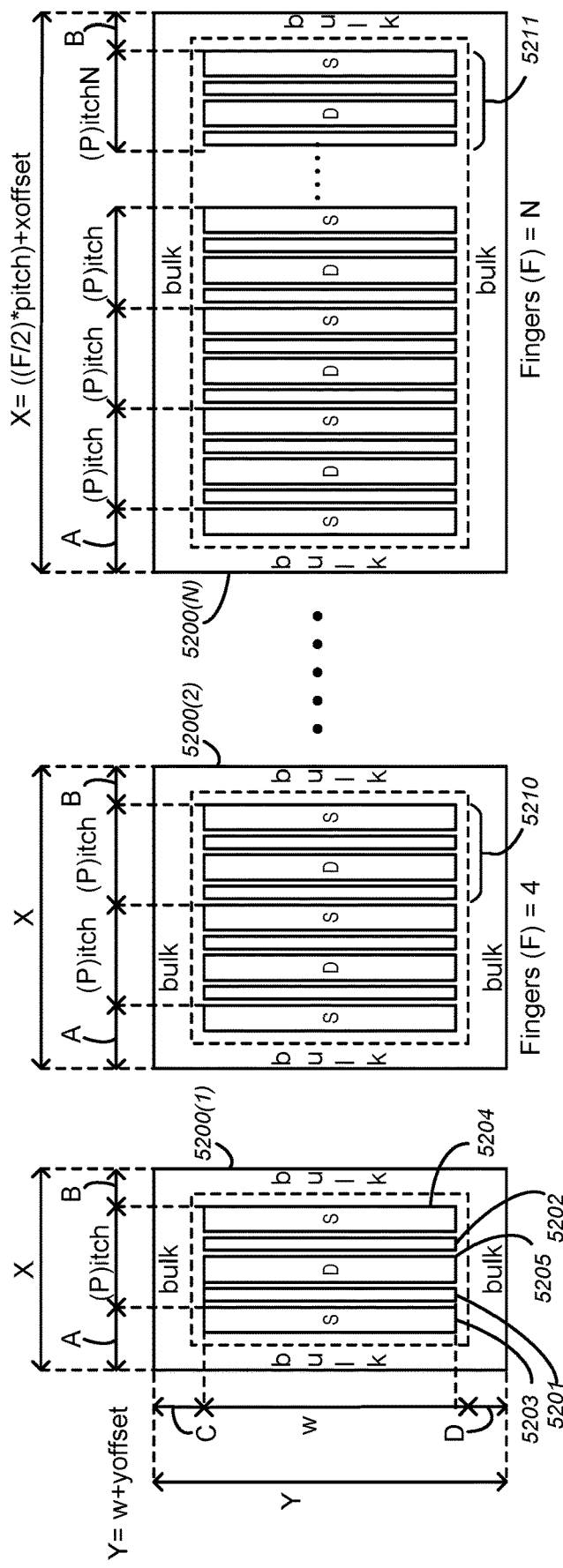
FIG. 52A illustrates an example of automatically generating layouts of a transistor according to an embodiment.

FIG. 52A illustrates an example of automatically generating layouts of a transistor according to an embodiment. FIG. 52A illustrates alternative layouts 5200(1)-5200(N) of a transistor with different numbers of fingers, F. Transistor layout 5200(1) includes two (2) fingers, which in this case is two gates 5201 and 5202 having width, w. Transistor layout 5200(1) further includes two (2) sources 5203 and 5204 and a single drain 5205. FIG. 52A illustrates that as the number of fingers changes, the x-dimension (e.g., horizontal) length of the transistor changes, but the y-dimension (e.g., vertical) length may not change. The total y-axis length of a transistor may be set by the transistor gate width, w, and layout structures above and below opposite edges of the gate, source, and/or drain structures. In this example, lengths C (above the gate/source/drain) and D (below the gate/source/drain), together with width, w, set the total y-axis length, Y. The number of fingers and other x-axis lengths may set the total x-axis length, X.

For instance, if F=4 fingers, an additional gate, drain, gate, and source segment may be added, thereby changing the length along the x-axis, but the length along the y-axis remains the same. For instance, the x-axis length may be a function of a first length, A, a second length (or pitch), p, and a third length, B (e.g., X=[(F/2)*(p)itch]+xoffset, where xoffset=A+B). The y-axis length may be a function of the unit gate width, Wunit, and lengths C and D (e.g., Y=w+yoffset, where yoffset=C+D) In one example embodiment, layout parameters for a Vds_max=6v NMOS transistor may be: (p)itch=3.3 um, xoffset=2.33 um, and yoffset=8.33 um. As the Vds_max increases, the xoffset and yoffset may be the same, but the pitch may increase. For instance, the following are example (Vds_max, P(pitch)) tuples for other NMOS transistors: [(12v, 4.1 um), (20v, 4.9 um), (24v, 5.3 um), (40v, 7.9 um)]. Length A may include various layout structures associated with a first edge of the transistor, such as bulk material, a first source configured along the first edge of the transistor, and other layout structures, for example. Length B may include various layout structures configured along a second edge of the transistor, such as bulk material and other layout structures. Lengths C and D may include various layout structures such as bulk materials and process specific setbacks, for example. Length (p)itch may include layout structures that repeat as additional figures are included in the circuit. For instance, when F=4, an additional segment 5210 may be included to produce layout 5200(2), which comprises a second gate/drain/gate/source. The x-axis length increases by another amount p, but A and B may remain constant. As illustrated in layout 5200(N), for F=N, A and B remain constant and there are N (p)itch lengths. It is to be understood that the layout structures may be different for different transistors, and thus, A, B, (p)itch, xoffset, and yoffset may be different for different transistors. However, the same type of transistors (e.g., n-type MOSFET, Vds_max=6v, Vgs_max=6v) may have the same layout structures and values for A, B, (p)itch, xoffset, and yoffset for different instances of the transistor. The example of FIG. 52A shows variation in x-axis length versus F for one y-axis length, which corresponds to the same gate width, w, for layouts 5200(1)-(N), for example.

FIG. 52A is useful in illustrating how attributes of a transistor in a transistor level schematic may be determined. As the unit width and number of fingers changes, different numbers of device cells (P) (e.g., 5200(1)-(N)) may be used to form a composite transistor. In one example embodiment, a total width, Wtotal, calculated from a specified Ron may be used to determine a number of fingers, F, for a given maximum unit width, Wunit max, a maximum number of fingers, Fmax, and P (number of device cells). For example, a number of fingers, F, may be calculated based on Wtotal, P=1, Fmax, and Wunit_max. If no solution is obtainable, then P may be increased. The number of device cells may be iteratively increased to successively larger number of device cells until a solution is found for F. The number of device cells may be limited to values capable of forming a two-dimensional array having a combined aspect ratio between 0.5 and 1 (e.g., rectangular). In one embodiment, the number of device cells may advantageously set to a perfect square (e.g., 1, 4, 9, 16, . . . ). Once the number of fingers F (F<Fmax) and number of device cells P are found for a given Wtotal and Wunit_max, the final width of each transistor may be determined for a specified ratio (X/Y or Y/X), for example.

In one embodiment, the unit gate width (Wunit), number of fingers (F), and the number of device cells (P) may be determined based on a maximum width and a maximum number of fingers. The maximum width (Wmax) and maximum number of fingers (Fmax) may be predefined values included in generator software or stored and received from an external storage location (e.g., a file or database). In one embodiment, generator software may determine the number of device cells (P) and the number of fingers (F) by increasing the number of device cells (P) across a plurality of increasing values to determine the number of fingers (F) obtainable based on each successively increasing current number of device cells (P), the maximum width (Wmax), and the maximum number of fingers (Fmax). This approach may advantageously result in the fewest number of device cells (P) and reduced circuit area.

For example, starting with a total width (Wtotal), generator software may iteratively increase the number of device cells (P) across a plurality of values. For the case of P=perfect square, P may be iteratively set to 1, 4, 9, etc. . . . . At each current value of P, the system may determine if the total width (Wtotal) is obtainable from a current value of P, the maximum width (Wmax), and the maximum number of fingers (Fmax). For example, for Wtotal=200,000 um, Wmax=200 um, and Fmax=120, P=1 results in F=Wtotal/(Wmax*P)=1000, which is greater than Fmax. Thus, the total width is not obtainable from the current value of P, Wmax, and Fmax. Accordingly, P is incremented to the next value (here, 4). For P=4, F=250, which is still greater than Fmax. Thus, P is incremented to the next value (here, 9). For P=9, F=111, which is less than Fmax. Accordingly, Wtotal=200,000 um is obtainable from P=9, F=111, and Wmax=200 um, and these values may be used to set the transistor attributes.

Features and advantages of the present disclosure may further include setting transistor attributes based on one or more layout parameters. For example, as mentioned above, a configurable aspect ratio of the device cells may be used to set the x-axis and y-axis lengths of the device cells, which may set a unit gate width, Wunit, for example. For instance, a length X along the x-dimension of the device cell may be determined based on the number of fingers (F) and predefined offset values (e.g., layout parameters for P(pitch) and xoffset)–X=((F/2)*pitch)+xoffset. As mentioned above, predefined offset values may be selected based on a transistor type (e.g., one or more of a dopant type, p-/n-type, Vdsmax, Vgsmax), and different transistor types may have different layout parameter values for pitch, xoffset, and yoffset, for example. Next, a length Y along the y-dimension of the device cell may be determined based on the length X and the aspect ratio (Y=AR*X, where AR is a programmable aspect ratio that may be encoded in the generator software or retrieved from an external storage location). Once the length Y of the cell is determined, a final unit gate width, Wunit, may be determined based on the length Y and a predefined offset value, yoffset–Y=Wunit+yoffset. In some embodiments, generator software may compare an area calculated based on the total width and length to an area calculated based on the final unit gate width (Wunit), number of device cells (P), and number of fingers (F). If the areas are within an acceptable margin of error, the design and various layout parameters may be validated, for example.

Figure 52B:
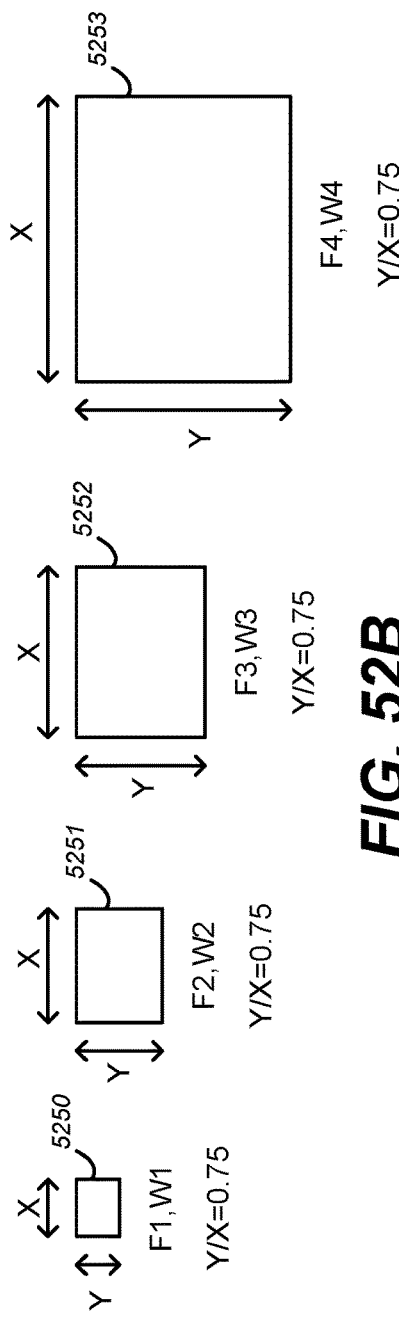
FIG. 52B illustrates that an aspect ratio of a transistor layout may change as the number of fingers increases.

FIG. 52B illustrates that an aspect ratio of a transistor layout may change as the number of fingers increases. In one example embodiment, changing the number of fingers may produce a change in the transistor device cell width to maintain an aspect ratio (e.g., either constant or within a range). Here, a device cell layout instance for a first device cell 5250 is generated having F=F1 fingers and a width w=W1 resulting in a Y/X ratio of 0.75. Another device cell layout instance 5251 may be generated having fingers F=F2 and a width w=W2 and a Y/X ratio of 0.75. Similarly, yet another device cell layout instance 5252 may be generated with a number of fingers F=F3 and width w=W3 while maintaining a Y/X ratio of 0.75. Finally, yet another device cell layout instance 5253 may be generated with a number of fingers F=F4 and width w=W4 with a ratio of 0.75. As mentioned above, the number of fingers may be used to determine a width of the transistor. Accordingly, in some example embodiments, as the number of fingers increases, the width of the transistor may also increase. Transistor device cells 5250-5253 are successively increasing. For a given transistor type, additional fingers may produce larger gate widths to maintain the aspect ratio at a particular value or within a range. For example, while an aspect ratio of 0.75 is shown here, it is to be understood that other rectangular aspect ratios may be used. In some embodiments, the aspect ratio may be programmable, for example. Various example embodiments may include aspect ratios greater than or equal to (>=) 0.5 and less than 1. Some embodiments may include aspect ratios from about ⅔rds to about ¾ths, for example. Additionally, while FIG. 52B illustrates an aspect ratio of Y/X, it is to be understood that an X/Y aspect ratio may also be used. Rectangular aspect ratios (e.g., X< >Y) may be advantageous to allow layout routines to manipulate one or more transistors to optimize placement and reduce area of a semiconductor circuit by allowing the system to rotate the layout of the transistor to fit into different available spaces on the layout, for example.

Figure 53A:
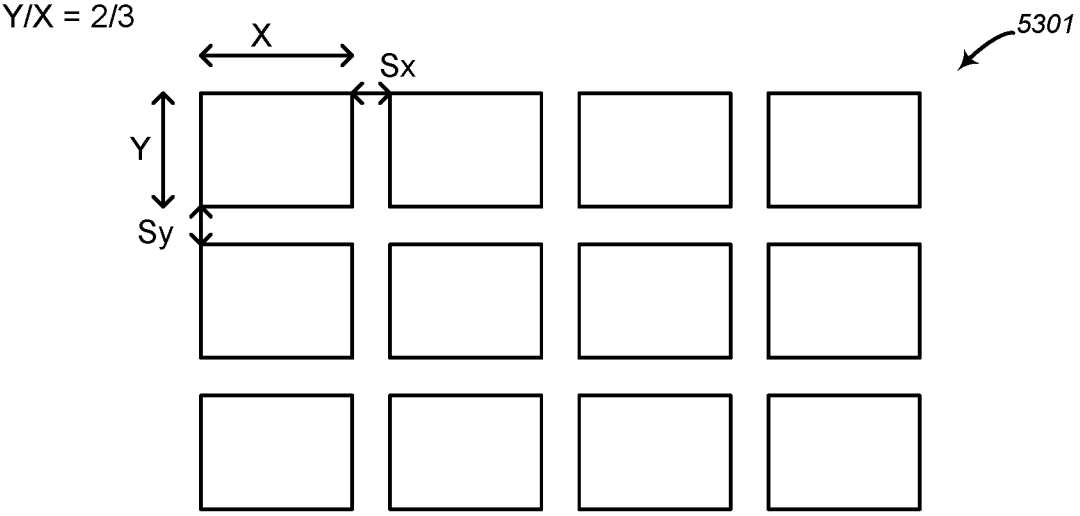
FIGS. 53A-B illustrate arrays of transistor device cell layout instances configured to form a transistor according to an embodiment.
Figure 53B:
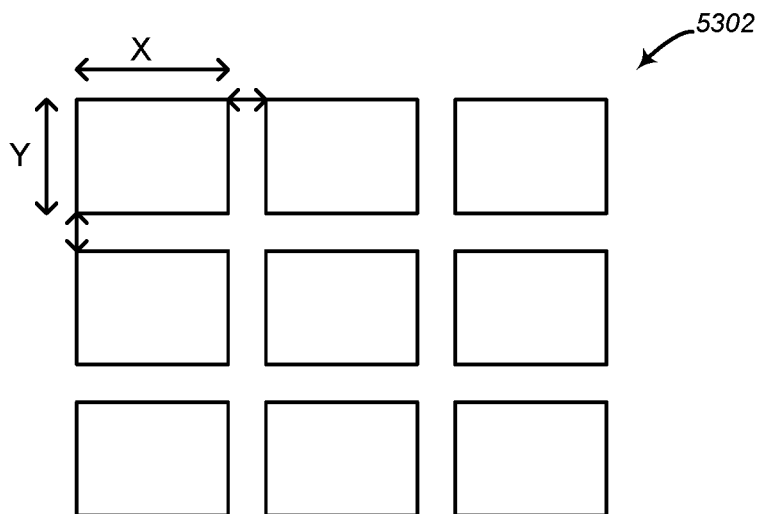

FIGS. 53A-B illustrate arrays of transistor device cell layout instances configured to form a transistor according to an embodiment. As mentioned above, transistor device cell layout instances illustrated in FIG. 52A, for example, may be combined in an M×N array (where M and N are integers) to form a single composite device (e.g., multiplier attribute M=P>1 or using P transistors with M=1 in parallel). FIG. 53A illustrates a 3×4 array 5301 having a ratio Y/X of ⅔rds, for example (drawing not to scale). The device cell layout instances may be spaced apart along the x-axis in even steps Sx and along the y-axis in even steps Sy. In some embodiments Sx and Sy may be the same.

FIG. 53B illustrates arrays of transistor device cell layout instances configured to form a transistor according to another embodiment. FIG. 53B illustrates an example where the number of device cells (P) is set to a perfect square (e.g., 1, 4, 9, 16, 25, 36, . . . ) to produce an N×N array. In this example, 9 device cell layout instances 5302 are configured in a 3×3 array having a ratio Y/X of ¾ths=0.75, for example (drawing not to scale). The cells may be spaced apart along the x-axis in even steps Sx and along the y-axis in even steps Sy, which may be the same as mentioned above.

The following is an example layout placement instruction for placing device cell layout instances for form a transistor:

placeFET x y xstep ystep #columns #rows

Where each transistor type may have unique layout parameter values used in the above layout placement instruction, for example. In the above layout placement instructions x and y are a location where the first device cell layout instance will be positioned. Additionally, "xstep" and "ystep" indicate offset for the position of the next layout instance along the x-axis and y-axis. Finally, the number of columns and rows may be specified. Based on the above disclosure, xstep, ystep, #columns, and #rows may be calculated and received by the layout placement instruction during execution, for example.

Figure 54:
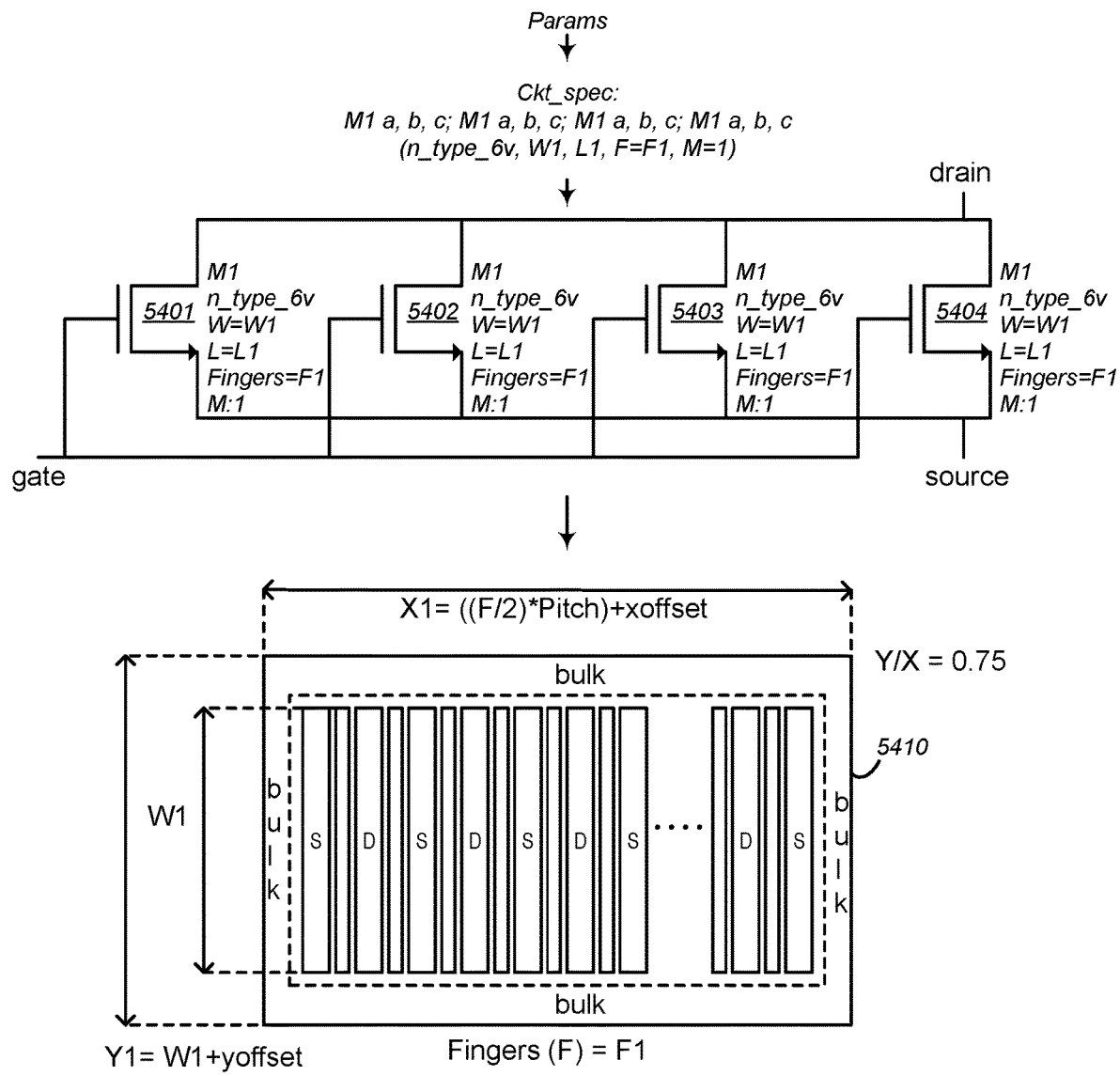
FIG. 54 illustrates generating a layout for a transistor according to one embodiment.
Figure 54:
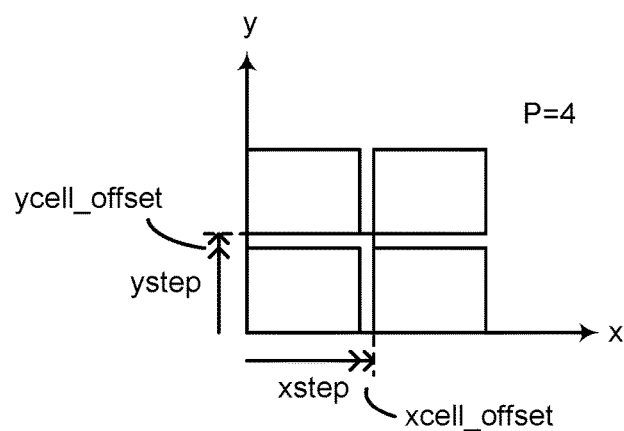

FIG. 54 illustrates generating a layout for a transistor according to one embodiment. In this example, received parameters are used to generate a circuit specification including four device cells (P=4), which are each n-type, Vds_max=6v, MOS transistors having a gate length w=W1, length l=L1, fingers F=F1, and multiplier M=1. The circuit specification is used to generate a transistor level schematic comprising transistors 5401-5404 configured in parallel. The schematic is used to generate a layout. Each transistor 5401-5404 may be automatically converted to a device cell layout instance 5410, for example. The device cell layout instances are automatically placed using layout placement instructions. For instance, a first device cell layout instance may be placed at a starting position (e.g., x=0, y=0 position of a layout environment). Device cell layout instance may be successively placed along the x-axis and y-axis based on an x-step and a y-step. The x-step is based on the x-axis length, X, plus an x cell offset ("xcell_offset"), and the y-step is based on the y-axis length, Y, plus a y cell offset ("ycell_offset").

Figure 55:
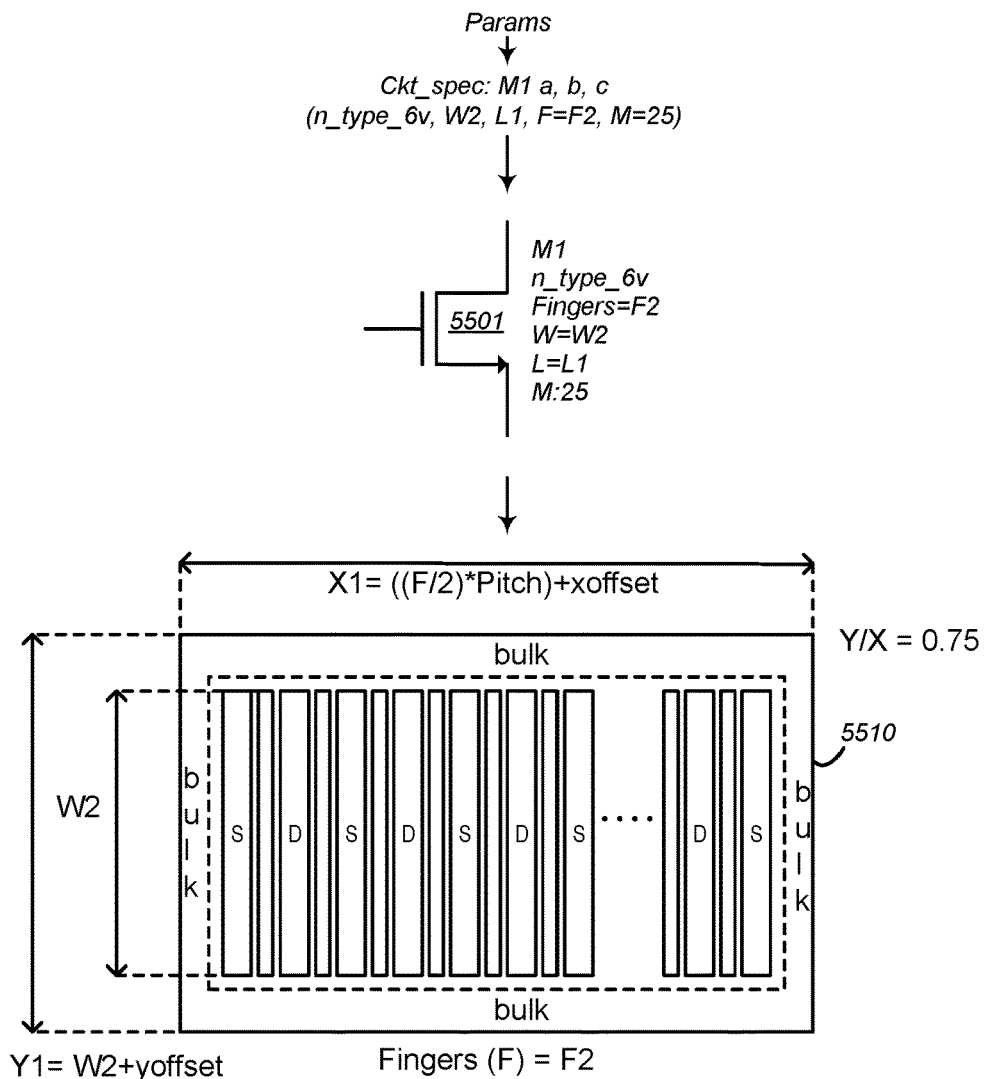
FIG. 55 illustrates generating a layout for a transistor according to one embodiment.
Figure 55:
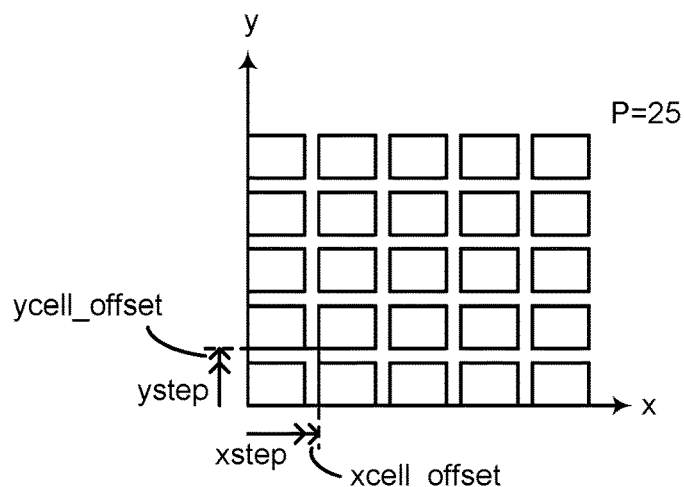

FIG. 55 illustrates generating a layout for a transistor according to one embodiment. In this example, received parameters are used to generate a circuit specification including an n-type, Vds_max=6v, MOS transistors having a gate length w=W2, length l=L1, fingers F=F2, and multiplier M=25 (aka, P=25 device cells). The circuit specification is used to generate a transistor level schematic comprising transistor 5501. The schematic is used to generate a layout. Transistor 5501 may be automatically converted to 25 device cell layout instances 5510, for example. The device cell layout instances are automatically placed using layout placement instructions. For instance, a first device cell layout instance may be placed at a starting position (e.g., x=0, y=0 position of a layout environment). Device cells may be successively placed along the x-axis and y-axis based on an x-step and a y-step. The x-step is based on the x-axis length, X, plus an x cell offset ("xcell_offset"), and the y-step is based on the y-axis length, Y, plus a y cell offset ("ycell_offset").

FIGS. 54 and 55 illustrate examples where the number P is set to a perfect square as mentioned above.

Figures 56A, 56B:
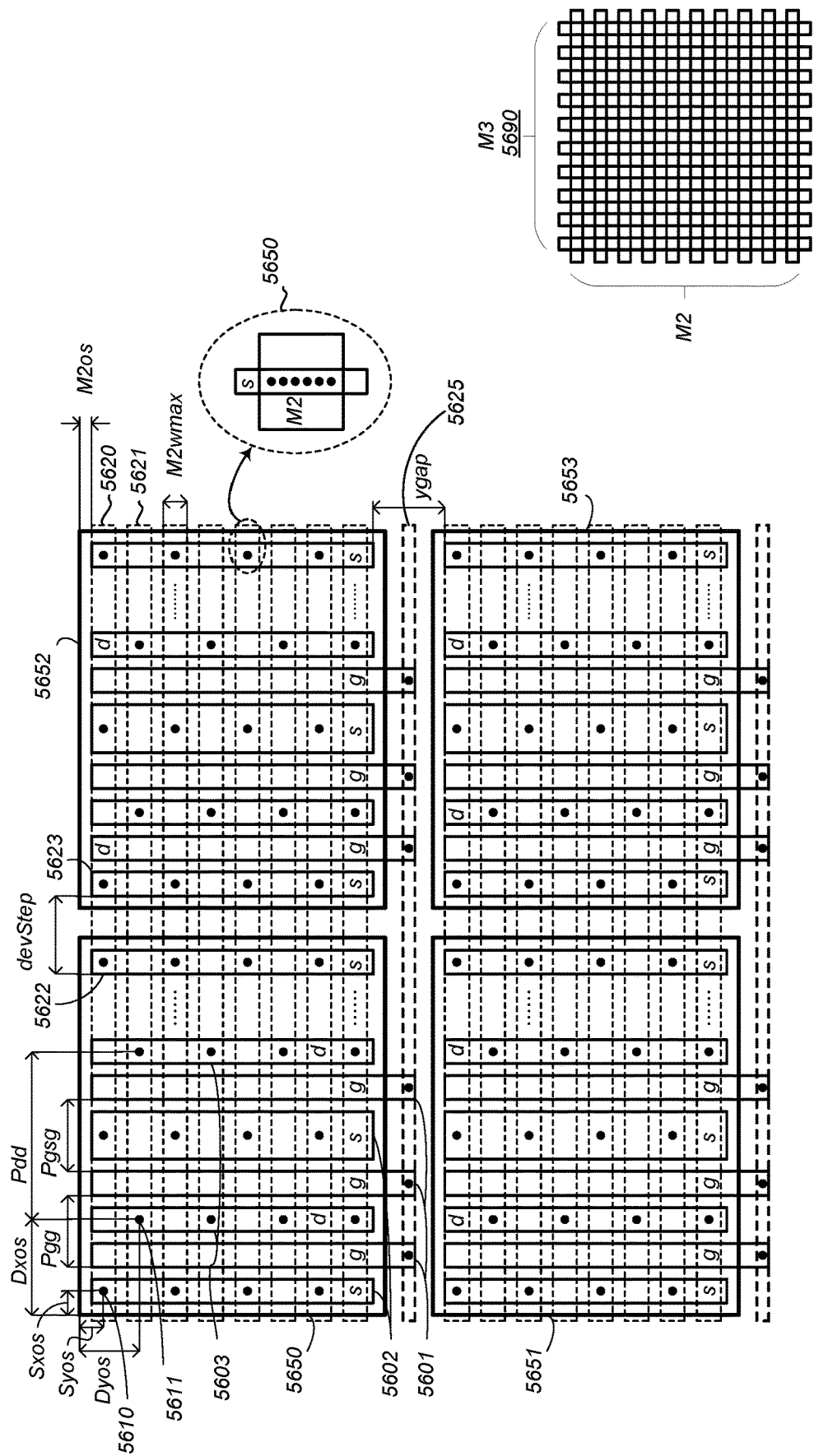
FIG. 56A illustrates automatic placement of layout instances to form a transistor according to an embodiment.
FIG. 56B illustrates vertical strips of metal layer 3 according to an embodiment.

Features and advantages of some embodiments of the present disclosure may include automatic placement of layout instances (e.g., polygons) to form a layout of a transistor. For example, FIG. 56A illustrates automatic placement of layout instances to form an MOS transistor. In this example, the number of device cells, P, is equal to 4, and the resulting layout includes a 2×2 array of transistor device cell layout instances 5650-5653. Cells 5650-5653 each comprise a plurality of sources (s) (e.g., source 5602), gates (g) (e.g., gate 5601), and drains (d) (e.g., drain 5603) configured in parallel as vertical strips. The automatic placement of the device cell layout instances used to form a complete layout of the transistor may be based on a plurality of parameters, which some of which may be selected based on the transistor type and others which may be calculated. For example, different transistor types may select different stored parameters for performing automatic layout using layout placement instructions. For instance, automated layout for an NMOS transistor having Vgs_max=6v, Vds_max=12v may select different stored layout parameters, perform different placement calculations, and execute a different layout algorithm than a NMOS transistor having Vgs_max=6v, Vds_max=6v, for example. Accordingly, automatic layout of a transistor may include selecting layout parameters based on a transistor type. Once the layout parameters are selected, additional parameters may be calculated by running custom scripts for the transistor type. The selected and calculated parameters may be included as parameters for layout placement instructions to dynamically build the particular transistor. For example, source, drain, and gate dimensions and placement locations may be determined from the transistor attributes (e.g., w, l, F, M, described above) and layout elements (e.g., polygons) may be positioned in the layout automatically based on the selected and calculated parameters, for example. As illustrated in FIG. 56A and as mentioned above, the selected parameters may include a plurality of offsets for placing particular layout elements in predefined positions, such as initial positions or initial positions adjusted by a pitch, for example.

FIG. 56A illustrates automatic layout of metal layers according to an embodiment. The present example illustrates stored and calculated parameters according to an embodiment. In this example, a plurality of metal layers are configured in horizontal strips covering the array of device cell layout instances, such as horizontal metal layers 5620 and 5621. Metal layers 5620-5621 are sometimes referred to as "Metal 2," which may be a second layer of metal above a polysilicon layer, for example. The metal layers may have a width set to a stored parameter for metal 2 maximum width ("M2wmax"). In some processes, when a metallization width exceeds a certain predefined value, slots may be required to be inserted (e.g., to relieve stress). M2wmax width may be set just below a width where slots are required. In another embodiment, the slot width may be stored and M2wmax may be calculated by a custom layout placement script as the slot width less some predetermined amount, for example. A layout placement script may further determine the number of horizontal metal strips that may fit across a particular row of cells based on the gate width of the transistor, for example. An initial M2 strip may be placed at an offset M2os below an upper edge of the cell (or equivalent initial reference) and the calculated number of horizontal M2 strips having width M2wmax may be successively placed (e.g., separated by a predefined gap which may be a process dependent stored parameter). FIG. 56A further illustrates a gate metallization 5625 configured between rows of device cells. The device cells may be separated by another stored parameter "ygap," and M2 gate metal 5625 may be configured in the center of the gap, for example. Embodiments of the present disclosure may further illustrate the automatic placement of vias (e.g., via 5610) connecting M2 to underlying structures in a layout according to an embodiment. In this example, source, drain, and gate vias to M2 strips may be automatically placed based on the one or more of stored parameters for the transistor, attributes of the transistor (e.g., gate width), and/or offsets. For example, one or more initial source vias 5610 may be placed based on a source y-axis offset (Syos) and a source x-axis offset (Sxos). Additional source vias may placed at predefined steps (e.g., x-axis pitch lengths and y-axis pitch lengths based on M2wmax) from the initial placement position. Similarly, one or more initial drain vias 5611 may be placed based on a drain y-axis offset (Dyos) and a drain x-axis offset (Dxos). Additional drain vias may placed at predefined steps from the initial placement position. Likewise, gate vias may couple gates 5601 to M2 gate metal 5625 according to gate steps. In this example, a gate-to-gate pitch (Pgg), a gate-source-gate pitch (Pgsg), and drain-to-drain pitch (Pdd) may be stored parameters. In this example, a source between pairs of gates may have a greater x-axis length, and thus a Pgsg dimension may be used for properly positioning layout elements of the transistor, for example. As can be seen, source vias start at an initial value (e.g., based on Sxos and Syos) and repeat along the x-axis and y-axis across each cell. Similarly, drain vias start at an initial value (e.g., based on Dxos and Dyos) and repeat along the x-axis and y-axis across each cell. A devStep parameter may be stored and retrieved for a particular transistor type to set the x-axis distance between a last source 5622 in one cell and a first source 5623 in an adjacent cell, for example, so that layout elements may repeat across cells along the x-axis. Similarly, y-gap and a width of the device may be used to offset positions of layout elements across cells along the y-axis, for example. FIG. 56A also illustrates that for each connection point 5610, a plurality of vias may be placed. As illustrated at 5650, M2wmax may be used to calculate a number of vias that may be automatically placed at an intersection of a M2 strip and a source, gate, or drain, for example. In one embodiment, the horizontal edges of the M2 strip and the vertical edges of a source, gate, or drain may have a setback process parameter. M2wmax may have 2*setback subtracted off and the remaining distance used to calculate a number of vias that may be placed in series as illustrated at 5650, for example. Finally, FIG. 56B illustrates vertical strips of metal layer 3 5690 above M2, which may be used to connect M2 sources, M2 drains, and M2 gates, for example.

Automated Layout of Integrated Circuits

Features and advantages of various embodiments of the present disclosure may further include automated generation of layouts for integrated circuits. In some example embodiments, transistor level schematics may have associated layout scripts. When the schematic is converted to a layout (e.g., in an EDA tool), the layout script associated with the schematic may be used to position layout instances generated from the schematic. Example embodiments of the present disclosure may include layout scripts customized for each transistor level schematic to automatically produce a concise efficient layout for the circuit.

Figure 57:
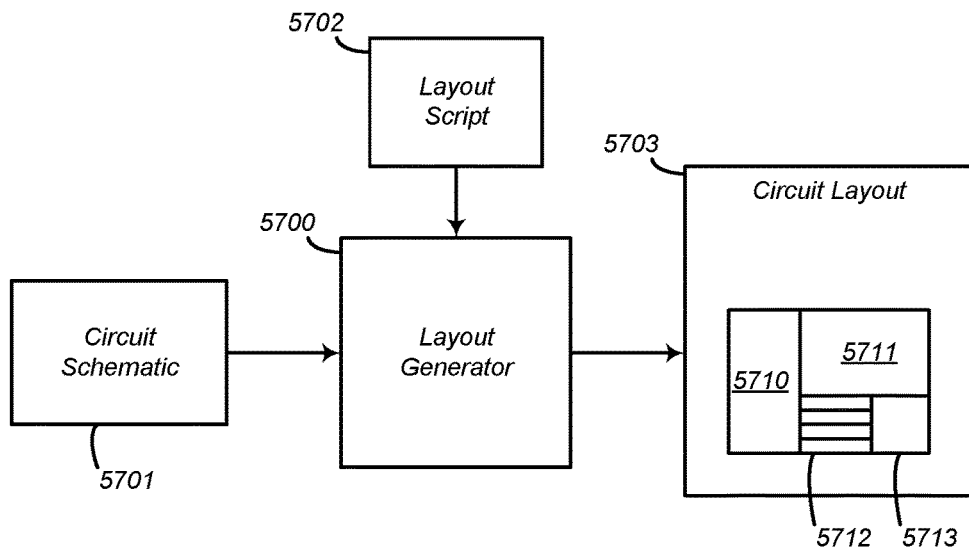
FIG. 57 illustrates generating a layout according to an embodiment.

FIG. 57 illustrates generating a layout according to an embodiment. Here, a layout generator software component 5700 converts a circuit schematic 5701 into a plurality of layout instances (e.g., instances 5710, 5711, 5712, 5713) to form a circuit layout 5703. The circuit schematic 5701 may define transistor level circuitry for an analog or mixed signal circuit, for example. Layout generator 5700 may produce layout instances (e.g., polygons) for various circuit components in circuit schematic 5701. Initially, the layout instances may be scattered and not optimally configured based on connectivity, circuit performance, and to conserve area, for example. Advantageously, layout generator 5700 may receive a layout script 5702 associated with the circuit schematic 5701. In one embodiment, the layout script 5702 may be customized and predefined for the particular circuit schematic to optimize layout, for example. As described in more detail below, layout script 5702 may comprise a set of instructions for automatically placing layout instances generated from the circuit schematic 5701. As illustrated in layout 5703, execution of the layout script 5702 (e.g., by a computer system) may result in the positioning of the plurality of layout instances (e.g., instances 5710, 5711, 5712, 5713) to produce the circuit layout 5703.

In various embodiments, the layout instances may correspond to a variety of components from a circuit schematic, and in some cases, additional structures added to the layout that may be useful for the operation of the circuit when the circuit is implemented in a semiconductor, for example. In one example embodiment, the layout instances may be predefined layouts for sub-circuit schematics as mentioned above (e.g., predefined layouts associated with a comparator, an amplifier, an oscillator, a bandgap circuit, a current mirror, a transistor layout, such as a signalFET or powerFET layout, or a wide variety of other analog or mixed signal circuits). Accordingly, a layout script may include a reference to a library (e.g., a library name) where one or more layout instances are stored (e.g., a library where one or more predefined layouts for the circuit schematic are stored). In other example embodiments, the layout instances may be passive layout components, such as resistor layout components or capacitor layout components, for example. Advantageously, in certain example embodiments, the layout script produces a particular placement for each of the plurality of layout instances generated from circuit schematic 5701 and may further incorporate and automatically position additional layout structures (e.g., vias, guard rings, bulk connections). Accordingly, in some example embodiments, all the layout instances used to form a circuit layout (e.g., and a mask) may be automatically positioned to produce a circuit layout.

Figure 58:
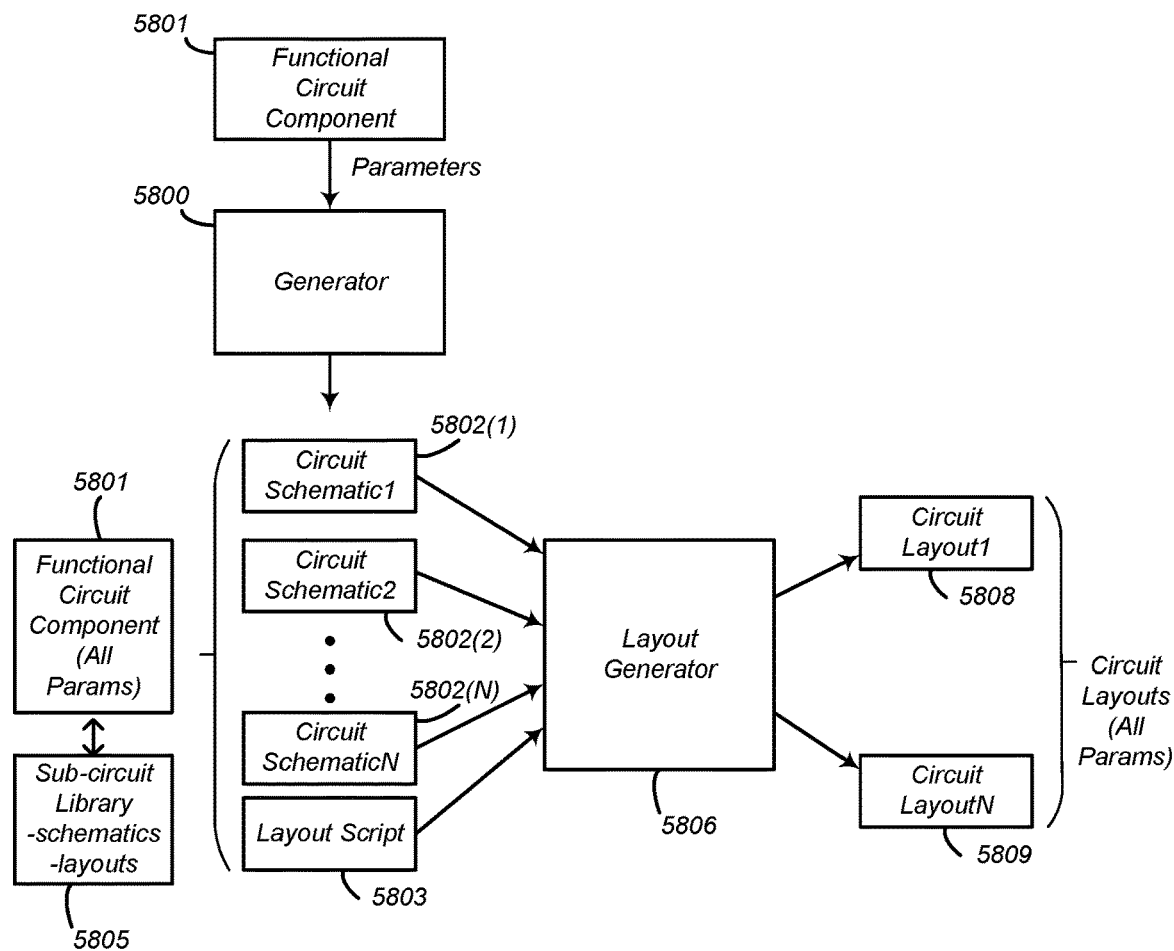
FIG. 58 illustrates an example system including an automated layout generator according to an embodiment.

FIG. 58 illustrates an example system including an automated layout generator according to an embodiment. Here, a functional circuit component 5801 may be configured to generate a plurality of circuit schematics that perform a common circuit function. For example, functional circuit component 5801 may be used to generate circuitry for any one of a comparator, oscillator, amplifier, current mirror, gm circuit, voltage to current converter, voltage buffer, or a wide range of other analog or mixed signal circuit functions. A particular functional circuit component 5801 may implement a particular function (e.g., a voltage to current converter) according to a variety of parameters (e.g., input device type, gain, clamping, etc. . . . ). Generator software 5800 may receive the parameter values and generate a netlist to produce circuit schematic 5802(1) as described above. Generator 5800 may produce a plurality of different circuit schematics 5802(1)-(N) in response to receiving various combinations of parameter values, for example. Based on different parameter values, a functional circuit component may produce circuit schematics for oscillators, amplifiers, etc. . . . having different characteristics. As described above, circuit schematics 5802(1)-(N) may be generated from predefined sub-circuit schematics, which may be stored in a library 5805. Library 5805 may store sub-circuits schematics and sub-circuit layouts to produce circuit schematics and layouts for functional circuit component 5801 across different parameter values, for example.

Features and advantages of some embodiments of the present disclosure further include generator 5800 producing a layout script 5803. Layout script 5803 may be associated with one or more of the plurality of circuit schematics 5802(1)-(N), which may perform a common function and be generated from different values of the same parameters. In some embodiments, layout script 5803 is configured to position layout instances for each of the plurality of circuit schematics. For example, in FIG. 58 a single layout script 5803 is configured to produce a layout for multiple circuit schematics 5802(1)-(N). In some embodiments, the layout script may perform a plurality of placement operations on layout instances from different circuit schematics (e.g., placement operations on layout instances from schematic 5802(1) and other placement operations on other layout instances from schematics 5802(2)-(N)). As described in various examples below, the placement operations on layout instances corresponding to circuit schematic 5802(1) may be executed (e.g., when circuit schematic 5802(1) is generated and converted to a layout) and placement operations on layout instances corresponding to other circuit schematics are not executed (e.g., when circuit schematic 5802(1) is generated and converted to a layout). As but one example, if a particular circuit schematic is converted to produce a layout instance XU1 and another circuit schematic is converted to produce a layout instance XU2, a layout script may include placement operations on both XU1 and XU2, but the placement operation may only be executed on a layout instance if it exists in the layout canvas. Accordingly, in some embodiments, a single layout script may include placement operations that are only executed when particular circuit schematics are being converted to layouts, for example.

Layout generator 5806 may receive layout script 5803 and any circuit schematic 5802(1)-(N) and generate corresponding layouts. Here, layout generator 5806 receives layout script 5803 and circuit schematic1 5802(1) and produces layout 5808. Similarly, layout generator 5806 receives layout script 5803 and circuit schematicN 5802(N) and produces layout 5809. Layouts for any of circuit schematics 5802(1)-(N) may be similarly generated automatically, for example.

While the presently described automated layout techniques may be applied on a system described in FIG. 58 and other parts of the present disclosure, it is to be understood that these techniques may be used to convert schematics into layouts in an EDA environments using an EDA tool, for example.

Figure 59:
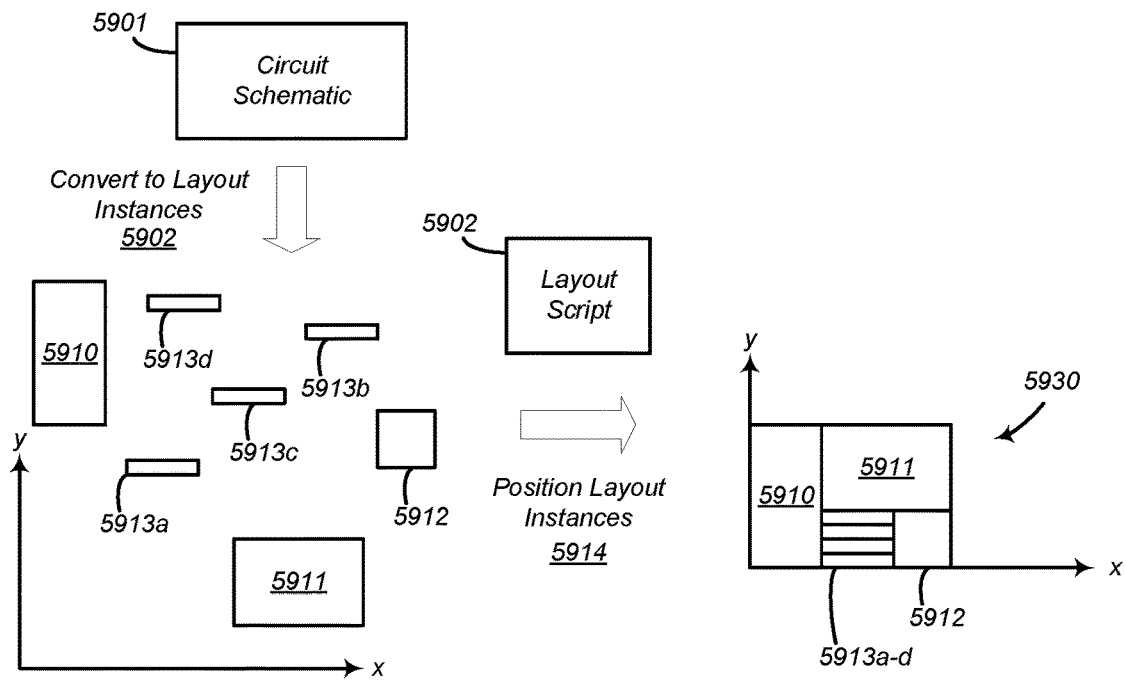
FIG. 59 illustrates converting circuit schematics to layout instances and generating a layout according to an embodiment.

FIG. 59 illustrates converting circuit schematics to layout instances and generating a layout according to an embodiment. In this example, circuit schematic 5901 is converted to layout instances 5910-5913 at 5902. In various embodiments, layout instances may correspond to different components in a circuit schematic. For example, layout instances may correspond to passive layout components, such as resistor layout components or capacitor layout components. In this example, layout instances 5913a-d may be resistor layout segments corresponding to a plurality of resistor segments in circuit 5901 configured to produce one total resistor value, Rtotal, for example. In other examples below, layout instances may be capacitor layout segments corresponding to a plurality of unit capacitors in a circuit schematic configured to produce one total capacitance value, Ctotal, for example. As mentioned above, different parameterized instances of circuit schematic 5901 may comprise different predefined sub-circuit schematics. In this example, layout instances 5910, 5911, and 5912 are three (3) predefined sub-circuit schematic layouts. It is to be understand that any one or more components in a circuit schematic 5901 may be converted to a layout instance and positioned according to the techniques described herein.

Initially, layout instances may be placed in a layout environment in a non-optimal manner (e.g., scattered across a canvas). Layout script 5902 may position the layout instances at particular positions to produce a more optimal layout. In this example, layout script 5902 positions the layout instances at 5914 into particular positions to produce layout 5930. Advantageously, layout script 5902 may be customized so that each layout instance from one or more corresponding circuit schematics may be automatically placed in any position to produce an optimized layout, for example.

While the example shown in FIG. 59 and in further example below illustrates layout instances being initially positioned on a layout canvas before final positioning by a layout script, it is to be understood that layout instances may be directly placed in final customized positions by the layout script without such an initial placement on the canvas.

Figure 60:
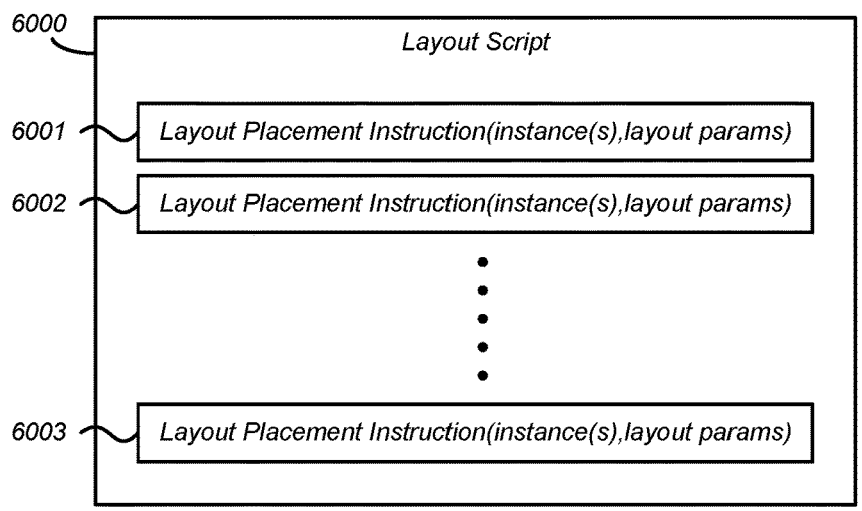
FIG. 60 illustrates a layout script according to an embodiment.

FIG. 60 illustrates a layout script according to an embodiment. Features and advantages of some embodiments may include layout scripts comprising a plurality of layout placement instructions. Layout placement instructions may specify a placement location (e.g., in a layout environment) for one or more corresponding layout instances. Accordingly, the layout placement instructions may advantageously be used to position one or more of the layout instances. In this example, layout script 6000 includes a plurality of layout instructions 6001-6003. Layout placement instructions 6001-6003 may comprise code for implementing particular functions corresponding to each layout placement instruction. The code may be implemented as a script, for example, such as a script in an EDA environment (e.g., a Skill Script in Cadence®). In this example, the layout placement instructions may operate on one or more instances. Additionally, the layout placement instructions may receive layout parameters to control the various operations performed on the layout instances, for example.

In various embodiments, script 6000 may include a plurality of layout placement instructions 6001-6003, and a subset of the layout placement instructions may include a reference to a particular layout instance. As illustrated in various examples below, in some embodiments the reference is a cell name (e.g., place <cell_name>). In other embodiments, the reference is an instance name (e.g., place <instance_name>). In some applications multiple layout instances may have the same cell name but have different instance names. Accordingly, the layout placement instructions may be advantageously crafted for different scenarios where placement based on cell names or placement based on instance names may be more efficient.

A variety of example layout placement instructions are shown in further detail below.

Figure 61:
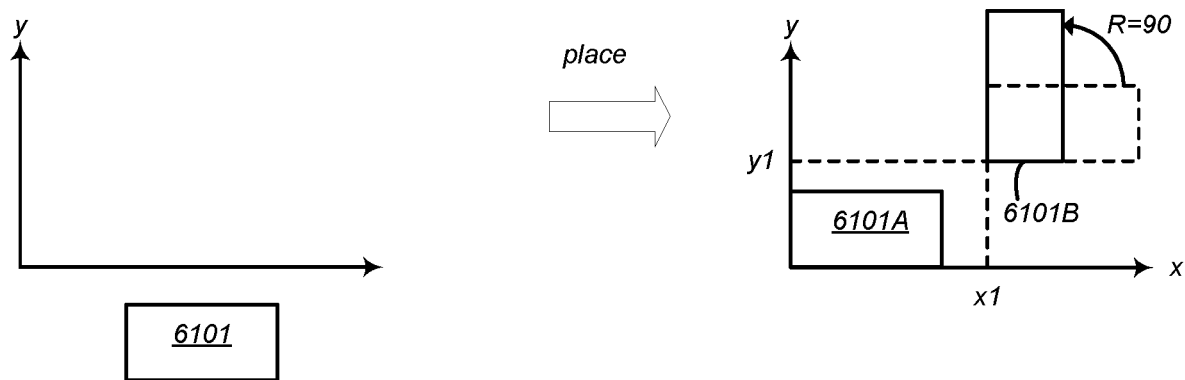
FIG. 61 illustrates an example placement operation of a layout placement instruction according to an embodiment.

FIG. 61 illustrates an example placement operation of a layout placement instruction according to an embodiment. In some embodiments, one or more layout placement instructions specify a particular layout instance, an x-axis coordinate, and a y-axis coordinate for positioning the particular layout instance. In this example, a layout instance 6101 is placed at the (x,y) coordinates (0,0) as illustrated at 6101A (e.g., "place <cell_name>0 0"). Alternatively, layout instance 6101 may be placed at another (x,y) coordinate (x1,y1) as illustrated at 6101B (e.g., "place <cell_name>x1 y1"; where x1 may be a first specified value and y1 may be a second specified value). FIG. 61 also illustrates another feature of some embodiments, wherein one or more layout placement instructions further specify a rotation of the particular layout instance. In this example, a layout placement instruction may rotate layout instance 6101B by 90 degrees (e.g., place <cell_name>x1 y1 90). In some embodiments, it may be advantageous for a layout placement instruction to further specify a library name where the particular layout instance is stored. For example, a library where the predefined sub-circuit layout instances are stored may be included as a parameter in a layout placement instruction (e.g., place <library_name> <cell_name>0 0 0"; may place a particular cell from a particular library at (x,y)=(0,0) with 0 rotation).

Figure 62:
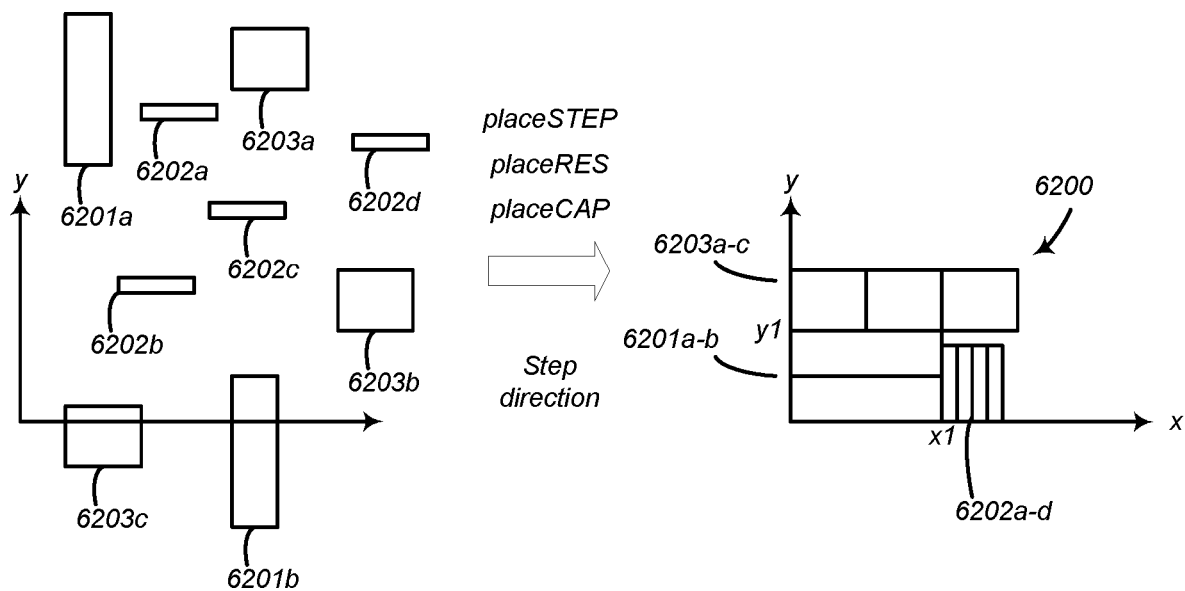
FIG. 62 illustrates further examples of generating a layout according to further embodiments.

FIG. 62 illustrates further examples of generating a layout according to further embodiments. In some embodiments, a layout placement instruction may position multiple layout instances. The example shown in FIG. 62 is illustrative. Here, multiple layout instances for the same type of cell (e.g., with different instance names) may be placed with a single layout placement instruction. In this example, layout instances 6201a-b correspond to a first layout instance type (e.g., one predefined sub-circuit layout or passive component), layout instances 6202a-d correspond to a second layout instance type (e.g., resistor layout components), and layout instances 6203 a-c correspond to a third layout instance type (e.g., capacitor layout components).

In one embodiment, layout instances 6201a-b may be placed with a single layout placement instruction. For example, the following instruction may place both layout instances with placement beginning at a starting position and then at another position defined by a step: "placeSTEP<cell_name>x y step stepdirection rotation". This example layout placement instruction illustrates multiple features that may be included in various embodiments. First, a first layout instance <cell_name> may be placed at a particular (x,y) coordinate, and successive layout instances having the same <cell_name>, for example, are placed in positions offset from the specified (x,y) coordinate by an amount "step". Further, the step direction may be specified in the layout placement instruction (e.g., +x, −x, +y, or −y). Finally, a rotation is included in this example layout placement instruction. Thus, execution of the following layout placement instruction may result in layout instances 6201a-b being positioned starting at (0,0) and then at "0+<cell_width>" along the +x direction with a 90 degree rotation: "placeSTEP <cell_name_6201>0 0<cell_width_6201>x90", where <cell_name_6201> is the cell name and <cell_width_6201> is the width (here, length along the x-axis) of layout instances 6201a-b. Similarly, layout instances 6202a-d may be successively placed starting at (x1,0) using the single layout placement instruction and 6203a-c may be successively placed starting at (0,y1) using the single layout placement instruction. In some example embodiments, resistors may have a dedicated layout placement instruction (e.g., placeRES) and capacitors may have a dedicated layout placement instruction (e.g., placeCAP), both of which are described in more detail below.

Figure 63A:
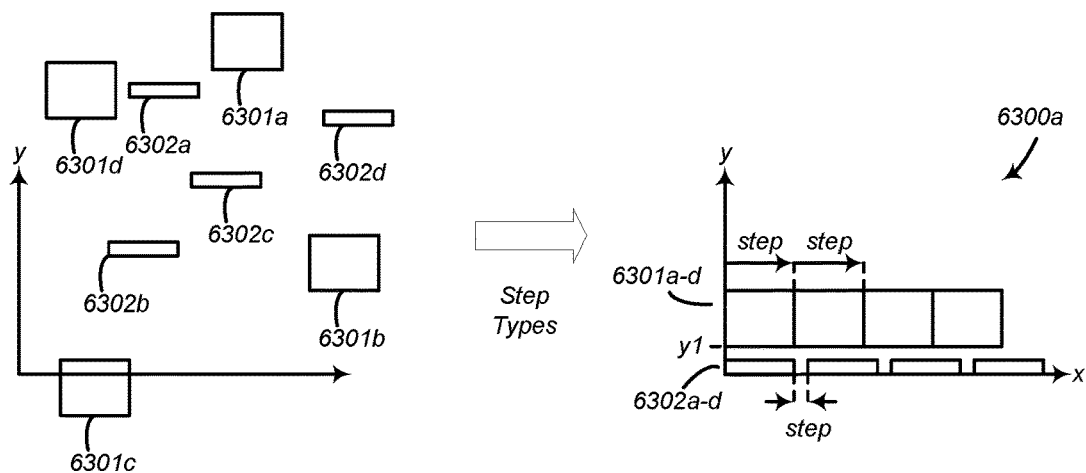
FIG. 63A illustrates example types of steps that may be used in various layout placement instructions according to various embodiments.

FIG. 63A illustrates example types of steps that may be used in various layout placement instructions according to various embodiments. FIG. 63A illustrates that layout instances 6301a-d may be stepped differently than layout instances 6302a-d. For example, in one embodiment, a step may specify a distance between adjacent boundaries of layout instances. This is illustrated at 6300a where layout instances 6302a-d are placed at positions starting at (0,0) and successively along the +x axis with a distance, step, between the vertical sidewall boundary of each layout instance. In this case, the layout placement instruction may position each layout instance based on the sum of the step value specified in the instruction and a length of the layout instance along one axis (e.g., here, the x-axis). Specifying a distance between adjacent layout instances may be advantageous for layout instances that may vary in size, such as for resistor layout components or capacitor layout components, for example.

Alternatively, a step may specify a pitch, where successive placements are positioned at an initial position plus the pitch (e.g., x=xinit+(i*pitch)). Accordingly, some layout placement instructions may set the step to be greater than or equal a length of a boundary along a first axis of the subset of layout instances to be positioned. In FIG. 63A, layout instances 6301a-d have step set to a length along the x-axis and each layout instance is placed such that adjacent vertical boundaries are touching. This step type may also be used to set a space between each layout instance, for example.

Figure 63B:
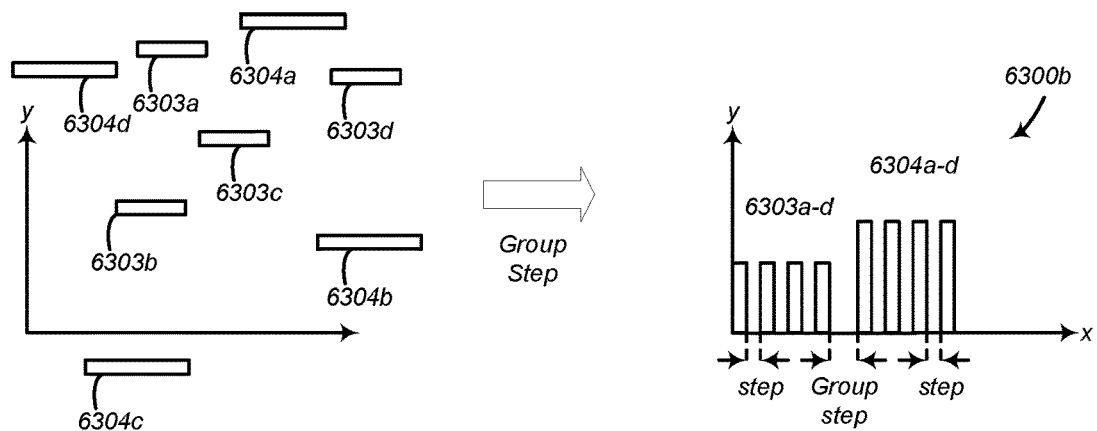
FIG. 63B illustrates another parameter used in some layout placement instructions according to an embodiment.

FIG. 63B illustrates another parameter used in some layout placement instructions according to an embodiment. In some embodiments, a single layout placement instruction may be used to place multiple groups of layout instances (e.g., multiple subgroups of resistor layout segments). In this example, layout placement instances comprise at least a first subgroup of layout placement instances 6303a-d and a second subgroup of layout placement instances 6304a-d. A layout placement instruction may specify a step between layout instances in the first and second subgroups. In some embodiments, the subgroups may have different names (e.g., resistor layout instance names or cell names) and the layout placement instruction may position layout instances in the same group using a first space (or step) and the layout placement instruction may position the two subgroups such that there is a second space (or step) between the two groups, for example. In this example, a layout placement instruction may successively position layout instances 6303*a-d* beginning at (0,0) separated by "step" along the x-axis. Layout instances 6304*a-d* are then successively positioned beginning a position along the x-axis separated from an adjacent boundary of the last layout instance of group 6303*a-d* by a "group step". Layout instances 6304*a-d* are then successively positioned separated by a "step." An example layout placement instruction for placing resistor layout instances is as follows: placeRES x y step_btwn_same_name_res step_btwn_diff_name_res rotation directionx directiony distance. Further discussion of the "distance" feature is discussed in more detail below in connection with FIG. 63C.

Figure 63C:
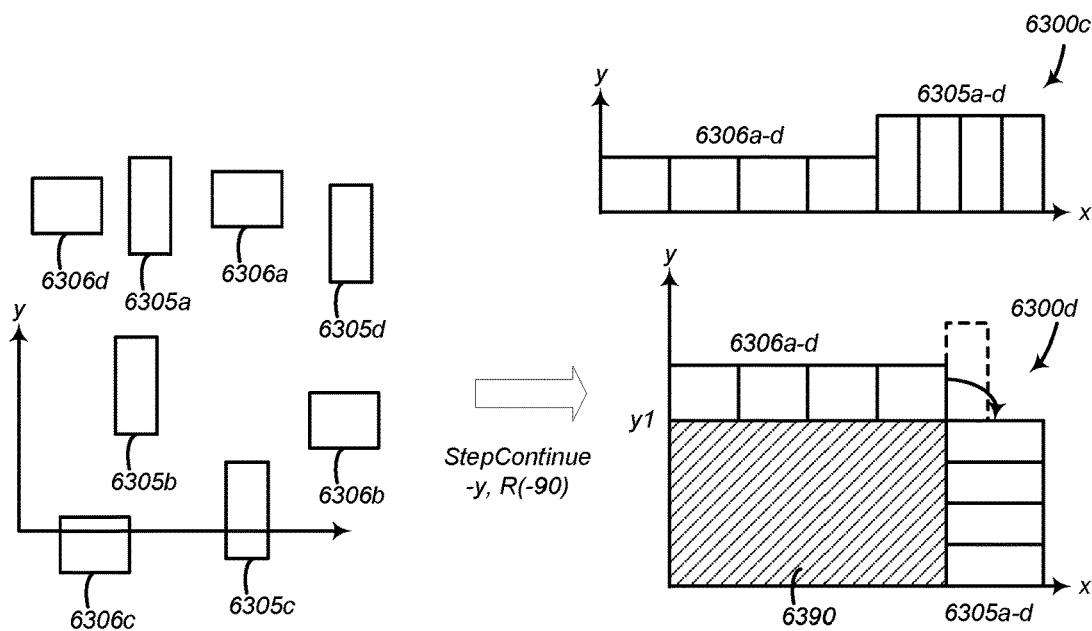
FIG. 63C illustrates another parameter used in some layout placement instructions according to an embodiment.

In some embodiments, one layout placement instruction may follow another layout placement instruction. The following layout placement instruction may place one or more layout instances at positions starting from a final position of the previous layout placement instruction. This may be advantageous in successively placing different layout instances relative to previously place layout instances, for example. FIG. 63C illustrates two different examples. In layout 6300*c*, layout instances 6306*a-d* are successively placed with a first layout placement instruction (e.g., placeSTEP), and layout instances 6305*a-d* are successively placed with a second layout placement instruction (e.g., placeSTEPCONTINUE) continuing from where the previous layout placement instruction ended, for example. In some embodiments, the second layout placement instruction may include layout placement parameters for step direction and rotation as described above. Layout 6300*d* illustrates that the second layout placement instruction successively places layout instances 6305*a-d* continuing from where the previous layout placement instruction ended along the −y direction with a rotation of −90 degrees, which in this example places layout instances around the perimeter of a filled region 6390, for example. The following are examples of layout placement instructions that may follow a previous layout placement instruction and maintain the x,y coordinates of the previous layout placement instruction according to an embodiment:
"placeSTEPcell libraryname cellname rotation"//places layout instance for "cellname" from "libraryname" (which may not be converted from the schematic and not on the layout canvas) at next step x y from previous instruction (may follow placeSTEP).
placeSTEPcontinue libraryname cellname stepdirection stepdistance rotation//places layout instance at next step x y from previous instruction (may follow placeSTEP)

Figure 64:
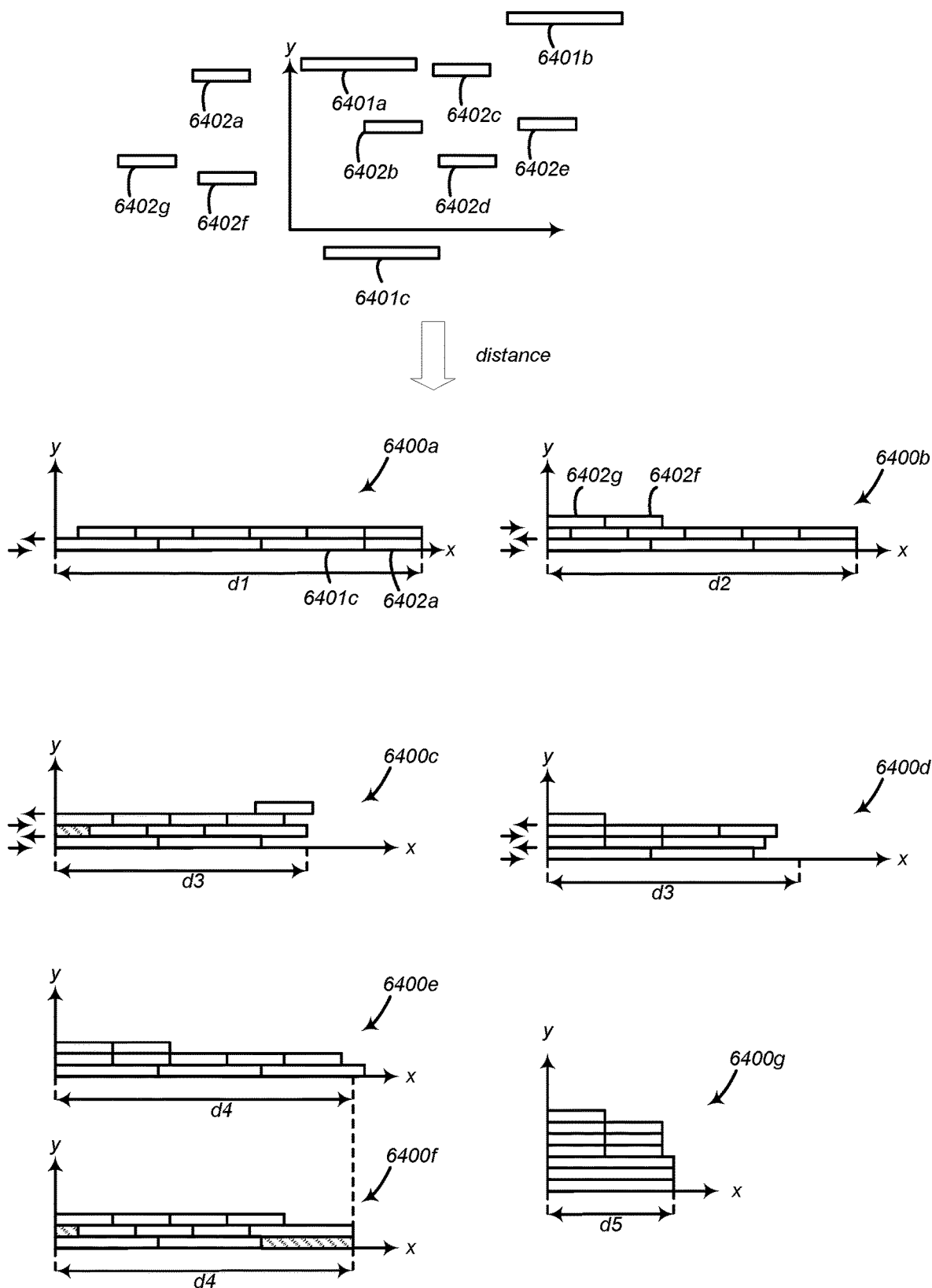
FIG. 64 illustrates another parameter used in some layout placement instructions according to various embodiments.

FIG. 64 illustrates another parameter used in some layout placement instructions according to various embodiments. In this case, a layout placement instruction further specifies a distance. The distance may specify a maximum distance along one axis (e.g., the x-axis), where placement of layout instances that exceed the distance are positioned starting at a different position along the other axis (e.g., the y-axis) and proceeding along the first axis (e.g., the x-axis) up to the distance. Accordingly, layout instances may be successively placed along a first axis from a starting position up to second position based on the distance. When a first portion of the layout instances span a space between the starting position and the second position, a second portion of the layout instances are successively placed along the first axis between a third position, offset from the final position along a second axis, and a fourth position based on the distance. FIG. 64 illustrates multiple different layouts of layout instances 6401*a-c* and 6402*a-g* for different values of a distance parameter.

Layout 6400*a* illustrates, for a first distance, d1, may be set as a parameter. Accordingly, layout instances 6401*a-c* are successively placed starting from (0,0) along the x-axis. Once instance 6401*c* is placed, there is room within distance d1 for instance of 6402*a*. Once the layout instances 6401*a-c* and 6402*a* span the distance d1, the next position for placement moves to a new position, offset along the y-axis from the ending position of instance 6402*a* by an amount equal to the thicker of instances 6401*a-c* or 6402*a* (here, they are the same thickness), and resumes in the −x direction along the x-axis. In this example, all the remaining instances of 6402 are placed. However, if additional instances were to be placed, the placement would increment up the y axis when each time the distance d1 was filled. This is illustrated in layout 6400*b*, where a distance d2, which is less than d1, causes the last two layout instances 6402*g-f* are wrapped around the x-axis to form a third row along the y-axis. In various embodiments, the automated serpentine ("back and forth" or "alternating") positioning of the layout segments may advantageously reduce the length of connections between the segments in some example applications.

Layouts 6400*c-d* illustrate another feature of some embodiments. In layout 6400*c*, if a layout instance cannot fit within remaining distance d3, it is offset (here, up the y-axis) and the starting position is at distance d3. In layout 6400*d*, the layout instances may be left justified along to x=0.

Layouts 6400*e-f* illustrate another feature of some embodiments. This example illustrates another parameter that may specify "strict" or "loose" adherence to a distance parameter. For example, as illustrated in layout 6400*e*, it may be advantageous in some situations to allow some small extension beyond distance, d4, before continuing placement at an offset position. As illustrated in layout 6400*f*, the system "strictly" applies distance, d4 as a maximum, and layout instance 6401*c* is positioned in the next row up the y-axis so as not to exceed the distance, d4.

Layout 6400*g* illustrates another parameter of a layout placement instruction according to an embodiment. In one embodiment, a layout placement instruction may associate a distance with one of the layout instances. In this example, the distance is set to equal d5, the length of the longest resistor layout component. Accordingly, one instance of the longest resistor layout component is placed, and the next position is moved to a next position (here, up the y-axis). Successive layout segments are placed as described above until all resistor layout components are placed to form layout 6400*g*, for example.

Figure 65:
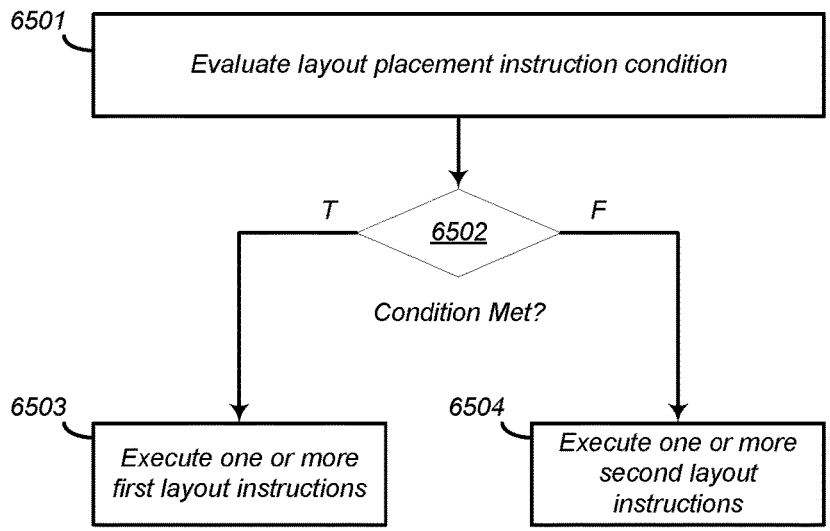
FIG. 65 illustrates the process for a conditional layout placement instruction according to an embodiment.

Features and advantages of some embodiments may further include layout placement instructions comprising conditional statements. FIG. 65 illustrates the process for a conditional layout placement instruction. At 6501, a condition associated with a layout placement instruction is evaluated. A variety of conditions may be associated with layout placement instructions, including expressions (logical or arithmetic) or conditions based on factors pertaining to the layout itself, examples of which are presented below. At 6502, the condition may be evaluated. If the condition is true, one or more layout placement instructions may be executed at 6503. If the condition is false, other layout placement instructions may be executed at 6504. While FIG. 65 illustrates executing alternative layout placement instructions (e.g., IF <condition=true> then <layout placement instruction 1>, else <layout placement instruction 2>), it is to be understood that layout placement instructions may only be executed if the condition is true or false, and otherwise the conditional statement ends (e.g., IF <condition=true> then <layout placement instruction>, else continue; or IF <condition=false> then <layout placement instruction>, else continue).

In one embodiment, a conditional layout placement instruction determines if a position is occupied. In some applications, a layout script may be used for multiple circuits of the same type (or family; e.g., the same functional circuit component with different parameters). For some parameters, a particular layout instance may occupy a space on the layout. Thus, determining if a particular position is occupied may advantageously indicate which circuit in the family is being generated. Accordingly, different layout instances and/or different positions may be specified based on whether or not a position is occupied, which may result in the execution of different layout placement instructions for the same type of circuit with different parameters, for example. For instance, the following example layout placement instruction may determine if a layout instance is at a particular position: placeTAP x y. If the position (x,y) is occupied the instruction may execute a layout placement instruction following placeTAP. Alternatively, if the position is not occupied the instruction may execute a different layout placement instruction (e.g., by skipping the line following placeTAP). The following conditional layout placement instruction alternatively places "cellname1" or "cellname2" at different locations based on whether or not the position (x,y)=(10,10) is occupied:

placeTAP 10 10
place cellname1 0 5.5 R0
place cellname2 4.9 5.5 R0

As mentioned above "cellname1" may be used for a circuit with one set of parameters (e.g., a circuit with a high voltage switch) and "cellname2" may be used for the same circuit with a different set of parameters (e.g., the same circuit with a low voltage switch). Because different circuits may have different layout spacings, the different cells may be advantageously positioned in different locations.

Another example conditional layout placement instruction may evaluate attributes of layout instances and execute different layout placement instructions based on the result. For example, a conditional layout placement instruction may determine if one or more specified layout instances are included in the layout. One or more first layout placement instructions may be executed if the specified instance is included in the layout, and one or more second layout placement instructions may be executed if the one or more specified layout instances are not in the layout. Determining whether or not layout instances are included in a layout may be performed by evaluating conditions based on cell names or instance names, for example. The following is an example conditional layout placement instruction according to an embodiment: placeIF <cell or instance name> <NOT-opt> contains <char(s)+wildcards>. This instruction may execute layout placement instructions following the "placeIF" command until a "placeEND" command is reached. The following are examples of "placeIF" commands:

placeIF cellnamecontains amp* //places amplifiers if cellname contains "amp<any>).
    place amplifier_highgain 1.23 2.23 R0
    place amplifier_lowgain 4.3 0 R0
    placeEND placeIF instancenamecontains osc_res* //places switch and mux cells if
instance names contain "osc_res<any>".
    place osc_resistor_switch1 1.23 2.23 R0
    place osc_res_mux 4.3 0 R0
    placeEND
placeIF instancenameNOTcontains osc_res* //places resistors if
instance names do NOT contain "osc_res<any>".
    placeRES 0 0 0.56 0.8 R0 x y 85
    placeEND Where "*" is a wildcard. Other wildcards may include: || for OR; && for evaluating alternative variates (e.g., "res*&&cap*" or "ch*3&&ch*5"). It is to be understood that a wide variety of wildcard operators may be used to build expressions for conditional layout placement instructions, for example. In one embodiment, a conditional may be include both placeIF and placeELSE. An example is as follows:

placeIF instancenameNOTcontains osc_res* //places resistors if
instance names do NOT contain "osc_res<any>".
    placeRES 0 0 0.56 0.8 R0 x y 85
    placeELSE
    placeTAP 101 30
    placeRES -3.14 9.75 .56 0.8 R90 -x y 31
    placeRES 8.85 69.655 0.56 0.8 R0 x y 131H Where "31" is the distance parameter described above and "131H" is another distance parameter with a strict adherence as also described above.

Figure 66:
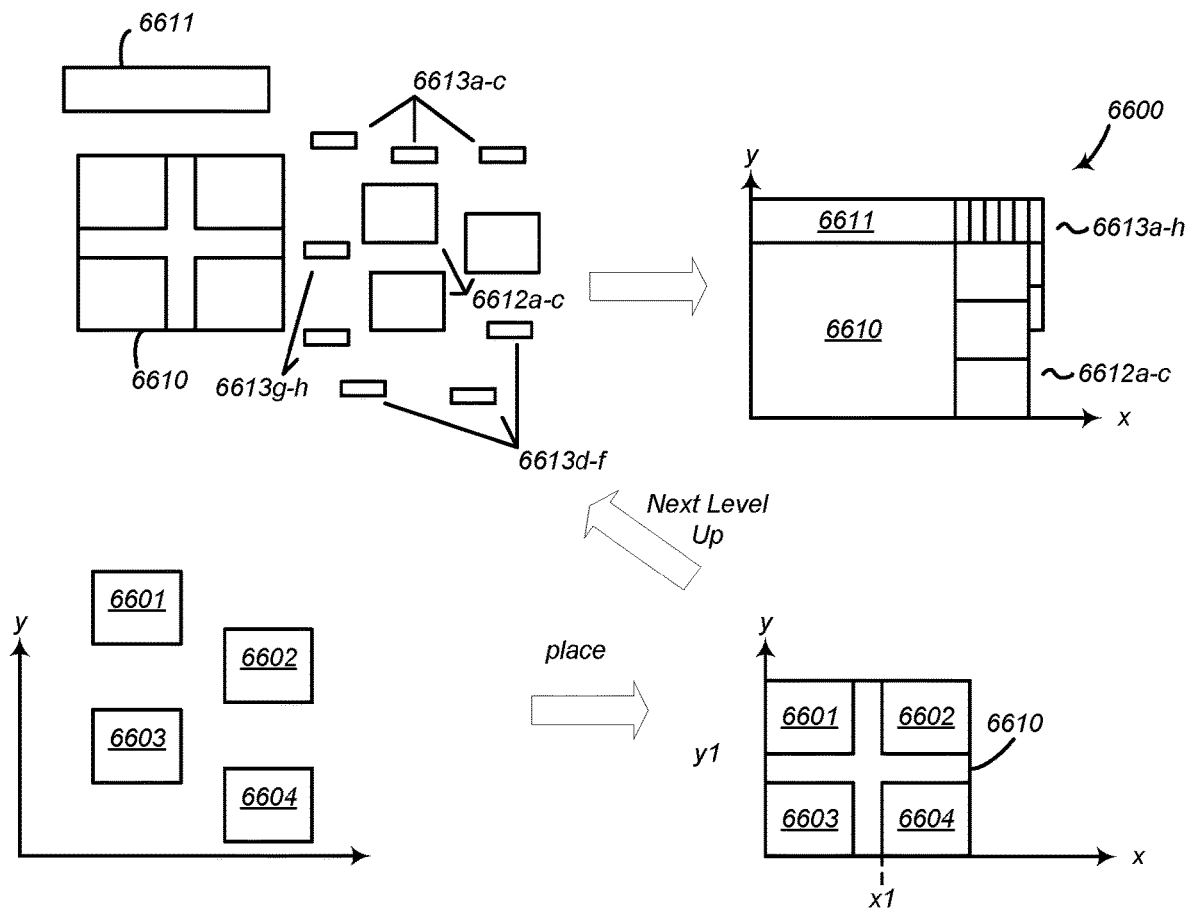
FIG. 66 illustrates another layout placement instruction for incorporating a transistor into a layout according to an embodiment.

FIG. 66 illustrates another layout placement instruction for incorporating a transistor into a layout according to an embodiment. As mentioned above, a transistor may be formed from a plurality of transistor layout elements, such as transistor layout elements 6601-6604. The transistor layout elements 6601-6604 may be positioned using one or more layout placement instruction to form a transistor layout component 6610 (e.g., a layout component for a single composite FET transistor). In various embodiments, transistor layout component 6610 may be incorporated into a layout for a circuit by positioning the transistor layout component 6610 with a plurality of other layout instances corresponding to other circuitry (e.g., at a next level up in the layout). As illustrated in FIG. 66, transistor layout component 6610 is incorporated in a layout with layout instance 6611 (e.g., corresponding to a sub-circuit schematic), layout instances 6612a-c (e.g., corresponding to capacitors), and layout instances 6613a-h (e.g., corresponding to resistor segments). Layout placement instructions may operate on each layout instance 6610-6613. An example of an automatically generated circuit layout for the automatically generated resistors, automatically generated capacitors, automatically generated transistor, and the pre-defined sub-circuit is illustrated at 6600.

In various embodiments, a plurality of different types of layout placement instructions that perform different functions may form a placement set (e.g., a placement language), which may be used to automatically position layout instances to produce a layout. The following is just one example set of layout placement instructions:
place libraryname cellname x y Rotation//places cells from schematic.
placeINST instance_name x y rotation//places based on instance name not cell name.

placeSTEP libraryname cellname x y stepdirection stepdistance rotation//places and steps cells in schematic; stepdistance=pitch (e.g., a predefined x or y length+an optional offset spacing).
placeSTEPcontinue libraryname cellname stepdirection stepdistance rotation//places at next step at last step x y from above cell step; follows placeSTEP.
placeSTEPcell libraryname cellname rotation//places non existing cell at next step x y from above cell step; follows placeSTEP (e.g., place a layout instance not converted from a schematic).
placeCELL libraryname cellname x y rotation//places cell not in schematic (e.g., place cell not converted from schematic at x y with rotation).
placeRES x y step_btwn_same_name_res step_btwn_ diff_name_res rotation directionx directiony distanceforres(H hard stop or maxL)//places multiple resistors from schematic; distanceforres sets the maximum distance for one row of resistors, "H" field at end defines hard stop no % fudge factor; "maxL" field instead of a number sets the largest resistor as the distance.
placeCAP x y step rotation distance available for step// places caps in schematic in rows for given distance.
placeFET x y xstep ystep #columns #rows//places transistor layout elements for transistors (e.g., M>1 or in parallel) in an array of columns and rows; xstep ystep calculated from formula for device type.
placeTAP x y//taps x,y and executes next line if nothing found (no other instance occupies the position (x,y) and executes the line after is something is found at the tap point.
placeIF <cellNameContains, instNameContains, cellNameNOTcontains, instNameNOTcontains> <cellname or string, +wildcards>//executes all layout placement instructions until placeEND is reached. Example Usage: to distinguish between different base cells.
placeIFELSE <cellNameContains, instNameContains, cellNameNOTcontains, instNameNOTcontains> <cellname or string, +wildcards>//executes all layout placement instructions until placeELSE if criteria is met. If criteria is not met, runs commands btwn placeELSE and placeEND. Example Usage: if the addition of a cell changes placements for other cells.
moveORIGIN shift_direction; finds prboundary and moves 0,0 to lowest y, leftist x or both xy. Usage: After positioning, resets 0,0 to predefined corner (e.g., lower left corner) for positioning the combined layout instance in a higher level layout.

The following is one example layout script used to generate a layout for a resistor circuit. The following example layout script may be used to layout a family of resistors with different parameters where some of the layout instances may exist for some resistor circuits and not others:

```
layout,resistor
//place one of the following switches if they are found in the circuit.
place Generate STONEresistorswitchH 14.89 58.005 R180
place Generate STONEresistorswitchHB 14.89 58.005 R180
place Generate STONEresistorswitchT 0 0 R0
place Generate STONEresistorswitchTB 0 0 R0
//Check x,y=10,10 and place based on whether it is occupied or not.
placeTAP 10 10
placeINST XkelvinP -1.675 -4.83 R0
placeINST XkelvinP 86.03 19.4 R270
placeTAP 10 10
placeINST XkelvinN 5.55 -4.83 R0
placeINST XkelvinN 61.9 20.335 R270
placeTAP 10 10
placeSTEP Generate STONEresistorswitchL 0 7.87 x 7.99 R0
placeSTEP Generate STONEresistorswitchL 158.4 7.87 x 7.99 R0
placeSTEPcontinue Generate STONEresistorswitchLB x 7.99 R0
//place predefined multiplexer layouts
place Generate STONEresistorimux0p125 42.345 49.635 R0
place Generate STONEresistorimux0p25 42.345 49.635 R0
place Generate STONEresistorimux0p5 42.345 49.635 R0
place Generate STONEresistorimux4 42.345 49.635 R0
place Generate STONEresistorimux8 42.345 49.635 R0
place Generate STONEresistorimux2 42.345 49.635 R0
//place resistors based on which switches have been placed (IF) and where (TAP) placeIFELSE cellNameNOTContains switchT&&switchL
placeRES 0 0 0.56 0.8 R0 x y 85 //place resistor here if "switchT" and "switchL" are not on canvass.
placeELSE
placeTAP 101 20 //else place resistor based on whether 101,20 is occupied (may depend on particular circuit in the family)
placeRES -2.19 8.85 .56 .8 R90 -x y 31
placeRES 8.85 59.655 0.56 0.8 R0 x y 131H
placeEND
moveORIGIN x //reset x for higher level use
moveORIGIN y //reset y for higher level use
endlayoutbio
```

The above example layout placement instructions are just one example embodiment of layout scripts and layout placement instructions that may be used. It is to be understood that other implementations could also be used within the scope of the present disclosure and claims.

Example Computer Systems

Figure 67:
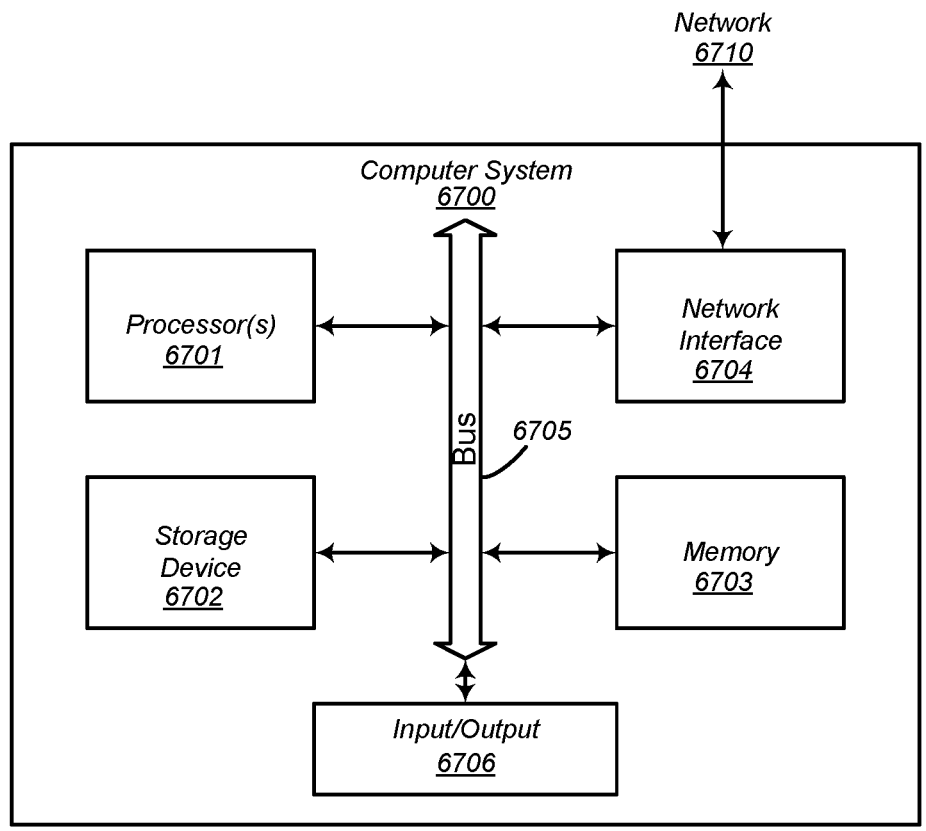
FIG. 67 illustrates example computer system hardware according to certain embodiments.

FIG. 67 illustrates example computer system hardware according to certain embodiments. Various embodiments of the present disclosure may be implemented in computer executable code (software) for performing various techniques described herein. FIG. 67 illustrates a simplified example of a computer used to execute software according to various embodiments. One or more such computers may be used to perform the techniques described herein. As shown in FIG. 67, a computer system 6700 may include one or more processors 6701, such as a multi-processor CPU (e.g., from Intel® or AMD®). Processors 6701 may load executable program code from a computer readable storage medium, which when executed, performs some or all of the techniques described herein. Processors 6701 may be coupled to one or more buses, which are represented here as bus 6705, to communicate with various subsystems. In this illustrative example, processor(s) 6701 may communicate with a storage device 6702 (e.g., to retrieve executable code), which may comprise magnetic storage, optical storage, or solid-state storage, for example. Processor(s) 6701 may further communicate with memory 6703 over a bus 6705. Memory 6703 may represent a number of memories including a random-access memory (RAM) for storage of instructions and data during program execution and a read-only memory (ROM) 820 in which fixed instructions are stored, for example. In some embodiments, processor(s) 6701 may communicate with removable media (e.g., CD-ROM, DVD, Blu-Ray, etc.), a removable flash memory-based drive or card, and/or other types of storage media known in the art.

Processor(s) 6701 may communicate with a network interface 6704 over a bus 6705, for example. Network interface 6704 may allow computer system 6700 to communicate with a network 6710 which may be in communication with other computer systems to perform the techniques described herein, for example. In various embodiments, network interface 6704 may include, for example, an Ethernet card to support a variety of Ethernet rate connections (e.g., in an office, server room, or data center), a Wi-Fi, IEEE 802 based system, and/or cellular adapter, a modem (telephone, satellite, cable, ISDN, etc.), digital subscriber line (DSL) units, and/or other data communications systems, for example.

In some embodiments, the techniques described herein may be performed on one or more server computers. In other embodiments, some or all of the techniques described herein may be performed on a laptop or desktop computer or other computer system that may include an input/output interface 6706, for example. Input/output interface 6706 may include hardware for receiving information from an input device (e.g., a mouse, keyboard, touchpad, or the like) and/or provide information to an output device (e.g., a display).

Although bus 6705 is represented here as a single bus, it is to be understood that bus 6705 may comprise multiple busses.

It will be appreciated by those skilled in the art that computer system 6700 is illustrative and many other configurations having more or fewer components than system 6700 are possible.

Figure 68:
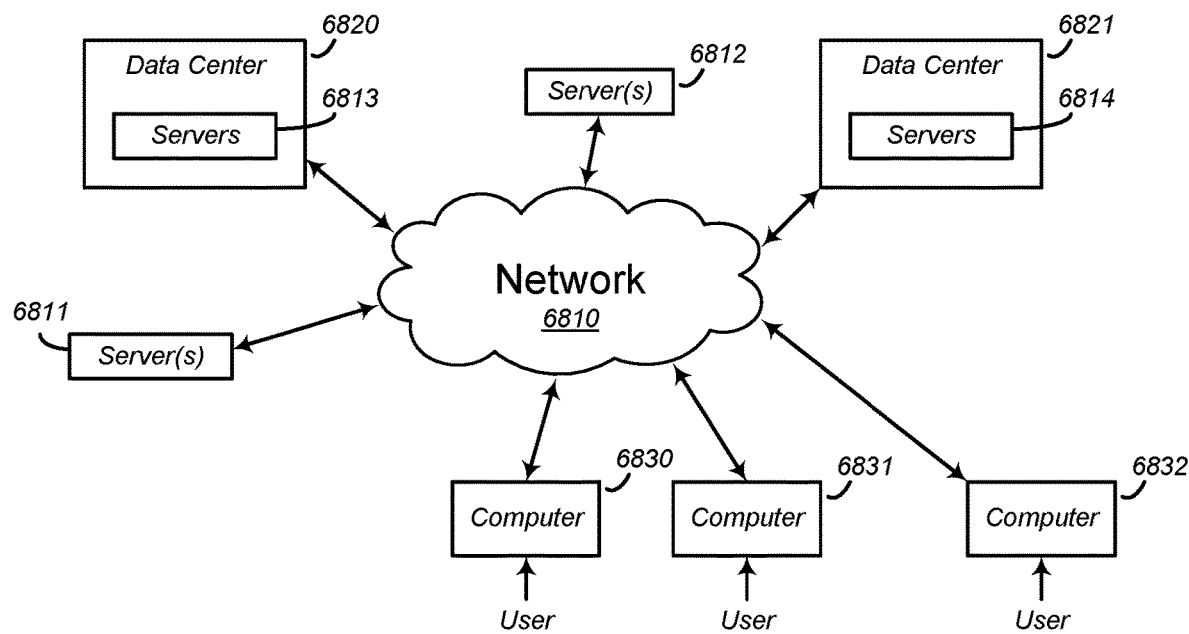
FIG. 68 illustrates various computer system configurations that may be used in certain embodiments.

In some embodiments, features and techniques described herein may be embodied in software executing on remote computer systems (e.g., software as a service executing in the cloud). FIG. 68 illustrates various computer system configurations that may be used in certain embodiments. In this example, the executable code for performing the some or all of techniques disclosed herein may be executing on one or more server computers coupled together over a network 6810, such as a local area network (LAN), wide area network (WAN), or other networks (e.g., the Internet). Computer executable code for performing some or all of the techniques disclosed herein may be executed on a single server or multiple servers 6811-6813, for example. Servers 6811-6813 may have computer architectures as described in FIG. 67. Software according to various embodiments may be executed directly by a server or be run on a virtual machine, which executes on computer system hardware, for example, as known to those skilled in the art. In some embodiments, embodiments of the disclosure may be performed on one or more servers that are part of data centers 6820-6821, for example.

As mentioned above, some embodiments described herein may receive inputs from users. Accordingly, users may interact with computer systems 6830-6832, which in turn communicate with one or more server computers 6811-6814 over network 6810 to perform the techniques described herein, for example.

Figure 69:
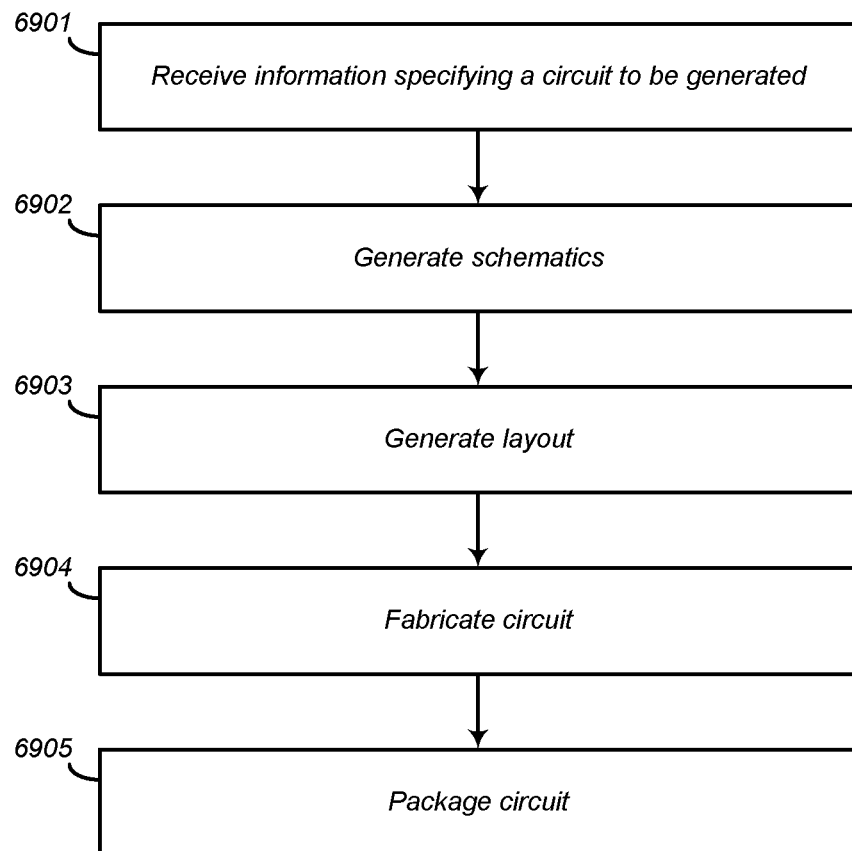
FIG. 69 illustrates a process of making a circuit according to an embodiment.

FIG. 69 illustrates a process of making a circuit according to an embodiment. As mentioned above, some or all of the techniques described herein may be used as part of a process for making an integrated circuit. For example, at 6901, information specifying a circuit to be generated is received in a software system (e.g., a generator software system according to the various embodiments described above). The software system may generate schematics at 6902. At 6903, a layout is generated. At 6904, a circuit may be fabricated using the layout. For example, the layout may be converted to file format for representing the geometric shapes in the layout and used to create photomasks or loaded into semiconductor fabrication tools and used to fabricate a physical semiconductor circuit. At 6905, the circuit is packaged. For example, a semiconductor wafer may be divided into individual semiconductor die (aka "chips"), and one or more of the semiconductor chips may be packaged.

Further Example Embodiments

Features and advantages of various embodiments may pertain to automatic generation of circuits according to the following techniques alone or in combination as follows.

In various embodiments, the techniques described herein may be embodied in computer implemented methods, systems, apparatuses, and computer readable mediums storing machine (e.g., computer) executable instructions.

The following are various example methods according to various embodiments. It is to be understood that the following examples may be combined in a variety of different combinations. Additionally, it is to be understood that other example combinations are possible light of the present disclosure. Therefore, the following examples are illustrative and not limiting.

Embodiment 1. A computer-implemented method of generating a circuit comprising: generating a circuit specification, said generating a circuit specification comprising: receiving parameters specifying a circuit to be generated; selecting, based on the parameters, predefined sub-circuit schematics to be included in the circuit; determining, based on the parameters, connections between the sub-circuit schematics; generating a circuit specification for the circuit to be generated specifying the sub-circuit schematics and the connections between the sub-circuit schematics; and generating a layout script associated with the circuit to be generated; and converting the circuit specification into a circuit schematic and circuit layout, said converting comprising: selecting predefined sub-circuit schematics specified in the circuit specification; connecting the predefined sub-circuit schematics for form the circuit schematic; converting the circuit schematic into a plurality of layout instances; and positioning the layout instances based on the layout script associated with the circuit to be generated to produce the circuit layout.

Embodiment 2. The method of embodiment 1, wherein the predefined sub-circuit schematics comprise predefined analog sub-circuit schematics.

Embodiment 3. The method of embodiment 1, wherein the parameters specify one or more functional circuit components, and wherein the one or more functional circuit components have corresponding predefined sub-circuit schematics.

Embodiment 4. The method of embodiment 3, further comprising generating one or more symbols corresponding to the one or more functional circuit components, wherein the symbols encapsulate the selected predefined sub-circuit schematics.

Embodiment 5. The method of embodiment 1, wherein the layout script comprises a plurality of layout placement instructions.

Embodiment 6. The method of embodiment 1, wherein the layout script is configured to position layout instances from a plurality of circuit schematics.

Embodiment 7. The method of embodiment 6, wherein the plurality of circuit schematics are associated with the same functional circuit component.

Embodiment 8. The method of embodiment 1, wherein said generating a circuit specification is performed on a first software system and said converting the circuit specification to a circuit schematic and a circuit layout is performed on a second software system.

Embodiment 9. The method of embodiment 8, wherein the second software system is an electronic design automation software system.

Embodiment 10. A computer system for generating a circuit comprising: one or more processors; and a non-transitory computer-readable storage medium having stored thereon computer executable instructions, which when executed by the computer system, cause the computer system to perform a method comprising: generating a circuit specification, said generating a circuit specification comprising: receiving parameters specifying a circuit to be generated; selecting, based on the parameters, predefined sub-circuit schematics to be included in the circuit; determining, based on the parameters, connections between the sub-circuit schematics; generating a circuit specification for the circuit to be generated specifying the sub-circuit schematics and the connections between the sub-circuit schematics; and generating a layout script associated with the circuit to be generated; and converting the circuit specification into a circuit schematic and circuit layout, said converting comprising: selecting predefined sub-circuit schematics specified in the circuit specification; connecting the predefined sub-circuit schematics for form the circuit schematic; converting the circuit schematic into a plurality of layout instances; and positioning the layout instances based on the layout script associated with the circuit to be generated to produce the circuit layout.

The computer system of embodiment 10 in combination with any one or more embodiments 2-9.

Embodiment 11. A non-transitory computer-readable storage medium having stored thereon computer executable instructions, which when executed by a computer system, cause the computer system to: generate a circuit specification, said generating a circuit specification comprising: receiving parameters specifying a circuit to be generated; selecting, based on the parameters, predefined sub-circuit schematics to be included in the circuit; determining, based on the parameters, connections between the sub-circuit schematics; generating a circuit specification for the circuit to be generated specifying the sub-circuit schematics and the connections between the sub-circuit schematics; and generating a layout script associated with the circuit to be generated; and convert the circuit specification into a circuit schematic and circuit layout, said converting comprising: selecting predefined sub-circuit schematics specified in the circuit specification; connecting the predefined sub-circuit schematics for form the circuit schematic; converting the circuit schematic into a plurality of layout instances; and positioning the layout instances based on the layout script associated with the circuit to be generated to produce the circuit layout.

The non-transitory computer-readable storage medium of embodiment 11 having stored thereon computer executable instructions, which when executed by a computer system, cause the computer system to perform any one or more of embodiments 2-9.

Embodiment 12. A computer-implemented method of generating a circuit comprising: receiving, by at least one software system executing on at least one computer, a plurality of circuit specification parameters corresponding to at least one functional circuit component; selecting, by the at least one software system, a plurality of sub-circuit schematics based on the circuit specification parameters; and combining, by the at least one software system, the sub-circuit schematics to form a circuit schematic for the at least one functional circuit component.

Embodiment 13. The method of embodiment 12, wherein the sub-circuit schematics comprise analog sub-circuit schematics.

Embodiment 14. The method of embodiment 12, wherein the sub-circuit schematics comprise predefined analog sub-circuit schematics.

Embodiment 15. The method of embodiment 14, wherein the selected plurality of sub-circuit schematics are a subset of a second plurality of predefined analog sub-circuit schematics.

Embodiment 16. The method of embodiment 15, wherein the second plurality of predefined analog sub-circuit schematics correspond to the at least one functional analog circuit component.

Embodiment 17. The method of embodiment 15, wherein the plurality of sub-circuit schematics include alternative sub-circuit schematics for performing the same function using different circuitry.

Embodiment 18. The method of embodiment 12, the sub-circuit schematics comprising a plurality of analog pins having different electrical characteristics.

Embodiment 19. The method of embodiment 18, wherein the different electrical characteristics are different voltage or current operating ranges.

Embodiment 20. The method of embodiment 12, said sub-circuit schematics comprising a plurality of pins, said combining comprising mapping the pins of the sub-circuit schematics.

Embodiment 21. The method of embodiment 20, wherein one or more pins of said plurality of pins are analog pins.

Embodiment 22. The method of embodiment 20, wherein said mapping is based on at least one pin map.

Embodiment 23. The method of embodiment 22, wherein different pin maps specify connections between the plurality of sub-circuit schematic pins for different combinations of selected sub-circuit schematics.

Embodiment 24. The method of embodiment 22, wherein the at least one pin map is based on the selected sub-circuit schematics.

Embodiment 25. The method of embodiment 22, wherein said pin map specifies connections between pins of the sub-circuit schematics.

Embodiment 26. The method of embodiment 22, wherein said pin map specifies connections between pins of the sub-circuit schematics and inputs or outputs of the circuit schematic.

Embodiment 27. The method of embodiment 20, wherein connected pins have predetermined compatibility.

Embodiment 28. The method of embodiment 20, wherein mapping the pins comprises connecting the pins in the circuit schematic.

Embodiment 29. The method of embodiment 20, wherein the mapping is done automatically by the at least one software system based on a plurality of predefined rules.

Embodiment 30. The method of embodiment 12, wherein different values for the circuit specification parameters generate different analog circuit schematics having different properties for the at least one functional circuit component.

Embodiment 31. The method of embodiment 12, wherein different sets of circuit specification parameters for different corresponding functional circuit components have different corresponding sets of predefined sub-circuit schematics.

Embodiment 32. The method of embodiment 31, wherein different values for different sets of circuit specification parameters select different subsets of predefined sub-circuit schematics from one of a plurality of sets of predefined sub-circuit schematics corresponding to different functional circuit components.

Embodiment 33. The method of embodiment 12, the plurality of circuit specification parameters comprising one or more of: a parameter specifying a physical property or a parameter specifying an electrical property.

Embodiment 34. The method of embodiment 12, further comprising generating a netlist specifying the selected sub-circuits.

Embodiment 35. The method of embodiment 34, wherein the netlist is a verilog file.

Embodiment 36. The method of embodiment 12, wherein the sub-circuit schematics are combined according to a set of rules associated with the at least one functional circuit component to form the circuit schematic for the at least one functional circuit component.

Embodiment 37. The method of embodiment 12, wherein different circuit specification parameters corresponding to different functional circuit components are processed using different associated sets of rules for combining different sets of sub-circuit schematics.

Embodiment 38. The method of embodiment 12, wherein different functional circuit components have a corresponding unique set of predefined sub-circuit schematics.

Embodiment 39. The method of embodiment 38, wherein each unique set of predefined sub-circuit schematics comprises one or more unique predefined analog sub-circuit schematics only used for the corresponding functional circuit component.

Embodiment 40. The method of embodiment 38, wherein each unique set of predefined sub-circuit schematics comprises one or more predefined analog sub-circuit schematics used for a plurality of corresponding functional circuit components.

Embodiment 41. The method of embodiment 12, the circuit specification parameters comprising variables and corresponding values.

Embodiment 42. The method of embodiment 41, wherein the variables and values are received as text.

Embodiment 43. The method of embodiment 12, wherein the circuit specification parameters comprise code specifying properties of the circuit schematic.

Embodiment 44. The method of embodiment 43, wherein different values of the code select different sub-circuit schematics.

Embodiment 45. A computer system for generating a circuit comprising: one or more processors; and a non-transitory computer-readable storage medium having stored thereon computer executable instructions, which when executed by the computer system, cause the computer system to perform a method comprising: receiving, by at least one software system executing on at least one computer, a plurality of circuit specification parameters corresponding to at least one functional circuit component; selecting, by the at least one software system, a plurality of sub-circuit schematics based on the circuit specification parameters; and combining, by the at least one software system, the sub-circuit schematics to form a circuit schematic for the at least one functional circuit component.

The computer system of embodiment 45 in combination with any one or more of embodiments 12-44.

Embodiment 46. A non-transitory computer-readable storage medium having stored thereon computer executable instructions, which when executed by a computer system, cause the computer system to: receive, by at least one software system executing on at least one computer, a plurality of circuit specification parameters corresponding to at least one functional circuit component; select, by the at least one software system, a plurality of sub-circuit schematics based on the circuit specification parameters; and combine, by the at least one software system, the sub-circuit schematics to form a circuit schematic for the at least one functional circuit component.

The non-transitory computer-readable storage medium of embodiment 46 having stored thereon computer executable instructions, which when executed by a computer system, cause the computer system to perform any one or more of embodiments 12-44.

Embodiment 47. A system for generating a circuit comprising: means for receiving, by at least one software system executing on at least one computer, a plurality of circuit specification parameters corresponding to at least one functional circuit component; means for selecting, by the at least one software system, a plurality of sub-circuit schematics based on the circuit specification parameters; and means for combining, by the at least one software system, the sub-circuit schematics to form a circuit schematic for the at least one functional circuit component.

Embodiment 48. A computer-implemented method of generating a circuit comprising: receiving, by at least one software system executing on at least one computer, a plurality of circuit specification parameters corresponding to at least one functional circuit component; and combining, by the at least one software system, a plurality of sub-circuit layouts based on the circuit specification parameters to form a circuit layout for the at least one functional circuit component.

Embodiment 49. The method of embodiment 48, wherein the sub-circuit layouts are analog sub-circuit layouts.

Embodiment 50. The method of embodiment 48, wherein the sub-circuit layouts are predefined analog sub-circuit layouts.

Embodiment 51. The method of embodiment 50, wherein the subset of the plurality of predefined analog sub-circuit layouts correspond to the at least one functional analog circuit component.

Embodiment 52. The method of embodiment 48, wherein the plurality of sub-circuit layouts include alternative sub-circuit layouts for performing the same function using different circuitry.

Embodiment 53. The method of embodiment 48, wherein different values for the circuit specification parameters generate different analog circuit layouts having different properties for the at least one functional circuit component.

Embodiment 54. The method of embodiment 48, wherein different sets of circuit specification parameters for different corresponding functional circuit components have different corresponding sets of predefined sub-circuit layouts.

Embodiment 55. The method of embodiment 54, wherein different values for each set of circuit specification parameters combine different subsets of predefined sub-circuit layouts from one of a plurality of sets of predefined sub-circuit layouts corresponding to different functional circuit components.

Embodiment 56. The method of embodiment 48, the plurality of circuit specification parameters comprising one or more of: a parameter specifying a physical property or a parameter specifying an electrical property.

Embodiment 57. The method of embodiment 48, wherein the circuit specification parameters comprise variables and corresponding values.

Embodiment 58. The method of embodiment 57, wherein the circuit specification parameters comprise variables and values are received as text.

Embodiment 59. The method of embodiment 48, wherein the circuit specification parameters comprise code specifying properties of the circuit layout.

Embodiment 60. The method of embodiment 59, wherein different values of the code select different sub-circuit layouts.

Embodiment 61. The method of embodiment 48, wherein said combining is based on a plurality of layout placement instructions to arrange of the sub-circuit layouts in said circuit layout.

Embodiment 62. The method of embodiment 61, wherein at least one of the sub-circuit layouts has a first height and a first width, and at least one of the other sub-circuit layouts has a second height different than the first height and a second width different than the second width.

Embodiment 63. The method of embodiment 61, wherein the layout placement instructions are predefined.

Embodiment 64. The method of embodiment 61, wherein the layout placement instructions access placement data from an external data record.

Embodiment 65. The method of embodiment 61, wherein the layout placement instructions are predefined in an external data record.

Embodiment 66. The method of embodiment 61, wherein the layout placement instructions arrange the sub-circuit layouts according to an x, y-coordinate system.

Embodiment 67. The method of embodiment 61, wherein different circuit layouts may be formed from different sets of sub-circuit layouts associated with different corresponding layout placement instructions.

Embodiment 68. The method of embodiment 61, the plurality of layout placement instructions comprising one or more layout placement instructions that arrange one or more sub-circuit layouts at particular coordinates.

Embodiment 69. The method of embodiment 61, the plurality of layout placement instructions comprising one or more layout placement instructions that rotate one or more sub-circuit layouts.

Embodiment 70. The method of embodiment 61, wherein the plurality of layout placement instructions are in a sequence, wherein particular sub-circuit layouts are arranged serially based on the sequence of the layout placement instructions.

Embodiment 71. The method of embodiment 61, wherein the plurality of layout placement instructions comprise executable instructions that access data specifying the arrangement of the sub-circuit layouts.

Embodiment 72. The method of embodiment 71, wherein the data specifies one or more layout placement instructions to be executed for each sub-circuit layout.

Embodiment 73. The method of embodiment 71, wherein the data specifies x-axis and y-axis coordinates to place a plurality of the sub-circuit layouts.

Embodiment 74. The method of embodiment 71, wherein the data specifies rotation for one or more of the sub-circuit layouts.

Embodiment 75. The method of embodiment 61, wherein different values for the circuit specification parameters combine different sub-circuit layouts using corresponding layout placement instructions, and wherein particular layout placement instructions executed are specific to a particular analog circuit layout generated from particular circuit specification parameter values.

Embodiment 76. The method of embodiment 61, further comprising executing one of a plurality of sets of layout placement instructions based on a particular combination of sub-circuit layouts to form said circuit layout, wherein different combinations of sub-circuit layouts have corresponding different layout placement instructions.

Embodiment 77. A computer system for generating a circuit comprising: one or more processors; and a non-transitory computer-readable storage medium having stored thereon computer executable instructions, which when executed by the computer system, cause the computer system to perform a method comprising: receiving, by at least one software system executing on at least one computer, a plurality of circuit specification parameters corresponding to at least one functional circuit component; and combining, by the at least one software system, a plurality of sub-circuit layouts based on the circuit specification parameters to form a circuit layout for the at least one functional circuit component.

The computer system of embodiment 77 in combination with any one or more of embodiments 48-76.

Embodiment 78. A non-transitory computer-readable storage medium having stored thereon computer executable instructions, which when executed by a computer system, cause the computer system to: receive, by at least one software system executing on at least one computer, a plurality of circuit specification parameters corresponding to at least one functional circuit component; and combine, by the at least one software system, a plurality of sub-circuit layouts based on the circuit specification parameters to form a circuit layout for the at least one functional circuit component.

The non-transitory computer-readable storage medium of embodiment 78 having stored thereon computer executable instructions, which when executed by a computer system, cause the computer system to perform any one or more of embodiments 48-76.

Embodiment 79. A system for generating a circuit comprising: means for receiving, by at least one software system executing on at least one computer, a plurality of circuit specification parameters corresponding to at least one functional circuit component; and means for combining, by the at least one software system, a plurality of sub-circuit layouts based on the circuit specification parameters to form a circuit layout for the at least one functional circuit component.

Embodiment 80. A computer-implemented method of generating a circuit comprising: generating a first model of a circuit to be generated; generating circuit specification parameters corresponding to the first model; selecting a plurality of sub-circuit schematics based on the circuit specification parameters; and combining the sub-circuit schematics to form a circuit schematic for the circuit to be generated, wherein the combined sub-circuit schematics form a transistor level model that corresponds to the first model.

Embodiment 81. The method of embodiment 80, wherein the first model is a behavioral model.

Embodiment 82. The method of embodiment 80, wherein a plurality of behavioral level simulations of the first model substantially match a corresponding plurality of transistor level simulations for the transistor level model.

Embodiment 83. The method of embodiment 80, wherein the first model is configurable based on the circuit specification parameters to produce a plurality of behaviors for the first model, and wherein simulations for the first model and the transistor level model substantially match when the first model and the transistor level model have the same parameters.

Embodiment 84. The method of embodiment 80, wherein a plurality of behavioral level simulations of the first model match a corresponding plurality of transistor level simulations for the transistor level model.

Embodiment 85. The method of embodiment 80, wherein the sub-circuit schematics comprise predefined analog sub-circuit schematics.

Embodiment 86. The method of embodiment 80, further comprising: converting the circuit schematic to a plurality of layout instances; and positioning the layout instances based on a layout script to produce a circuit layout.

Embodiment 87. A computer system for generating a circuit comprising: one or more processors; and a non-transitory computer-readable storage medium having stored thereon computer executable instructions, which when executed by the computer system, cause the computer system to perform a method comprising: generating a first model of a circuit to be generated; generating circuit specification parameters corresponding to the first model; selecting a plurality of sub-circuit schematics based on the circuit specification parameters; and combining the sub-circuit schematics to form a circuit schematic for the circuit to be generated, wherein the combined sub-circuit schematics form a transistor level model that corresponds to the first model.

Embodiment 88. A non-transitory computer-readable storage medium having stored thereon computer executable instructions, which when executed by a computer system, cause the computer system to: generate a first model of a circuit to be generated; generate circuit specification parameters corresponding to the first model; select a plurality of sub-circuit schematics based on the circuit specification parameters; and combine the sub-circuit schematics to form a circuit schematic for the circuit to be generated, wherein the combined sub-circuit schematics form a transistor level model that corresponds to the first model.

The computer system of embodiment 87 in combination with any one or more of embodiments 80-86.

The non-transitory computer-readable storage medium of embodiment 88 having stored thereon computer executable instructions, which when executed by a computer system, cause the computer system to perform any one or more of embodiments 80-86.

Embodiment 89. A system for generating a circuit comprising: means for generating a first model of a circuit to be generated; means for generating circuit specification parameters corresponding to the first model; means for selecting a plurality of sub-circuit schematics based on the circuit specification parameters; and means for combining the sub-circuit schematics to form a circuit schematic for the circuit to be generated, wherein the combined sub-circuit schematics form a transistor level model that corresponds to the first model.

Embodiment 90. A computer-implemented method of generating a circuit comprising: receiving information specifying a circuit to be generated; selecting one or more pin lists corresponding to one or more sub-circuit schematics based on the information, each pin list comprising sub-circuit schematic pins for a corresponding sub-circuit schematic; selecting a subset of a plurality of predefined pins for at least one symbol based on said information; establishing connections between the sub-circuit schematic pins and the subset of the plurality of predefined pins for the at least one symbol; and generating a circuit specification, the circuit specification comprising: sub-circuit schematic pins from the one or more pin lists corresponding to one or more sub-circuit schematics; the subset of the plurality of predefined pins for the at least one symbol; and the connections between the sub-circuit schematic pins and the subset of the plurality of predefined pins for the at least one symbol.

Embodiment 91. The method of embodiment 90, further comprising processing the circuit specification in an EDA tool to produce a circuit schematic.

Embodiment 92. The method of embodiment 90, wherein the pin lists and symbol correspond to a first functional circuit component.

Embodiment 93. The method of embodiment 92, wherein different functional circuit components have different associated sub-circuit schematic pin lists and predefined pins for functional circuit component symbols.

Embodiment 94. The method of embodiment 90, further comprising retrieving a layout script based on the information, wherein the layout script is configured to automatically position layout instances for a circuit generated from the circuit specification.

Embodiment 95. The method of embodiment 90, wherein the information comprises parameters.

Embodiment 96. The method of embodiment 95, further comprising: retrieving parameter limits; and comparing the parameters to the parameter limits to verify the parameters.

Embodiment 97. The method of embodiment 90, further comprising: determining a component value; and encoding the component value in an identifier associated with a plurality of component symbols, wherein the circuit specification further comprises the plurality of component symbols.

Embodiment 98. A computer system for generating a circuit comprising: one or more processors; and a non-transitory computer-readable storage medium having stored thereon computer executable instructions, which when executed by the computer system, cause the computer system to perform a method comprising: receiving information specifying a circuit to be generated; selecting one or more pin lists corresponding to one or more sub-circuit schematics based on the information, each pin list comprising sub-circuit schematic pins for a corresponding sub-circuit schematic; selecting a subset of a plurality of predefined pins for at least one symbol based on said information; establishing connections between the sub-circuit schematic pins and the subset of the plurality of predefined pins for the at least one symbol; and generating a circuit specification, the circuit specification comprising: sub-circuit schematic pins from the one or more pin lists corresponding to one or more sub-circuit schematics; the subset of the plurality of predefined pins for the at least one symbol; and the connections between the sub-circuit schematic pins and the subset of the plurality of predefined pins for the at least one symbol.

Embodiment 99. A non-transitory computer-readable storage medium having stored thereon computer executable instructions, which when executed by a computer system, cause the computer system to: receive information specifying a circuit to be generated; select one or more pin lists corresponding to one or more sub-circuit schematics based on the information, each pin list comprising sub-circuit schematic pins for a corresponding sub-circuit schematic; select a subset of a plurality of predefined pins for at least one symbol based on said information; establish connections between the sub-circuit schematic pins and the subset of the plurality of predefined pins for the at least one symbol; and generate a circuit specification, the circuit specification comprising: sub-circuit schematic pins from the one or more pin lists corresponding to one or more sub-circuit schematics; the subset of the plurality of predefined pins for the at least one symbol; and the connections between the sub-circuit schematic pins and the subset of the plurality of predefined pins for the at least one symbol.

The computer system of embodiment 98 in combination with any one or more of embodiments 90-97.

The non-transitory computer-readable storage medium of embodiment 99 having stored thereon computer executable instructions, which when executed by a computer system, cause the computer system to perform any one or more of embodiments 90-97.

Embodiment 100. A system for generating a circuit comprising: means for receiving information specifying a circuit to be generated; means for selecting one or more pin lists corresponding to one or more sub-circuit schematics based on the information, each pin list comprising sub-circuit schematic pins for a corresponding sub-circuit schematic; means for selecting a subset of a plurality of predefined pins for at least one symbol based on said information; means for establishing connections between the sub-circuit schematic pins and the subset of the plurality of predefined pins for the at least one symbol; and means for generating a circuit specification, the circuit specification comprising: sub-circuit schematic pins from the one or more pin lists corresponding to one or more sub-circuit schematics; the subset of the plurality of predefined pins for the at least one symbol; and the connections between the sub-circuit schematic pins and the subset of the plurality of predefined pins for the at least one symbol.

Embodiment 101. A computer-implemented method of generating circuit components comprising: receiving a total attribute value of a component to be generated; determining a second attribute value for the component to be generated based at least on the total attribute value; determining at least one number N of said components having the second attribute value to be combined to form the component having the total attribute value; generating a transistor level schematic comprising a plurality of components configured with the second attribute value; and generating a layout, wherein the layout comprises N layout instances corresponding to the component configured to produce the total attribute value.

Embodiment 102. The method of embodiment 101, wherein the component to be generated is one of: a transistor, a resistor, or a capacitor.

Embodiment 103. The method of embodiment 101, further comprising generating a circuit specification specifying a configuration of the N components to produce the total attribute value, wherein the transistor level schematic is generated based on the circuit specification.

Embodiment 104. The method of embodiment 101, further comprising receiving at least one layout parameter, wherein the second attribute value for the component be generated is determined based on the at least one layout parameter.

Embodiment 105. The method of embodiment 104, wherein layout parameter specifies a length along at least one dimension of the component to be generated.

Embodiment 106. The method of embodiment 104, wherein layout parameter specifies a resistor layout segment length.

Embodiment 107. The method of embodiment 104, wherein layout parameter specifies a predefined maximum length along the first dimension of a unit capacitor.

Embodiment 108. The method of embodiment 101, wherein the total attribute value is a total resistance for a resistor to be generated.

Embodiment 109. The method of embodiment 101, wherein the total attribute value is a total capacitance for a capacitor to be generated.

Embodiment 110. The method of embodiment 101, wherein the total attribute value is a total gate width determined based on an on resistance for a transistor to be generated.

Embodiment 111. A computer system for generating circuit components comprising: one or more processors; and a non-transitory computer-readable storage medium having stored thereon computer executable instructions, which when executed by the computer system, cause the computer system to perform a method comprising: receiving a total attribute value of a component to be generated; determining a second attribute value for the component be generated based at least on the total attribute value; determining at least one number N of said components having the second attribute value to be combined to form the component having the total attribute value; generating a transistor level schematic comprising a plurality of components configured with the second attribute value; and generating a layout, wherein the layout comprises N layout instances corresponding to the component configured to produce the total attribute value.

Embodiment 112. A non-transitory computer-readable storage medium having stored thereon computer executable instructions, which when executed by a computer system, cause the computer system to: receive a total attribute value of a component to be generated; determine a second attribute value for the component be generated based at least on the total attribute value; determine at least one number N of said components having the second attribute value to be combined to form the component having the total attribute value; generate a transistor level schematic comprising a plurality of components configured with the second attribute value; and generate a layout, wherein the layout comprises N layout instances corresponding to the component configured to produce the total attribute value.

The computer system of embodiment 111 in combination with any one or more of embodiments 101-110.

The non-transitory computer-readable storage medium of embodiment 112 having stored thereon computer executable instructions, which when executed by a computer system, cause the computer system to perform any one or more of embodiments 101-110.

Embodiment 113. A system for generating circuit components comprising: means for receiving a total attribute value of a component to be generated; means for determining a second attribute value for the component be generated based at least on the total attribute value; means for determining at least one number N of said components having the second attribute value to be combined to form the component having the total attribute value; means for generating a transistor level schematic comprising a plurality of components configured with the second attribute value; and means for generating a layout, wherein the layout comprises N layout instances corresponding to the component configured to produce the total attribute value.

Embodiment 114. A computer-implemented method of generating a circuit comprising: receiving information specifying an analog circuit component to be generated; retrieving layout parameters based on at least a portion of said information; determining attributes of the analog circuit component to be generated based on said information and said layout parameters; generating a transistor level schematic of the analog circuit comprising one or more of the analog circuit components, wherein the one or more analog circuit components are configured with said attributes; and generating a layout from the transistor level schematic, wherein the layout comprises a plurality of layout instances corresponding to the one or more analog circuit components, and wherein each layout instances is automatically positioned in the layout by a layout script based on said attributes of the analog circuit component.

Embodiment 115. A computer system for generating a circuit comprising: one or more processors; and a non-transitory computer-readable storage medium having stored thereon computer executable instructions, which when executed by the computer system, cause the computer system to perform a method comprising: receiving information specifying an analog circuit component to be generated; retrieving layout parameters based on at least a portion of said information; determining attributes of the analog circuit component to be generated based on said information and said layout parameters; generating a transistor level schematic of the analog circuit comprising one or more of the analog circuit components, wherein the one or more analog circuit components are configured with said attributes; and generating a layout from the transistor level schematic, wherein the layout comprises a plurality of layout instances corresponding to the one or more analog circuit components, and wherein each layout instances is automatically positioned in the layout by a layout script based on said attributes of the analog circuit component.

Embodiment 116. A non-transitory computer-readable storage medium having stored thereon computer executable instructions, which when executed by a computer system, cause the computer system to: receive information specifying an analog circuit component to be generated; retrieve layout parameters based on at least a portion of said information; determine attributes of the analog circuit component to be generated based on said information and said layout parameters; generate a transistor level schematic of the analog circuit comprising one or more of the analog circuit components, wherein the one or more analog circuit components are configured with said attributes; and generate a layout from the transistor level schematic, wherein the layout comprises a plurality of layout instances corresponding to the one or more analog circuit components, and wherein each layout instances is automatically positioned in the layout by a layout script based on said attributes of the analog circuit component.

Embodiment 117. A system for generating a circuit comprising: means for receiving information specifying an analog circuit component to be generated; means for retrieving layout parameters based on at least a portion of said information; means for determining attributes of the analog circuit component to be generated based on said information and said layout parameters; means for generating a transistor level schematic of the analog circuit comprising one or more of the analog circuit components, wherein the one or more analog circuit components are configured with said attributes; and means for generating a layout from the transistor level schematic, wherein the layout comprises a plurality of layout instances corresponding to the one or more analog circuit components, and wherein each layout instances is automatically positioned in the layout by a layout script based on said attributes of the analog circuit component.

Embodiment 118. A computer-implemented method of generating an electronic component schematic comprising: receiving information specifying an electronic circuit to be generated; determining a component value for at least one component of the electronic circuit based on the information; generating a plurality of component symbols; encoding the component value in an identifier associated with each of the component symbols; establishing connections between the component symbols; and generating a circuit specification to configure the component symbols in series or in parallel.

Embodiment 119. The method of embodiment 118 wherein the identifier comprises a symbol name.

Embodiment 120. The method of embodiment 118 wherein the component is a resistor, and wherein the component value comprises a resistance.

Embodiment 121. The method of embodiment 118 wherein the component is a capacitor, and wherein the component value comprises a capacitance.

Embodiment 122. The method of embodiment 118 wherein the component is a transistor, and wherein the component value comprises a gate width.

Embodiment 123. The method of embodiment 122 wherein the component value further comprises a number of fingers.

Embodiment 124. A computer system for generating an electronic component schematic comprising: one or more processors; and a non-transitory computer-readable storage medium having stored thereon computer executable instructions, which when executed by the computer system, cause the computer system to perform a method comprising: receiving information specifying an electronic circuit to be generated; determining a component value for at least one component of the electronic circuit based on the information; generating a plurality of component symbols; encoding the component value in an identifier associated with each of the component symbols; establishing connections between the component symbols; and generating a circuit specification to configure the component symbols in series or in parallel.

Embodiment 125. A non-transitory computer-readable storage medium having stored thereon computer executable instructions, which when executed by a computer system, cause the computer system to: receive information specifying an electronic circuit to be generated; determine a component value for at least one component of the electronic circuit based on the information; generate a plurality of component symbols; encode the component value in an identifier associated with each of the component symbols; establish connections between the component symbols; and generate a circuit specification to configure the component symbols in series or in parallel.

The computer system of embodiment 124 in combination with any one or more of embodiments 118-123.

The non-transitory computer-readable storage medium of embodiment 125 having stored thereon computer executable instructions, which when executed by a computer system, cause the computer system to perform any one or more of embodiments 118-123.

Embodiment 126. A system for generating an electronic component schematic comprising: means for receiving information specifying an electronic circuit to be generated; means for determining a component value for at least one component of the electronic circuit based on the information; means for generating a plurality of component symbols; means for encoding the component value in an identifier associated with each of the component symbols; means for establishing connections between the component symbols; and means for generating a circuit specification to configure the component symbols in series or in parallel.

Embodiment 127. A computer-implemented method of generating an electronic component schematic comprising: receiving a circuit specification specifying one or more components comprising one or more corresponding identifiers; generating one or more schematic symbols for the one or more components, wherein the one or more schematic symbols are associated with the one or more corresponding identifiers; reading the identifiers associated with the one or more symbols; and inserting a schematic representation for the component into each symbol, wherein one or more attributes of the schematic representation for the component are set based on the identifier associated with the symbol.

Embodiment 128. The method of embodiment 127 wherein the identifier encodes attribute values.

Embodiment 129. The method of embodiment 127 wherein the identifier comprises a symbol name.

Embodiment 130. The method of embodiment 129 wherein the symbol name encodes attribute values.

Embodiment 131. The method of embodiment 127 wherein the component is a resistor, and wherein the one or more attributes comprise a resistance.

Embodiment 132. The method of embodiment 127 wherein the component is a capacitor, and wherein the one or more attributes comprise a capacitance.

Embodiment 133. The method of embodiment 127 wherein the component is a transistor, and wherein the one or more attributes comprise a gate width.

Embodiment 134. The method of embodiment 133 wherein the one or more attributes further comprise a number of fingers.

Embodiment 135. A computer system for generating an electronic component schematic comprising: one or more processors; and a non-transitory computer-readable storage medium having stored thereon computer executable instructions, which when executed by the computer system, cause the computer system to perform a method comprising: receiving a circuit specification specifying one or more components comprising one or more corresponding identifiers; generating one or more schematic symbols for the one or more components, wherein the one or more schematic symbols are associated with the one or more corresponding identifiers; reading the identifiers associated with the one or more symbols; and inserting a schematic representation for the component into each symbol, wherein one or more attributes of the schematic representation for the component are set based on the identifier associated with the symbol.

Embodiment 136. A non-transitory computer-readable storage medium having stored thereon computer executable instructions, which when executed by a computer system, cause the computer system to: receive a circuit specification specifying one or more components comprising one or more corresponding identifiers; generate one or more schematic symbols for the one or more components, wherein the one or more schematic symbols are associated with the one or more corresponding identifiers; read the identifiers associated with the one or more symbols; and insert a schematic representation for the component into each symbol, wherein one or more attributes of the schematic representation for the component are set based on the identifier associated with the symbol.

The computer system of embodiment 135 in combination with any one or more of embodiments 127-134.

The non-transitory computer-readable storage medium of embodiment 136 having stored thereon computer executable instructions, which when executed by a computer system, cause the computer system to perform any one or more of embodiments 127-134.

Embodiment 137. A system for generating an electronic component schematic comprising: means for receiving a circuit specification specifying one or more components comprising one or more corresponding identifiers; means for generating one or more schematic symbols for the one or more components, wherein the one or more schematic symbols are associated with the one or more corresponding identifiers; means for reading the identifiers associated with the one or more symbols; and means for inserting a schematic representation for the component into each symbol, wherein one or more attributes of the schematic representation for the component are set based on the identifier associated with the symbol.

Embodiment 138. A computer-implemented method of generating a resistor comprising: receiving a first resistor value; converting the resistor value into a plurality of resistor layout segments; and automatically placing the plurality of resistor layout segments based on one or more layout placement instructions to form the first resistor value.

Embodiment 139. The method of embodiment 138 wherein a first resistor layout segment is placed at an initial position, and other resistor layout segments are placed at positions offset from the initial position.

Embodiment 140. The method of embodiment 139 wherein the offset is based on a width of each resistor layout segment.

Embodiment 141. The method of embodiment 140 wherein the offset is further based on predefined separation between adjacent layout segments.

Embodiment 142. The method of embodiment 141 wherein the predefined separation is based on a design rule check (DRC) value.

Embodiment 143. The method of embodiment 139 wherein resistor layout segments are placed in parallel along the length of each resistor layout segment.

Embodiment 144. The method of embodiment 139 wherein resistor layout segments are rotated by an amount specified in the one or more layout placement instructions.

Embodiment 145. The method of embodiment 139 wherein resistor layout segments are successively placed along an axis according to a polarity specified in the one or more layout placement instructions.

Embodiment 146. The method of embodiment 138 wherein each resistor layout segment has a unique identifier, the method further comprising sorting the resistor layout segments based on the unique identifier and successively placing each resistor layout segment.

Embodiment 147. The method of embodiment 138 wherein a first portion of the resistor layout segments are configured in series and a second portion of the resistor layout segments are configured in parallel.

Embodiment 148. The method of embodiment 138 wherein at least a first plurality of the resistor layout segments have a same length and width.

Embodiment 149. A computer system for generating a resistor comprising: one or more processors; and a non-transitory computer-readable storage medium having stored thereon computer executable instructions, which when executed by the computer system, cause the computer system to perform a method comprising: receiving a first resistor value; converting the resistor value into a plurality of resistor layout segments; and automatically placing the plurality of resistor layout segments based on one or more layout placement instructions to form the first resistor value.

Embodiment 150. A non-transitory computer-readable storage medium having stored thereon computer executable instructions, which when executed by a computer system, cause the computer system to: receive a first resistor value; convert the resistor value into a plurality of resistor layout segments; and automatically place the plurality of resistor layout segments based on one or more layout placement instructions to form the first resistor value.

The computer system of embodiment 149 in combination with any one or more of embodiments 138-148.

The non-transitory computer-readable storage medium of embodiment 150 having stored thereon computer executable instructions, which when executed by a computer system, cause the computer system to perform any one or more of embodiments 138-148.

Embodiment 151. A system for generating a resistor comprising: means for receiving a first resistor value; means for converting the resistor value into a plurality of resistor layout segments; and means for automatically placing the plurality of resistor layout segments based on one or more layout placement instructions to form the first resistor value.

Embodiment 152. A computer-implemented method of generating a resistor comprising: receiving a first resistor value; determining one or both of: a first number specifying a first plurality of resistor segments to be configured in series; and a second number specifying a second plurality of resistor segments to be configured in parallel, to approximately produce the first resistor value; and generating a circuit specification to configure the first number of resistor segments in series and/or the second number of resistor segments in parallel.

Embodiment 153. The method of embodiment 152 wherein the first resistor value varies across a range of values.

Embodiment 154. The method of embodiment 152 wherein the first resistor value is received as a parameter with an associated resistor component type.

Embodiment 155. The method of embodiment 152 further comprising receiving at least one predefined physical dimension for a resistor segment, wherein the first and second plurality of resistor segments each have the at least one predefined physical dimension, and wherein said determining the first number of resistor segments to be configured in series and the second number of resistor segments to be configured in parallel is based on the at least one predefined physical dimension.

Embodiment 156. The method of embodiment 155 wherein the at least one predefined physical dimension includes a predefined resistor segment length.

Embodiment 157. The method of embodiment 156 wherein the at least one predefined physical dimension includes a predefined resistor segment width.

Embodiment 158. The method of embodiment 155 wherein the at least one predefined physical dimension for the resistor segment is associated with the first resistor value.

Embodiment 159. The method of embodiment 152 wherein different resistors having different resistor values have different corresponding predefined resistor segment lengths.

Embodiment 160. The method of embodiment 152 further comprising receiving a resistivity associated with the first resistor value, wherein said determining the first number of resistor segments to be configured in series and the second number of resistor segments to be configured in parallel is based on the resistivity.

Embodiment 161. The method of embodiment 152 wherein the first resistor value is specified by a user.

Embodiment 162. The method of embodiment 152 further comprising receiving one or more parameters, wherein the first resistor value is determined based on said parameters.

Embodiment 163. The method of embodiment 152 wherein the circuit specification specifies a plurality of components corresponding to the plurality of resistor segments and connections between the plurality of components.

Embodiment 164. The method of embodiment 163 wherein the circuit specification is a netlist.

Embodiment 165. The method of embodiment 152 further comprising sending the circuit specification from a first software system to a second software system, the second software system generating a schematic based on the circuit specification.

Embodiment 166. The method of embodiment 165 further comprising receiving, by the second software system, a predefined length and a predefined width for the plurality of resistor segments encoded in identifiers for components corresponding to the resistor segments in the circuit specification.

Embodiment 167. The method of embodiment 166 wherein the identifier is a symbol name.

Embodiment 168. The method of embodiment 166 wherein the identifier further encodes a resistor type.

Embodiment 169. The method of embodiment 165 further comprising receiving, by the second software system, a predefined length and a predefined width for the plurality of resistor segments from a first storage location.

Embodiment 170. The method of embodiment 152 further comprising generating a schematic based on the circuit specification, the schematic comprising schematic symbols for the first and second number of resistor segments.

Embodiment 171. The method of embodiment 170 wherein the schematic symbols are empty schematic symbols comprising a plurality of pins, the method further comprising automatically inserting a resistor in each of the schematic symbols and connecting terminals of the resistor with the pins of the schematic symbol.

Embodiment 172. The method of embodiment 170 further comprising mapping a schematic symbol name to attributes of the resistor.

Embodiment 173. The method of embodiment 152 further comprising generating a layout, the layout comprising a plurality of polygons for the first number of resistor segments in series and the second number of resistor segments in parallel.

Embodiment 174. The method of embodiment 173 further comprising executing a plurality of predefined layout placement instructions to position the polygons in the layout.

Embodiment 175. A computer system for generating a resistor comprising: one or more processors; and a non-transitory computer-readable storage medium having stored thereon computer executable instructions, which when executed by the computer system, cause the computer system to perform a method comprising: receiving a first resistor value; determining one or both of: a first number specifying a first plurality of resistor segments to be configured in series; and a second number specifying a second plurality of resistor segments to be configured in parallel, to approximately produce the first resistor value; and generating a circuit specification to configure the first number of resistor segments in series and/or the second number of resistor segments in parallel.

Embodiment 176. A non-transitory computer-readable storage medium having stored thereon computer executable instructions, which when executed by a computer system, cause the computer system to: receive a first resistor value; determine one or both of: a first number specifying a first plurality of resistor segments to be configured in series; and a second number specifying a second plurality of resistor segments to be configured in parallel, to approximately produce the first resistor value; and generate a circuit specification to configure the first number of resistor segments in series and/or the second number of resistor segments in parallel.

The computer system of embodiment 175 in combination with any one or more of embodiments 152-174.

The non-transitory computer-readable storage medium of embodiment 176 having stored thereon computer executable instructions, which when executed by a computer system, cause the computer system to perform any one or more of embodiments 152-174.

Embodiment 177. A system for generating a resistor comprising: means for receiving a first resistor value; means for determining one or both of: a first number specifying a first plurality of resistor segments to be configured in series; and a second number specifying a second plurality of resistor segments to be configured in parallel, to approximately produce the first resistor value; and means for generating a circuit specification to configure the first number of resistor segments in series and/or the second number of resistor segments in parallel.

Embodiment 178. A computer-implemented method of generating a resistor comprising: receiving a resistor value; generating a circuit specification specifying a configuration of a plurality of components; generating, based on the circuit specification, a plurality of schematic symbols corresponding to the plurality of components coupled together based on the circuit specification, wherein the plurality of schematic symbols are generated without resistor segments; and automatically inserting a resistor segment in each of the schematic symbols and connecting terminals of the resistors with pins of the schematic symbols, wherein the plurality of components and inserted resistor segments form a schematic for a resistor network having the resistor value.

Embodiment 179. The method of embodiment 178 wherein the symbols are generated in response to the circuit specification as empty symbols.

Embodiment 180. The method of embodiment 178 further comprising assigning attributes to the resistors.

Embodiment 181. The method of embodiment 180 wherein attributes for the resistors are encoded in the circuit specification.

Embodiment 182. The method of embodiment 180 wherein attributes for the resistors are retrieved from a storage location.

Embodiment 183. The method of embodiment 178 wherein the circuit specification is generated by a first software system and the schematic is generated by a second software system.

Embodiment 184. The method of embodiment 183 wherein the second software system is an electronic design automation software system.

Embodiment 185. A computer system for generating a resistor comprising: one or more processors; and a non-transitory computer-readable storage medium having stored thereon computer executable instructions, which when executed by the computer system, cause the computer system to perform a method comprising: receiving a resistor value; generating a circuit specification specifying a configuration of a plurality of components; generating, based on the circuit specification, a plurality of schematic symbols corresponding to the plurality of components coupled together based on the circuit specification, wherein the plurality of schematic symbols are generated without resistor segments; and automatically inserting a resistor segment in each of the schematic symbols and connecting terminals of the resistors with pins of the schematic symbols, wherein the plurality of components and inserted resistor segments form a schematic for a resistor network having the resistor value.

Embodiment 186. A non-transitory computer-readable storage medium having stored thereon computer executable instructions, which when executed by a computer system, cause the computer system to: receive a resistor value; generate a circuit specification specifying a configuration of a plurality of components; generate, based on the circuit specification, a plurality of schematic symbols corresponding to the plurality of components coupled together based on the circuit specification, wherein the plurality of schematic symbols are generated without resistor segments; and automatically insert a resistor segment in each of the schematic symbols and connecting terminals of the resistors with pins of the schematic symbols, wherein the plurality of components and inserted resistor segments form a schematic for a resistor network having the resistor value.

The computer system of embodiment 185 in combination with any one or more of embodiments 178-184.

The non-transitory computer-readable storage medium of embodiment 186 having stored thereon computer executable instructions, which when executed by a computer system, cause the computer system to perform any one or more of embodiments 178-184.

Embodiment 187. A system for generating a resistor comprising: means for receiving a resistor value; means for generating a circuit specification specifying a configuration of a plurality of components; means for generating, based on the circuit specification, a plurality of schematic symbols corresponding to the plurality of components coupled together based on the circuit specification, wherein the plurality of schematic symbols are generated without resistor segments; and means for automatically inserting a resistor segment in each of the schematic symbols and connecting terminals of the resistors with pins of the schematic symbols, wherein the plurality of components and inserted resistor segments form a schematic for a resistor network having the resistor value.

Embodiment 188. A computer-implemented method of generating a resistor comprising: receiving a first resistor value; generating a circuit specification specifying a configuration of a plurality of components, wherein the plurality of components correspond to resistor segments having at least one predefined physical dimension; generating, based on the circuit specification, a schematic comprising the resistor segments corresponding to the plurality of components coupled together based on the circuit specification to produce the first resistor value; and generating, based on the schematic, a layout comprising a plurality of polygons corresponding to the resistor segments, wherein the plurality of polygons are automatically placed in the layout based on the at least one predefined physical dimension of the resistor segments.

Embodiment 189. A computer system for generating a resistor comprising: one or more processors; and a non-transitory computer-readable storage medium having stored thereon computer executable instructions, which when executed by the computer system, cause the computer system to perform a method comprising: receiving a first resistor value; generating a circuit specification specifying a configuration of a plurality of components, wherein the plurality of components correspond to resistor segments having at least one predefined physical dimension; generating, based on the circuit specification, a schematic comprising the resistor segments corresponding to the plurality of components coupled together based on the circuit specification to produce the first resistor value; and generating, based on the schematic, a layout comprising a plurality of polygons corresponding to the resistor segments, wherein the plurality of polygons are automatically placed in the layout based on the at least one predefined physical dimension of the resistor segments.

Embodiment 190. A non-transitory computer-readable storage medium having stored thereon computer executable instructions, which when executed by a computer system, cause the computer system to: receive a first resistor value; generate a circuit specification specifying a configuration of a plurality of components, wherein the plurality of components correspond to resistor segments having at least one predefined physical dimension; generate, based on the circuit specification, a schematic comprising the resistor segments corresponding to the plurality of components coupled together based on the circuit specification to produce the first resistor value; and generate, based on the schematic, a layout comprising a plurality of polygons corresponding to the resistor segments, wherein the plurality of polygons are automatically placed in the layout based on the at least one predefined physical dimension of the resistor segments.

Embodiment 191. A system for generating a resistor comprising: means for receiving a first resistor value; means for generating a circuit specification specifying a configuration of a plurality of components, wherein the plurality of components correspond to resistor segments having at least one predefined physical dimension; means for generating, based on the circuit specification, a schematic comprising the resistor segments corresponding to the plurality of components coupled together based on the circuit specification to produce the first resistor value; and means for generating, based on the schematic, a layout comprising a plurality of polygons corresponding to the resistor segments, wherein the plurality of polygons are automatically placed in the layout based on the at least one predefined physical dimension of the resistor segments.

Embodiment 192. A computer-implemented method of generating a capacitor comprising: receiving a total capacitance for a capacitor to be generated; determining a number N of unit capacitors having a unit capacitance to be combined to form the total capacitance; generating a transistor level schematic comprising N unit capacitor schematics having the unit capacitance, wherein the N unit capacitor schematics are configured to produce the total capacitance; and generating a layout comprising N capacitor layout elements configured to produce said capacitor.

Embodiment 193. The method of embodiment 192 wherein the total capacitance is produced based on information specifying a circuit to be generated.

Embodiment 194. The method of embodiment 193 wherein the total capacitance is produced based on a predefined circuit model for the circuit to be generated.

Embodiment 195. The method of embodiment 192 wherein the total capacitance is received as a parameter corresponding to a capacitor functional circuit component.

Embodiment 196. The method of embodiment 192 further comprising comparing the total capacitance to a predefined maximum capacitance, wherein the N unit capacitor schematics are configured in parallel when the total capacitance is greater than the predefined maximum capacitance.

Embodiment 197. The method of embodiment 192 further comprising comparing the total capacitance to a predefined minimum capacitance, wherein the N unit capacitor schematics are configured in series when the total capacitance is less than the predefined minimum capacitance.

Embodiment 198. The method of embodiment 192 wherein the number N of unit capacitors is an integer greater than or equal to one (1).

Embodiment 199. The method of embodiment 192 further comprising: configuring a first length corresponding to a first dimension of the N unit capacitors to be less than or equal to a predefined maximum length along the first dimension; and determining a second length corresponding to a second dimension of the N unit capacitors based on at least the unit capacitance and the first length.

Embodiment 200. The method of embodiment 199 wherein the first length is set to the predefined maximum length along the first dimension.

Embodiment 201. The method of embodiment 199 wherein the first length and second length are configured to produce a predefined aspect ratio of the first length and the second length.

Embodiment 202. The method of embodiment 199 the method further comprising iteratively adjusting the first length to produce an adjusted second length until an aspect ratio of the first length and the second length meet a predetermined aspect ratio.

Embodiment 203. The method of embodiment 202 wherein the first length is initially the predefined maximum length and the first length is iteratively reduced.

Embodiment 204. The method of embodiment 199 further comprising generating a circuit specification comprising N components corresponding to the N unit capacitors.

Embodiment 205. The method of embodiment 204 wherein the circuit specification is a netlist.

Embodiment 206. The method of embodiment 204 wherein one or more attributes of the N unit capacitors are encoded in the circuit specification.

Embodiment 207. The method of embodiment 199 wherein the N unit capacitor schematics have a first attribute set to the first length and a second attribute set to the second length.

Embodiment 208. The method of embodiment 199 wherein the N capacitor layout elements comprise polygons having a first dimension equal to the first length and a second dimension equal to the second length.

Embodiment 209. The method of embodiment 192, said generating a transistor level schematic comprising: generating N schematic symbols; and automatically inserting into each of the N schematic symbols a capacitor symbol component.

Embodiment 210. A computer system for generating a capacitor comprising: one or more processors; and a non-transitory computer-readable storage medium having stored thereon computer executable instructions, which when executed by the computer system, cause the computer system to perform a method comprising: receiving a total capacitance for a capacitor to be generated; determining a number N of unit capacitors having a unit capacitance to be combined to form the total capacitance; generating a transistor level schematic comprising N unit capacitor schematics having the unit capacitance, wherein the N unit capacitor schematics are configured to produce the total capacitance; and generating a layout comprising N capacitor layout elements configured to produce said capacitor.

Embodiment 211. A non-transitory computer-readable storage medium having stored thereon computer executable instructions, which when executed by a computer system, cause the computer system to: receive a total capacitance for a capacitor to be generated; determine a number N of unit capacitors having a unit capacitance to be combined to form the total capacitance; generate a transistor level schematic comprising N unit capacitor schematics having the unit capacitance, wherein the N unit capacitor schematics are configured to produce the total capacitance; and generate a layout comprising N capacitor layout elements configured to produce said capacitor.

The computer system of embodiment 210 in combination with any one or more of embodiments 192-209.

The non-transitory computer-readable storage medium of embodiment 211 having stored thereon computer executable instructions, which when executed by a computer system, cause the computer system to perform any one or more of embodiments 192-209.

Embodiment 212. A system for generating a capacitor comprising: means for receiving a total capacitance for a capacitor to be generated; means for determining a number N of unit capacitors having a unit capacitance to be combined to form the total capacitance; means for generating a transistor level schematic comprising N unit capacitor schematics having the unit capacitance, wherein the N unit capacitor schematics are configured to produce the total capacitance; and means for generating a layout comprising N capacitor layout elements configured to produce said capacitor.

Embodiment 213. A computer-implemented method of generating a resistor divider comprising: receiving a parameters specifying a resistor divider to be generated; determining a plurality of resistor values corresponding to resistors between one or more output taps of the resistor divider; for each resistor value, determining a plurality of resistor segments to produce each of the plurality of resistor values; generating a circuit specification to configure each plurality of resistor segments to form the plurality of resistor values; and generating a transistor level schematic comprising the plurality of resistor segments to produce said resistor divider.

Embodiment 214. The method of embodiment 213, wherein determining a plurality of resistor segments comprises determining at least one first number specifying a first plurality of resistor segments to be configured in series.

Embodiment 215. The method of embodiment 213, wherein determining a plurality of resistor segments comprises determining at least one first number specifying a first plurality of resistor segments to be configured in parallel.

Embodiment 216. The method of embodiment 213, wherein determining a plurality of resistor segments comprises determining at least one first number specifying a first plurality of resistor segments to be configured in series and at least one second number specifying a second plurality of resistor segments to be configured in parallel.

Embodiment 217. The method of embodiment 213, wherein the parameters specify a total resistance of the resistor divider, and wherein the plurality of resistor values are determined based on the total resistance of the resistor divider.

Embodiment 218. The method of embodiment 213, wherein the parameters specify one or more output taps, wherein the plurality of resistor values is equal to a number of output taps plus one (1).

Embodiment 219. The method of embodiment 218, wherein the parameters specify voltages at each output tap, wherein the plurality of resistor values are determined based on a number of output taps and the voltages at each output tap.

Embodiment 220. The method of embodiment 218, wherein the parameters specify voltages at each output tap as one or more percentages, wherein the plurality of resistor values are determined based on a number of output taps and a difference in percentage across two of: an input, a plurality of output taps, and a bottom.

Embodiment 221. The method of embodiment 213, wherein the parameters specify an enable, the method further comprising specifying, in the circuit specification, one or more sub-circuit schematics, wherein the specified sub-circuit schematics are configured to receive an input to enable or disable the resistor divider.

Embodiment 222. The method of embodiment 221, wherein the sub-circuit schematics comprise a switch.

Embodiment 223. The method of embodiment 222, wherein the switch is coupled between an input of the resistor divider and one or more terminals of top resistor segments of the resistor divider.

Embodiment 224. The method of embodiment 222, wherein the switch is coupled between a reference input of the resistor divider and one or more terminals of bottom resistor segments of the resistor divider.

Embodiment 225. The method of embodiment 222, wherein the switch is coupled between an output tap of the resistor divider and one or more terminals of intermediate resistor segments of the resistor divider.

Embodiment 226. A computer system for generating a resistor divider comprising: one or more processors; and a non-transitory computer-readable storage medium having stored thereon computer executable instructions, which when executed by the computer system, cause the computer system to perform a method comprising: receiving a parameters specifying a resistor divider to be generated; determining a plurality of resistor values corresponding to resistors between one or more output taps of the resistor divider; for each resistor value, determining a plurality of resistor segments to produce each of the plurality of resistor values; generating a circuit specification to configure each plurality of resistor segments to form the plurality of resistor values; and generating a transistor level schematic comprising the plurality of resistor segments to produce said resistor divider.

Embodiment 227. A non-transitory computer-readable storage medium having stored thereon computer executable instructions, which when executed by a computer system, cause the computer system to: receive a parameters specifying a resistor divider to be generated; determine a plurality of resistor values corresponding to resistors between one or more output taps of the resistor divider; for each resistor value, determine a plurality of resistor segments to produce each of the plurality of resistor values; generate a circuit specification to configure each plurality of resistor segments to form the plurality of resistor values; and generate a transistor level schematic comprising the plurality of resistor segments to produce said resistor divider.

The computer system of embodiment 226 in combination with any one or more of embodiments 213-225.

The non-transitory computer-readable storage medium of embodiment 227 having stored thereon computer executable instructions, which when executed by a computer system, cause the computer system to perform any one or more of embodiments 213-225.

Embodiment 228. A system for generating a resistor divider comprising: means for receiving a parameters specifying a resistor divider to be generated; means for determining a plurality of resistor values corresponding to resistors between one or more output taps of the resistor divider, and for each resistor value, determining a plurality of resistor segments to produce each of the plurality of resistor values; means for generating a circuit specification to configure each plurality of resistor segments to form the plurality of resistor values; and means for generating a transistor level schematic comprising the plurality of resistor segments to produce said resistor divider.

Embodiment 229. A computer-implemented method of generating a transistor comprising: receiving information specifying a transistor to be generated, said information comprising an on resistance of the transistor to be generated; determining a total width of a gate of the transistor to be generated based at least on the on resistance; determining a first width, a number of fingers (F), and a number of device cells (P) based on the total width; generating a transistor level schematic comprising one or more transistors configured with the first width and the number of fingers (F); and generating a layout, wherein the layout comprises P device cells, each device cell comprising a plurality of gates corresponding to said number of fingers (F) each gate having said first width, wherein the device cells are configured in a two-dimensional array.

Embodiment 230. The method of embodiment 229 wherein transistor level schematic comprises one transistor having a multiplier attribute (M) equal to said number of device cells (P).

Embodiment 231. The method of embodiment 229 wherein transistor level schematic comprises P transistors configured in parallel.

Embodiment 232. The method of embodiment 229 wherein the P device cells have a programmable aspect ratio.

Embodiment 233. The method of embodiment 232 wherein the aspect ratio is greater than 0.5 and less than 1.

Embodiment 234. The method of embodiment 232 wherein the aspect ratio is between about ⅔rds and about ¾ths.

Embodiment 235. The method of embodiment 229 wherein the two-dimensional array comprises an equal number of rows and columns of device cells.

Embodiment 236. The method of embodiment 229 wherein the number of device cells (P) is a perfect square.

Embodiment 237. The method of embodiment 229 wherein the first width, first number of fingers, and the number of device cells (P) are determined based on a maximum width, and a maximum number of fingers.

Embodiment 238. The method of embodiment 237 further comprising determining the number of device cells (P) and the number of fingers (F) by increasing the number of device cells (P) across a plurality of increasing values to determine the number of fingers (F) obtainable based on a current number of device cells, the maximum width, and the maximum number of fingers.

Embodiment 239. The method of embodiment 237 the method further comprising: iteratively increasing the number of device cells (P) across a plurality of values; determining if the total width is obtainable from a current value of P, the maximum width, and the maximum number of fingers; if the total width is not obtainable from the current value of P, the maximum width, and the maximum number of fingers, then increasing the value of P, and repeating said determining step; and if the total width is obtainable from the current value of P, the maximum width, and the maximum number of fingers, then setting the number of device cells (P) to the current value of P and setting the number of fingers (F) based on the maximum width and the current value of P.

Embodiment 240. The method of embodiment 238 further comprising determining a first length along a first dimension of a device cell based on the number of fingers (F) and a first plurality of predefined offset values.

Embodiment 241. The method of embodiment 240 wherein the plurality of predefined offset values are selected based on a transistor type.

Embodiment 242. The method of embodiment 240 further comprising determining a second length of the device cell based on the first length and a predefined aspect ratio.

Embodiment 243. The method of embodiment 242 wherein the aspect ratio is programmable.

Embodiment 244. The method of embodiment 242 further comprising determining the first width based on the second length and at least one second predefined offset value.

Embodiment 245. The method of embodiment 237 wherein the maximum width and maximum number of fingers are predefined values.

Embodiment 246. The method of embodiment 229 further comprising generating a circuit specification specifying one or more transistors having the first width and the number of fingers (F), wherein the circuit specification is used to generate the transistor level schematic.

Embodiment 247. The method of embodiment 246 wherein the information specifying a transistor to be generated specifies a device type, and wherein the circuit specification specifies one or more p-type transistors or n-type transistors based on the device type.

Embodiment 248. The method of embodiment 246 wherein the information specifying a transistor to be generated specifies a maximum drain-to-source voltage, and wherein the circuit specification specifies one of a plurality of transistors based on the maximum drain-to-source voltage.

Embodiment 249. The method of embodiment 246 wherein the information specifying a transistor to be generated specifies a maximum gate-to-source voltage, and wherein the circuit specification specifies one of a plurality of transistors based on the maximum gate-to-source voltage.

Embodiment 250. The method of embodiment 229 wherein determining the total width of the gate of the transistor to be generated based at least on the on resistance comprises: selecting one set of a plurality of sets of regression coefficients based on a transistor type of the transistor to be generated; determining the total width based on the on resistance and the selected set of regression coefficients.

Embodiment 251. The method of embodiment 250 wherein the transistor type is a power transistor.

Embodiment 252. The method of embodiment 250 wherein the transistor type is a signal transistor.

Embodiment 253. The method of embodiment 229 wherein the information specifying a transistor to be generated specifies a replica transistor, and wherein the transistor level schematic comprises a replica transistor having a gate coupled to one or more gates of the one or more transistors and a drain coupled to one or more drains of the one or more transistors.

Embodiment 254. The method of embodiment 253 wherein the information specifying a transistor to be generated specifies a replica gain, and wherein a width of the replica transistor is determined based on the total width of the transistor to be generated.

Embodiment 255. The method of embodiment 229 wherein the information specifying a transistor to be generated specifies a Kelvin connection, and wherein the transistor level schematic comprises a Kelvin source terminal coupled to one or more sources of the one or more transistors and a Kelvin drain terminal coupled to one or more drains of the one or more transistors.

Embodiment 256. The method of embodiment 255 wherein the transistor level schematic further comprises a first resistor configured between the Kelvin source terminal and the one or more source terminals of the one or more transistors and a second resistor configured between the Kelvin drain terminal and the one or more drains of the one or more transistors Embodiment 257. The method of embodiment 229 wherein said generating a layout comprising executing one or more layout placement instructions, wherein the layout placement instructions successively place the P device cells at an initial position and P−1 other positions offset from the initial position by an integer number of x-axis offsets and y-axis offsets.

Embodiment 258. The method of embodiment 257 wherein the executed layout placement instructions are executed based on a transistor type.

Embodiment 259. The method of embodiment 257 wherein the x-axis offsets and y-axis offsets are calculated based on the first width and the number of fingers (F).

Embodiment 260. The method of embodiment 257 wherein said generating a layout further comprising automatically placing a plurality of metallization strips across the two-dimensional array of device cells.

Embodiment 261. The method of embodiment 260 wherein a number of metallization strips across each device cell is determined based on the first width and a predefined maximum strip width.

Embodiment 262. The method of embodiment 260 wherein the metallization strips are placed based on pre-defined offsets selected based on a transistor type of the transistor to be generated.

Embodiment 263. A computer system for generating a transistor comprising: one or more processors; and a non-transitory computer-readable storage medium having stored thereon computer executable instructions, which when executed by the computer system, cause the computer system to perform a method comprising: receiving information specifying a transistor to be generated, said information comprising an on resistance of the transistor to be generated; determining a total width of a gate of the transistor to be generated based at least on the on resistance; determining a first width, a number of fingers (F), and a number of device cells (P) based on the total width; generating a transistor level schematic comprising one or more transistors configured with the first width and the number of fingers (F); and generating a layout, wherein the layout comprises P device cells, each device cell comprising a plurality of gates corresponding to said number of fingers (F) each gate having said first width, wherein the device cells are configured in a two-dimensional array.

Embodiment 264. A non-transitory computer-readable storage medium having stored thereon computer executable instructions, which when executed by a computer system, cause the computer system to: receive information specifying a transistor to be generated, said information comprising an on resistance of the transistor to be generated; determine a total width of a gate of the transistor to be generated based at least on the on resistance; determine a first width, a number of fingers (F), and a number of device cells (P) based on the total width; generate a transistor level schematic comprising one or more transistors configured with the first width and the number of fingers (F); and generate a layout, wherein the layout comprises P device cells, each device cell comprising a plurality of gates corresponding to said number of fingers (F) each gate having said first width, wherein the device cells are configured in a two-dimensional array.

The computer system of embodiment 263 in combination with any one or more of embodiments 229-262.

The non-transitory computer-readable storage medium of embodiment 264 having stored thereon computer executable instructions, which when executed by a computer system, cause the computer system to perform any one or more of embodiments 229-262.

Embodiment 265. A system for generating a transistor comprising: means for receiving information specifying a transistor to be generated, said information comprising an on resistance of the transistor to be generated; means for determining a total width of a gate of the transistor to be generated based at least on the on resistance; means for determining a first width, a number of fingers (F), and a number of device cells (P) based on the total width; means for generating a transistor level schematic comprising one or more transistors configured with the first width and the number of fingers (F); and means for generating a layout, wherein the layout comprises P device cells, each device cell comprising a plurality of gates corresponding to said number of fingers (F) each gate having said first width, wherein the device cells are configured in a two-dimensional array.

Embodiment 266. A computer-implemented method of generating a transistor comprising: receiving information specifying a transistor to be generated, the information comprising an on resistance; calculating area from on resistance; determining a total width based on the area and a predefined length; determining a number of device cells (P) and a number of fingers (F) based on the total width, a predefined maximum width, and a predefined maximum number of fingers; determining a first length along a first dimension of a device cell based the number of fingers (F); determining a second length along a second dimension of the device cell based on a programmed ratio of the first length and the second length; determining a first gate width based on the second dimension; and configuring one or more transistors in a transistor level schematic with the first gate width and said number of fingers (F).

Embodiment 267. The method of embodiment 266 wherein the transistor level schematic comprises one transistor having a multiplier attribute (M) equal to said number of device cells (P).

Embodiment 268. The method of embodiment 266 wherein the transistor level schematic comprises P transistors configured in parallel.

Embodiment 269. The method of embodiment 266 wherein the number of device cells (P) is perfect square.

Embodiment 270. A computer system for generating a circuit comprising: one or more processors; and a non-transitory computer-readable storage medium having stored thereon computer executable instructions, which when executed by the computer system, cause the computer system to perform a method comprising: receiving information specifying a transistor to be generated, the information comprising at least an on resistance; calculating area from on resistance; determining a total width based on the area and a predefined length; determining a number of device cells (P) and a number of fingers (F) based on the total width, a predefined maximum width, and a predefined maximum number of fingers; determining a first length along a first dimension of a device cell based the number of fingers (F); determining a second length along a second dimension of the device cell based on a programmed ratio of the first length and the second length; determining a first gate width based on the second dimension; and configuring one or more transistors in a transistor level schematic with the first gate width and said number of fingers (F).

Embodiment 271. A non-transitory computer-readable storage medium having stored thereon computer executable instructions, which when executed by a computer system, cause the computer system to: receive information specifying a transistor to be generated, the information comprising at least an on resistance; calculate area from on resistance; determine a total width based on the area and a predefined length; determine a number of device cells (P) and a number of fingers (F) based on the total width, a predefined maximum width, and a predefined maximum number of fingers; determine a first length along a first dimension of a device cell based the number of fingers (F); determine a second length along a second dimension of the device cell based on a programmed ratio of the first length and the second length; determine a first gate width based on the second dimension; and configure one or more transistors in a transistor level schematic with the first gate width and said number of fingers (F).

The computer system of embodiment 270 in combination with any one or more of embodiments 266-269.

The non-transitory computer-readable storage medium of embodiment 271 having stored thereon computer executable instructions, which when executed by a computer system, cause the computer system to perform any one or more of embodiments 266-269.

Embodiment 272. A system for generating a transistor comprising: means for receiving information specifying a transistor to be generated, the information comprising an on resistance; means for calculating area from on resistance; means for determining a total width based on the area and a predefined length; means for determining a number of device cells (P) and a number of fingers (F) based on the total width, a predefined maximum width, and a predefined maximum number of fingers; means for determining a first length along a first dimension of a device cell based the number of fingers (F); means for determining a second length along a second dimension of the device cell based on a programmed ratio of the first length and the second length; means for determining a first gate width based on the second dimension; and means for configuring one or more transistors in a transistor level schematic with the first gate width and said number of fingers (F).

Embodiment 273. A computer-implemented method comprising: generating a plurality of data sets for a plurality of transistors, each data set comprising values of on resistance obtained for a plurality of gate widths for a particular transistor of the plurality of transistors; generating a plurality of coefficient sets comprising one or more regression coefficients based on a regression equation applied to each of the plurality of data sets; receiving information specifying an on resistance and a transistor of said plurality of transistors; selecting one coefficient set of the plurality of coefficient sets based on the specified transistor of said plurality of transistors; and determining a gate width based on said on resistance and the selected coefficient set.

Embodiment 274. A computer system for generating a circuit comprising: one or more processors; and a non-transitory computer-readable storage medium having stored thereon computer executable instructions, which when executed by the computer system, cause the computer system to perform a method comprising: generating a plurality of data sets for a plurality of transistors, each data set comprising values of on resistance obtained for a plurality of gate widths for a particular transistor of the plurality of transistors; generating a plurality of coefficient sets comprising one or more regression coefficients based on a regression equation applied to each of the plurality of data sets; receiving information specifying an on resistance and a transistor of said plurality of transistors; selecting one coefficient set of the plurality of coefficient sets based on the specified transistor of said plurality of transistors; and determining a gate width based on said on resistance and the selected coefficient set.

Embodiment 275. A non-transitory computer-readable storage medium having stored thereon computer executable instructions, which when executed by a computer system, cause the computer system to: generate a plurality of data sets for a plurality of transistors, each data set comprising values of on resistance obtained for a plurality of gate widths for a particular transistor of the plurality of transistors; generate a plurality of coefficient sets comprising one or more regression coefficients based on a regression equation applied to each of the plurality of data sets; receive information specifying an on resistance and a transistor of said plurality of transistors; select one coefficient set of the plurality of coefficient sets based on the specified transistor of said plurality of transistors; and determine a gate width based on said on resistance and the selected coefficient set.

Embodiment 276. A system for generating a circuit comprising: means for generating a plurality of data sets for a plurality of transistors, each data set comprising values of on resistance obtained for a plurality of gate widths for a particular transistor of the plurality of transistors; means for generating a plurality of coefficient sets comprising one or more regression coefficients based on a regression equation applied to each of the plurality of data sets; means for receiving information specifying an on resistance and a transistor of said plurality of transistors; means for selecting one coefficient set of the plurality of coefficient sets based on the specified transistor of said plurality of transistors; and means for determining a gate width based on said on resistance and the selected coefficient set.

Embodiment 277. A computer-implemented method of generating a transistor comprising: receiving information specifying a transistor to be generated; retrieving predefined layout parameters based on at least a portion of said information; determining attributes of the transistor to be generated based on said information and said layout parameters, the attributes comprising at a width, a number of fingers, and a number of device cells; generating a transistor level schematic of the transistor to be generated comprising one or more transistor schematics, wherein the one or more transistor schematics are configured based on said attributes; and generating a layout of the transistor to be generated from the transistor level schematic, wherein the layout comprises the number of device cells, and wherein each device cell is automatically positioned in the layout by layout placement instructions based on said attributes.

Embodiment 278. A computer system for generating a transistor comprising: one or more processors; and a non-transitory computer-readable storage medium having stored thereon computer executable instructions, which when executed by the computer system, cause the computer system to perform a method comprising: receiving information specifying a transistor to be generated; retrieving predefined layout parameters based on at least a portion of said information; determining attributes of the transistor to be generated based on said information and said layout parameters, the attributes comprising at a width, a number of fingers, and a number of device cells; generating a transistor level schematic of the transistor to be generated comprising one or more transistor schematics, wherein the one or more transistor schematics are configured based on said attributes; and generating a layout of the transistor to be generated from the transistor level schematic, wherein the layout comprises the number of device cells, and wherein each device cell is automatically positioned in the layout by layout placement instructions based on said attributes.

Embodiment 279. A non-transitory computer-readable storage medium having stored thereon computer executable instructions, which when executed by a computer system, cause the computer system to: receive information specifying a transistor to be generated; retrieve predefined layout parameters based on at least a portion of said information; determine attributes of the transistor to be generated based on said information and said layout parameters, the attributes comprising at a width, a number of fingers, and a number of device cells; generate a transistor level schematic of the transistor to be generated comprising one or more transistor schematics, wherein the one or more transistor schematics are configured based on said attributes; and generate a layout of the transistor to be generated from the transistor level schematic, wherein the layout comprises the number of device cells, and wherein each device cell is automatically positioned in the layout by layout placement instructions based on said attributes.

Embodiment 280. A system for generating a transistor comprising: means for receiving information specifying a transistor to be generated; means for retrieving predefined layout parameters based on at least a portion of said information; means for determining attributes of the transistor to be generated based on said information and said layout parameters, the attributes comprising at a width, a number of fingers, and a number of device cells; means for generating a transistor level schematic of the transistor to be generated comprising one or more transistor schematics, wherein the one or more transistor schematics are configured based on said attributes; and means for generating a layout of the transistor to be generated from the transistor level schematic, wherein the layout comprises the number of device cells, and wherein each device cell is automatically positioned in the layout by layout placement instructions based on said attributes.

Embodiment 281. A computer-implemented method of generating a transistor layout comprising: converting one or more transistors into a plurality of layout instances based on attributes of the transistors; and executing a predefined layout script, the predefined layout script positioning the plurality of layout instances as a 2-dimensional array to form a layout for the transistor.

Embodiment 282. The method of embodiment 281 wherein the layout script is associated with a circuit schematic including said transistor.

Embodiment 283. The method of embodiment 281 wherein transistor is a field effect transistor.

Embodiment 284. The method of embodiment 283 wherein transistor is a power field effect transistor.

Embodiment 285. The method of embodiment 281 further comprising determining a first gate width, a number of fingers (F), and a number of device cells (P) based on the total gate width for the transistors.

Embodiment 286. The method of embodiment 281 wherein the one or more transistors are a plurality of transistor configured in parallel having the same attributes, and
wherein a multiplier attribute of each transistor is equal to 1.

Embodiment 287. The method of embodiment 281 wherein the one or more transistors are a single transistor having a multiplier attribute greater than 1.

Embodiment 288. The method of embodiment 281 wherein a number of (P) the layout instances is a perfect square.

Embodiment 289. The method of embodiment 281 wherein an aspect ratio of the layout instances is programmable.

Embodiment 290. The method of embodiment 281 wherein the layout script comprises at least one layout placement instruction that specifies an initial position for a first layout instance.

Embodiment 291. The method of embodiment 290 wherein a single layout placement instruction places the plurality of layout instances.

Embodiment 292. The method of embodiment 290 wherein the at least one layout placement instruction specifies an x-step and a y-step between the layout instances.

Embodiment 293. The method of embodiment 290 wherein the at least one layout placement instruction specifies a number of columns and a number of rows for the 2-dimensional array.

Embodiment 294. A computer system for generating a transistor layout comprising: one or more processors; and a non-transitory computer-readable storage medium having stored thereon computer executable instructions, which when executed by the computer system, cause the computer system to perform a method comprising: converting one or more transistors into a plurality of layout instances based on attributes of the transistors; and executing a predefined layout script, the predefined layout script positioning the plurality of layout instances as a 2-dimensional array to form a layout for the transistor.

Embodiment 295. A non-transitory computer-readable storage medium having stored thereon computer executable instructions, which when executed by a computer system, cause the computer system to: convert one or more transistors into a plurality of layout instances based on attributes of the transistors; and execute a predefined layout script, the predefined layout script positioning the plurality of layout instances as a 2-dimensional array to form a layout for the transistor.

The computer system of embodiment 294 in combination with any one or more of embodiments 281-293.

The non-transitory computer-readable storage medium of embodiment 295 having stored thereon computer executable instructions, which when executed by a computer system, cause the computer system to perform any one or more of embodiments 281-293.

Embodiment 296. A computer system for generating a transistor layout comprising: means for converting one or more transistors into a plurality of layout instances based on attributes of the transistors; and means for executing a predefined layout script, the predefined layout script positioning the plurality of layout instances as a 2-dimensional array to form a layout for the transistor.

Embodiment 297. A computer-implemented method of generating a circuit layout comprising: specifying a circuit schematic to be converted to said circuit layout; receiving a layout script associated with the circuit schematic, the layout script configured to position a plurality of layout instances generated from the circuit schematic; converting the circuit schematic into the plurality of layout instances; and positioning the plurality of layout instances based on the layout script to produce said circuit layout.

Embodiment 298. The method of embodiment 297 wherein the circuit schematic is a transistor level circuit schematic for an analog circuit or mixed signal circuit.

Embodiment 299. The method of embodiment 297 wherein one or more of the plurality of layout instances are predefined layouts for sub-circuit schematics.

Embodiment 300. The method of embodiment 299 wherein the layout script comprising a reference to a library where a particular layout instance is stored.

Embodiment 301. The method of embodiment 297 wherein a first subset of the plurality of layout instances correspond to a plurality of resistors.

Embodiment 302. The method of embodiment 297 wherein a first subset of the plurality of layout instances correspond to a plurality of capacitors.

Embodiment 303. The method of embodiment 297 wherein the layout script specifies a particular placement for each of the plurality of layout instances.

Embodiment 304. The method of embodiment 297 wherein the circuit schematic corresponds to a first circuit schematic of a plurality of circuit schematics, and wherein the layout script is configured to position layout instances for each of the plurality of circuit schematics.

Embodiment 305. The method of embodiment 304 wherein the plurality of circuit schematics perform a first function.

Embodiment 306. The method of embodiment 304 wherein the layout script performs a plurality of placement operations on layout instances from different circuit schematics, and wherein placement operations on layout instances corresponding to the first circuit schematic are executed and placement operations on layout instances corresponding to other circuit schematics are not executed.

Embodiment 307. The method of embodiment 297 wherein the layout script comprises a plurality of layout placement instructions to position one or more of the layout instances.

Embodiment 308. The method of embodiment 307 wherein the plurality of layout placement instructions comprise corresponding code for implementing placement operations corresponding to each layout placement instruction.

Embodiment 309. The method of embodiment 308 wherein the code is a layout placement instruction script.

Embodiment 310. The method of embodiment 307 wherein the layout placement instructions receive positioning parameters specifying placement of the one or more layout instances.

Embodiment 311. The method of embodiment 307 wherein a subset of the layout placement instructions comprise a reference to a particular layout instance of the plurality of layout instances.

Embodiment 312. The method of embodiment 311 wherein the reference is a cell name.

Embodiment 313. The method of embodiment 311 wherein the reference is an instance name.

Embodiment 314. The method of embodiment 307 wherein one or more layout placement instructions specify a placement location for one or more corresponding layout instances of the plurality of layout instances.

Embodiment 315. The method of embodiment 307 wherein one or more layout placement instructions specify a particular layout instance, an x-axis coordinate, and a y-axis coordinate for positioning the particular layout instance.

Embodiment 316. The method of embodiment 315 wherein one or more layout placement instructions further specify a library name where the particular layout instance is stored.

Embodiment 317. The method of embodiment 315 wherein one or more layout placement instructions further specify a rotation of the particular layout instance.

Embodiment 318. The method of embodiment 307 wherein a first layout placement instruction of said plurality of layout placement instructions positions a first subset of the plurality of layout instances.

Embodiment 319. The method of embodiment 318 wherein the first subset of the plurality of layout instances are predefined layouts for sub-circuit schematics.

Embodiment 320. The method of embodiment 318 wherein the first subset of the plurality of layout instances are passive layout components.

Embodiment 321. The method of embodiment 320 wherein the plurality of passive layout components are resistor layout components.

Embodiment 322. The method of embodiment 320 wherein the plurality of passive components are capacitor layout components.

Embodiment 323. The method of embodiment 318 wherein a first layout placement instruction specifies a step direction along one of a plurality of axes.

Embodiment 324. The method of embodiment 318 wherein the first layout placement instruction specifies a starting position and a step between the first subset of layout instances.

Embodiment 325. The method of embodiment 324 wherein the step specifies a distance between adjacent boundaries of the first subset of layout instances.

Embodiment 326. The method of embodiment 324 wherein the step is greater than or equal to a length of a boundary along a first axis of the first subset of layout instances.

Embodiment 327. The method of embodiment 318 wherein the first layout placement instruction further specifies a maximum distance for successively placing layout instances along an axis.

Embodiment 328. The method of embodiment 327 wherein the maximum distance is associated with a length of one of the plurality of layout instances.

Embodiment 329. The method of embodiment 327 wherein the layout instances are successively placed along a first axis from the starting position up to second position based on said distance, and, when a first portion of the layout instances span a space between the starting position and the second position, a second portion of the layout instances are successively placed along the first axis between a third position, offset from the starting position along a second axis, and a fourth position based on said distance.

Embodiment 330. The method of embodiment 318 wherein the first subset of layout placement instances comprises at least a first subgroup of layout placement instances and a second subgroup of layout placement instances, and wherein the first layout placement instruction further specifies a step between first subgroup and second subgroup of layout instances.

Embodiment 331. The method of embodiment 318 wherein a second layout placement instruction following the first layout placement instruction places one or more layout instances of the plurality of layout instances at one or more positions starting from a final position of the first layout placement instruction.

Embodiment 332. The method of embodiment 307 wherein one or more of the layout placement instructions comprise conditional statements.

Embodiment 333. The method of embodiment 332 wherein at least one layout placement instruction determines if a position is occupied.

Embodiment 334. The method of embodiment 333 wherein one or more first layout placement instructions are executed if the position is occupied.

Embodiment 335. The method of embodiment 333 wherein one or more first layout placement instructions are executed if the position is not occupied.

Embodiment 336. The method of embodiment 332 wherein at least one layout placement instruction determines if one or more specified layout instances are included in the layout, and wherein one or more first layout placement instructions are executed if the specified instance is included in the layout, and wherein one or more second layout placement instructions are executed if the one or more specified layout instances are not in the layout.

Embodiment 337. A computer system for generating a circuit layout comprising: one or more processors; and a non-transitory computer-readable storage medium having stored thereon computer executable instructions, which when executed by the computer system, cause the computer system to perform a method comprising: specifying a circuit schematic to be converted to said circuit layout; receiving a layout script associated with the circuit schematic, the layout script configured to position a plurality of layout instances generated from the circuit schematic; converting the circuit schematic into the plurality of layout instances; and positioning the plurality of layout instances based on the layout script to produce said circuit layout.

Embodiment 338. A non-transitory computer-readable storage medium having stored thereon computer executable instructions, which when executed by a computer system, cause the computer system to: specify a circuit schematic to be converted to said circuit layout; receive a layout script associated with the circuit schematic, the layout script configured to position a plurality of layout instances generated from the circuit schematic; convert the circuit schematic into the plurality of layout instances; and position the plurality of layout instances based on the layout script to produce said circuit layout.

The computer system of embodiment 337 in combination with any one or more of embodiments 297-336.

The non-transitory computer-readable storage medium of embodiment 338 having stored thereon computer executable instructions, which when executed by a computer system, cause the computer system to perform any one or more of embodiments 297-336.

Embodiment 339. A computer system for generating a circuit layout comprising: means for specifying a circuit schematic to be converted to said circuit layout; means for receiving a layout script associated with the circuit schematic, the layout script configured to position a plurality of layout instances generated from the circuit schematic; means for converting the circuit schematic into the plurality of layout instances; and means for positioning the plurality of layout instances based on the layout script to produce said circuit layout.

Embodiment 340. A computer-implemented method of generating a circuit layout comprising: receiving, in a layout canvas, a plurality of layout instances generated from a schematic; receiving a layout script associated with the schematic, wherein the layout script comprises a plurality of layout placement instructions for placing a plurality of layout instances generated from the schematic; and positioning the plurality of layout instances using the plurality of layout placement instructions.

Embodiment 341. A computer system for generating a circuit layout comprising: one or more processors; and a non-transitory computer-readable storage medium having stored thereon computer executable instructions, which when executed by the computer system, cause the computer system to perform a method comprising: receiving, in a layout canvas, a plurality of layout instances generated from a schematic; receiving a layout script associated with the schematic, wherein the layout script comprises a plurality of layout placement instructions for placing a plurality of layout instances generated from the schematic; and positioning the plurality of layout instances using the plurality of layout placement instructions.

Embodiment 342. A non-transitory computer-readable storage medium having stored thereon computer executable instructions, which when executed by a computer system, cause the computer system to: receive, in a layout canvas, a plurality of layout instances generated from a schematic; receive a layout script associated with the schematic, wherein the layout script comprises a plurality of layout placement instructions for placing a plurality of layout instances generated from the schematic; and position the plurality of layout instances using the plurality of layout placement instructions.

Embodiment 343. A system for generating a circuit layout comprising: means for receiving, in a layout canvas, a plurality of layout instances generated from a schematic; means for receiving a layout script associated with the schematic, wherein the layout script comprises a plurality of layout placement instructions for placing a plurality of layout instances generated from the schematic; and means for positioning the plurality of layout instances using the plurality of layout placement instructions.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method of generating a circuit comprising:
  generating a circuit specification, said generating the circuit specification comprising:
    receiving parameters specifying the circuit to be generated;
    selecting, based on the parameters, predefined sub-circuit schematics to be included in the circuit;
    determining, based on the parameters, connections between the predefined sub-circuit schematics;
    generating the circuit specification for the circuit to be generated specifying the sub-circuit schematics and the connections between the predefined sub-circuit schematics; and
    generating a layout script associated with the circuit to be generated; and
  converting the circuit specification into a circuit schematic and a circuit layout, said converting comprising:
    selecting predefined sub-circuit schematics specified in the circuit specification;
    connecting the predefined sub-circuit schematics to form the circuit schematic;

converting the circuit schematic into a plurality of layout instances; and positioning the layout instances based on the layout script associated with the circuit to be generated to produce the circuit layout.

2. The method of claim 1, wherein the predefined sub-circuit schematics comprise predefined analog sub-circuit schematics.

3. The method of claim 1, wherein the parameters specify one or more functional circuit components, and wherein the one or more functional circuit components have corresponding predefined sub-circuit schematics.

4. The method of claim 3, further comprising generating one or more symbols corresponding to the one or more functional circuit components, wherein the symbols encapsulate the selected predefined sub-circuit schematics.

5. The method of claim 1, wherein the layout script comprises a plurality of layout placement instructions.

6. The method of claim 1, wherein the layout script is configured to position layout instances from a plurality of circuit schematics.

7. The method of claim 6, wherein the plurality of circuit schematics are associated with the same functional circuit component.

8. The method of claim 1, wherein said generating a circuit specification is performed on a first software system and said converting the circuit specification to a circuit schematic and a circuit layout is performed on a second software system.

9. The method of claim 8, wherein the second software system is an electronic design automation software system.

10. A computer system for generating a circuit comprising:

one or more processors; and a non-transitory computer-readable storage medium having stored thereon computer executable instructions, which when executed by the computer system, cause the computer system to perform a method comprising:

generating a circuit specification, said generating the circuit specification comprising:

receiving parameters specifying the circuit to be generated;

selecting, based on the parameters, predefined sub-circuit schematics to be included in the circuit;

determining, based on the parameters, connections between the predefined sub-circuit schematics;

generating the circuit specification for the circuit to be generated specifying the sub-circuit schematics and the connections between the predefined sub-circuit schematics; and generating a layout script associated with the circuit to be generated; and converting the circuit specification into a circuit schematic and a circuit layout, said converting comprising:

selecting predefined sub-circuit schematics specified in the circuit specification;

connecting the predefined sub-circuit schematics to form the circuit schematic;

converting the circuit schematic into a plurality of layout instances; and positioning the layout instances based on the layout script associated with the circuit to be generated to produce the circuit layout.

11. The computer system of claim 10, wherein the parameters specify one or more functional circuit components, and wherein the one or more functional circuit components have corresponding predefined sub-circuit schematics.

12. The computer system of claim 10, wherein the layout script comprises a plurality of layout placement instructions.

13. The computer system of claim 10, wherein the layout script is configured to position layout instances from a plurality of circuit schematics.

14. The computer system of claim 10, wherein said generating a circuit specification is performed on a first software system and said converting the circuit specification to a circuit schematic and a circuit layout is performed on a second software system, wherein the second software system is an electronic design automation software system.

15. A non-transitory computer-readable storage medium having stored thereon computer executable instructions, which when executed by a computer system, cause the computer system to:

generate a circuit specification, said generate the circuit specification comprising:

receive parameters specifying the circuit to be generated;

select, based on the parameters, predefined sub-circuit schematics to be included in the circuit;

determine, based on the parameters, connections between the predefined sub-circuit schematics;

generate the circuit specification for the circuit to be generated specifying the sub-circuit schematics and the connections between the predefined sub-circuit schematics; and generate a layout script associated with the circuit to be generated; and convert the circuit specification into a circuit schematic and a circuit layout, said convert the circuit specification comprising:

select predefined sub-circuit schematics specified in the circuit specification;

connect the predefined sub-circuit schematics to form the circuit schematic;

convert the circuit schematic into a plurality of layout instances; and position the layout instances based on the layout script associated with the circuit to be generated to produce the circuit layout.

16. The non-transitory computer-readable storage medium of claim 15, wherein the parameters specify one or more functional circuit components, and wherein the one or more functional circuit components have corresponding predefined sub-circuit schematics.

17. The non-transitory computer-readable storage medium of claim 15, wherein the layout script comprises a plurality of layout placement instructions.

18. The non-transitory computer-readable storage medium of claim 15, wherein the layout script is configured to position layout instances from a plurality of circuit schematics.

19. The non-transitory computer-readable storage medium of claim 15, wherein said generating a circuit specification is performed on a first software system and said converting the circuit specification to a circuit schematic and a circuit layout is performed on a second software system, wherein the second software system is an electronic design automation software system.

* * * * *